United States Patent
Hayter et al.

(10) Patent No.: US 12,502,102 B2
(45) Date of Patent: Dec. 23, 2025

(54) SYSTEMS, DEVICES, AND METHODS FOR MEAL INFORMATION COLLECTION, MEAL ASSESSMENT, AND ANALYTE DATA CORRELATION

(71) Applicant: ABBOTT DIABETES CARE INC., Alameda, CA (US)

(72) Inventors: Gary A. Hayter, Oakland, CA (US); Timothy C. Dunn, San Francisco, CA (US); Yashesvini V. Ram, Newark, CA (US); Claire A. Cunningham, Point Richmond, CA (US); Justin N. Williams, Oakland, CA (US); William Koo Lee, Alameda, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 198 days.

(21) Appl. No.: 17/360,621

(22) Filed: Jun. 28, 2021

(65) Prior Publication Data
US 2022/0000399 A1     Jan. 6, 2022

Related U.S. Application Data

(60) Provisional application No. 63/144,782, filed on Feb. 2, 2021, provisional application No. 63/046,849, filed on Jul. 1, 2020.

(51) Int. Cl.
*A61B 5/145*     (2006.01)
*A61B 5/00*     (2006.01)

(52) U.S. Cl.
CPC .......... *A61B 5/14532* (2013.01); *A61B 5/743* (2013.01); *A61B 5/746* (2013.01)

(58) Field of Classification Search
CPC ........ G16H 20/60; G16H 10/40; G16H 50/20; G16H 50/30; A61B 5/14532; A61B 5/743;
(Continued)

(56) References Cited

U.S. PATENT DOCUMENTS 4,545,382 A    10/1985  Higgins et al.
4,711,245 A    12/1987  Higgins et al.
(Continued)

FOREIGN PATENT DOCUMENTS

WO    WO 2015/153482 A1    10/2015
WO    WO 2016/191706 A1    12/2016
(Continued)

OTHER PUBLICATIONS

Dobrev, A. (Dec. 16, 2014). Increment push notification badge No. Increment push notification badge number | Telerik Forums. https://www.telerik.com/forums/increment-push-notification-badge-number (Year: 2014).*

(Continued)

*Primary Examiner* — Jennifer Robertson
*Assistant Examiner* — Elina Sohyun Jang
(74) *Attorney, Agent, or Firm* — ONE LLP

(57) ABSTRACT

Systems, devices, and methods for detecting, measuring and classifying meals for an individual based on analyte measurements. These results and related information can be presented to the individual to show the individual which meals are causing the most severe analyte response. These results can be organized and categorized based on preselected criteria or previous meals and results so as to organize and present the results in a format with reference to glucose as the monitored analyte. Various embodiments disclosed herein relate to methods, systems, and software applications intended to engage an individual by providing direct and timely feedback regarding the individual's meal-related glycemic response.

16 Claims, 97 Drawing Sheets

(58) Field of Classification Search
CPC ...... A61B 5/0004; A61B 5/145–14546; A61B 5/742–745; A61B 5/746; G06F 11/366
See application file for complete search history.

(56) References Cited

U.S. PATENT DOCUMENTS

| | | | |
|---|---|---|---|
| 5,262,035 A | 11/1993 | Gregg et al. |
| 5,262,305 A | 11/1993 | Heller et al. |
| 5,264,104 A | 11/1993 | Gregg et al. |
| 5,320,715 A | 6/1994 | Berg |
| 5,356,786 A | 10/1994 | Heller et al. |
| 5,509,410 A | 4/1996 | Hill et al. |
| 5,543,326 A | 8/1996 | Heller et al. |
| 5,593,852 A | 1/1997 | Heller et al. |
| 5,601,435 A | 2/1997 | Quy |
| 5,628,890 A | 5/1997 | Carter et al. |
| 5,820,551 A | 10/1998 | Hill et al. |
| 5,822,715 A | 10/1998 | Worthington et al. |
| 5,899,855 A | 5/1999 | Brown |
| 5,918,603 A | 7/1999 | Brown |
| 6,071,391 A | 6/2000 | Gotoh et al. |
| 6,103,033 A | 8/2000 | Say et al. |
| 6,120,676 A | 9/2000 | Heller et al. |
| 6,121,009 A | 9/2000 | Heller et al. |
| 6,134,461 A | 10/2000 | Say et al. |
| 6,143,164 A | 11/2000 | Hsieh et al. |
| 6,144,837 A | 11/2000 | Quy |
| 6,161,095 A | 12/2000 | Brown |
| 6,175,752 B1 | 1/2001 | Say et al. |
| 6,270,455 B1 | 8/2001 | Brown |
| 6,284,478 B1 | 9/2001 | Heller et al. |
| 6,299,757 B1 | 10/2001 | Feldman et al. |
| 6,338,790 B1 | 1/2002 | Feldman et al. |
| 6,377,894 B1 | 4/2002 | Deweese et al. |
| 6,461,496 B1 | 10/2002 | Feldman et al. |
| 6,503,381 B1 | 1/2003 | Gotoh et al. |
| 6,514,460 B1 | 2/2003 | Fendrock |
| 6,514,718 B2 | 2/2003 | Heller et al. |
| 6,540,891 B1 | 4/2003 | Stewart et al. |
| 6,560,471 B1 | 5/2003 | Heller et al. |
| 6,579,690 B1 | 6/2003 | Bonnecaze et al. |
| 6,591,125 B1 | 7/2003 | Buse et al. |
| 6,592,745 B1 | 7/2003 | Feldman et al. |
| 6,600,997 B2 | 7/2003 | Deweese et al. |
| 6,605,200 B1 | 8/2003 | Mao et al. |
| 6,605,201 B1 | 8/2003 | Mao et al. |
| 6,616,819 B1 | 9/2003 | Liamos et al. |
| 6,618,934 B1 | 9/2003 | Feldman et al. |
| 6,650,471 B2 | 11/2003 | Doi |
| 6,654,625 B1 | 11/2003 | Say et al. |
| 6,676,816 B2 | 1/2004 | Mao et al. |
| 6,730,200 B1 | 5/2004 | Stewart et al. |
| 6,736,957 B1 | 5/2004 | Forrow et al. |
| 6,746,582 B2 | 6/2004 | Heller et al. |
| 6,749,740 B2 | 6/2004 | Liamos et al. |
| 6,764,581 B1 | 7/2004 | Forrow et al. |
| 6,773,671 B1 | 8/2004 | Lewis et al. |
| 6,881,551 B2 | 4/2005 | Heller et al. |
| 6,893,545 B2 | 5/2005 | Gotoh et al. |
| 6,932,892 B2 | 8/2005 | Chen et al. |
| 6,932,894 B2 | 8/2005 | Mao et al. |
| 6,942,518 B2 | 9/2005 | Liamos et al. |
| 7,041,468 B2 | 5/2006 | Drucker et al. |
| 7,167,818 B2 | 1/2007 | Brown |
| 7,299,082 B2 | 11/2007 | Feldman et al. |
| 7,501,053 B2 | 3/2009 | Karinka et al. |
| 7,618,369 B2 | 11/2009 | Hayter et al. |
| 7,740,581 B2 | 6/2010 | Buse et al. |
| 7,754,093 B2 | 7/2010 | Forrow et al. |
| 7,802,467 B2 | 9/2010 | Wang |
| 7,811,231 B2 | 10/2010 | Jin et al. |
| 7,811,430 B2 | 10/2010 | Petyt et al. |
| 7,822,557 B2 | 10/2010 | Chen et al. |
| 7,846,311 B2 | 12/2010 | Feldman et al. |
| 7,866,026 B1 | 1/2011 | Wang et al. |
| 7,885,698 B2 | 2/2011 | Feldman |
| 7,887,682 B2 | 2/2011 | Wang et al. |
| 7,895,740 B2 | 3/2011 | Wang et al. |
| 7,918,975 B2 | 4/2011 | Wang et al. |
| 8,219,173 B2 | 7/2012 | Budiman et al. |
| 8,298,389 B2 | 10/2012 | Chen et al. |
| 8,346,335 B2 | 1/2013 | Harper et al. |
| 8,595,607 B2 | 11/2013 | Nekoomaram et al. |
| 8,771,183 B2 | 7/2014 | Sloan |
| 9,171,343 B1 | 10/2015 | Fischell et al. |
| 9,402,544 B2 | 8/2016 | Yee et al. |
| 9,465,917 B2 | 10/2016 | Soni et al. |
| 2003/0208113 A1 | 11/2003 | Mault et al. |
| 2006/0091006 A1 | 5/2006 | Wang et al. |
| 2007/0095661 A1 | 5/2007 | Wang et al. |
| 2007/0233013 A1 | 10/2007 | Schoenberg |
| 2008/0161666 A1 | 7/2008 | Feldman et al. |
| 2008/0267823 A1 | 10/2008 | Wang et al. |
| 2009/0294277 A1 | 12/2009 | Thomas et al. |
| 2010/0081905 A1 | 4/2010 | Bommakanti et al. |
| 2010/0198034 A1 | 8/2010 | Thomas et al. |
| 2010/0213057 A1 | 8/2010 | Feldman et al. |
| 2010/0230285 A1 | 9/2010 | Hoss et al. |
| 2010/0326842 A1 | 12/2010 | Mazza et al. |
| 2011/0021889 A1 | 1/2011 | Hoss et al. |
| 2011/0213225 A1 | 9/2011 | Bernstein et al. |
| 2012/0014701 A1* | 1/2012 | Tokuno ............ G03G 15/5079 399/27 |
| 2012/0150005 A1 | 6/2012 | Hoss et al. |
| 2012/0227737 A1 | 9/2012 | Mastrototaro et al. |
| 2013/0085358 A1 | 4/2013 | Crouther et al. |
| 2014/0075004 A1* | 3/2014 | Van Dusen ............ G07C 13/00 709/223 |
| 2014/0088393 A1 | 3/2014 | Bernstein et al. |
| 2014/0256103 A1 | 9/2014 | Kim |
| 2014/0350369 A1 | 11/2014 | Budiman et al. |
| 2015/0119655 A1 | 4/2015 | Mayou et al. |
| 2015/0205947 A1 | 7/2015 | Berman et al. |
| 2015/0341438 A1 | 11/2015 | Sloan et al. |
| 2017/0049386 A1* | 2/2017 | Abraham ............... G16H 50/20 |
| 2017/0185748 A1 | 6/2017 | Budiman et al. |
| 2018/0101649 A1* | 4/2018 | Azuma .................. G16H 10/60 |
| 2018/0217917 A1* | 8/2018 | Hayter .................. G16H 10/60 |
| 2018/0342173 A1 | 11/2018 | Jordan |
| 2020/0105397 A1 | 4/2020 | Budiman et al. |
| 2021/0030323 A1 | 2/2021 | Hayter et al. |

FOREIGN PATENT DOCUMENTS

WO  WO 2017/007775 A2  1/2017
WO  WO 2018/132315 A1  7/2018

OTHER PUBLICATIONS

Krishna. (Mar. 22, 2011). How to remove the notification after the particular time in Android?. Stack Overflow. https://stackoverflow.com/questions/5399229/how-to-remove-the-notification-after-the-particular-time-in-android, (Year: 2011).*
Raptor. (May 9, 2013). How to increment/decrement application. badge number for UILocalnotification. Stack Overflow. https://stackoverflow.com/questions/16465947/how-to-increment-decrement-application-badge-number-for-uilocalnotification (Year: 2013).*
WO, PCT/US20/44077 ISR and Written Opinion, Oct. 20, 2020.
WO, PCT/US21/39372 ISR and Written Opinion, Oct. 22, 2021.
JP, 2022-580411 Office Action, Jun. 25, 2025.

* cited by examiner

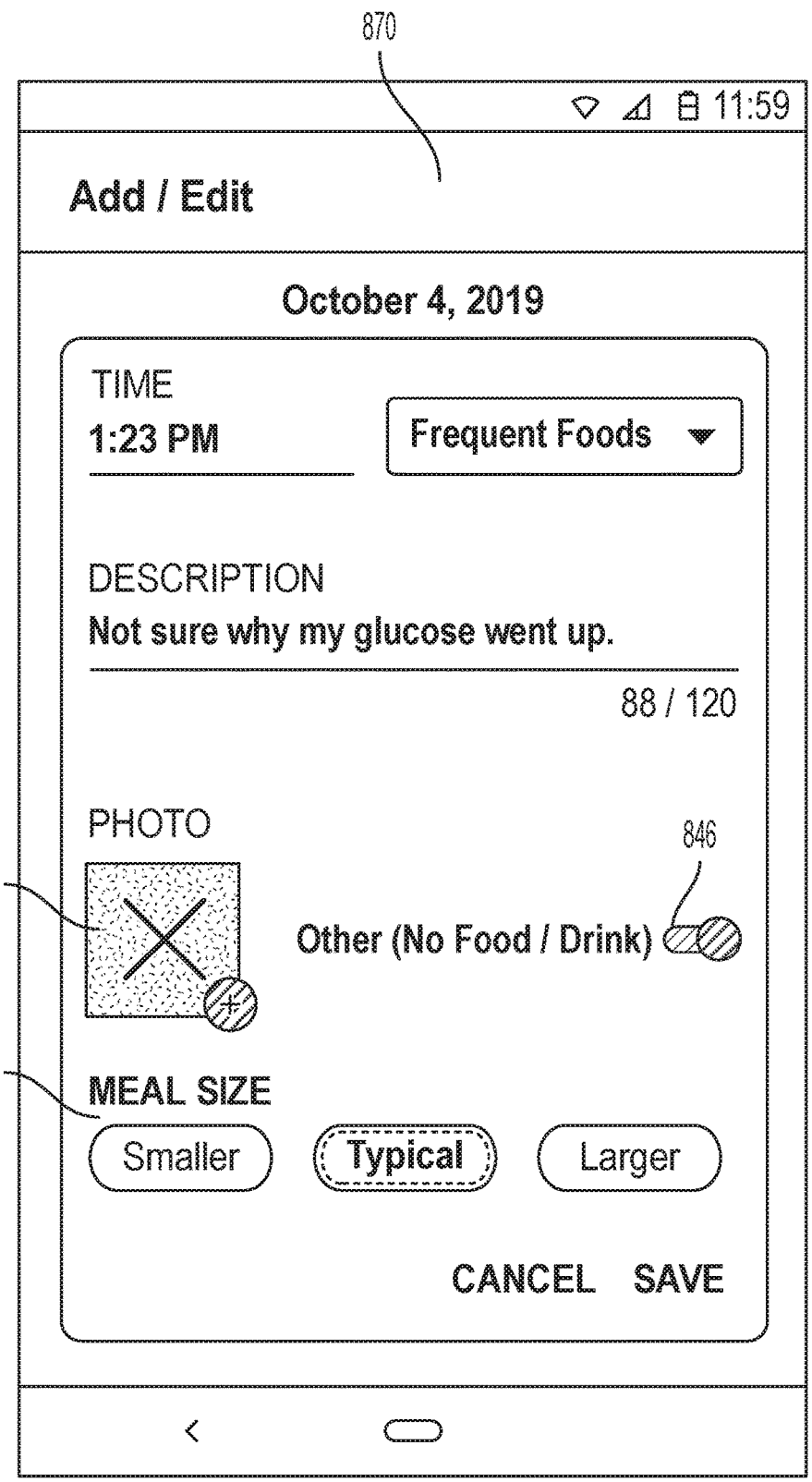
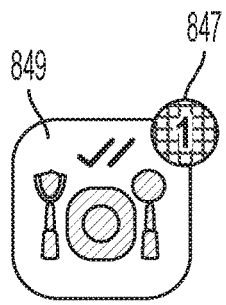
FIG. 10C
FIG. 10B CONTINUED

SYSTEMS, DEVICES, AND METHODS FOR MEAL INFORMATION COLLECTION, MEAL ASSESSMENT, AND ANALYTE DATA CORRELATION

CROSS-REFERENCE TO RELATED APPLICATIONS

This application claims priority to U.S. Provisional Application No. 63/144,782, filed Feb. 2, 2021, and U.S. Provisional Application No. 63/046,849, filed Jul. 1, 2020, both of which are herein expressly incorporated by reference in their entirety for all purposes. This application is also related to U.S. application Ser. No. 15/206,095, filed Jul. 8, 2016, which claims priority to, and the benefit of, U.S. Provisional Application No. 62/191,218, filed Jul. 10, 2015, U.S. Provisional Application No. 62/191,262, filed Jul. 10, 2015, U.S. Provisional Application No. 62/307,344, filed Mar. 11, 2016, and U.S. Provisional Application No. 62/307,346, filed Mar. 11, 2016, all of which are herein expressly incorporated by reference in their entirety for all purposes.

FIELD

The present subject matter broadly relates to systems, devices, and methods for the collection of information about analyte levels of individuals and information about meals that those individuals consume. The present subject matter further relates to processing, analyzing, and/or presenting this information for the purpose of correlating meal information to analyte levels, and identifying and implementing adjustments to the diet, lifestyle, and/or medical treatment regimens of those individuals.

BACKGROUND

The increased prevalence of Type-Two diabetes and metabolic syndrome over the past few decades has been attributed to changing diet and activity levels. For example, consumption of more readily available high glycemic index (GI) foods cause rapid post-prandial increase of blood glucose and insulin levels, which has a positive association with weight gain and obesity. These conditions can be further traced to an increased risk of developing these and other diseases.

Most people generally understand the importance of their diet. However, in practice, many people struggle with translating this general awareness to their specific food choices. These problems exist primarily because people cannot directly see the impact of their choices. This can lead to misconceptions around food portion size, misunderstandings about which foods are relatively healthy, and a general lack of awareness regarding the necessary duration and intensity of activity to maintain good health. These problems are further exacerbated by advertisements, habits, peer pressure, food preferences, and recommendations based on generalizations.

To address these issues, an individual's physiological responses can be tracked and better understood by analyte monitoring systems. Because high glucose levels are primarily driven by the consumption of food, the level of post-prandial glucose can relate to the amount of carbohydrates and other meal components consumed by the individual, as well as to the individual's physiological response to meals. However, a challenge for analysis of this influx of data is to represent the data in a meaningful manner that enables efficient action. Data relating to meal selection, and the subsequent impact, should be understood on a clinical basis, as well as a personal basis for the individual, the meal administrator, and/or the medical professional to understand and moderate glucose excursions, such as episodes of hyperglycemia.

Prior attempts to implement software for tracking a user's meal consumption and correlating that to the user's analyte data suffer from numerous deficiencies. For example, some systems require that the individual perform numerous inconvenient and uncomfortable discrete blood glucose measurements (e.g., finger stick blood glucose tests). These solutions can also suffer from an insufficient number of data points to adequately determine a glycemic response to a meal. For example, the individual may perform a discrete blood glucose measurement at a time before or after the time when the user's glycemic response peaks, making it difficult to accurately ascertain the glycemic response, and to meaningfully compare meals based on the glycemic response. A deficiency in data points can also make it difficult to automatically detect the occurrence of a meal event in the user's analyte data. Thus, some prior systems place significant reliance upon manual logging of meals by the user.

Prior art systems that seek to detect meal events based simply on the existence of a rise in glucose levels, such as U.S. Patent Publication No. 2003/0208113, are inadequate because they fail to take into account the user's prior meal history and thus can overestimate the number of meals the user has consumed.

Thus, improved systems, devices, and methods for meal information collection, meal assessment and detection, and correlation to analyte levels are needed.

SUMMARY

Provided herein are example embodiments of systems, devices, and methods for detecting, measuring, and classifying meals for a human individual in relation to that individual's analyte measurements. These individuals can be those exhibiting or diagnosed with a diabetic condition, those considered as pre-diabetic, those with metabolic syndrome, and even those without diabetes, pre-diabetic, or metabolic syndrome conditions. These individuals can be any person motivated to improve his or her health by adjustment to his or her diet and/or activity practices. Resulting information can be presented to the individual to show which meals or aspects of the meals are causing the most impact on analyte levels. These results can be organized and categorized based on preselected criteria chosen directly by the individual or based upon consultation between the individual and a medical professional.

In many embodiments, the individual's meal-related analyte responses collected by an analyte monitoring system, such as an in vivo analyte monitoring system, can be compared with or linked to meal information to discover common consistencies (or inconsistencies) along with trends therein based on related historical glucose readings and associated algorithms, variables, weights, comparisons, and trends.

Many embodiments disclosed herein are intended to engage the individual by providing direct and timely feedback regarding the individual's meal-related analyte response. In some embodiments, this analyte response can be provided to the individual to characterize the effects of meal consumption.

The present embodiments can be immediately informative and fun to use by the individual, thereby encouraging the individual's experimentation therewith to better understand how their own diet impacts their body's analyte response. The individual can compare and contrast their current and historical analyte data to see their how their own efforts are related to better diet and meal section and how these choices directly affect their health.

Example embodiments are also provided that enable the collection of analyte data from a local population and linking or association of that data with meal information about meals consumed by the local population. The aggregated information can be processed and presented to a user to identify common trends in analyte levels amongst the local population and to identify whether any correlation exists to the common diet of that population. For example, a person with responsibility for dietary selections can utilize the presented information to determine whether meal contents, types, and/or times of administration can or should be adjusted to alleviate an undesirable trend in the aggregate analyte data, such as a reduction in the occurrence of hypoglycemic or hyperglycemic events. These example embodiments have particular suitability for populations in a common living arrangement, examples of which can include senior care facilities, hospitals, rehabilitation centers, schools, dormitories, military compounds or bases, family residences, prison or penal populations, and any other such environment where a group of individuals share one or more meals on a regular basis.

In preferred embodiments at least, many of the embodiments provided herein are improved graphical user interfaces (GUIs) or GUI features for analyte monitoring systems that are highly intuitive, user-friendly, and provide for rapid access to physiological information of a user. More specifically, these embodiments may allow a user to easily navigate through and between different user interfaces that can quickly indicate to the user various physiological conditions and/or actionable responses and correlate analyte data with meals, exercise, stress, or other factors, without requiring the user (or an HCP) to go through the arduous task of examining large volumes of analyte data. Furthermore, in preferred embodiments at least, some of the GUIs and GUI features allow for users (and their caregivers) to better understand and improve their diet, eating habits, and managing other stressors as they see the correlations with these activities and their glucose levels. Likewise, in preferred embodiments at least, improved digital interfaces and/or features for meal monitoring systems may improve upon: the visualization of the impact of food choices on analyte (glucose) levels and the amount of time spent in a goal analyte range (time in range, TIR), the visualization of the good foods and bad foods that exist in the user's current diet and their impact on glucose levels and TIR, the correlation of meal information to detected meal events, and the motivation for users to maintain and/or increase TIR by informing users of options of foods to eat while still maintaining a TIR goal, to name only a few. Other improvements and advantages are provided as well. The various configurations of these devices are described in detail by way of the embodiments which are only examples.

The improvements to the GUI in the various aspects described and claimed herein produce a technical effect at least in that they assist the user of the device to operate the device more accurately, more efficiently and more safely. It will be appreciated that the information that is provided to the user on the GUI, the order in which that information is provided and the clarity with which that information is structured can have a significant effect on the way the user interacts with the system and the way the system operates. The GUI therefore guides the user in the technical task of operating the system to take the necessary readings and/or obtain information accurately and efficiently.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be depicted schematically rather than literally or precisely.

FIGS. 8A-1-8B depicts example embodiments of graphical user interfaces for displaying analyte metrics.

FIGS. 9A-1-9D depict example embodiments of graphical user interfaces for logging meal information.

FIGS. 10A-1-10B depict example embodiments of graphical user interfaces for logging events not related to food or drink.

FIG. 10C depicts an example embodiment of an application icon.

FIGS. 16A-1-16D-2 depict additional example embodiments of graphical user interfaces for displaying time in range metrics.

DETAILED DESCRIPTION

Figure 1:
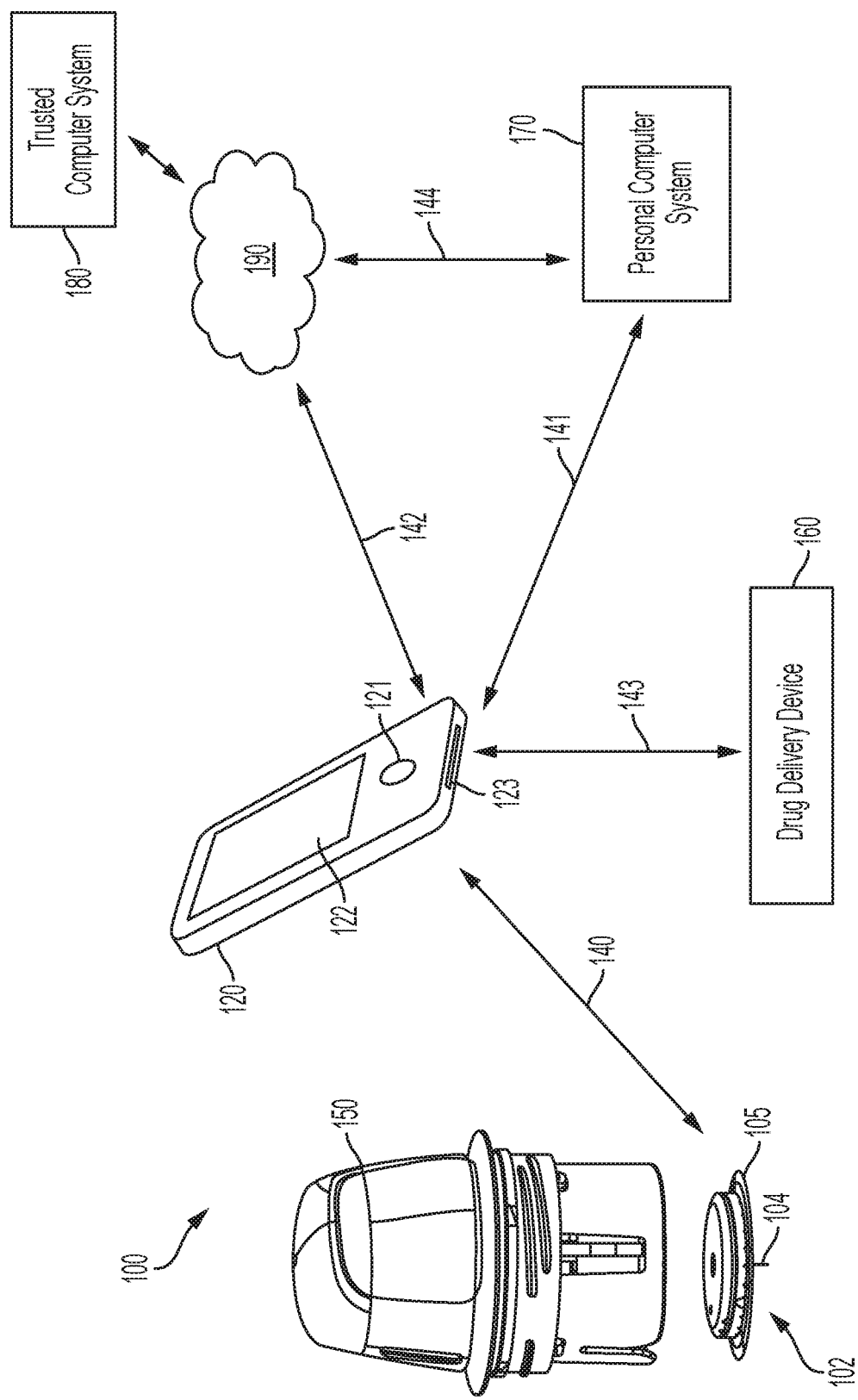
FIG. 1 is a high level diagram depicting an example embodiment of an analyte monitoring system for real time analyte (e.g., glucose) measurement, data acquisition and/or processing.

Provided herein are example embodiments of systems, devices, and methods for detecting, measuring, and classifying meals for a human individual in relation to that individual's analyte levels. Based on the analyte data collected, meal-related events and their impact on the individual's analyte levels can be further understood and used to modify future meal selection and dietary habits. Moreover, the administration schedule for insulin or other medication can be adjusted based upon the analyte response to particular meals.

Before describing this subject matter in greater detail, it is worthwhile to describe example embodiments of systems, devices, and methods with which the subject matter can be implemented.

A number of systems have been developed for the automatic monitoring of the analyte(s), like glucose, in bodily fluid such as in the blood stream, in interstitial fluid ("ISF"), dermal fluid of the dermal layer, or in other biological fluid. Some of these systems are configured so that at least a portion of a sensor is positioned below a skin surface of a user, e.g., in a blood vessel or in the subcutaneous tissue of a user, to obtain information about at least one analyte of the body.

As such, these systems can be referred to as "in vivo" monitoring systems. In vivo analyte monitoring systems include "Continuous Analyte Monitoring" systems (or "Continuous Glucose Monitoring" systems) that can transmit data from a sensor control device to a reader device continuously without prompting, e.g., automatically according to a schedule. In vivo analyte monitoring systems also include "Flash Analyte Monitoring" systems (or "Flash Glucose Monitoring" systems or simply "Flash" systems) that can transfer data from a sensor control device in response to a scan or request for data by a reader device, such as with an Near Field Communication (NFC) or Radio Frequency Identification (RFID) protocol. In vivo analyte monitoring systems can also operate without the need for finger stick calibration.

The in vivo analyte monitoring systems can be differentiated from "in vitro" systems that contact a biological sample outside of the body (or rather "ex vivo") and that typically include a meter device that has a port for receiving an analyte test strip carrying bodily fluid of the user, which can be analyzed to determine the user's blood sugar level. While in many of the present embodiments the monitoring is accomplished in vivo, the embodiments disclosed herein can be used with in vivo analyte monitoring systems that incorporate in vitro capability, as well has purely in vitro or ex vivo analyte monitoring systems.

The sensor can be part of the sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This device, and variations thereof, can be referred to as a "reader device" (or simply a "reader"), "handheld electronics" (or a handheld), a "portable data processing" device or unit, a "data receiver," a "receiver" device or unit (or simply a receiver), or a "remote" device or unit, to name a few. Other devices such as personal computers have also been utilized with or incorporated into in vivo and in vitro monitoring systems.

Embodiments of In Vivo Monitoring Systems

For purpose of illustration, and not limitation, the graphical user interfaces and associated software described herein may be used in connection with an exemplary analyte monitoring system as depicted in FIG. 1. FIG. 1 is an illustrative view depicting an example in vivo analyte monitoring system 100 with which any and/or all of the embodiments described herein can be used. System 100 can have a sensor control device 102 and a reader device 120 that communicate with each other over a local communication path (or link) 140, which can be wired or wireless, and uni-directional or bi-directional. In embodiments where local communication path 140 is wireless, any near field communication (NFC) protocol, RFID protocol, Bluetooth or Bluetooth Low Energy protocol, Wi-Fi protocol, proprietary protocol, or the like can be used, including those communication protocols in existence as of the date of this filing or their later developed variants.

Bluetooth is a well-known standardized short range wireless communication protocol, and Bluetooth Low Energy is a version of the same that requires less power to operate. Bluetooth Low Energy (Bluetooth LE, BTLE, BLE) is also referred to as Bluetooth Smart or Bluetooth Smart Ready. A version of BTLE is described in the Bluetooth Specification, version 4.0, published Jun. 30, 2010, which is explicitly incorporated by reference herein for all purposes. The term "NFC" applies to a number of protocols (or standards) that set forth operating parameters, modulation schemes, coding, transfer speeds, frame format, and command definitions for NFC devices. The following is a non-exhaustive list of examples of these protocols, each of which (along with all of its sub-parts) is incorporated by reference herein in its entirety for all purposes: ECMA-340, ECMA-352, ISO/IEC 14443, ISO/IEC 15693, ISO/IEC 16000-3, ISO/IEC 18092, and ISO/IEC 21481.

Reader device 120 is also capable of wired, wireless, or combined communication, either bidirectional or unidirectional, with either or all of: a drug delivery device 160 over communication path (or link) 143, a local computer system 170 over communication path (or link) 141, and with a network 190 over communication path (or link) 142. The same wireless protocols described for link 140 can likewise be used for all or part of links 141, 142, and 143.

Reader device 120 can communicate with any number of entities through network 190, which can be part of a telecommunications network, such as a Wi-Fi network, a local area network (LAN), a wide area network (WAN), the internet, or other data network for uni-directional or bi-directional communication. A trusted computer system 180 can be accessed through network 190. In an alternative embodiment, communication paths 141 and 142 can be the same path which can include the network 190 and/or additional networks. All communications over paths 140, 141, 142, and 143 can be encrypted and sensor control device 102, reader device 120, drug delivery device 160, remote computer system 170, and trusted computer system 180 can each be configured to encrypt and decrypt those communications sent and received.

Variants of devices 102 and 120, as well as other components of an in vivo-based analyte monitoring system that are suitable for use with the system, device, and method embodiments set forth herein, are described in U.S. Patent Publication No. 2011/0213225 (the '225 Publication), which is incorporated by reference herein in its entirety for all purposes.

Sensor control device 102 can include a housing 103 containing in vivo analyte monitoring circuitry and a power source (not shown). The in vivo analyte monitoring circuitry can be electrically coupled with an analyte sensor 104 that can extend through an adhesive patch 105 and project away from housing 103. Adhesive patch 105 contains an adhesive layer (not shown) for attachment to a skin surface of the body of the user. Other forms of body attachment to the body may be used, in addition to or instead of adhesive.

Sensor 104 is adapted to be at least partially inserted into the body of the user, where it can make fluid contact with that user's body fluid (e.g., interstitial fluid (ISF), dermal fluid, or blood) and be used, along with the in vivo analyte monitoring circuitry, to measure analyte-related data of the user. Generally, sensor control device 102 and its components can be applied to the body with a mechanical applicator 150 in one or more steps, as described in the incorporated '225 Publication, or in any other desired manner.

After activation, sensor control device 102 can wirelessly communicate the collected analyte data (such as, for example, data corresponding to monitored analyte level and/or monitored temperature data, and/or stored historical analyte related data) to reader device 120 where, in certain embodiments, it can be algorithmically processed into data representative of the analyte level of the user and then displayed to the user and/or otherwise incorporated into a diabetes monitoring regime.

Various embodiments disclosed herein relate to reader device 120, which can have a user interface including one or more of a display 122, keyboard, optional user interface component 121, and the like. Here, display 122 can output information to the user and/or accept an input from the user (e.g., if configured as a touch screen). Reader device 120 can include one or more optional user interface components 121, such as a button, actuator, touch sensitive switch, capacitive switch, pressure sensitive switch, jog wheel or the like. Reader device 120 can also include one or more data communication ports 123 for wired data communication with external devices such as local computer system 170. Reader device 120 may also include an integrated or attachable in vitro meter, including an in vitro test strip port (not shown) to receive an in vitro analyte test strip for performing in vitro blood analyte measurements.

Drug delivery device 160 is capable of injecting or infusing a drug, such as but not limited to insulin, into the body of the individual wearing sensor control device 102. Like reader device 120, the drug delivery device can include processing circuitry, non-transitory memory containing instructions executable by the processing circuitry, wireless or wired communication circuitry, and a user interface including one or more of a display, touchscreen, keyboard, an input button or instrument, and the like. Drug delivery device 160 can include a drug reservoir, a pump, an infusion tube, and an infusion cannula configured for at least partial implantation into the user's body. The pump can deliver insulin from the reservoir, through the tube, and then through the cannula into the user's body. Drug delivery device 160 can include instructions, executable by the processor, to control the pump and the amount of insulin delivered. These instructions can also cause calculation of insulin delivery amounts and durations (e.g., a bolus infusion and/or a basal infusion profile) based on analyte level measurements obtained directly or indirectly from sensor control device 102. Alternatively, calculations of insulin delivery amounts and durations, and the control of the pump, can be performed by reader device 120 directly. The drug delivery device can be configured to communicate directly with reader device 120 in the form of a closed loop or semi-closed loop system. Alternatively, the drug delivery device can include the functionality of reader device 120 described herein, or vice versa, to arrive at one integrated reader and drug delivery device.

Computer system 170 may be a personal or laptop computer, a tablet, or other suitable data processing device. Computer 170 can be either local (e.g., accessible via a direct wired connection such as USB) or remote to reader device 120 and can be (or include) software for data management and analysis and communication with the components in analyte monitoring system 100. Operation and use of computer 170 is further described in the '225 Publication incorporated herein by reference. Analyte monitoring system 100 can also be configured to operate with a data processing module (not shown), also as described in the incorporated '225 Publication.

Trusted computer system 180 can be used to perform authentication of sensor control device 102 and/or reader device 120, used to store confidential data received from devices 102 and/or 120, used to output confidential data to devices 102 and/or 120, or otherwise configured. Trusted computer system 180 can include one or more computers, servers, networks, databases, and the like. Trusted computer system 180 can be within the possession of the manufacturer or distributor of sensor control device 102, either physically or virtually through a secured connection, or can be maintained and operated by a different party (e.g., a third party).

Trusted computer system 180 can be trusted in the sense that system 100 can assume that computer system 180 provides authentic data or information. Trusted computer system 180 can be trusted simply by virtue of it being within the possession or control of the manufacturer, e.g., like a typical web server. Alternatively, trusted computer system 180 can be implemented in a more secure fashion such as by requiring additional password, encryption, firewall, or other internet access security enhancements that further guard against counterfeiter attacks or attacks by computer hackers.

The processing of data and the execution of software within system 100 can be performed by one or more processors of reader device 120, computer system 170, and/or sensor control device 102. For example, raw data measured by sensor 104 can be algorithmically processed into a value that represents the analyte level and that is readily suitable for display to the user, and this can occur in sensor control device 102, reader device 120, or computer system 170. This and any other information derived from the raw data can be displayed in any of the manners described above (with respect to display 122) on any display residing on any of sensor control device 102, reader device 120, or computer system 170. The information may be utilized by the user to determine any necessary corrective actions to ensure the analyte level remains within an acceptable and/or clinically safe range.

Figure 2A:
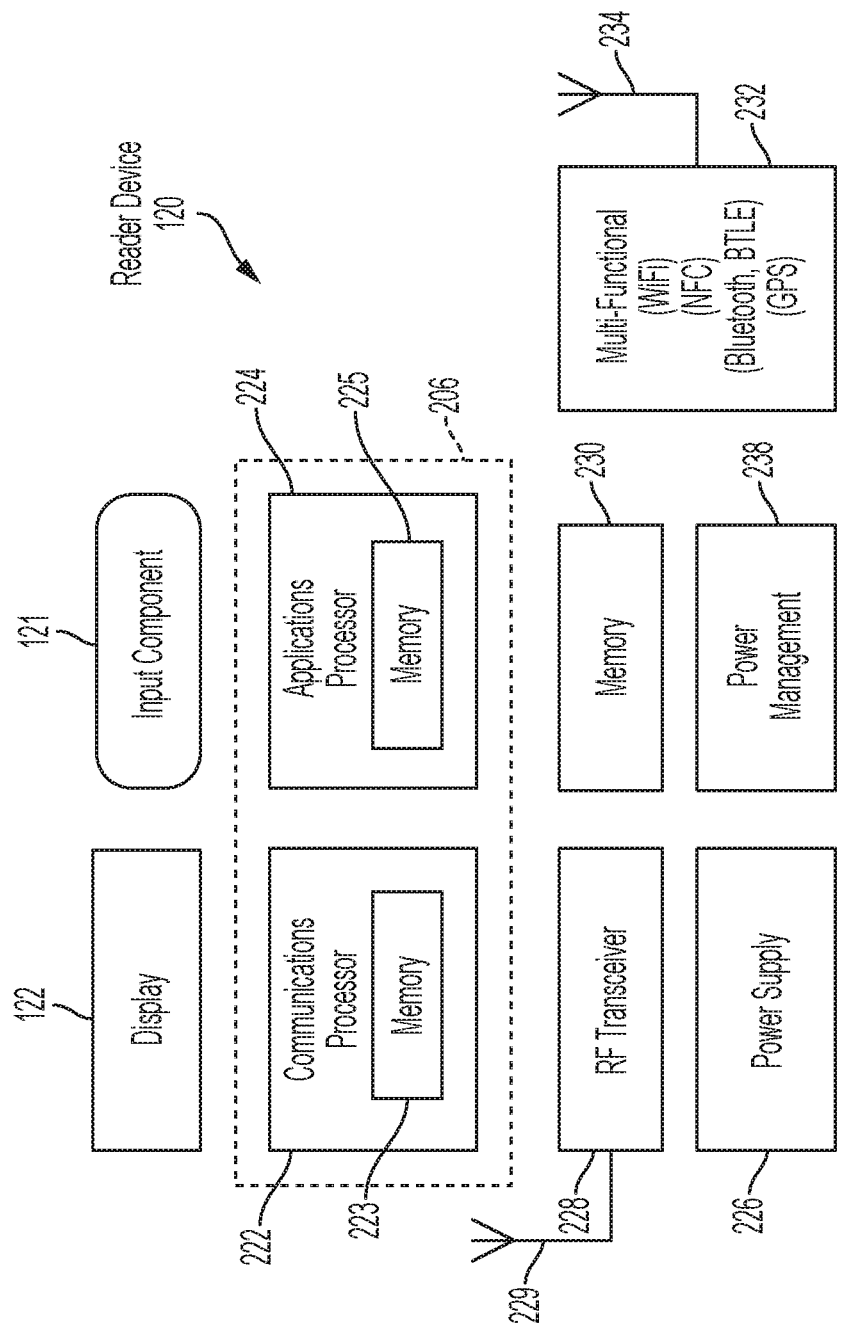
FIG. 2A is a block diagram depicting an example embodiment of a reader device configured as a smartphone.
Figure 2B:
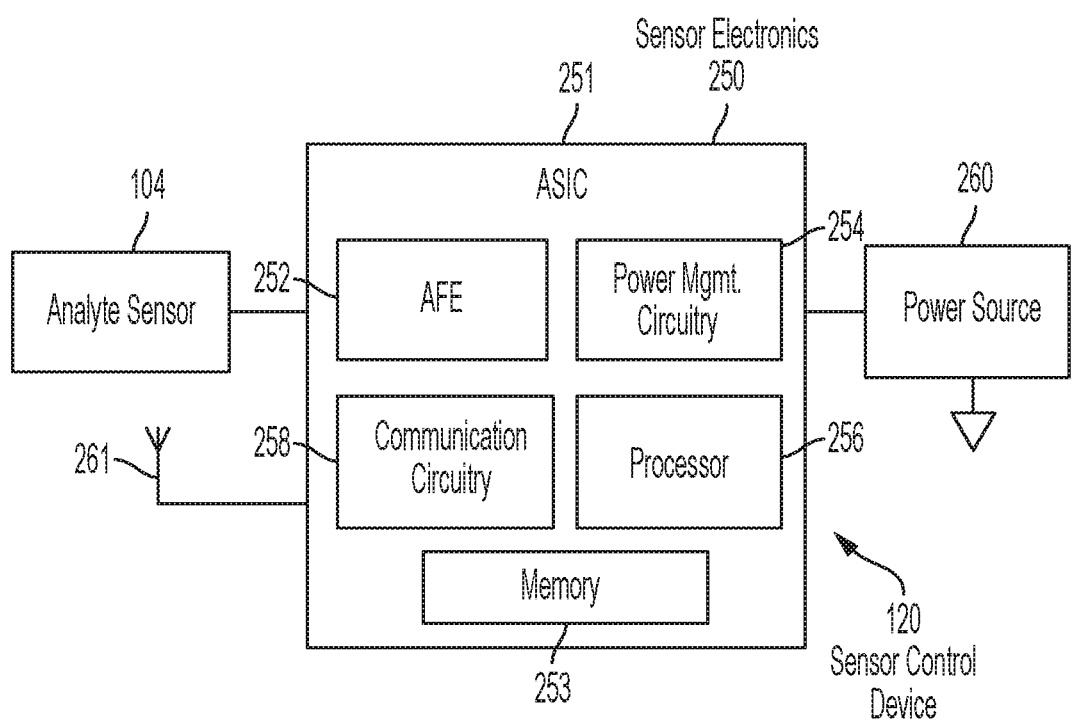
FIG. 2B is a block diagram depicting an example embodiment of a sensor control device.

FIGS. 2A-2B depict example embodiments of reader device 120 and sensor control device 102, respectively. As discussed above, reader device 120 can be a mobile communication device such as, for example, a Wi-Fi or internet enabled smartphone, tablet, or personal digital assistant (PDA). Examples of smartphones can include, but are not limited to, those phones based on a WINDOWS® operating system, ANDROID® operating system, IPHONE® operating system, PALM WEBOS®, BLACKBERRY® operating system, or SYMBIAN® operating system, with network connectivity for data communication over the internet or a local area network (LAN).

Reader device 120 can also be configured as a mobile smart wearable electronics assembly, such as an optical assembly that is worn over or adjacent to the user's eye (e.g., a smart glass or smart glasses, such as GOOGLE GLASSES™). This optical assembly can have a transparent display that displays information about the user's analyte level (as described herein) to the user while at the same time allowing the user to see through the display such that the user's overall vision is minimally obstructed. The optical assembly may be capable of wireless communications similar to a smartphone. Other examples of wearable electronics include devices that are worn around or in the proximity of the user's wrist (e.g., a watch, etc.), neck (e.g., a necklace, etc.), head (e.g., a headband, hat, etc.), chest, or the like.

FIG. 2A is a block diagram of an example embodiment of a reader device 120 according to various embodiments disclosed herein. In this example, the reader device 120 is in the form of a smartphone, upon which the various software, applications, and graphical user interfaces disclosed herein can reside. Here, reader device 120 includes an input component 121, display 122, and processing hardware 206, which can include one or more processors, microprocessors, controllers, and/or microcontrollers, each of which can be a discrete chip or distributed amongst (and a portion of) a number of different chips. Here, processing hardware 206 includes a communications processor 222 having on-board non-transitory memory 223 and an applications processor 224 having on-board non-transitory memory 225. Reader device 120 further includes an RF transceiver 228 coupled with an RF antenna 229, a memory 230, multi-functional circuitry 232 with one or more associated antennas 234, a power supply 226, and power management circuitry 238. FIG. 2A is an abbreviated representation of the internal components of a smartphone, and other hardware and functionality (e.g., codecs, drivers, glue logic, etc.) can of course be included.

Communications processor 222 can interface with RF transceiver 228 and perform analog-to-digital conversions, encoding and decoding, digital signal processing and other functions that facilitate the conversion of voice, video, and data signals into a format (e.g., in-phase and quadrature) suitable for provision to RF transceiver 228, which can then transmit the signals wirelessly. Communications processor 222 can also interface with RF transceiver 228 to perform the reverse functions necessary to receive a wireless transmission and convert it into digital data, voice, and video.

Applications processor 224 can be adapted to execute the operating system and any software applications that reside on reader device 120 (such as any sensor interface application or analyte monitoring application that includes, e.g., SLL 304), process video and graphics, and perform those other functions not related to the processing of communications transmitted and received over RF antenna 229. Any number of applications can be running on reader device 120 at any one time, and will typically include one or more applications that are related to a diabetes monitoring regime, in addition to the other commonly used applications that are unrelated to such a regime, e.g., email, calendar, weather, etc.

Memory 230 can be shared by one or more of the various functional units present within reader device 120, or can be distributed amongst two or more of them (e.g., as separate memories present within different chips). Memory 230 can also be a separate chip of its own. Memory 230 is non-transitory, and can be volatile (e.g., RAM, etc.) and/or non-volatile memory (e.g., ROM, flash memory, F-RAM, etc.).

Multi-functional circuitry 232 can be implemented as one or more chips and/or components, including communication circuitry, that perform other functions such as local wireless communications (e.g., Wi-Fi, Bluetooth, Bluetooth Low Energy) and determining the geographic position of reader device 120 (e.g., global positioning system (GPS) hardware). One or more other antennas 234 are associated with the functional circuitry 232 as needed.

Power supply 226 can include one or more batteries, which can be rechargeable or single-use disposable batteries. Power management circuitry 238 can regulate battery charging and power supply monitoring, boost power, perform DC conversions, and the like. As mentioned, reader device 120 may also include one or more data communication ports such as USB port (or connector) or RS-232 port (or any other wired communication ports) for data communication with a remote computer system 170 (see FIG. 1), or sensor control device 102, to name a few.

FIG. 2B is a block schematic diagram depicting an example embodiment of sensor control device 102 having analyte sensor 104 and sensor electronics 250 (including analyte monitoring circuitry). Although any number of chips can be used, here the majority of the sensor electronics 250 are incorporated on a single semiconductor chip 251 that can be, e.g., a custom application specific integrated circuit (ASIC). Shown within ASIC 251 are several high-level functional units, including an analog front end (AFE) 252, power management circuitry 254, processor 256, and communication circuitry 258 (which can be implemented as a transmitter, receiver, transceiver, passive circuit, or otherwise according to the communication protocol). In this embodiment shown in FIG. 2B, both AFE 252 and processor 256 are used as analyte monitoring circuitry, but in other embodiments either circuit can perform the analyte monitoring function. Processor 256 can include one or more processors, microprocessors, controllers, and/or microcontrollers.

A non-transitory memory 253 is also included within ASIC 251 and can be shared by the various functional units present within ASIC 251, or can be distributed amongst two or more of them. Memory 253 can be volatile and/or non-volatile memory. In this embodiment, ASIC 251 is coupled with power source 260, which can be a coin cell battery, or the like. AFE 252 interfaces with in vivo analyte sensor 104 and receives measurement data therefrom and outputs the data to processor 256 in digital form, which in turn processes the data to arrive at the end-result analyte discrete and trend values, etc. This data can then be provided to communication circuitry 258 for sending, by way of antenna 261, to reader device 120 (not shown) where further processing can be performed by, e.g., the sensor interface application. It should be noted that the functional components of ASIC 251 can also be distributed amongst two or more discrete semiconductor chips.

Performance of the data processing functions within the electronics of the sensor control device 102 provides the flexibility for system 100 to schedule communication from sensor control device 102 to reader device 120, which in turn limits the number of unnecessary communications and can provide further power savings at sensor control device 102.

Information may be communicated from sensor control device 102 to reader device 120 automatically and/or continuously when the analyte information is available, or may not be communicated automatically and/or continuously, but rather stored or logged in a memory of sensor control device 102, e.g., for later output.

Data can be sent from sensor control device 102 to reader device 120 at the initiative of either sensor control device 102 or reader device 120. For example, in many example embodiments sensor control device 102 can communicate data periodically in an unprompted fashion, such that an eligible reader device 120, if in range and in a listening state, can receive the communicated data (e.g., sensed analyte data). This is at the initiative of sensor control device 102 because reader device 120 does not have to send a request or other transmission that first prompts sensor control device 102 to communicate. Transmissions can be performed, for example, using an active Wi-Fi, Bluetooth, or BTLE connection, and can occur according to a schedule that is programmed within device 102 (e.g., about every 1 minute, about every 5 minutes, about every 10 minutes, or the like). Transmissions can also occur in a random or pseudorandom fashion, such as whenever sensor control device 102 detects a change in the sensed analyte data. Further, transmissions can occur in a repeated fashion regardless of whether each transmission is actually received by a reader device 120.

System 100 can also be configured such that reader device 120 sends a transmission that prompts sensor control device 102 to communicate its data to reader device 120. This is generally referred to as "on-demand" data transfer. An on-demand data transfer can be initiated based on a schedule stored in the memory of reader device 120, or at the behest of the user via a user interface of reader device 120. For example, if the user wants to check his or her analyte level, the user could perform a scan of sensor control device 102 using an NFC, Bluetooth, BTLE, or Wi-Fi connection. Data exchange can be accomplished using broadcasts only, on-demand transfers only, or any combination thereof.

Accordingly, once a sensor control device 102 is placed on the body so that at least a portion of sensor 104 is in contact with the bodily fluid and electrically coupled to the electronics within device 102, sensor derived analyte information may be communicated in on-demand or unprompted (broadcast) fashion from the sensor control device 102 to a reader device 120. On-demand transfer can occur by first powering on reader device 120 (or it may be continually powered) and executing a software algorithm stored in and accessed from a memory of reader device 120 to generate one or more requests, commands, control signals, or data packets to send to sensor control device 102. The software algorithm executed under, for example, the control of processing hardware 206 of reader device 120 may include routines to detect the position of the sensor control device 102 relative to reader device 120 to initiate the transmission of the generated request command, control signal and/or data packet.

Embodiments Associating Analyte Levels with Meal Information

In many embodiments, the subject matter described herein is implemented by a software application program that is stored in a memory of and executed by a processor-based device, such as any one of the reader devices, drug delivery devices, or other computing devices described herein. In certain embodiments, the software is implemented as one or more downloadable software applications ("an App") on a reader device such as a mobile communication device or smartphone.

The software can provide a mechanism for the user to define consumables (e.g., a type of food, type of drink, or portion thereof), in any fashion that is convenient to the user. These consumables will be referred to generally herein as a meal or meals, and these terms are used broadly to denote all types of food and drink.

This software can perform a number of functions related to the collection of meal information and association of that meal information with analyte information collected by in vivo analyte sensor 104 or by in vitro test strip and meter. The software will be generally referred to herein as the "meal monitor application."

The meal monitor application can allow an individual to log information about each meal that the individual consumes (i.e., each "meal event"), including a photo of the meal. The meal monitor application can associate analyte data from the same general time period where the user's log entry indicated that a meal was consumed.

The meal monitor application can also monitor the user's analyte data and identify when the analyte data changes in a manner indicating or suggesting the occurrence of a potential meal event and seek to associate meal information from the same general time period with that potential meal event. The meal monitor application can prompt the individual for confirmation that the potential meal event occurred and for information describing the meal event. If the individual has already entered meal information, then the system can prompt for additional information about the meal event that the user has not already entered. In some embodiments, if a meal has been detected, and the meal monitor application determines that meal information has already been entered, then the user may not be prompted.

The meal monitor application can also associate the measured analyte response with each meal event and store the result in a non-transitory memory or a database, regardless of whether the analyte response is also classified as or includes an analyte excursion. The meal monitor application can display each meal with its associated analyte (e.g., glucose or other analyte) response to the user, for example, as a list where each meal is sorted by descending degree of, using glucose as an example, glycemic response magnitude. The meal monitor application can display other lists, such as a list of "good" meals made up of meals where the glycemic response magnitude was below a predefined magnitude and/or made up of a number of meals that had the lowest magnitudes of all the meals recorded. Another example is a list of "bad" meals made up of meals where the glycemic response magnitude was above a predefined magnitude and/or made up of a number of meals that had the highest magnitudes of all the meals recorded.

One example embodiment of the glucose response magnitude is the peak glucose value detected from the glucose response after a meal. Methods for determining this peak glucose metric are described further herein. Another example embodiment of the glucose response magnitude is the difference from the peak glucose value after a meal and the glucose value at the start of the detected meal.

In yet another example embodiment, the glucose response magnitude may be determined from a form of "area under the curve." The system can determine the value of the area with an upper bound set by a trace or curve along (or approximating) the values of the collected glucose data from the start of the detected meal and ending upon or after a) a fixed time such as 6 hours, b) the start of the next detected meal, c) an occurrence when the glucose trace falls below the value of the start of the meal, In one example embodiment the end point is whichever of the preceding events (a-c) occurs first. The lower bound for the area determination can be the glucose value at the start of the detected meal. The area can be calculated by summing the glucose values between the start and the end (inclusive or exclusive) and multiplying this sum by the total time from start to end, then subtracting the glucose value at the start of the detected meal multiplied by the total time from start to end. Other similar magnitude metrics along these lines can be implemented.

If the user consumes the same or a similar meal on repeated occasions, then a glycemic central tendency (e.g., an average or median glycemic response) can be determined for that meal and that central tendency can be displayed. For example, if the peak of the glycemic response is the metric of choice, then when multiple identical meals have been recorded by the system, the median of the peak values can represent the glycemic response metric for this meal. Other forms of glucose response metrics such as a glucose trace or a parametric fit to the glucose trace, may be used. Alternatively, the glycemic response of every meal can be displayed regardless of whether each meal is the same or similar to another meal on the list or in the database. In yet another alternative embodiment, the meal monitor application may generate a glycemic response as representative of all similar meals; for instance, if the glycemic response is displayed as a trace, the trace representative of all the similar meals may be made up of hourly medians of all of the individual glycemic responses, where time is relative to the start of the meal.

Example embodiments of the meal monitor application can utilize analyte data analysis software or software implementable processes, for example, as disclosed in any of U.S. Patent Publication Nos. 2013/0085358, 2014/0350369, 2014/0088393, 2017/0185748, 2020/0105397, or in Int'l Publ. No. WO 2015/153482 or PCT/US20/12134, all of which are incorporated herein in their entirety and for all purposes. Example embodiments of this software are collectively referred to herein as the "meal event detector." The meal event detector can be an algorithm, routine, or other set of instructions (part of or separate from the meal monitor application) that can detect and/or quantify the occurrence of an actual or potential meal event in the individual's monitored analyte data.

Detection of a meal event can include detection of analyte episodes or excursions outside a desired acceptable (e.g., medically recommended) target range in the user, who can be informed by the software that one or both has been detected. Examples of analyte excursions include violation of a low glucose threshold, violation of a high glucose threshold, violation of a rate of change (e.g., increase or decrease) threshold, violation of a glucose median threshold, violation of a glucose variability threshold, and the like.

Some of the meal event detectors described in these incorporated references are described only in terms of identifying analyte excursions outside a desired target range. These embodiments can be extended to the detection of meal events based on the teachings contained within other ones of these incorporated references (e.g., Int'l Publ. No. WO 2015/153482). These embodiments can also be extended to the detection of meal events by specification of a within-target episode, where glucose values are maintained between an upper and lower bound for a period of time. Detection of these episodes can be done by extension of threshold-based episode detection algorithms.

A relatively straightforward example of threshold-based logic includes grouping all consecutive points above or below a threshold into a grouping to be associated with the meal event, which can, in some instances, also be or include an analyte excursion outside of the user's targeted acceptable range.

Very brief episodes (e.g., trends or groupings in the analyte data or outlier values) may not be clinically relevant. Embodiments described herein can manage this challenge by requiring a minimum number of readings and/or a minimum duration and/or a minimum area (e.g., an integration) outside the threshold to consider the episode for analysis as either a meal event or an analyte excursion. An episode failing any of the requirements may be ignored. Software displays and applications for providing upload prompts to an individual are disclosed in the incorporated reference U.S. Patent Publication No. 2014/088393, which also discloses software applications for providing heuristic meal announcements that can be used herein for analysis and display of data as well as for meal selection.

A virtually limitless catalog of analyte episode types exists (e.g., analyte data occurrences having different characteristics), each of which, if independently clinically relevant, can be used to form the basis for meal reports, meal effects, meal analysis, meal-based treatment, medication administration, and meal selection. Glycemic response and episode characteristics can also be used to classify meals and certify meal-related collected data. Such analysis and results can be presented to the individual, clinical meal supervisor, or physician to make future meal decisions.

Figure 3A:
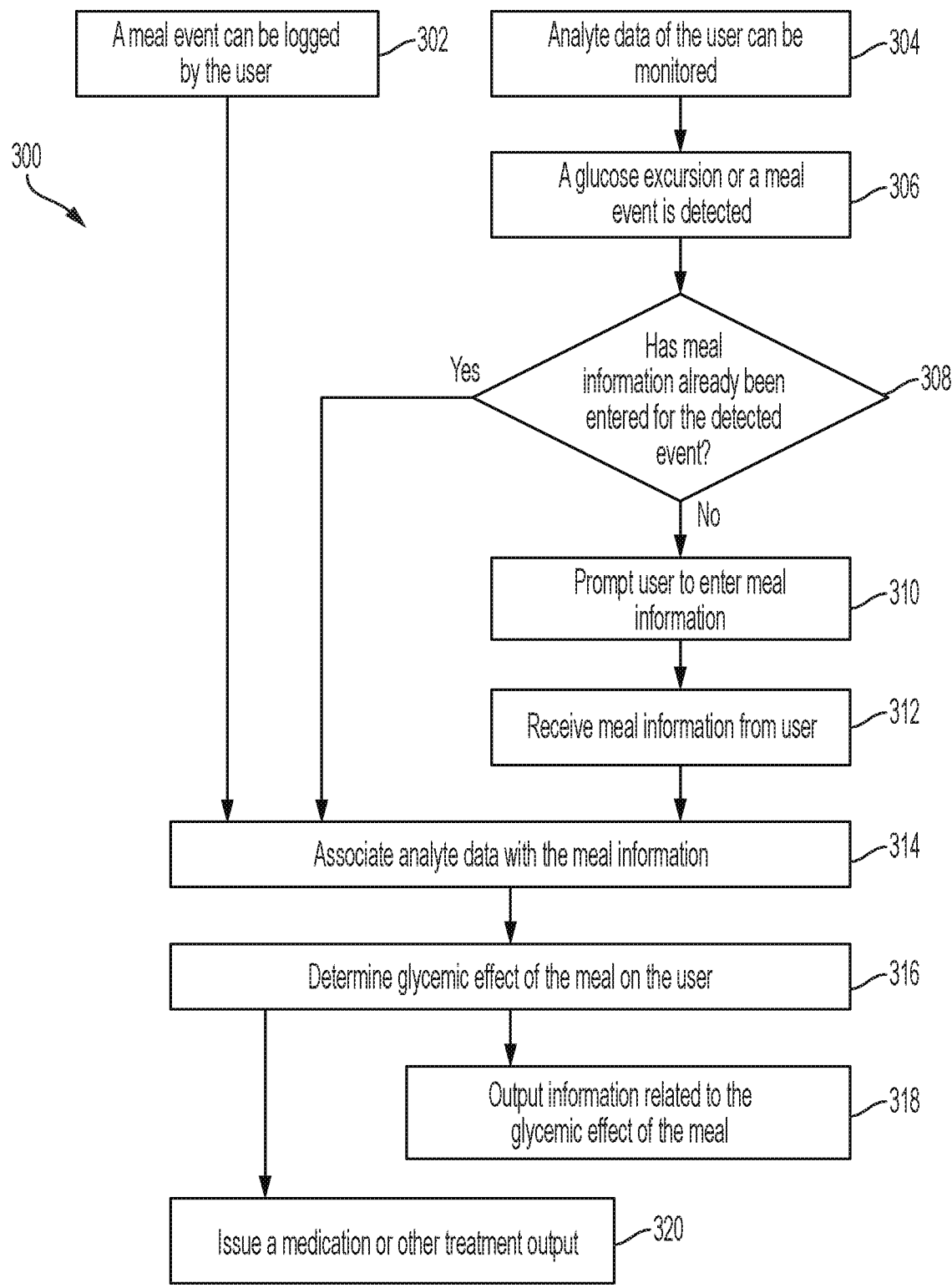
FIG. 3A is a flow diagram depicting an example embodiment of a method for meal information gathering and assessment.

Reference is now made to FIG. 3A, which is a flow diagram depicting an example embodiment of a method 300 for meal information collection, association with analyte data, and determination of glycemic impact of that meal. Method 300 includes acts that may be described as performed by an electronic device, such as reader device 120, drug delivery device 160, or computer system 170 or 180, or processors thereof. The user may be an individual or diabetic, clinical administrator, medical professional, dietary profession, or other person. By way of example only, method 300 will be described by reference to a diabetic using the meal monitor software as a downloaded app on a reader device 120 configured as a smart phone. For ease of illustration, the monitored analyte in this and other embodiments described below will be glucose, although other analytes can be monitored as well, as is noted herein.

Referring to FIG. 3A, a meal event can be logged by the user at 302. The user can input meal information directly into reader device 120 (via a user interface) at his or her own discretion, before, during, or after consumption of the meal. In some embodiments, the user inputs meal information in response to a reminder generated by the meal monitor application according to a predetermined schedule, which can be set and/or modified by the user. Example embodiments of user interfaces for accepting a manual log by the user are described with respect to FIGS. 4A and 4B.

Analyte data of the user is monitored at 304. This monitoring, in most embodiments, is a continuous process (e.g., a frequently repeated process, automatically or at the discretion of the user) that is ongoing so long as the user is wearing sensor control device 102. Data collected by sensor control device 102 can be transferred to reader device 120 such that the meal monitor application has access to the data. Information indicative of the time at which each analyte data measurement is collected (e.g., a timestamp) can also be transferred to reader device 120. As already described herein, this data transfer can occur in an on-demand fashion (e.g., the performance of a scan by the user), in a streaming fashion, or other regularly occurring fashion. Analyte data collected by a discrete blood glucose measurement (e.g., such as the reading of a test strip with a meter) can also be entered into reader device 120 manually or automatically.

Reader device 120 can algorithmically process the collected analyte data and determine whether a glucose excursion or a meal event has occurred at 306. This can occur by use of a meal event detector as described herein, which examines the analyte data for one or more analyte values that violate a threshold or other condition that is indicative of the occurrence of a glucose excursion or a meal event. This algorithmic processing can likewise be frequently repeated, e.g., each time new analyte data is received from sensor control device 102, such as in response to a user performed NFC scan of sensor control device 102 with reader device 120 or otherwise. The manual logging of meal information by the user (302) can occur contemporaneously with the monitoring (304) and processing (306) of the analyte data. Those of skill in the art will appreciate that these methods can be implemented in systems where analyte data is autonomously and wirelessly transmitted from the sensor control device to the reader at a predetermined interval.

Each time new data is transmitted to reader 120, the algorithmic processing can be applied to the new data, which might represent a multiple hour time period (such as the last 8 hours) to detect meal events. Steps 308-320 can be performed for each meal that is detected, starting with the most recent detected meal and repeating for every other detected meal event.

In some example embodiments, the meal event detector can use a one or more sets of predefined glucose rate of change (e.g., rise) settings to attempt to detect all meals in the analyte data. If analyte data exceeds the rate of change threshold, such as a series of data points over a predetermined time range where the average increase in value from one point to the next exceeds a threshold, then that analyte data can be characterized as a glucose excursion.

One problem that specifically arises from the use of the meal monitor application is that the meal monitor application may be either too sensitive or not sensitive enough to analyte data that suggests the occurrence of a meal event. This problem can result in the identification of too many or not enough meal events.

In some embodiments, the settings that are used by the meal event detector to determine whether a potential meal event has occurred can be adjusted. For example, each setting or threshold used by the meal event detector can be individually set by the user. In another embodiment, the meal monitor software can provide the ability to scale the sensitivity of the settings, for example by providing the option for the user to select one of a plurality of different settings each having a different magnitude.

The meal monitor software can default to a "medium" (or "normal" or "default") mode using a group of predetermined settings or the settings input by the user. The meal monitor software can provide the option to switch to a different mode, such as a "low" mode or a "high" mode where the sensitivity or magnitude of the settings are scaled to be less likely or more likely, respectively, as compared to the "medium" mode, to consider a particular span of analyte data to qualify as a potential meal event. The "low" mode and "high" mode can each be a direct percentage scaling of the settings of the "medium" mode. For example, the "low" mode may use the settings of the "normal" mode adjusted by 5%, 10%, 15%, 20%, 25%, etc., so as to decrease the likelihood that a meal event is detected. Likewise, for example, the "high" mode may use the settings of the "normal" mode adjusted by 5%, 10%, 15%, 20%, 25%, etc., so as to increase the likelihood that a meal event is detected. While three setting options are described here any number of two or more setting options can be used. Also, the meal monitor software application can provide the option for the user to scale the sensitivity of the meal event detector in an analog or virtual-analog fashion (at least from the user's perspective), such as with a slide bar on a touchscreen.

In some embodiments, the meal monitor application is self-monitoring and optionally self-correcting, such that sensitivity of the meal event detector can be continually or repeatedly monitored against a desired baseline and, if it appears that the sensitivity of the meal event detector requires adjustment, then the user can be notified to make an adjustment or the meal monitor application can automatically adjust itself without input from the user.

Figure 3B:
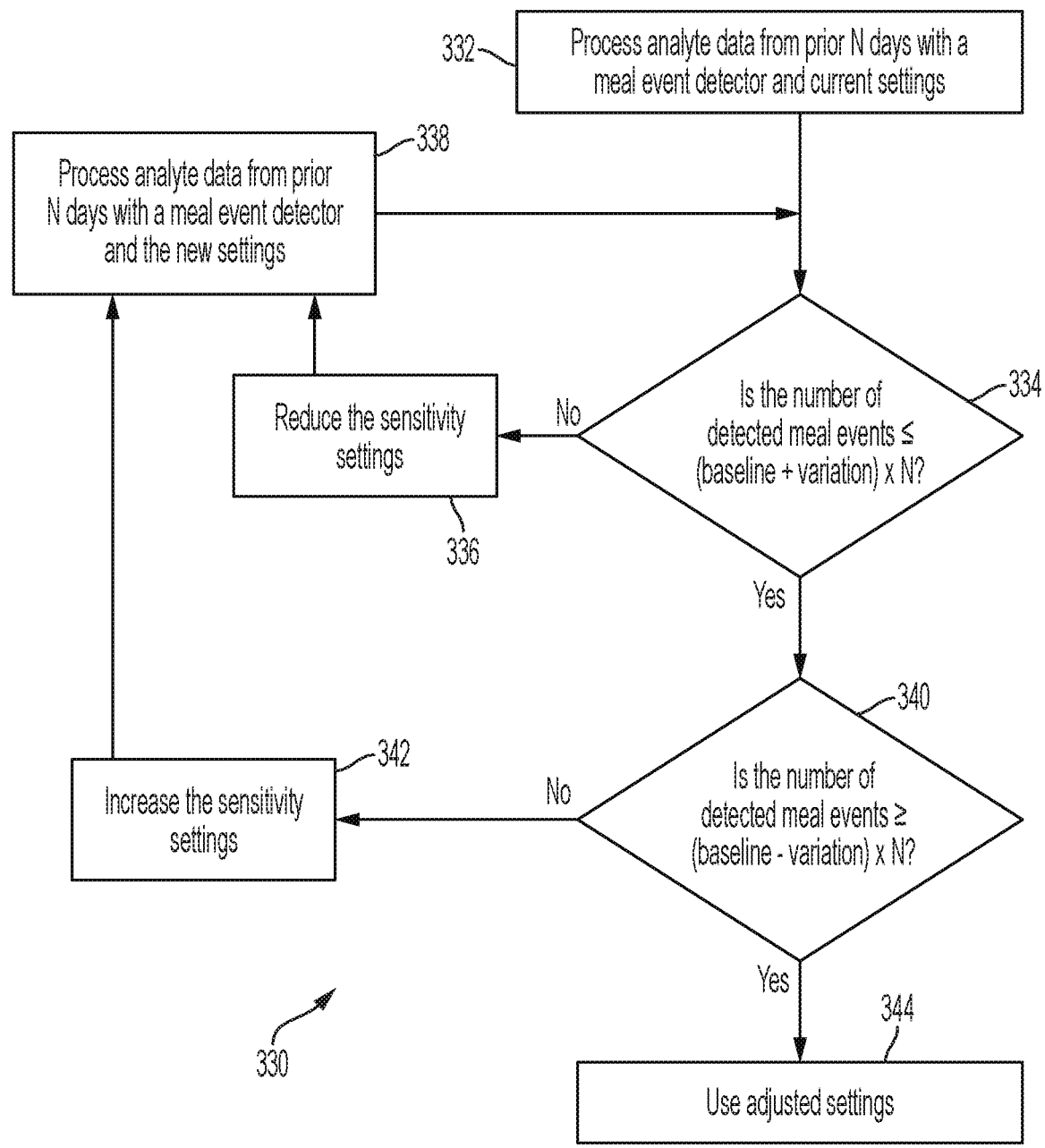
FIG. 3B is a flow diagram depicting an example embodiment of a method for performing automatic meal detection sensitivity setting adjustments.

FIG. 3B is a flow chart depicting an example embodiment of method 330 for automatically adjusting the sensitivity of the meal event detector. Here, method 330 can utilize a baseline integer or decimal value indicative of the normal number of meals the user consumes each day. This baseline value can be set by the user or can be a default value (e.g., one, two, three, four, five, etc.) set within the meal monitor application. Method 330 can also utilize a variable integer or decimal value that can account for typical variation in the daily number of meals that the user consumes.

In this embodiment of method 330, the meal monitor application runs the meal event detector on the analyte data from a prior time range (e.g., N days, hours, minutes) using a first set of sensitivity settings (e.g., analyte data magnitude thresholds, duration thresholds, rate of change thresholds, or others) at 332. Here, method 330 examines the analyte data over the previous N days, where N can be any desired value. Next, a determination is made at 334 whether the number of meal events detected over those N days is less than or equal to a maximum, which in this embodiment is (the baseline value added to the variation value) multiplied by N. In an example where N is three, the baseline value is three meals/day, and the variation value is one meal/day, then the determination at 334 would evaluate whether the number of meal events detected is less than or equal to twelve (e.g., the maximum).

A determination that the number of meal events is greater than the maximum indicates that the meal event detector settings are too sensitive. Thus, the routine of method 330 proceeds to 336 where the sensitivity settings are reduced. Reduction of the sensitivity settings can be to the next lowest set of predetermined sensitivity settings, or can be by a scaling factor such as by 1%, 2%, 5%, 10%, etc. Then, at 338, the meal event detector is performed on the analyte data from the prior time range with the new settings. Method 330 then proceeds to make the determination at 334 again. The process can repeat until the sensitivity settings are reduced sufficiently so as to not to violate the condition of 334.

When the condition of 334 is passed (e.g., the detected number of meal events is less than or equal to 12), the routine proceeds to make a determination at 340 as to whether the detected number of meal events is greater than or equal to a minimum, which in this embodiment is (the variation value subtracted from the baseline value) multiplied by N. In the example where N is three, the baseline value is three meals/day, and the variation value is one meal/day, the determination at 340 would evaluate whether the number of meal events detected is greater than or equal to six (e.g., the minimum).

A determination that the number of meal events is less than the minimum indicates that the meal event detector settings are not sensitive enough. Thus, the routine of method 330 proceeds to 342 where the sensitivity settings are increased. Increase to the sensitivity settings can be to the next highest set of predetermined sensitivity settings, or can be by a scaling factor such as by 1%, 2%, 5%, 10%, etc. The routine then proceeds to 338 where the meal event detector is performed on the analyte data from the prior time range with the new settings. Method 330 then proceeds to make the determination at 334 again and the process can repeat until the sensitivity settings are adjusted sufficiently so as to not to violate the conditions of 334 and 340. When the condition of 340 is met, the routine proceeds to 344 where the adjusted settings are considered to be appropriate and are used in the subsequent normal course of operation of the meal event detector.

Method 330 can be repeated at regular intervals. In one example embodiment, method 330 is performed once per day using data from the prior N days as measured from midnight to midnight to prevent the settings from changing multiple times per day.

In another embodiment, the meal monitor application can perform an automated sensitivity adjustment that analyzes the data to identify settings that are too high without regard to whether the settings are too low. For example, a self-adjustment routine can iteratively assess whether each of a plurality of settings is beneath a maximum by starting with the highest setting, determining whether the meal event detector outputs a number of detected meal events that is less than the maximum using the highest setting and if so, then using those highest settings for subsequent normal operation of the meal event detector. If the highest settings result in a number of detected meal events that exceeds the maximum, then the routine can proceed in order of decreasing magnitude through each iteratively lower setting and stopping when a setting is identified that does not exceed the maximum. That identified setting can be used for subsequent normal operation. In yet another embodiment, the meal monitor application can perform an automated sensitivity adjustment that analyzes the data to identify settings that are too low, without regard to whether the settings are too high, in a similar but reverse fashion.

Referring back to FIG. 3A, if a glucose excursion or meal event is detected at 306, then, at 308, the meal monitor application assesses whether meal information has already been entered (such as by the user at 302) that corresponds to the detected glucose excursion or meal event (collectively referred to as the "detected event"). This assessment can be performed by examining a period of time before, and optionally to a limited extent after (e.g., to compensate for inaccuracies in time keeping or entry), the times at which the detected event occurred to see if any meal information was entered during that time period. If so, then the meal monitor application can associate that meal information with the detected event at 314. If multiple meal information entries are found, then the meal monitor application can associate all with the detected event, or can associate the detected event with only the meal information which occurred closest in time.

If no meal information has been entered that can be associated with the detected event, then at 310, the user is prompted to enter the meal information. Example embodiments of user interfaces for prompting the user to log a meal or meal information are described with respect to FIGS. 4C-E. If no meal event has occurred, the user can decline or ignore the prompt. Otherwise, the meal information can be entered at 312.

Prompting can take the form of an alarm notification, such as a vibration or sound that clues the user into activating the meal monitor application to see the prompt. Alternatively, the prompt may be a notification that appears when the user next views the application.

Regardless of whether the user logs meal information at his or her own discretion (302) or in response (312) to a prompt (310), the meal information can include various levels of detail and can be entered in the same or similar fashion.

A desirable aspect of the embodiments described herein is the ease at which meal information can be entered so as to promote usage of the meal monitor application to gain a more intuitive understanding of glycemic impact of meal consumption, which in turn can improve the user's health. The meal information can be input in any desired manner, such as by the manual entry of text, by selection of the meal name from a list (e.g., a picklist or drop-down list), by selection of the meal picture from a group of pictures, by selection of recognizable indicia (e.g., a tag or code) of the meal, or any combination thereof.

The meal information can include a meal type, for example, whether the meal is breakfast, lunch, snack, dinner, or dessert, etc. The meal information can include the time range (e.g., start time and stop time) during which the meal was consumed. This can be an actual time (e.g., a start time in hour:minutes) or can be a generalized or heuristic part of the day (e.g., early morning, late afternoon, etc.), or an approximated time range (e.g., 6-7 am, 5-6 pm, etc.) with any desired level of granularity of the time range (e.g., 10 minute, 15 minute, 30 minutes, 60 minutes, etc.).

The meal information can also include the contents and portion sizes of the meal. For example, the meal may be described as including a caloric amount, protein, carbohydrates, dairy, meat, grain, vegetables, nuts, sugar, alcohol or other beverage type, etc. along with the respective amount or size for each content. This can be done on a portion by portion basis, for example, one serving of bread with one serving of peanut butter, where each portion has the respective amount of carbohydrates, sugar, protein, etc. associated with it. Alternatively, the meal may be described on solely a nutritional category basis, for example, 10 grams of carbohydrates, 5 grams of sugar, 8 grams of protein, etc. Heuristic categories (e.g., small portion, medium portion, large portion) as opposed to quantitative categories can also be used to facilitate data entry.

To further facilitate the entry of meal information, the meal monitor application can present options from which the user may select meals or information about meals. For example, meals or meal information can be presented to the user in the form of a list or array from which the user can select the most appropriate entry that describes the meal consumed by the user.

In some embodiments, the user can create a list or array of common meals consumed by the user (and/or associated information) for use by the meal monitor application, either by directly entering the list into the application, by selecting from a list of options preprogrammed into the meal monitor application, or by creating the list on a separate computing platform and uploading it to the host device on which the meal monitor application is being executed. Consumables can be added or removed at any time. As discussed herein, this data entry can be performed using a graphical user interface on the host device.

The meal monitor application can be programmed to store the information about any and all prior meals and associated meal information previously consumed by the user. That information can be presented to the user as options from which the user can select to identify a particular meal or aspect thereof that was more recently consumed. For example, when the user is prompted to enter meal information, the meal monitor application can present a list of options from which the user can choose. This list can be ordered such that the most commonly consumed or selected meals are presented first or at the top of the list, with remaining meals presented in order of decreasing frequency of consumption (e.g., the most commonly consumed meal is presented first, the second most commonly consumed meal is presented second, and so forth with the least commonly consumed meal presented at the end).

The user may often need to tailor a selected meal based on the occasion. Thus, for any meal selected, the user is given the option to customize an aspect of that meal, such as by the addition, removal, or substitution of a particular side (e.g., substitution of broccoli for peas) or drink, modification to a portion size, modification to a caloric or carbohydrate content, and so forth. In any and all instances where the user enters information about a selected meal, a similar approach can be taken where the user is provided with a list of options from which to choose, the options being presentable in order of most relevant to least relevant. For example, if a particular type of food is selected, previously consumed portion sizes of that particular type of food can be presented to the user. Again, this can be done in descending order based on frequency of consumption. For example, if chicken breast is selected as part of a meal, then based on the user's prior history stored on the device, the meal monitor application may present portion sizes to choose from in order of descending frequency of consumption (e.g., 8 ounces, 10 ounces, 6 ounces). Or the list may be presented in increasing (least to most) or descending (most to least) order of portion size. The same applies, for example, with respect to carbohydrate amount, sugar amount, protein amount, and any other aspect of meal information described herein.

Thus, selection of a particular meal can be followed by entry of information about each type of food and drink within that meal where the user's history can be used to present the most relevant options first. Of course, if no customization is required, the user can end the data entry process after initial selection of the meal itself without further specifying variations in portion sizes etc.

The meal monitor application can be programmed to filter the presentation of options based on the time of day. For example, if the user is prompted to enter information about a meal consumed during morning hours, the meal monitor application can present a list of the commonly consumed breakfast meals and/or morning snacks, etc. (in order of descending frequency of consumption) such that the user is provided only the most relevant options from which to choose (e.g., dinners are excluded). Similarly, when entering information about meals consumed in the middle of the day, only the most commonly consumed lunches and/or afternoon snacks can be presented and, when entering information about meals consumed late in the day or in the early evening, only the most commonly consumed dinners, desserts, and/or evening snacks can be presented.

The meal monitor application can also be programmed to filter the presentation of options based on the characteristics of the detected event (e.g., the magnitude and/or duration of glucose excursion or meal event) and/or the correlation between the characteristics of the detected event and prior meals associated with detected events having similar characteristics. For example, the meal monitor application can have local access (e.g., stored in local memory) or remote access (e.g., by downloaded from a server) to the user's historical glucose levels over the previous amount of time, e.g., days, weeks, months, etc., as well as meal information entered into system 100 over that same or similar amount of time.

When a meal event is detected, the meal monitor application can identify prior detected events with the same or similar characteristics in the analyte data. This can be done by reference to a database of correlations stored locally or remotely to the meal monitor application within system 100. When the user is prompted to enter meal information based on a detected event, the meal monitor application can present meal options for selection based on the correlation between the analyte data of the recently detected event and analyte data of previously detected events that already have meal information associated therewith. Time of day information can also be used in the correlation. For example, if a hypoglycemic event is detected in the early evening, and previously detected hypoglycemic events occurring in the early evening were previously associated with a particular high carbohydrate meal (e.g., a spaghetti dinner), then the user may be presented with that particular high carbohydrate meal as the first option from which to select, followed by other options in order of decreasing potential relevance.

In other embodiments, when a meal event is detected, a list of all previous meals can be displayed to the user (or accessed by a virtual selectable button labelled, for instance, "previous meals"). The user can be permitted to select one meal as corresponding to the detected meal event. The list of all previous meals can be sortable by frequency of past selections of that meal and/or by magnitude or severity of the glycemic response to that meal, which can be an average or median value if that meal has been consumed multiple times in the past. The list may be ordered any number of ways, but the preferred embodiment is to order first by the most frequently selected meals, and next by the most recent meals. Each meal can be associated with a unique identifying code. Meal names that are entered by the user with text that is not identical but that resemble each other can be assigned the same code. If the same meal is entered and selected one or more times, that unique identifying code will be stored multiple times associated with the different times for this same meal. When displayed on a list sorted by glucose response magnitude, the meal monitor application can detect when meals are repeated by detecting that they have the same unique code. The meal monitor application can create a list of all the glucose responses for each repeated meal and determine the mean or median of these responses and associate this with the unique code. When this is done for all of the unique codes, then the final list for display can be generated for all of the unique meals including meals entered only once, and repeated meals, and the list can be sorted by the glucose response magnitude associated with each unique code.

If the user selects a meal event that is associated with an undesirable glycemic response, then a real-time notification can be generated and output to the user to warn that user of the potential glycemic impact of the meal that was just consumed.

Such real time feedback (i.e., feedback returned immediately from the user's perspective), can help the user internalize the undesirable effect of the consumed food. For example, if the type of meal event detected is a dinner meal, then the real-time notification can display the average glycemic response of all other meals of that type (dinner) along with the average glycemic response of the type of meal that was just consumed and an indication of the difference (e.g., the recently consumed meal has a typical glycemic response 20% higher than the average glycemic response of all other dinner meals). The real-time notification can also warn the user to eat less or take an offsetting medication such as insulin.

Figure 3C:
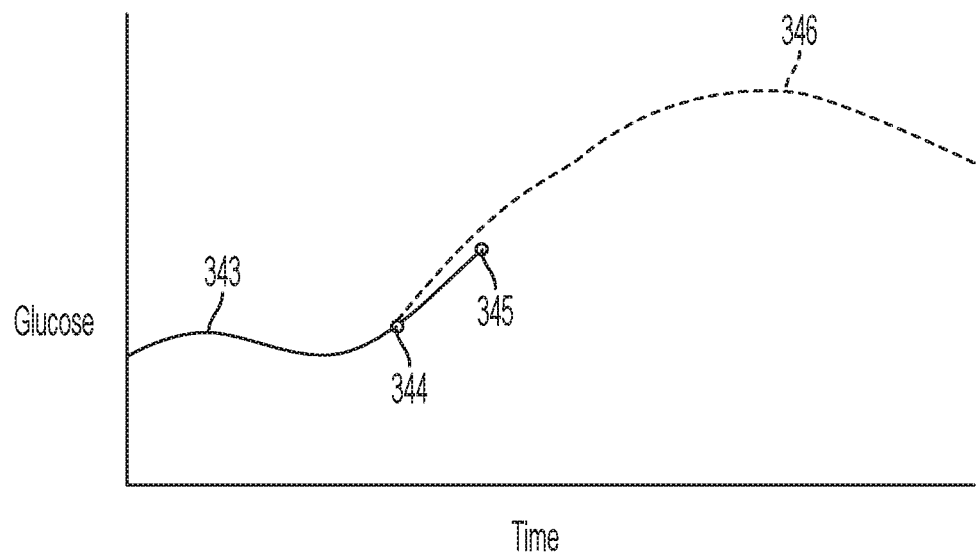
FIG. 3C is an example embodiment of a graphical display of a user's analyte data over time, with a superimposition of previous glycemic responses.

In one example embodiment, the notification can include a graphical display of the user's current analyte data over time, with an average of all previous glycemic responses to that meal type superimposed on the current analyte data graph synchronized to the meal start time. One such example is depicted in FIG. 3C, where a trace 343 of the user's current analyte data is displayed over time. The meal start time is indicated at 344 and the last collected analyte measurement is indicated at 345. Upon selection of a meal type that is associated with one or more undesirable prior glycemic responses, the graph of FIG. 3C can be displayed with an overlaid trace 346 representing the average glycemic response in the user for all prior consumptions of the same meal type (or all previous times in which an undesirable excursion occurred with that meal type). The start of the overlaid trace 346 can be aligned with the analyte data at the meal start time 344. Thus, the user is given real-time visual feedback of the likely result of consumption of that problematic food. Alternatively, multiple traces can be overlaid where each trace represents a single past excursion from consumption of that meal type.

Alternative outputs include reports that are available from a menu provided by the meal monitor application. Examples of reports include a list of detrimental meals (e.g., a "bad meal" list) and a list of beneficial meals (e.g., a "good meal" list). The bad meal list can be a list of previous meals sorted by descending glucose response magnitude, whereas the good meal list can be of previous meals sorted by ascending glucose response. The lists may be further modified by only including meals, for instance on the bad list, that exceed a predetermined or user defined threshold of glucose response magnitude. For the good list, only meals that are less than a predetermined or user defined threshold of glucose response magnitude can be included. Also, for the list of previous meals used to select from when entering meal information, symbols may be used to identify meals as good, bad or neither, as described above. Good and bad meals may be identified in other ways for this selection list, such as inclusion in respective sub-lists.

Also, reports and periodic notifications may be provided that keep a running total of the quantity of good meals and bad meals over an elapsed period of time, such as one week or two weeks. For instance, each time the user selects this report, the meal monitor application can count the number of good meals and the number of bad meals and display the result. In addition, the application can provide a user interface that allows the user or health care provider to set a goal for the maximum number of bad meals in a period of time. The report display can show the current number of bad meals next to the goal. Alternatively, the application may generate periodic notifications regarding these metrics, where the period is, for instance, weekly.

The application can process new data (whenever available either automatically or when manually queried) to detect meals, measure glucose responses to detected meals, and perform the running calculation on the meals. Alternatively, the application can determine glucose responses whenever they are needed for analysis or reporting; that is, glucose responses are retrieved from memory but recalculated when needed. When the running calculation of, for instance, bad meals per week exceeds a threshold (or falls below a threshold), a notification can be generated indicating to the user that their eating habits have digressed (or congratulating that the goal has been met). Notifications may take the form of the those like a standard lock screen notification on Android and iOS phones, or they may be presented on specific display areas on common application screens such as the home screen or the glucose results screen.

The user has the option to input a photograph or image of the meal. This image may be entered to supplement other information also entered to describe the meal. Alternatively, this image can constitute the entire description of the meal and its contents. This streamlined data entry can greatly facilitate the ease at which the user enters data in logging a meal or responding to a prompt, thereby encouraging use of the meal monitor application. If an image is entered, that image can be presented along with or instead of a textual description of the meal and/or contents thereof, such that the user need only recognize the image in a list of options presented to the user for data entry. Thus, when the user is presented with options for identifying a meal in response to the detection of an event, those options can be presented solely in the form of text, solely in the form of icons, or solely in the form of images, or those options can be presented in a combination of text, icons, and/or images.

In some embodiments, the imagery of the meal can be analyzed using image recognition techniques to identify attributes of the meal such as recognizable components of the meal. The components of the meal may be recognized using meal component recognition algorithms based on spectral boundaries defined within the image. If recognized, the meal imagery can be given a name by the meal monitor application that describes the meal contents, e.g., a picture of chicken and broccoli can be labeled as "chicken and broccoli." The meal monitor application can then provide options to the user to specify further information, e.g., the portion amount, nutritional content, etc., for the particular type of meal detected from the imagery. That meal can also be linked to prior instances where the same type of meal occurred in the user's meal history and used in correlating detected events to particular types of meals.

FIGS. 4A-E depict example embodiments of graphical user interface (GUI) visual arrangements or screens. These screens can be displayed on any of the embodiments of reader device 120, drug delivery device 160, or local computer system 170 described herein.

Figure 4A:
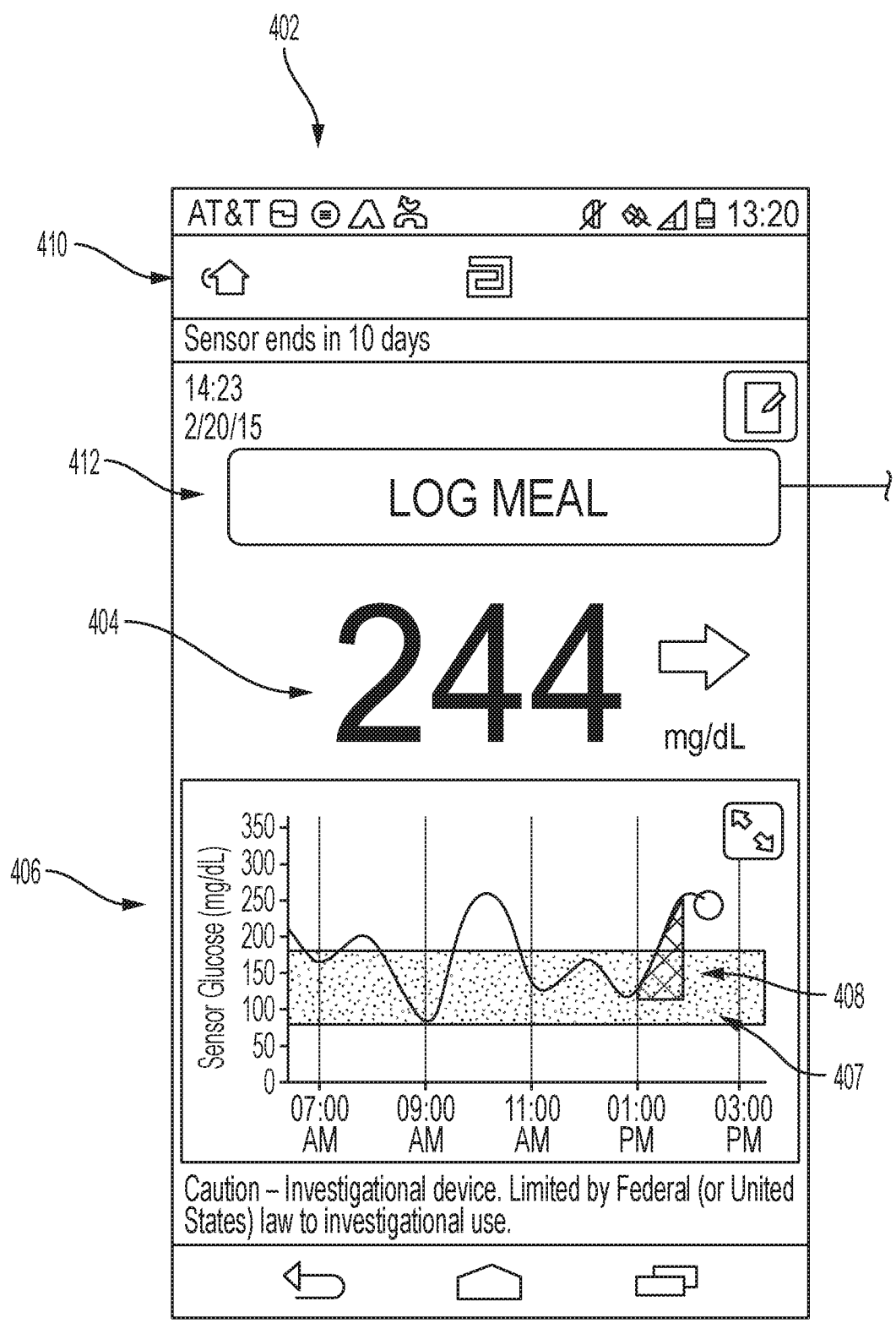
FIGS. 4A-E and 5A-F depict example embodiments of graphical user interface display screens.

FIG. 4A depicts an example embodiment of a screen 402 for logging meals and associated meal information, for example, as would be used at 302 of method 300 (see FIG. 3A). Screen 402 can include indications 404 and 406 of analyte levels determined from data received from analyte sensor 104 (not shown). Indication 404 is a numerical display of the user's current or last received analyte level (e.g. mg/dL). Indication 406 is a graphical display depicting a trace or curve of the user's analyte level (y axis) over time (x axis) against a shaded region 407 indicative of normal or desired analyte level range. Such an indication 406 can show data over any desired time period (e.g., eight hours or other periods).

Screen 402 can include visual indicators for indicating various attributes of the data. For example, graphical display 406 can include a highlighted or otherwise accentuated indicator or marker 408 of the data. Here, indicator 408 is indicative of a glucose rate of change that exceeds a desired maximum rate of change, e.g., a rapid rise (or in other instances a rapid fall) of the analyte data over time. Specifically, indicator 408 is a highlighted area beneath the analyte level curve corresponding in time to the occurrence of the rapid rise. Thus, an observer can more readily appreciate whether recent events or excursions have occurred, as well as their nature.

Screen 402 can be a home screen for the meal monitor application or can be accessed from a home screen or other higher level page. Here, screen 402 is accessed from a home screen and includes a selectable home screen back button 410 to return thereto, which can likewise redirect back to any other higher level page.

Screen 402 also includes a Log Meal selectable button or field 412. Selection of the Log Meal button 412 can direct the user to screen 420 depicted in FIG. 4B. If the device on which the meal monitor application is operating includes a camera, then screen 420 can include a selectable Take or Select Photo button or field 422 that, upon selection, can open a camera application with access to the device's camera to capture a photograph or image of the meal for storage and association therewith. Selection of button 422 can also give the user the option to select a photo from a gallery of photos previously used to log meals, or from a gallery of photos stored in the device's general purpose photo gallery. If the user captures or otherwise selects a photo of the meal, then that photo can then be displayed on screen 420. In some embodiments, selection of Log Meal button 412 of FIG. 4A can cause the meal monitor application to immediately open the device camera application to allow the user to take a photo and thereby further streamline the image entry process.

Also included on screen 420 is a textual entry input location 424 for the user to enter free text information describing the meal. Selection of this location 424 opens a text editor which can be used to enter textual information about the meal. This information, along with the photograph, can be associated with the meal and can form part of a data structure representing the meal. Although not shown here, a pick list or drop-down list can also be included on screen 420 that the user can select to choose from a previously stored list of options for the meal or the meal's information, as described in detail herein.

Figure 4B:
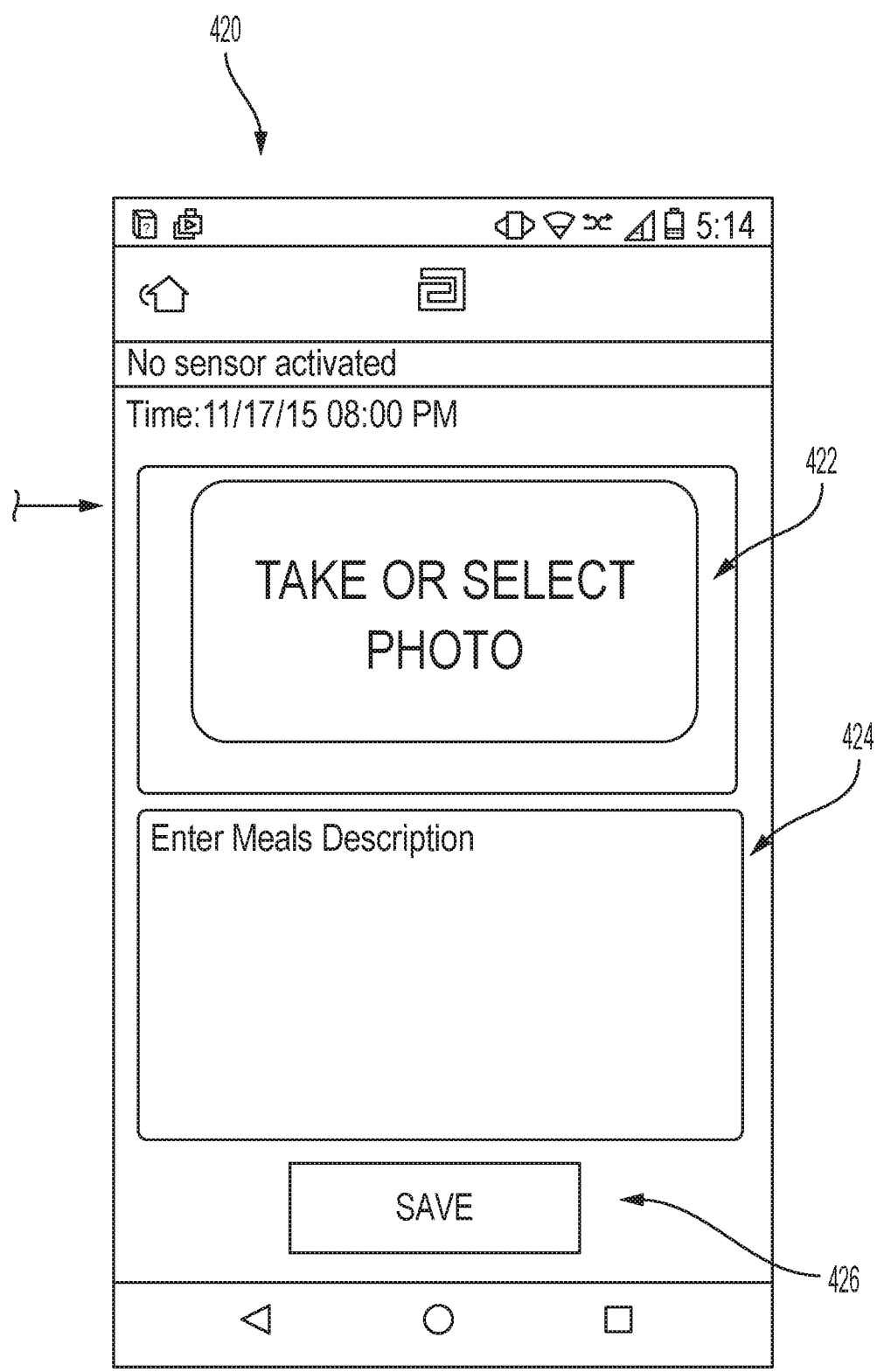

Although not all variations are depicted, it is recognized that all aspects of meal information described herein can be input via one or more screens similar to those described with respect to FIGS. 4A and 4B, including, but not limited to, the entry of time of meal information, meal portion information, nutritional content, representative meal icons, and so forth.

After the meal information is entered, either with a photo, textual description, or selection of a predetermined option, the user can select a Save button or field 426 to save the data to memory, as a data structure associated with and digitally describing the meal.

Figure 4C:
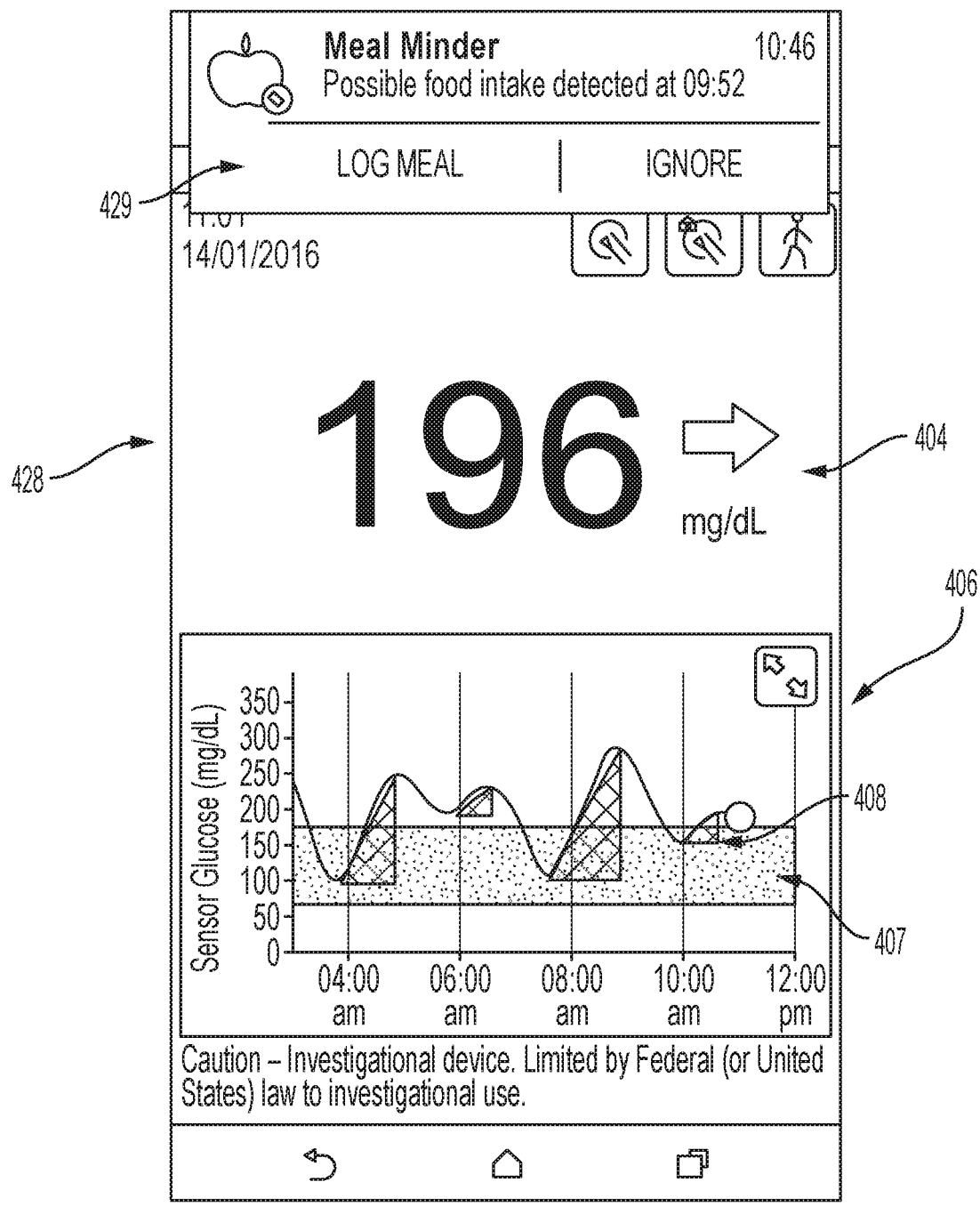
Figure 4D:
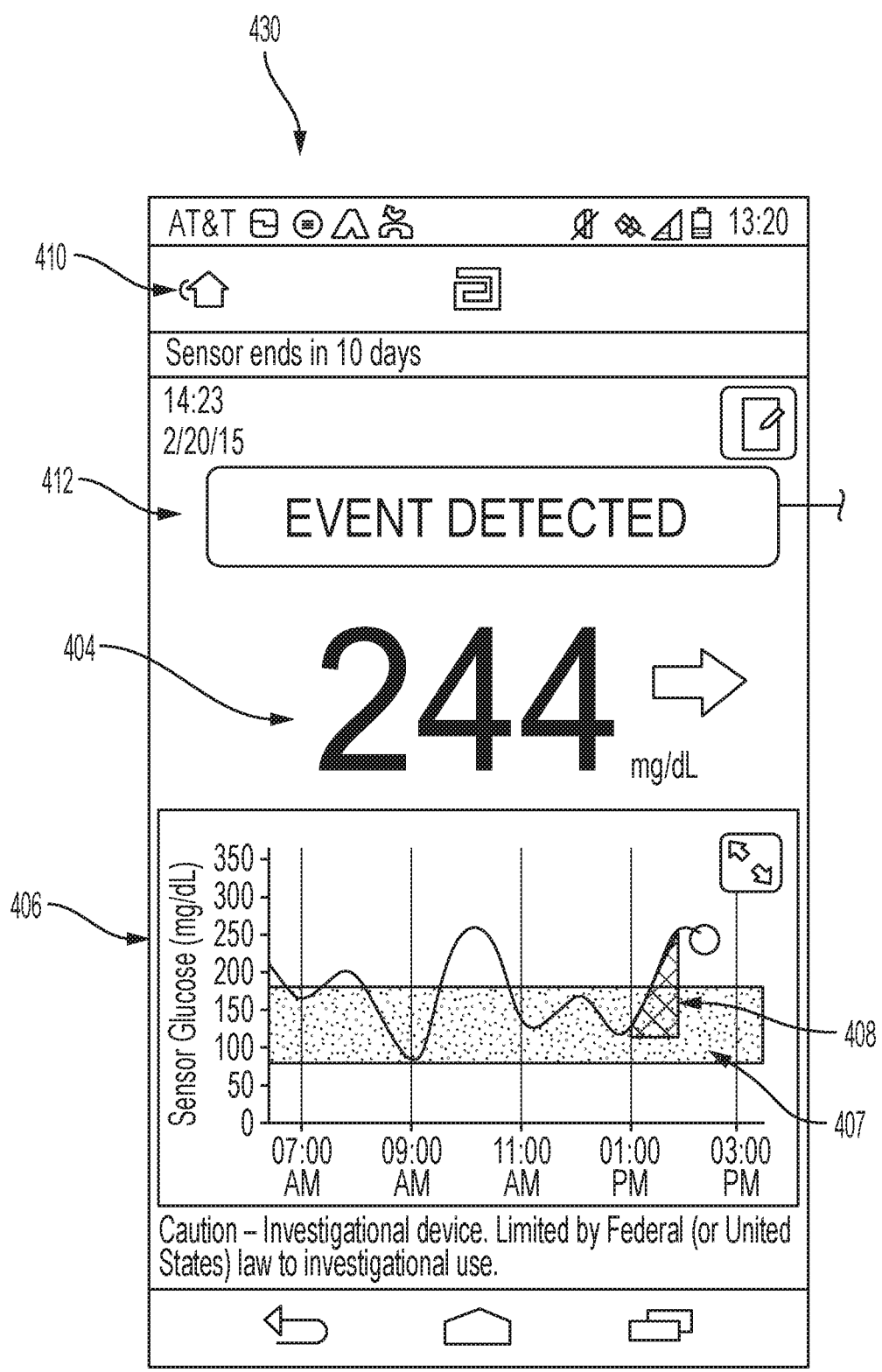
Figure 4E:
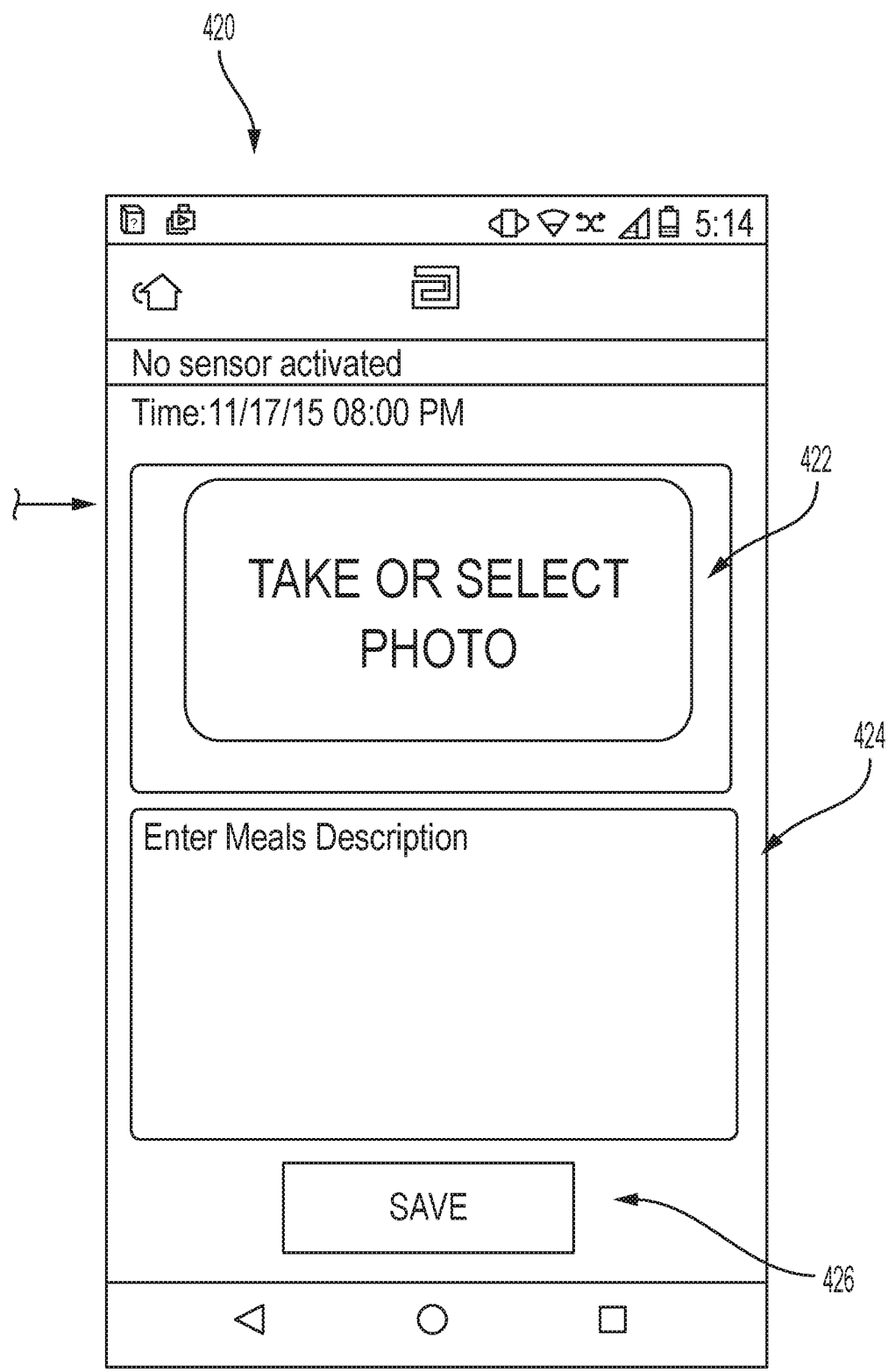

FIGS. 4C-E depict example embodiments of screens 428 and 430 for prompting a user to enter meal and associated meal information, for example, as would be used at 310 of method 300 (see FIG. 3A). Like screen 402 of FIG. 4A, screens 428 and 430 can include indications 404 and 406 of analyte levels determined from data received from analyte sensor 104 (not shown). Also, like screen 402, indicator 408 is indicative of a glucose rate of change that exceeds a desired maximum rate of change, e.g., a rapid rise (or in other instances a rapid fall) of the analyte data over time. Specifically, indicator 408 is a highlighted area beneath the analyte level curve corresponding in time to the occurrence of the rapid rise.

This rapid rise can be the glucose excursion or meal event detected at 306 of method 300 (see FIG. 3A), which can trigger a prompt to the user at 310 to enter meal information. Screen 428 of FIG. 4C is an example of a home screen of the meal monitor application. Here, when an excursion or event is detected the home screen displays a pop-up window 429 that can overlay the home screen and notify the user that one or more possible meals were detected and optionally give the time when each of those meals were detected. Pop-up window 429 includes a selectable field where the user can choose to log a meal for each time period corresponding to the detected excursion or event, and can also include a selectable field where the user can choose to ignore the notification of window 429. Here, screen 428 includes a historical graphical display 406 of the user's analyte level with indicators 408 for each detected glucose excursion or meal event. When pop-up screen 429 is displayed, the corresponding detected events where meal information has not yet been entered can be graphically identified or distinguished from those events where meal information has already been entered or where it is not required.

In an alternative embodiment, upon detection of a glucose excursion or meal event, the meal monitor application can initiate or display screen 430 of FIG. 4D to identify the detected event to the user (at least in part by way of indicator 408) and prompt the user to enter a meal information by selectable Event Detected button or field 412. Alternatively, the meal monitor application can display the Event Detected button 412 on another screen currently being displayed to the user. The Event Detected button 412 can be alternatively labeled as a Meal Detected button.

Selection of the option to log the meal in pop up screen 429 or selection of the Event Detected button 412 can cause the meal monitor application to transition to screen 420 of FIG. 4B, reproduced again as FIG. 4E for ease of illustration. There, as in the example embodiments described with respect to FIGS. 4A and 4B, the user can enter meal information photographically via button 422 and/or textually via free text field 424, and save that information via button 426. Because detection of the meal event occurs after consumption of the meal, the user may choose to photograph packaging for the meal, or scan a barcode of the meal packaging, instead of photographing the meal itself. All variations to the meal information entry process described with respect to FIGS. 4A and 4B (including, but not limited to the pick list and drop-down list variations), including all variations to the meal information entry process described herein but not shown in FIGS. 4A and 4B, can likewise be applied here.

When a user logs a meal at his or her own discretion, for example using screen 420 of FIG. 4B, the meal monitor application can require the user to describe the time at which the meal occurred in any of the formats described herein. When the meal monitor application detects an event, then the application already has access to time information about the event. Thus, when the user is prompted to enter information about the meal event such as, for example, using screen 430 to access screen 420, that determined time information can be displayed to the user so that the user has an option to edit the time information if not accurate. If a rise in the analyte data is used to detect a meal event, then the time at which the rise episode starts can be the default displayed meal time, with compensation for sensor and digestive-based lags as described herein.

In some example embodiments, the data entry process is streamlined to further minimize the burden on the user when inputting data. The lower the burden the more likely the user is to utilize the meal monitor application, and thus enjoy its benefits. In one example embodiment, the meal monitor application can be configured so that it does not actively prompt the user for any nutritional information about the meal nor the meal type (e.g., breakfast, lunch, or dinner) when accepting a log entry from the user (e.g., step 302 of method 300) and/or when accepting information from the user in response to a prompt for meal information (e.g., step 310 of method 300). In another example embodiment, the meal monitor application is configured so that it only accepts an image of the meal and/or a free textual description of the meal and does not permit any other information about the meal to be entered when accepting a log entry from the user and/or when accepting information from the user in response to the prompt.

Referring back to FIG. 3A, once the information for a meal event has been entered at 312, the meal monitor application will associate the analyte data with that meal information in memory at 314. Specifically, the analyte data occurring around the time of the meal event can be associated with the information for that meal event. The analyte data selected to be associated with the meal event can be chosen based on the time during which the meal event occurred and optionally a period of time after which the meal event occurred to reflect changes in the analyte level due to digestion of the meal.

In some embodiments, analyte data occurring from the time at which the meal began until a period of time after the meal ceased can be associated with the meal event. Also, analyte data occurring from the time at which the meal began until the conclusion of a detected glucose excursion can be associated with the meal event. In some embodiments, analyte data collected during a fixed range of time around the meal event is associated with the meal event, for example, any combination of from one, two, or three hours before the meal event (e.g., as measured by initiation of the meal event, a median time of the meal event, or a conclusion of the meal event) until one, two, three, four, five, six, seven or eight hours after the meal event. In each case, times over which the meal event occurred can be identified based on information entered by the user or can be identified algorithmically through analysis of the analyte data.

Data collected from analyte sensor 104 may temporally lag the user's actual blood glucose level, for example if sensor 104 is sensing data from within the user's interstitial fluid, and to a lesser degree, dermal fluid. Thus, correlation of analyte data to meal consumption times should take into account this sensor-based lag, which may typically be on the order of 3 to 20 minutes depending on fluid type and sensor placement. This lag is in addition to lag time that results from absorption of food through the digestive process. In other words, there is a time delay between the time when food is consumed and the time when the results of that consumption are reflected in the user's blood glucose level. Thus, in some embodiments, the analyte data associated with the meal event is selected as described above with additional compensation for digestive lag and/or sensor-based lag. For example, the first analyte data points to be associated with a meal event may be based on the commencement of that meal event, but delayed by 10 minutes (five minutes to compensate for digestive lag plus five minutes to compensate for sensor-based lag).

The association of analyte data with a meal event can be used in determining a glycemic impact of the meal event at 316. In some embodiments, determination of the glycemic impact of the meal event can be done algorithmically with reference to analyte data contemporaneous with the meal event, and this algorithmic processing can constitute both steps 314 and 316. The determined glycemic impact can be determined quantitatively in terms of maximum (peak) or minimum glucose level, median or mean glucose level, minimum-to-maximum change in glucose level (delta (Δ) glucose value), percent variability of glucose level, duration of glucose response, rate of change of glucose level, area of the glucose response, and any combination thereof.

The meal event detector outputs information about the glycemic response to the meal that can be used to characterize the magnitude or severity of the response. For example, the meal event detector can output the start time and the peak time for each detected meal event. The meal-start glucose can be the glucose value at the meal event start time and the peak glucose can be the glucose value when a rise episode of the detected meal event peaks. The difference in these glucose values can be determined to provide a delta glucose measure of the glycemic response to the meal.

In other embodiments, the "area" of the glycemic response is determined in terms of glucose and time; for instance, a sum or integration of each glucose reading is determined from the meal start time to either a) the next meal start time, or b) when the glucose readings fall within a threshold value of the meal start glucose value (e.g., within 10 mg/dL), as it can be difficult to accurately assess where the glycemic response ends. This sum or integration value is proportional to the glucose multiplied by time area of the glucose response. Each of the metrics described herein, as well as others, can be used as the basis upon which to rank and/or sort the glycemic response to meals output to the user as described below.

Another problem that specifically arises from the use of a meal monitoring and detection software is that in some instances multiple meal events may be detected and/or logged in close temporal proximity to each other. This problem can result in the identification of too many meal events when, from the user's perspective, the events were part of the same meal.

In these cases, the meal monitor application can cluster or group the meal events into one meal cluster. For example, meal events logged or detected within a time range condition (e.g., one hour, 90 minutes, etc.) of each other can be merged into one meal cluster. The meal monitor application can then analyze and output glycemic response data to the user describing the meal cluster as a whole as opposed to each separate event therein, which is intended to correspond to the user's concept of a meal (e.g., dinner may be one cluster of different courses). Thus, each meal event or meal cluster that is analyzed and displayed to the user is separated by at least the value of the time range condition, which can result in a more natural information output that is easier to comprehend. To facilitate this, the meal monitor application can avoid placing a restriction on the number of meal events considered per day.

Figure 3D:
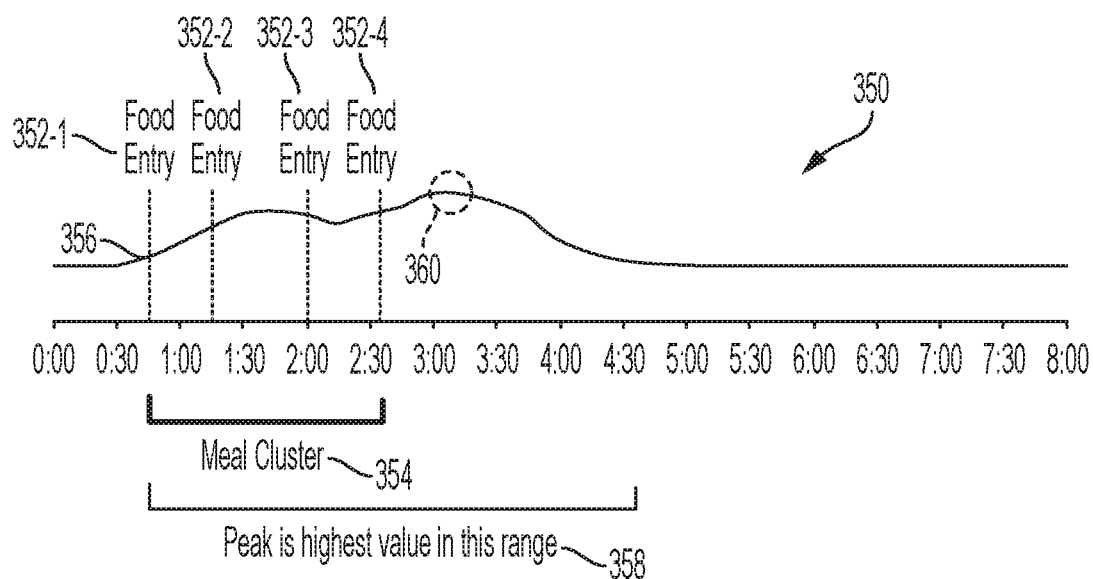
FIG. 3D is an example of a graph of analyte data over time displaying an example set of data with four different meal events.

FIG. 3D is an annotated graph 350 of analyte data over time displaying an example set of data where four different meal events (352-1, 352-1, 352-3, and 352-4) have been automatically detected or manually logged. These four different meal events are considered a single meal cluster 354 because each event 352 is within a time range condition, which can be a predetermined factory-set condition or a condition set by the user. In this example, the time range condition is one hour, and all four events 352 are grouped together because each individual event 352 is within one hour of at least one other event 352.

In some embodiments, a maximum time limit can be placed on the length of time from a first event 352 that the meal monitor application will consider other events for clustering. For example, the time range condition can be one hour with a meal cluster maximum length (not shown) of 90 minutes after the first event 352-1, in which case meal events 352-1, 352-2, and 352-3 would be grouped as one meal cluster and meal event 352-4 would be considered a separate meal event from the cluster.

As described herein, the time of the meal event can be the time input by the user in the manual logging process, the time at which an analyte episode corresponding to the meal event is first detected (e.g., the start of a rise), the time at which an analyte episode corresponding to the meal event is first detected plus the addition of a delay (e.g., 15 minutes, 25 minutes), the mean or median time determined from the duration of the analyte episode (e.g., the meantime from start to end of a rise or the time of the median data measurement collected during the rise), or any other desired time.

In some embodiments, multiple different meal events detectors, based upon different algorithms, can be used. Each individual meal event detector routine can be independently run on the collected analyte data to identify detected meal events and/or their start times. The meal monitor application can then choose which results to use for analysis and display to the user. For example, if each meal event detector outputs a different start time for the same meal event, then the meal monitor application can average the two and use the averaged meal start time for analysis and display. In another example, the meal monitor application may consider an event to be detected only if each meal event detector actually detects it. In yet another example, the meal monitor application may consider an event to be detected if at least one meal event detector actually detects it.

In the example depicted in FIG. 3D, a pre-meal or meal-start glucose value 356 can be the glucose value at the start of the first meal event 352-1 of meal cluster 354. If necessary, this value can be obtained from the data measurement occurring closest in time before or after the time of meal event 352-1. If no data measurement is present within a maximum time range, such as 30 minutes, then the meal monitor application may consider the pre-meal glucose value to be unknown.

A meal peak glucose value can be the highest glucose value occurring in the analyte data collected during or after meal cluster 354. Meal peak glucose time range 358 denotes an example time range window that is searched for the occurrence of the highest glucose value. Time range 358 can start it the time of the first meal event 352-1 and can end at the time of the last meal event 352-4, or more likely, can and the predetermined time after the last meal event 352-4. In the embodiment depicted in FIG. 3D, time range 358 begins at the time of the first meal event 352-1 and ends two hours after the last meal event 352-4. Thus, the meal peak glucose value would be the magnitude of values in region 360 where the analyte data peaks and maintains a constant level. If no readings are present in window 358 the meal peak glucose value can be considered as unknown.

A meal delta glucose value can be determined by subtracting the pre-meal glucose value from the meal peak glucose value. If one of or both of those values are unknown, then the meal delta glucose value can be considered as unknown.

Referring back to FIG. 3A, the determined glycemic response or impact can then be output to the user at 318, such as visually on a display of the smartphone, as will be described below with respect to FIGS. 5A-F. In many embodiments, this is done immediately with a presentation of information about the corresponding meal event so that the user can immediately understand the impact of a particular meal on the user's analyte levels, making the application compelling to use. The determined glycemic response can be output in quantitative and/or qualitative terms. For example, the determined glycemic response can be output in the same quantitative measure in which it was determined at 316. This can be done in text and/or graphical form. Also, the determined glycemic response can be output qualitatively, for example, described in text as low or minor, moderate or medium, or high or severe, or any synonym thereof. Less or more graduations of magnitude can be used as well. The determined glycemic response can also or alternatively be output as an icon or other imagery (e.g., colored shapes of various degrees of magnitude).

System 100 can also (or alternatively) issue a medication or other treatment output at 320. In certain embodiments the output can inform an individual, such as the user or a medical professional, that medication (e.g., insulin) or treatment may be warranted, for example, due to the risk or occurrence of a high glucose excursion or hyperglycemia. This notification can be a visual and/or audible notification output by reader device 120.

An output issued at 320 can supply information directly to the user's medication or treatment program on the same device or a different device in communication with the device executing the meal monitor application. This information can be used by the treatment program in determining whether a modification to a user's treatment profile (e.g., a basal insulin delivery schedule or a bolus dose) is warranted or to prompt the user as to whether a change to the user's treatment profile should be implemented.

An output issued at 320 can cause the user's drug delivery device 160 to administer medication to treaty a potential or actual high glucose condition, such as by administration of a bolus dose or by a modification to a basal dosage profile or schedule. This can be done with the user's approval, such as in a semi-closed loop, or automatically without the user's approval, such as with a true closed loop or artificial pancreas.

The meal monitor application can also issue any of the aforementioned medication or treatment outputs when a user indicates that a meal is or was recently consumed where that meal has previously caused a glucose excursion, such as a rapid rise or high glucose level. In this manner system 100 can pro-actively treat the anticipated glucose change without waiting for the detection of the actual change with sensor 104.

Outputting information from the meal monitor application to a medication or treatment program and/or drug delivery device enhances the ability of the program or device to implement accurate therapy for the user. More accurate information about the user's meal history is captured and made available to the program or device to make the appropriate, sometimes subtle, adjustments to the user's treatment. This can, in turn, reduce the occurrence of errors in medication administration (e.g., over or under-dosing), which constitutes an improvement to the functioning of electronic and mechanical systems with drug delivery capability.

FIGS. 5A-F depict example embodiments of GUI screens that can display output information to the user or any other individual in step 318 of method 300 (see FIG. 3A) or at other times during use of the meal monitor application. These screens can be displayed on any of the embodiments of reader device 120, drug delivery device 160, or local computer system 170 described herein.

Figure 5A:
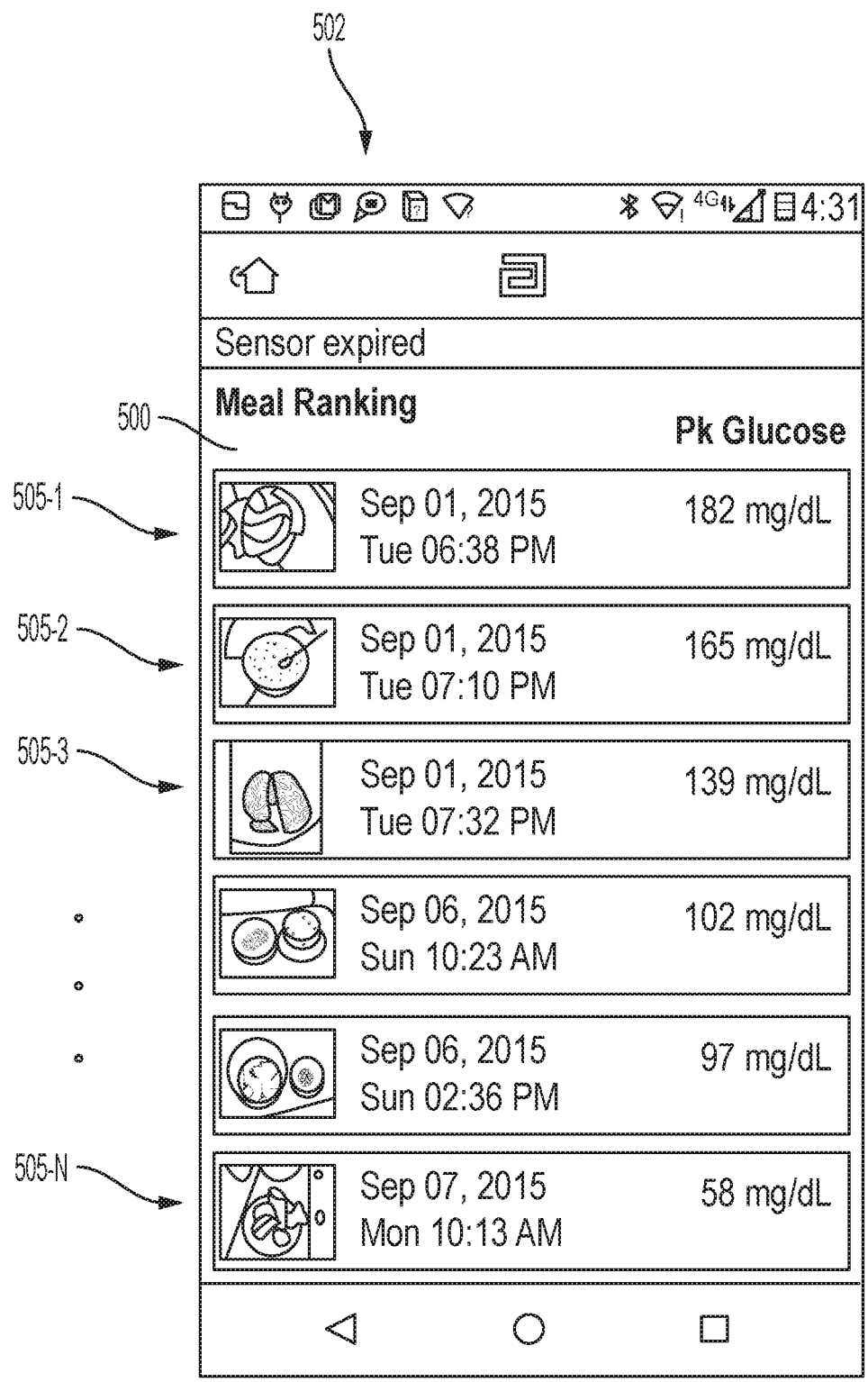

FIG. 5A depicts screen 502, which includes a series, listing, or group 500 of logged meals 505-1 through 505-N. Group 500 is generally referred to herein as a ranking report 500. Ranking report 500 shows all or a subset of meal events 505 (and activity, if applicable) for which data has been collected. If a meal cluster was identified, then the meal events within the cluster are grouped together and displayed as one meal event 505. The ranking of events 505 can be ordered by the magnitude of the glycemic response. When presented to the user, ranking report 500 can display starting at the top of the list, showing the meals 505 that resulted in the largest glycemic responses first, followed by those that resulted in glycemic responses of decreasing magnitude.

In another embodiment, ranking report 500 can display the most recent meal causing a glucose excursion and the user can scroll (upwards or downwards) through the list which is again sorted in order of highest to lowest glucose excursion magnitudes. In yet another embodiment, ranking report 500 can display the meals causing glucose excursions in order of most recent to least recent. Toggle sort buttons can be provided that allow the user to change the criteria upon which the ranking in report 500 is determined (e.g., change ranking by meal type, date and time, glucose excursion magnitude, and the like).

In the embodiment depicted in FIG. 5A, for each meal 505 within ranking report 500, an image of the meal can be displayed if available, along with the date and time at which the meal was consumed, along with an indication of the magnitude of glucose response, which can be presented in any of the output forms described herein. Instead of or in addition to an image, the name of each meal 505 can be described textually. In addition to ranking meals by their glycemic response, ranking report 500 can rank occurrences of a single particular meal type by their glycemic response. For example, portion sizes, times of day, and glycemic response for a commonly consumed spaghetti dinner can be ranked and displayed.

If a glucose excursion occurred but no meal information was entered, then the time, date, and magnitude of the glucose excursion can be displayed in report 500 along with a selectable button or field which, upon selection, will prompt the user to enter information about the meal, such as by displaying screen 420 of FIG. 4B. If there is meal information but no photo, then a missing photo indicator can be displayed so that the date and/or time is aligned with the other entries in report 500.

If meal event detection sensitivity settings or glucose excursion sensitivity settings are adjusted during the use of the meal monitor application, then the data displayed in ranking report 500 can be retroactively adjusted so that all data is displayed with one common array of sensitivity settings. Thus, each time the user displays a ranking report 500 or otherwise displays historical meal or analyte information, the meal monitor application can recalculate the displayed information to retroactively compensate for sensitivity adjustments.

Figure 5B:
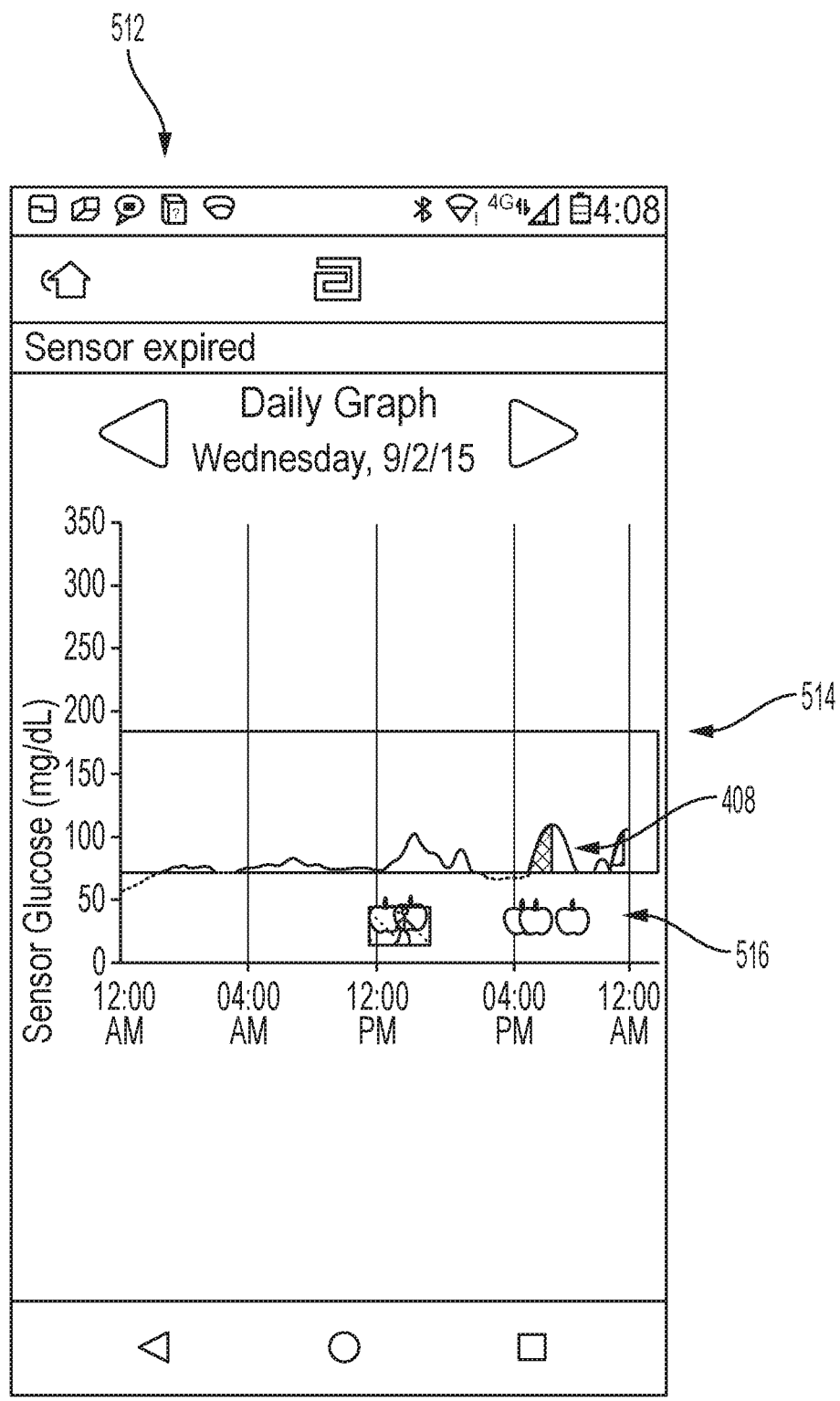

Selecting or clicking on a meal in ranking report 500 can initiate a screen with additional information about that particular meal. FIG. 5B depicts an example embodiment of such a screen 512 that can include a graphical display 514 of historic glucose (e.g., 8 hours, 24 hours, 48 hours, or other) surrounding the meal event. Graphical display 514 can include any increment of time prior to, after, and surrounding the meal. In one example embodiment, graphical display 514 is an eight hour period of time with two hours of data prior to the start of the meal event and six hours of data after the start of the meal event. Graphical display 514 can also include time periods of any of the various ranges of analyte data associated with the meal event at 314 of method 300 (see the description with respect to FIG. 3A).

An excursion indicator 408, in this case a shaded area under a glucose curve, can be displayed for each excursion detected in the analyte data of graphical display 514. The occurrence of the selected meal event along with every other meal event within the period of time of graphical display 514 can be indicated by a food icon 516, a photo of the meal, and/or text describing the meal. Alternatively, meal events that are clustered together can be indicated as only one event. Selection of a particular meal event can cause another screen 512 to display, which is instead focused on that newly selected meal event. Alternatively, selection of a meal event can cause a pop up window to display with information about that particular meal event.

In another embodiment, selecting an individual meal from screen 502 of FIG. 5A can display an embodiment of screen 512 that includes graphical display 514 along with an image of the selected meal, with a summary of the meal contents of that meal (e.g. portion type, portion size, etc.) and/or any free text entered by the user with respect to that meal. Thus, all or most of the information entered by the user to describe the meal is displayed, along with historical analyte data around that meal event.

In another embodiment, each meal displayed either in the ranking report or elsewhere may be displayed with the associated glucose trace. When displayed with other meals on the ranking report, the user can compare features of different meals, such as the relative peak glucose time and how long the glucose response lasts. The display may highlight some of these features, such as displaying the numeric elapsed time of the peak glucose relative to the start of the meal.

Figure 5C:
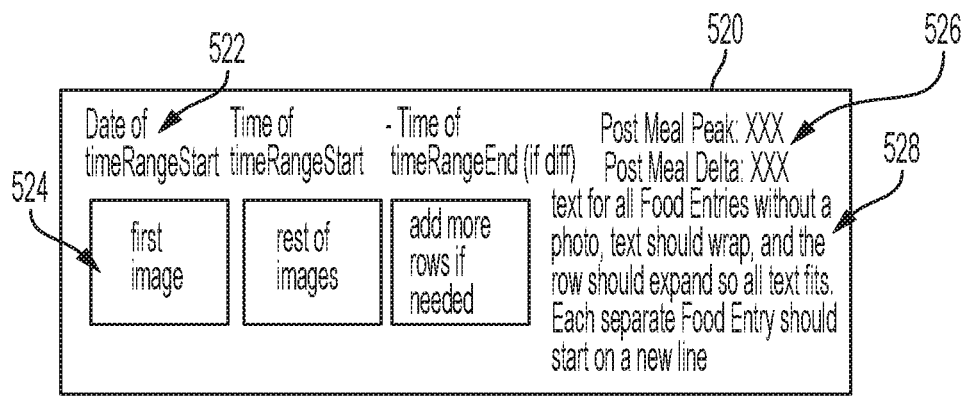

FIG. 5C depicts an example embodiment of a screen 520 showing an organizational layout of information for display to the user about a particular meal, for example such as would be displayed upon selecting a particular meal from ranking report 500. The date where a time corresponding to the meal event first occurs is displayed in region 522, followed by the time (or time range if supplied) of the meal event. Beneath one or more images 524 of the meal can be displayed, for example, if the user captured a photo of each course of the meal. Meal peak and meal delta glucose values can be displayed to the right at 526, along with any free textual description of the meal at 528.

Figure 5D:
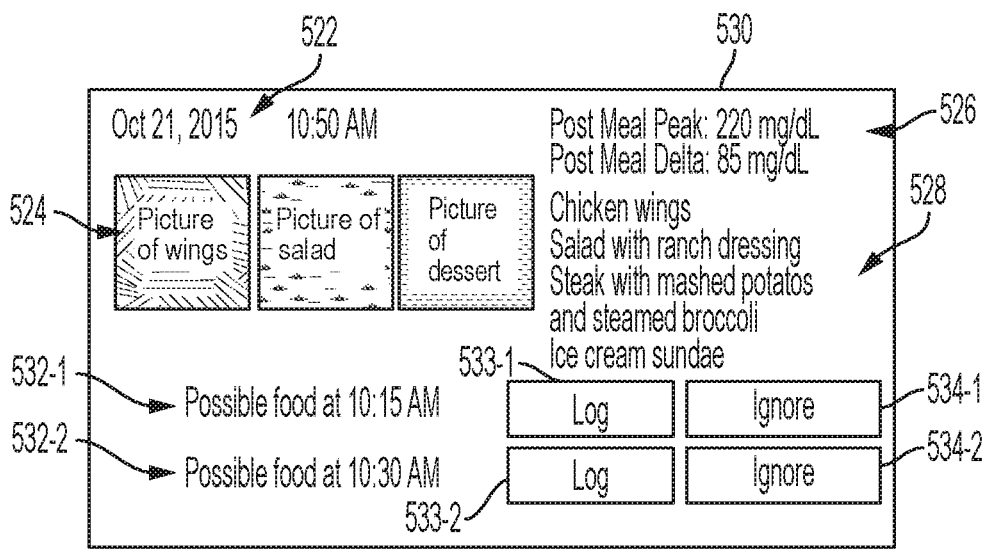

FIG. 5D depicts an example embodiment of a screen 530 populated with example information about a particular meal. Screen 530 is similar to screen 520 but also includes indications of detected meal events 532-1 and 532-2 for which no information is yet been entered, e.g., a missed entry. Each meal event 532 is followed by a user selectable log buttons 533-1 and 533-2 for logging information about the meal event and user selectable ignore buttons 534-1 and 534-2 for selection if the user chooses not to enter information about the meal or if no meal in fact occurred. If the user chooses to log information about the meal, then a log information screen such as screen 420 of FIG. 4E can be displayed with the meal time pre-populated as the time of the missed entry. If the user returns to screen 530, the information should be recalculated to account for the newly logged data. If the user chooses to ignore the missed entry, then a log of missed entries can be updated, and that ignored entry can be removed from screen 530.

Figure 5E:
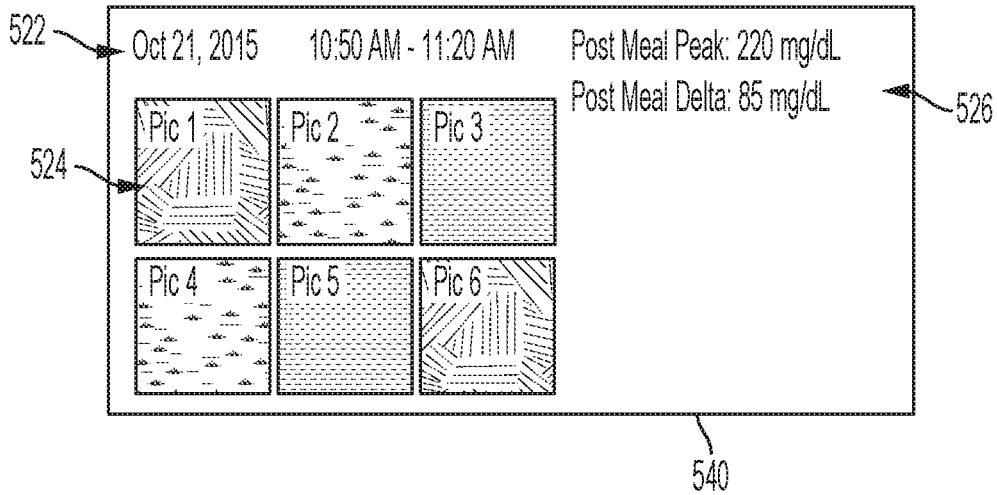

FIG. 5E depicts an example embodiment of a screen 540 similar to screens 520 and 530. Here, screen 540 includes six photographs of a meal cluster occurring between 10:50 am and 11:20 am. In any of the embodiments described herein, selection of a particular photograph can cause the display of a pop up window containing a larger display of that image.

Figure 5F:
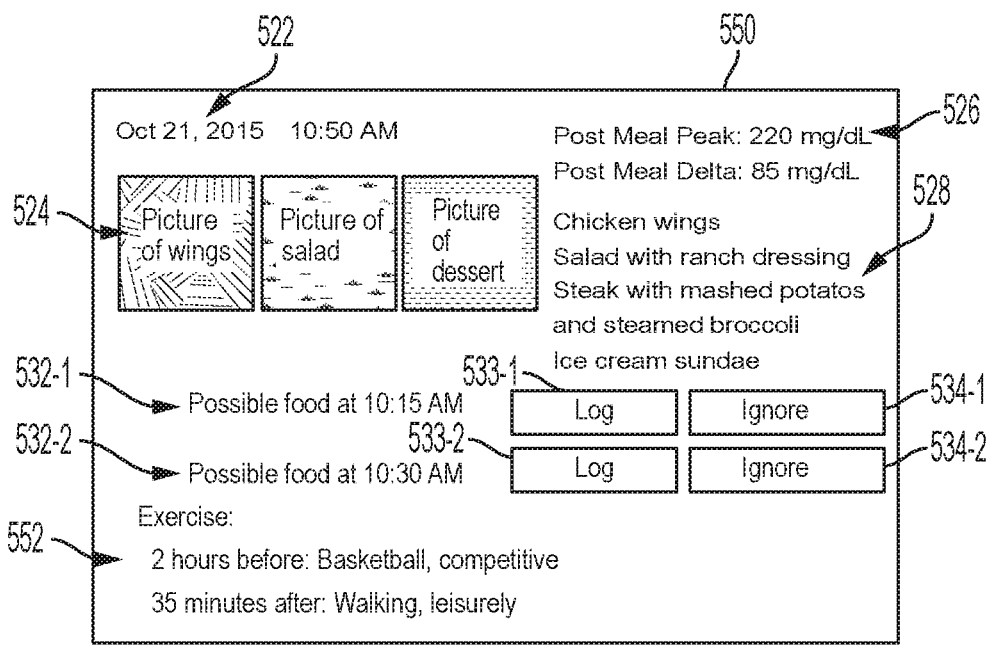

FIG. 5F depicts an example embodiment of screen 550 similar to the previous screens but with an indication of logged or detected exercise or other activity 552 and the times at which that activity occurred in relation to the meal event described in screen 550.

Referring back to FIG. 3A, method 300 can repeat itself such that the meal monitor application continues to receive, monitor and store the analyte data (e.g., step 304 of method 300) and search for detected events 306 indefinitely. The recently entered information about a detected or logged meal can be included in the options presented to the user for entering meal information each time a new event is detected.

The meal monitor application can be used with software that monitors and collects information about the user's activity level. Thus, for each of the embodiments described herein that relate to the logging of meals, prompting for information about meals, associating analyte data with meals, determining glycemic impact of meals, and/or outputting information about the relationship between a meal and the user's glucose level, it should be understood that those embodiments can likewise be applied to an activity performed by the user that is not the consumption of the meal. Common examples of such activities are exercise, work, and rest. All such activity related embodiments are within the scope of this disclosure. To assist in the collection of activity data, each sensor control device 102 can include or otherwise be configured to operate with an activity monitor that continually or repeatedly measures the level of activity for each wearer (e.g., calories burned per time of day) and/or a heart rate monitor that monitors and enables the recording, by system 100, of the wearer's heart rate.

The information output by the meal monitor application, such as ranking report 500, provides the user with concrete and immediate information regarding the impact of their meals on their glucose levels. This output information can help users learn to avoid or minimize certain meals in their diet that they did not realize were impacting their glucose levels, e.g., that they did not realize were driving their glucose levels so high. This output information can also help users learn to control the portion sizes of their meals by seeing the relative impact of different portion sizes on their glucose levels.

The meal monitor application can also encourage the individual to experiment with different meals, times, components, and can be compelling and fun to use. This meal monitor application promotes the use of analyte sensors by a large demographic including people with Type-Two diabetes, pre-diabetes, metabolic syndrome and people without diabetes—basically any person who is motivated to improve their health by changing their diet and/or activity habits.

The meal and/or activity monitoring applications described herein can have substantial benefits for individuals that are newly diagnosed with Type-Two diabetes or pre-diabetes. Often, when an individual is confronted with starting diabetes medication, they are highly motivated to try diet and exercise modifications in order to avoid or delay the need for medication.

Thus, a clinical scenario for use of various systems and software disclosed herein is for individuals that are newly diagnosed, for example, based on a fasting glucose test and/or an A1c test, to follow up by wearing a sensor control device 102 that interfaces with a reader device 120 that can be blinded so that the user's current and historical analyte levels are stored but not shown to the user. The user wears sensor control device 102 for a period of time, e.g. two weeks, after which the analyte data is collected by a medical professional and the analyte patterns are revealed to the user. This blinded usage minimizes the impact of the system on the user's habits and tendencies, and thus gives the medical professional a better understanding of the specific glycemic issues and how best to address them with medication. At this point the physician can give the individual the option to try to address their diabetic condition with diet and exercise using the software applications described herein, in conjunction with nutritional training and an exercise plan. This may be followed up with another sensor control device 102 and reader device 120 to allow the medical professional to evaluate progress, and to determine if medication or further diet/exercise intervention is still required.

Additional metrics and reports geared towards the medical professional can be included. For example, a study on 14 normal glucose tolerance (NGT), 12 impaired glucose tolerance (IGT), and 16 non-insulin dependent diabetes mellitus (NIDDM) individuals showed that the first phase insulin response to an intravenous glucose challenge is absent in Type-Two diabetes mellitus (T2DM) subjects. With sufficient monitoring of meal information paired with glucose excursion tracking, changes in the first phase insulin response can be tracked by the medical professional.

Moreover, a quarter of the world's adults have metabolic syndrome. These adults have a five-fold higher risk of developing Type-Two diabetes. In addition, evidence indicates that most of the damage to a person's beta cells is done prior to pre-diabetes diagnosis, demonstrating the need for intervention prior to diagnosis. Since progression to Type-Two diabetes starts from impaired glucose tolerance (IGT) well before impaired fasting glucose (IFG), sensor-based hyperglycemia and post meal excursion based metrics that have been shown to reliably predict the onset of or diagnose Type-One diabetes may be adaptable for those with metabolic syndrome. Thus, the software applications and systems described herein for newly diagnosed diabetes individuals is therefore applicable to the metabolic syndrome population.

Furthermore, the software applications and systems described herein have applicability to those wishing to lose weight, as a general correlation between glucose excursions and weight gain is known.

To the extent information is input by a user, device, or other software, then that information can be received, read, and if containing an instruction, implemented by the processing circuitry (which can be a single processor or distributed across multiple processors or devices having processing capability). Those instructions can be stored in a memory of, and executed by processing circuitry of, any and all embodiments of a reader device, drug delivery device, meter, computer system, or other computing device described herein.

Embodiments of Analyte Monitoring a Population for Meal and Activity Planning

Also provided herein are example embodiments that enable analyte monitoring for a local collective, population, community, or group of users. Data collected from the monitoring of this population can be used for a number of purposes, including providing guidance and meal and activity planning. These embodiments will be described with respect to one example application, namely, use of population monitoring at a senior care residence facility or home. However, these embodiments are not limited to this example application and numerous other such applications exist and are within the scope of this disclosure. The population monitoring embodiment can be used alone or in combination with the meal evaluation and planning embodiments also described herein.

In senior residence facilities, meals are prepared and served by the residence facility staff. Residence populations may be susceptible to diabetes or pre-diabetes due to age-related decrease in insulin response, decrease in physical activity, weight gain, and/or other factors. Generally speaking, the residents form a population and each member of the population can wear an in vivo sensor 104, such as with sensor control device 102. Analyte data collected by each member's sensor control device 102 can be automatically read by a reader device while the members are within range of the reader device, for example, when all or most members of the population are in the same general proximity to each other within a common area (e.g., a dining room, etc.) during a meal time (e.g., breakfast, lunch, or a dinner time). Alternatively, the data can be read from each member of the population at different times with respect to each other.

Figure 6A:
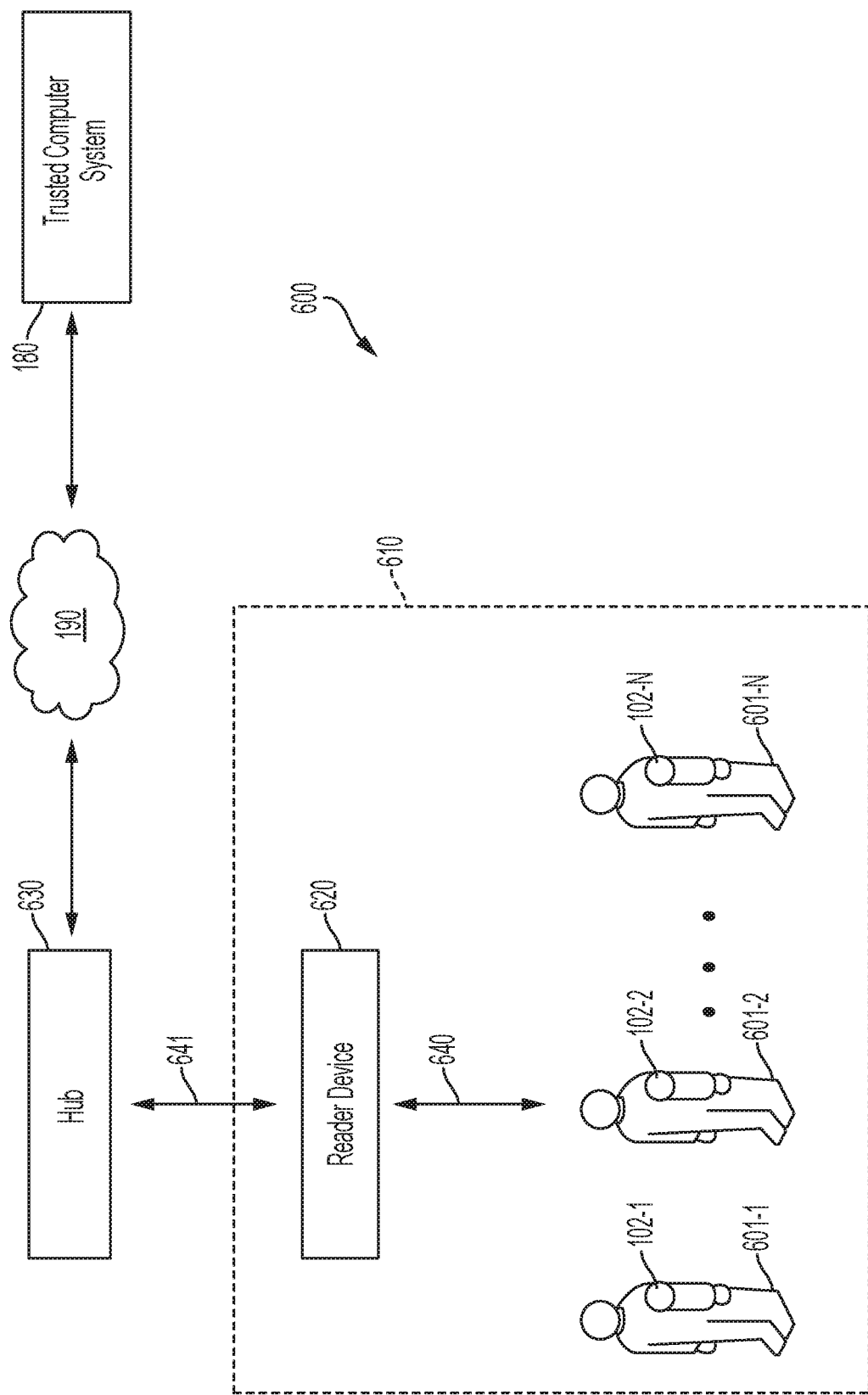
FIG. 6A is a block diagram depicting an example embodiment of an analyte monitoring system for use with multiple individuals in a local population.

FIG. 6A is a block diagram depicting an example embodiment of using an analyte monitoring system 600 to collect analyte data from N members of a population. Here, system 600 includes a reader device 620 capable of communicating with a plurality of sensor control devices 102-1 through 102-N, located on a plurality of device wearers 601-1 through 601-N, respectively. N can be any desired number. Reader device wearers 601 are physically located in a common area 610, such as a dining room.

Reader device 620 can be configured in a manner similar to all of the embodiments of reader device 120 described herein, but also with the capability to communicate with each of the plurality of sensor control devices 102 simultaneously, sequentially, or at scheduled or random intervals (e.g., as the wearers 601 cycle through the common area through the course of a day). This communication can occur over a wireless or wired communication path 640, which can be configured similarly to the wireless communication path 140 described with respect to FIG. 1. For example, any of the wireless communication protocols described herein can be used, and this communication path can be unidirectional or bidirectional.

In one example embodiment, reader device 620 pairs with each sensor control device 102 using a Bluetooth or Bluetooth Low Energy communication protocol. Reader device 620 can collect analyte data from each wearer 601 and store the data locally and/or upload the data to another computer system, such as a remote internet server. Here, reader device 620 is adapted to communicate with a wireless hub 630, which in turn can communicate data to a trusted computer system 180 over network 190, through any number of intervening servers. The communication link (or path) 641 between reader device 620 and wireless hub 630 can operate according to any desired wireless protocol. In this embodiment, wireless hub 630 is a Wi-Fi hub and link 640 is a Wi-Fi connection. Thus, reader device 620 can function as a Bluetooth to Wi-Fi bridge.

In other embodiments, reader device 120 can include the electronic circuitry hardware and software that permits reader device 620 to upload data directly to trusted computer system 180 over network 190 such that Wi-Fi hub 630 can be omitted. For example, reader device 620 can include mobile telephony functionality, satellite communication functionality, a cable modem, Ethernet functionality, and so forth.

In many embodiments trusted computer system 180 can be local to the residence population 601-1 through 601-N such that communication over network 190 is not necessary. For example, reader device 620 can upload the collected data over communication link 641 to Wi-Fi hub 630, which can then pass the information directly to trusted computer system 180 over a local wired or wireless connection, or reader device 620 can upload the collected data directly to trusted computer system 180 over a local wired or wireless connection.

Reader device 620 can also perform any amount of desired processing on the analyte data collected from sensor control devices 102. For example, reader device 620 can simply pass through raw data collected from each sensor control device 102 to trusted computer system 180 by way of wireless hub 630 and network 190. In another example, reader device 620 can algorithmically process the collected raw data and determine the analyte level of each wearer 102, and then upload that processed information to trusted computer system 180.

Reader device 620 can be programmed to automatically recognize and pair with each sensor control device 102 within its communication range. However, greater selectivity may be desired to allow data from only particular sensor control devices 102 to be collected. In such embodiments, reader device 620 can be programmed to recognize and pair with only a subset of sensor control devices 102. For example, sensor control devices 102 can include a dedicated identification flag or code that is transmitted to reader device 620 during a data collection or pairing procedure. Reader device 620 can be programmed to upload data from only those sensor control devices 102 that transmit this flag or code.

In another example, reader device 620 itself, or a different reader device 120, can perform a recognition procedure on each sensor control device 102 that reads an identification number (e.g., a serial number) of that sensor control device 102 and associates that identification number with the subset of sensor control devices 102 that will communicate with reader device 620. During this recognition procedure, the name or identification of the wearer 601 of each sensor control device 102 can be associated with that device identification number such that data collected from each sensor control device 102 can be linked to a particular wearer 601. If reader device 620 is used for this recognition procedure, then the list of sensor identification numbers can be stored locally in the non-transitory memory of reader device 620. If a separate reader device 120 is used in the recognition procedure than the list of sensor identification numbers can be uploaded to trusted computer system 180 and then communicated to reader device 620.

In order to permit communication with as many sensor control devices 102 as possible, reader device 620 can be positioned centrally within the common area 610. For example, reader device 620 can be mounted overhead in the center of the room or, in the case of a dining room, can be positioned on the dining table. In some embodiments, multiple reader devices 620 can be used, for example one reader device 620 on each table, to increase the overall communication area.

Each sensor control device 102 can include enough non-transitory memory to store analyte data for the entire time period between readings by reader device 620. This allows reader device 620 to collect all or substantially all of the analyte data of each wearer 601 throughout the course of a day or week. For example, sensor control device 102 can include 12 hours of memory to record analyte data overnight from after a dinner meal until a breakfast meal. Other memory sizes corresponding to different lengths of time can also be used (e.g., 8 hours, 24 hours, 72 hours, etc.).

Although these embodiments are described with respect to use of a common reader device 620 for the local population, is also the case that each member of the local population can use his or her own reader device 120 to collect the analyte data. In such cases, each reader device 120 could communicate directly to trusted computer system 180 or to a data collection hub that in turn uploads the data to the appropriate computer system.

Figure 6B:
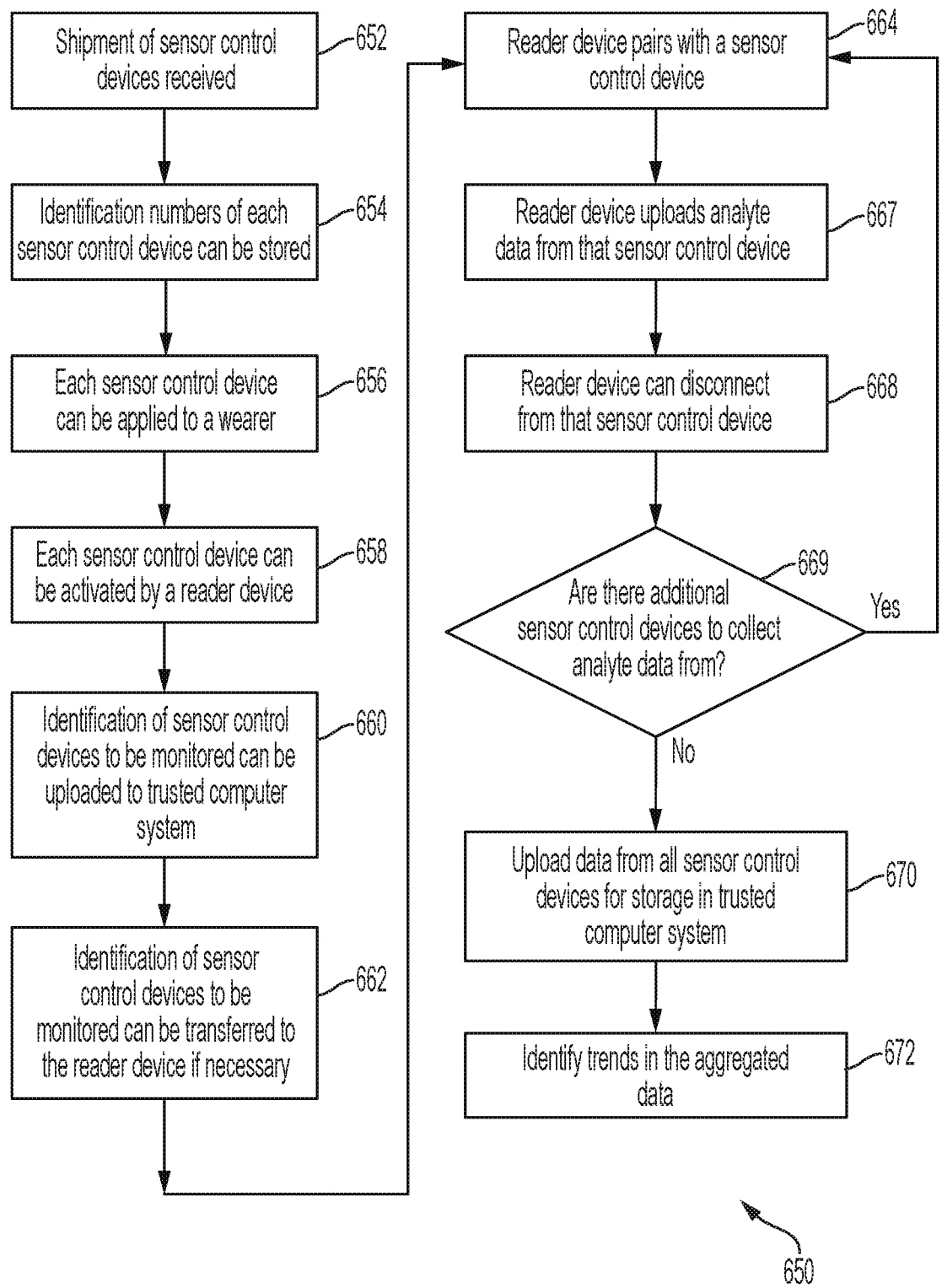
FIG. 6B is a flow diagram depicting an example embodiment of a method of using an analyte monitoring system with multiple individuals in a local population.

FIG. 6B is a flow diagram depicting an example embodiment of a method 650 of analyte monitoring a population for meal and/or activity planning. Like the system 600 of FIG. 6A, method 650 is described with respect to the collection of data from residents of a senior care facility during mealtime.

A shipment of sensor control devices 102 is first received by the facility at 652. Facility personnel can optionally upload the identification numbers of each sensor control device 102 to trusted computer system 180 at 654. Each wearer 601 to be monitored can then apply a sensor control device 102 such that the analyte sensor is positioned in vivo and ready to sense analyte data at 656.

Each applied sensor control device 102 can then be initialized, activated, or recognized at 658 by reader device 620 or another reader device 120, as previously described, to identify the subset of sensor control devices 102 that will be sending data to reader device 620. This recognition procedure can be performed by each wearer 601 or a member of the facility personnel and can optionally include associating the wearer's name or identification with his or her sensor control device 102. This data can be uploaded to trusted computer system 180 at 660, which can in turn communicate the list of sensor control devices 102 (and optionally the associated wearers 601) to reader device 620 at 662.

Reader device 620 can monitor for the presence of sensor control devices 102 within common area 610 and then pair with each sensor control device 102 of the subset as those sensor control devices 102 are discovered in common area 610 at 664. If common area 610 is the dining hall, then many sensor control devices 102 will likely be discovered in a short time span. After establishing a connection with a particular recognized sensor control device 102, reader device 620 can read or upload the analyte data stored within that sensor control device 102 at 667, which may represent a series of analyte level measurements of the wearer 601 since device 102 was last read or the entire history of analyte level measurements stored in the memory of device 102 (in which case measurements overlapping those already collected can be ignored). After collection of the analyte data, reader device 620 can disconnect from that sensor control device 120 at 668 and, if reader device 620 determines that another sensor control device 120 is present and needs to be read at 669, then proceed to pair with and collect analyte data from the next recognized sensor control device 120 (back to 664).

This process is repeated until analyte data has been collected from all recognized sensor control devices 102 within range of reader device 620. Reader device 620 can continually monitor for sensor control devices 102 throughout the course of the day as meal schedules for particular residents may vary and accordingly their presence within common area 610 may not be predictable. Reader device 620 can be programmed with a waiting period so that, after data from a particular wearer 601 is collected, reader device 620 will not attempt to pair with that wearer's sensor control device 102 again until sufficient time has passed. For example, if the wearer briefly leaves common area 610 then reader device 620 will not attempt to collect data again upon reentry. This waiting period may be, for example, 30 minutes, one hour, 90 minutes, and so forth. The next time reader device 620 recognizes sensor control device 102 after expiration of this waiting period, reader device 620 will begin the data collection procedure again. Thus, the process can repeat continually.

Data from all of the sensor control devices 102 can be stored in non-transitory memory of trusted computer system 180 at 670 and the aggregated data can be examined or processed to identify trends among the resident facility population at 672. An example set of aggregated data is depicted in human readable form in FIG. 7. Here, the x-axis represents time and the y-axis represents analyte concentration, although each axis can be different metrics as well. Each point (X) in the distribution represents an analyte concentration reading collected by reader device 620 from a particular sensor control device 102. Thus, the distribution includes readings from the same wearer 601 at different times as well as readings from different wearers 601 (also at different times). Further, the aggregated data can include readings collected from each wearer on different days, for example, to allow identification of trends that are independent of a single meal occurrence.

Menu information, such as meal contents (e.g., caloric content, carbohydrate content, sugar content, protein content, and the like), meal time of day, and meal type (e.g., breakfast, lunch, snack, or dinner) can also be provided to trusted computer system 180 and linked to the aggregate data so that correlations between analyte data and meal information can be identified. Meal events can be detected in the aggregate data using any of the meal event detectors described herein, or by analysis of predefined time periods for each day on the assumption that schedule meals are provided. The analyte pattern of the resident population after the previous meal can be compared against the meal information to identify factors causing undesirable analyte events, and the meals can be adjusted to minimize these events. Even if particular excursions are not occurring, meal contents, type, and times, can be adjusted to provide maximum stability or analyte levels across the resident facility population.

Figure 7:
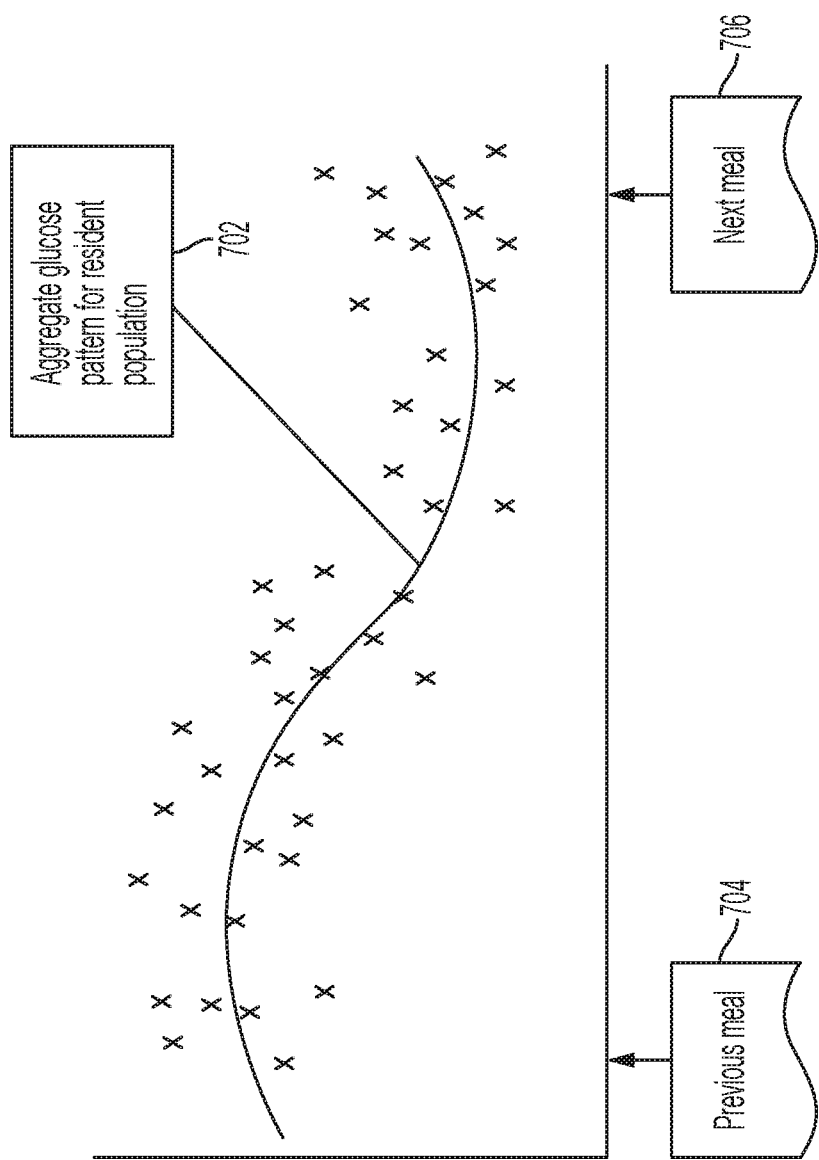
FIG. 7 depicts example aggregated analyte data for one or more (or all) individuals in a local population.

Trusted computer system 180 can be programmed to present the aggregate data to the user in graphical form such as that depicted in FIG. 7 or in the form of a summary report or the like. Trusted computer system 180 can also be programmed to determine or present analyte metrics for each individual wearer and statistics for the population as a whole (e.g., analyte median or mean, standard deviation, or average maximum or minimum values). FIG. 7 depicts a trend line 702 representative of the team analyte concentration for the resident population during a portion of a day with indicators for a first meal 704 and a subsequent meal 706.

Trusted computer system 180 can indicate trends for the resident population and identify instances where a portion of the population (e.g., 5%, 10%, 20%, etc.) violates a threshold or where the population trends in an undesirable manner. The threshold can be, for example, a low analyte threshold, a high analyte threshold, a rate of change threshold, or the like. The population may trend in an undesirable manner, for example, by the occurrence of a mean, median, or minimum-to-maximum variability that is undesirably high or low even if an excessive number of glucose excursions are not occurring. Trusted computer system 180 can be further programmed to provide a potential cause for the trend by reference to the meal information (e.g., excessive carbohydrate content, excessive sugar content, the occurrence of meals too frequently or not frequently enough, etc.) and also a recommendation as to how a meal aspect can be modified to relieve the trend. These recommendations can include adjustment of meal contents, adjustment of meal times, the introduction of a snack, the elimination of a snack, and adjustments to insulin dose amounts and times of administration (e.g., basal and bolus doses).

Trusted computer system 180 can also determine the analyte (e.g., glycemic) response or impact of each meal and provide a report that identifies meals that are associated with the most desirable or undesirable analyte traits. This information can be used by, e.g., a facility manager to alter the meal plans to maintain improved analyte levels across the population. For example, trusted computer system 180 can determine and store the glycemic response for each meal and output a ranking to assist in identifying the meals that cause the most severe responses. Any of the metrics described herein can be used to quantify or otherwise indicate the severity of the glycemic response, including, but not limited to peak glucose value, delta glucose value, and/or the glucose area.

A statistical analysis can be output, for example, glucose mean, glucose median, or glucose variability with standard deviations and/or interquartile ranges for each meal. The output can also include the results of a threshold comparison that, for example, outputs an indication of a mean or median of the population exceeding a threshold value, outputs a percent of the population with the means or medians exceeding a threshold value, outputs a variability for the population that exceeds a threshold value, and so forth.

In addition to those actions already mentioned, any number of actions can be taken for those members of the population identified as exceeding a threshold for a given meal, such as lowering the food portion, providing alternative food, or increasing insulin or other medication. Trusted computer system 180 can also identify individuals experiencing low glucose levels that may indicate too much insulin being administered for a particular meal.

Residences typically offer recreational activity and thus have the ability to select the type of activities and schedule these activities at the most effective times to reduce glucose rises. The embodiments described with respect to FIGS. 6A, 6B, and 7 can be used in conjunction with other activities that the population experiences, such as exercise.

For example, information about exercise events for the population can also be linked to the aggregated data in order to allow trusted computer system 180 to present the linked data and/or determine if correlations exist between analyte trends and the time, duration, and/or intensity of exercise events, in much the same manner as described above for meals. Each sensor control device 102 can include or otherwise be configured to operate with an activity monitor that continually measures the level of activity for each wearer (e.g., calories burned per time of day).

Meal Monitor Application

In another embodiment, in addition to the features previously described, the meal monitor application classifies food and drink choices according to glycemic (or other analyte) response. It can be used in conjunction with analyte monitoring system 100 to help people better understand the impact of their diet on their glucose levels. Users can see directly how food and drink choices, along with portion sizes, affect their glucose levels. Users can learn which foods have the biggest impact. The application also helps dispel myths about healthy eating (e.g., problematic high carbohydrate foods such as orange juice and breakfast cereal that can be incorrectly viewed as healthy). The application may be a stand-alone application or may be incorporated in whole or in part into another application.

The meal monitor application can be used by diabetic patients, including patients having Type 2 diabetes that are administering basal insulin, or Type 1 or Type 2 patients on multiple dose insulin therapy that have an underlying motivation to change their diet. It can also be used by patients with pre-diabetes or non-diabetic people who want to minimize their glucose excursions by controlling their diet. Users of the meal monitor application may have uncontrolled diabetes and a desire to bring their diabetes under control, but have found that following a prescriptive "diabetes diet" for an extended period of time is not sustainable because they do not want to give up the foods that they enjoy. Users of the meal monitor application may also have their diabetes under control, but their usual diet is no longer working because they are, e.g., on a new medication, on a new exercise plan, pregnant, or experiencing other life changes.

The meal monitor application may enable the user to see the good and bad foods (or good and bad eating behavior) that exists within their current diet in order to assist the user in determining which modifications they can make to achieve glucose control and improve the time that their glucose levels remain in a goal range. The meal monitor application may assist the user by providing data visualization of glucose spike differences and time in range (TIR) impact of different food choices. The meal monitor application may also prompt the user to log meals when a "not so healthy" (e.g., a meal that has resulted in the user's blood glucose level going outside of the goal or target range) meal has been detected. The meal monitor application may gamify TIR in order to motivate users to make beneficial food choices and increase their TIR metric. The meal monitor application may also include encouraging or congratulatory messages to motivate the user to continue good eating behavior.

The meal monitor application may present the user with an onboarding sequence to assist in customizing the application based on the indicated needs and goals of the user so that the user may have a targeted experience. The application may prompt the user to indicate the user's type of diabetes. A list of options may include Type 1, Type 2, prediabetes, gestational, other, and not sure. After the user selects the appropriate answer to the prompt, the application may prompt the user to specify a level of their diabetes education. A list of possible answers may include beginner, intermediate, and experienced but still learning. The application may prompt the user to specify their goals in using the application. A list of possible answers may include eating for glucose control, keeping glucose in range, and both (complete guidance). A user who selects eating for glucose control may want to learn what to eat and how much based on meals that the user logs and the impact that the meals have on their glucose. A user who selected keeping glucose in range may want to understand how the food they eat impacts their glucose and may only want to be notified when their glucose spikes and may want the application to help get the user's glucose levels back in their goal range. A user who selects both 1130 may want to learn what to eat and what to do to achieve their target glucose range.

During the onboarding process, the application may also introduce various milestones for the user to meet to encourage the user to log more meals. The application may set milestones for the user to meet, which may include logging their first meal, staying in target range after eating a meal, and logging a certain number of meals (e.g., 5, 10, 15, 20, 25, 50 meals). Moreover, the application may display a counter to keep track of the users progress on various milestones. For example, a counter noting the number of logged meals, along with a graphical progress indicator, may be displayed to show a user's progress toward logging a goal of 10 meals. The application may set the milestones by default. Alternatively, the user may set or modify the milestones.

There are many metrics that may be used to assess glucose impact of meals (and other events). The meal monitor application may utilize and evaluate any desired metric, and in some embodiments may utilize and evaluate the amount of time the user exceeds an upper threshold, the amount of time the user is within a range of values, or the amount of time that a user drops below a minimum threshold. For example, the meal monitor application may evaluate the amount of time the user's glucose levels exceed a threshold value (e.g., a value of about 180 mg/dL, alternatively about 250 mg/dL, alternatively about 120 mg/dL, or another value). Such a metric may be referred to as a time-above-threshold. A time-above-threshold episode may be triggered if the glucose level exceeds a threshold value for a present duration of time. Although not limited to such, the embodiments will be described in the context of using the time the user's glucose levels exceed a threshold of about 180 mg/dl for at least a preset period of time, which can be referred to as time-above-180 or TA180. The meal monitor application may also evaluate the amount of time a user is within a range of values, or time-in-range, or "TIR" (e.g., in the range of about 70 mg/dL to about 180 mg/dL, about 70 mg/dL to about 120 mg/dL, or about 140 mg/dl to about 250 mg/dl, or other values). Yet another is to evaluate the amount of time below a value, such as about 180 mg/dL. Such a metric may be referred to as a time-below threshold.

These metrics may be determined in percentage form by dividing time an analyte level has exceeded a threshold (or the time the analyte level has been within a range), over a total period of time. For example, if the glucose is within the TIR thresholds for 6 hours, over a total period of 24 hours, then the TIR metric is 25%. Or if the user's glucose levels are above a threshold for 3 hours, over a total period of 24 hours, then the time-above-threshold metric is 12.5%. Alternatively, the metrics may be displayed in terms of time increments instead of percentile; using the example above, the TIR would be 6 hours (in a total period of 24 hours). The total period may be a predetermined fixed amount, or an amount that changes as time elapses; for example, TIR for the week thus far may be the aggregated time that the glucose is in range since Sunday at 12 am up to the current time in the week, divided by the total elapsed time since Sunday at 12 am. The metric may also be calculated according to the amount of readings in range in a certain elapsed time period divided by the total number of readings in the elapsed time period. For example, as a 24-hour period progresses, a glucose reading may be collected every 15 minutes. When the application is accessed through, e.g., the home page, a TIR calculation can be performed according to the following equation:

$$TIR = \frac{\text{\# of readings in range}}{\text{\# of readings since start of time period}}$$

In this example, if the start of the time period is 12 am, at 12 pm (12 hours have elapsed since 12 am), the total number of readings taken at 15-minute intervals is 48. But at 11:45 pm, (23.75 hours elapsed since 12 am), the total number of readings taken at 15-minute intervals is 95. Thus, the denominator changes as the day progresses and resets when it reaches the end of the set time period, e.g., when it reaches 96 readings at 12 am each night if the time period is 1 day. Similar calculations can be made for time-above-threshold metrics by substituting the amount of time the readings are above a threshold or the number of readings above a threshold for the amount of time or number of readings in range.

Figures 1, 8A:
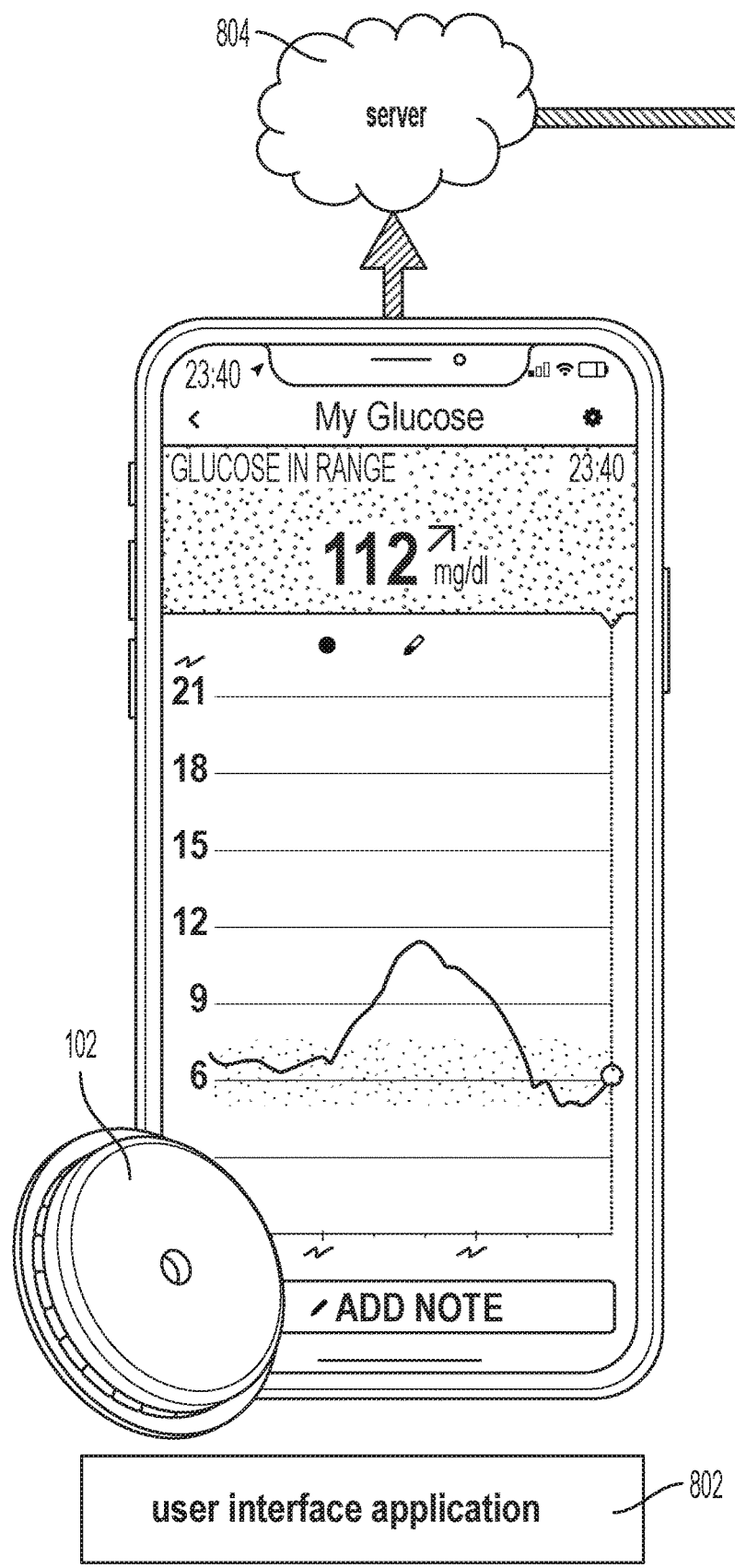
Figures 1, 8A:
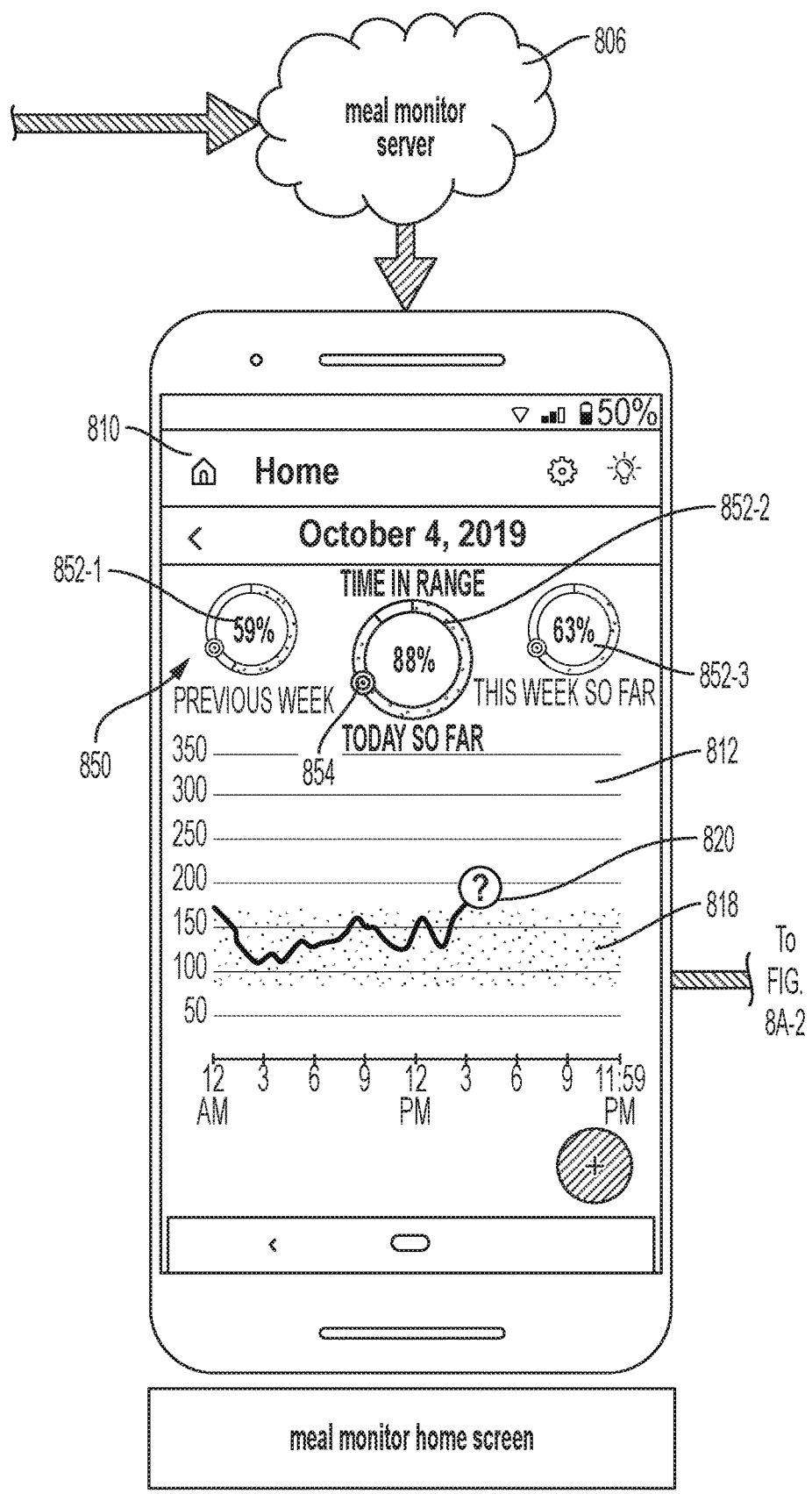
Figures 2, 8A:
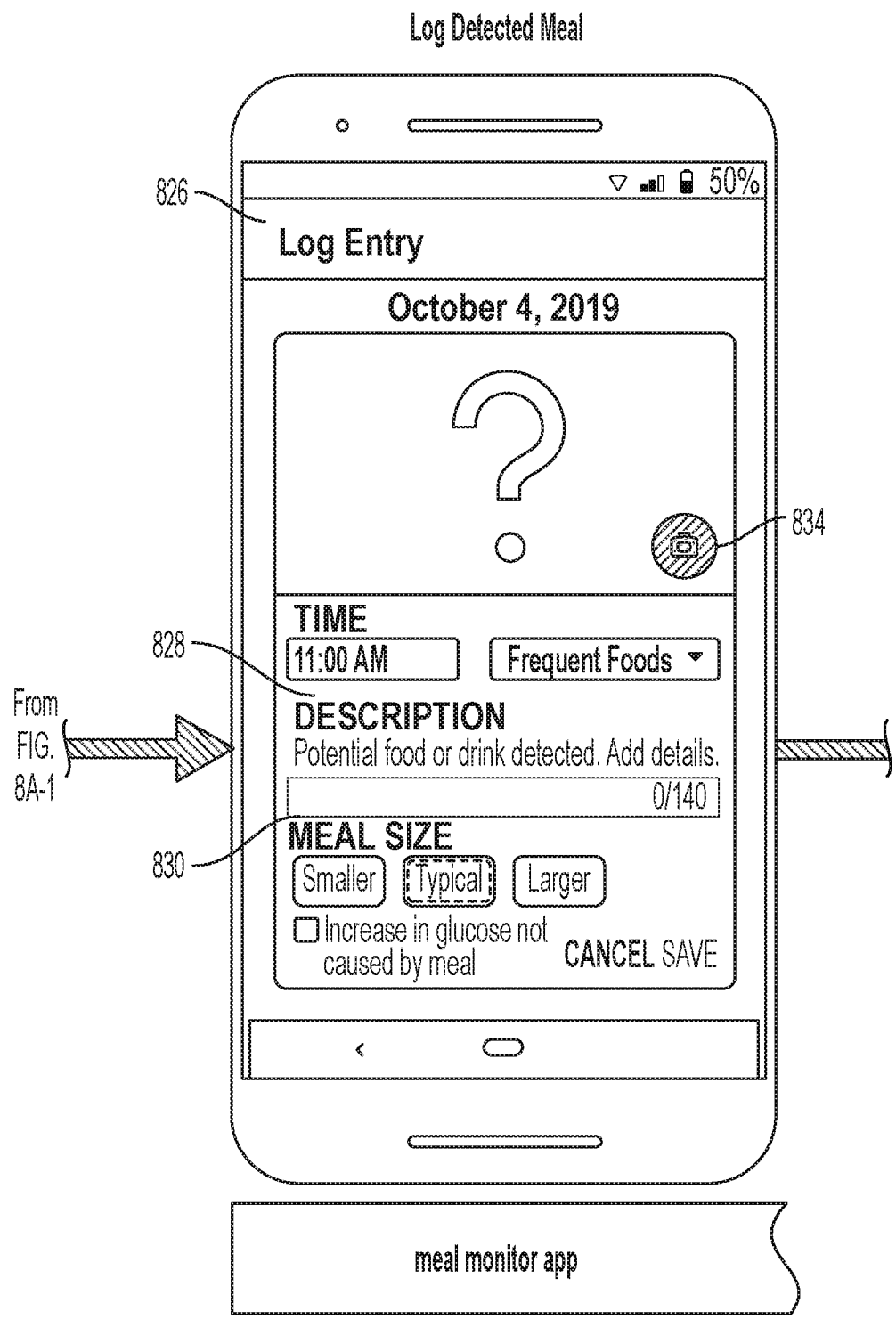
Figures 2, 8A:
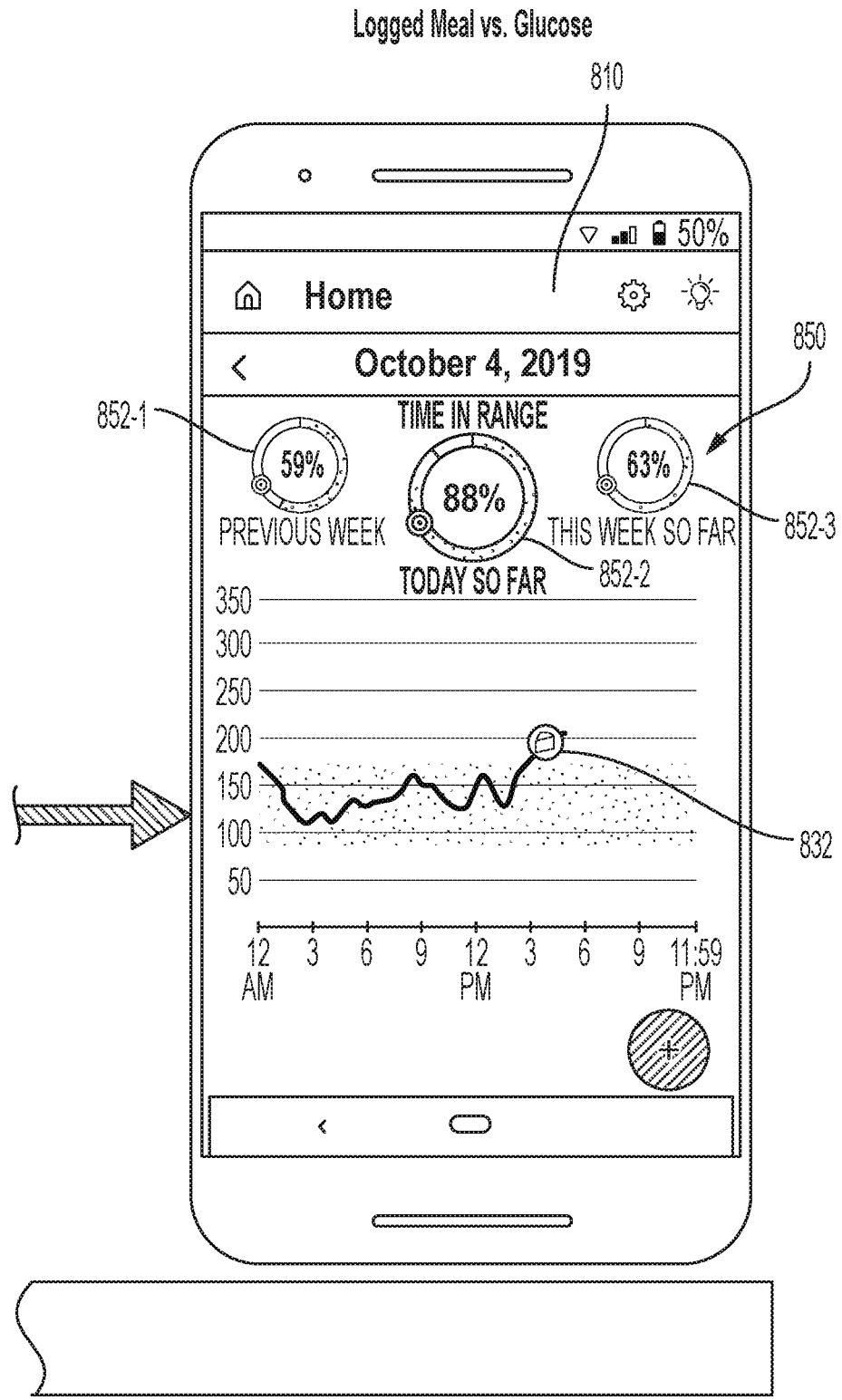
Figure 8B:
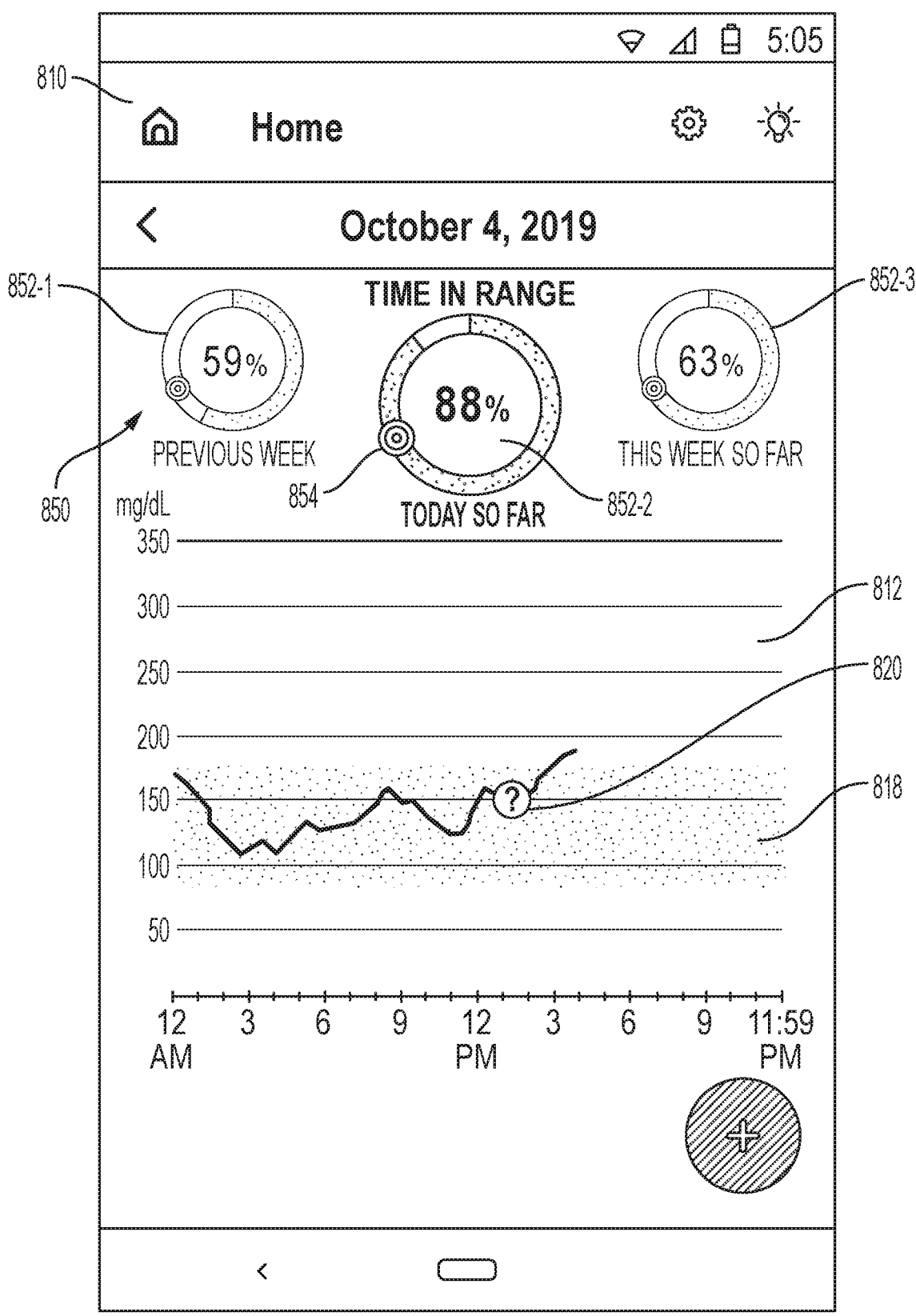

In many embodiments, the user of the application is having their glucose monitored, such as with sensor control device 102 of system 100. As seen in FIGS. 8A-1-8A-2, the analyte levels can be transferred (i) from the sensor to the user interface application 802; then (ii) from the user interface application 802 to a cloud comprising to server 804; then (iii) transferred from server 804 to the meal monitor server 806, which can then return results, if any, back to the meal monitoring application. Cloud can include one or more servers 804, 806 having the same or different functions. For example, analyte data can be uploaded to a first server or group of servers responsible for collecting analyte data, and then downloaded to the meal monitor application by a second server or group of servers responsible for downloading the data for use by the meal monitor application. As seen in a first screen, the meal monitor home screen 810, a graph 812 of glucose concentration (in mg/dl or mmol/L) is displayed for a certain time period, e.g., one day, or part of a day. The time displayed in the graph 812 may show the glucose concentrations measured starting from 12 am of the current day. A goal range 818 is highlighted in the graph, e.g., by shading it a different color than the background color of the graph, e.g., shading it green. As seen in FIG. 8B, when a meal event is detected, the meal monitor application can mark the event with an indicator 820 at the time determined by the episode detector to be the start of the event. A notification of the detected event to the user may come at a time after the time determined by the episode detector to be the start of the event. The indicator may be a circle with a "?" to indicate that meal info (or other info that can be logged, like exercise, stress, etc.) is missing regarding this event, and prompt the user to log the meal (see Log Entry screen 826) that was ingested that caused the glucose levels to rise. The meal monitor application may then return to the home screen 810, which may then display an indication 832 of the meal consumed (e.g., a picture of the food eaten).

In an alternative embodiment, a home screen may include a graph of glucose concentration (in mg/dl or mmol/L) displayed for a certain time period, e.g., one day, or part of a day. The time displayed in the graph may show the glucose concentrations measured starting from 12 am of the current day. A goal range may be highlighted in the graph, e.g., by shading it a different color than the background color of the graph, e.g., shading it green. An upper glucose threshold level (e.g., about 250 mg/dL) and lower glucose threshold level (e.g., about 75 mg/dL) may also be shown on the graph with different colored lines to clearly show the user if they are above or below these thresholds. Moreover, detected events may be color coded to denote when the event is above range (e.g., orange or red) or in range (green). TIR displays for the day so far and the week so far may also be displayed so that the user can easily discern how well they are managing their glucose. A graphic depicting the current sensor life may also be displayed on the home screen 811.

The goal range 818 (as well as the episode detector thresholds) may be set by the user and/or the HCP. For example, the goal range could be set from about 80 mg/dl to about 170 mg/dl, alternatively from about 70 mg/dl to about 180 mg/dl, or from about 65 mg/dL to about 120 mg/dL.

According to another aspect of the embodiment, a configurable goal may be used. The goal 854 itself may be set or configured by default by the patient or HCP. The goal is a threshold to be compared to the total aggregated amount of the glycemic response metric (such as TA180 not-to-exceed 30%, or TIR of at least 70%) over a period of time (such as one week, or week-so-far, or day-so-far). The goal 854 may also be incrementally adjusted by the meal monitor application if the user is meeting the currently assigned target or goal after some predetermined period of time. For example, if the user has consistently reached a target of 30% of their glucose measurements in the goal range, e.g., for the past week, the meal monitor application may set a new target of maintaining 35% of measured analyte levels in the goal range for the user. Similarly, if the user has consistently failed to reach a target of 30% of their glucose measurements in the goal range, the meal monitor application may set a new target of maintaining 25% of measured analyte levels in the goal range for the user.

The home screen 810 may also include a display of the amount of time that the user was in the goal range ("time in range" or "TIR") for different time periods, e.g., two or more time periods, alternatively three or more time periods. The home screen 810 may display a percentage value of TIR 850 of the current day (e.g., as measured from 12 am to the current time of the day), a TIR for the previous week, and a TIR for the current week so far (e.g., measured for a fixed period of time, e.g., from Sunday at 12 am to the current day and time, alternatively from 12 am Monday to the current day and time, alternatively from seven days prior to the current day and time). The value of these three ways of showing TIR is that it provides the user with a sense of how they are currently doing compared to the previous week, in terms of the current week so far and the current day so far. Using this information, the user may make choices in their eating habits, such as refraining from certain foods when they are not currently doing as well as last week, or splurging on a food that could cause high glucose when they have been doing well compared to the previous week. The TIR displays 850 may visually indicate the amount of time the user has spent in goal range 818 in addition to reporting a numerical value of the percentage of time spent in goal range 818. For example, for each time period in the TIR display 850, a circle 852-1, -2, -3 may be depicted with the numerical percentage of the TIR in the center of the circle. The circle 852-1, -2, -3 may include a graphical indication of the amount of TIR (a progress indicator) and the goal/target percentage for TIR. For example, with respect to an imaginary clock face on the circle, an indication of the percentage of TIR can be displayed in the form of a colored line that begins at 12 o'clock and extends around the perimeter of the circle to X % of the total perimeter of the circle, to indicate that the user has spent X % TIR so far for that time period. Moreover, an indication of the target percentage 854 (e.g., a bullseye, circle, "x," or other demarcation) may be included on the perimeter of the circle so that it is easily apparent to the user if their TIR is above or below the goal percentage. Each of the circles 852-1, -2, -3 for the different time periods may include such a display of (1) the numerical percentage of the TIR, (2) a graphical or visual indication (progress indicator) of the amount of TIR, and (3) an indication of the goal/target percentage.

Event Detection

The meal monitor application may have three configurable settings related to episode detection: a high threshold, a low threshold, and a minimum duration. Analyte levels that are greater than the high threshold for a duration greater than the duration threshold can be designated as an "above range episode." For example, if the high threshold is about 180 mg/dL, and the duration threshold is set to 30 minutes, then when the glucose exceeds about 180 mg/dL for at least about 30 minutes, a high episode is detected, and the user is prompted to log a meal. Analyte levels such as glucose readings can be categorized in one of three possible states: (1) an in-range episode, (2) an above-range episode, or (3) a below-range episode. A more detailed explanation of example embodiments of software or software implementable processes related to meal event detection can be found in any of U.S. Patent Publication Nos. 2013/0085358, 2014/0350369, 2014/0088393, 2017/0185748, 2020/0105397, or in Int'l Publ. No. WO 2015/153482 or PCT/US20/12134, all of which were previously incorporated by reference in their entirety and for all purposes.

For any embodiment of the application, when the episode detector detects an event, as seen in FIG. 10C, the meal monitor application can increment, by one, a numeric badge 847 located on the meal monitor application icon 849. The meal monitor application can also add an icon (such as a "?") to the glucose graph at the time estimated by the episode detector to be the start of the event, and located relative to the glucose value at that time, either at the glucose value or offset by a predetermined amount. The numeric badge can be decremented by 1 either when the user provides information for an associated event and saves the information, or after a period of time has elapsed, where the elapsed period of time may be a fixed time value since the event or a quantized full day period relative to the event. In a further embodiment, the meal monitor application may additionally issue a notification upon detecting a new event. If the user selects the "?" icon, the log entry screen 826 can appear that allows the user to enter event information. When the screen 826 is opened in this way, the event time can be set by default to the time estimated by the episode detector to be the start of the event; that is, the time associated with the icon. This time, however, can still be edited by the user.

Logging a Meal

Figures 1, 9A:
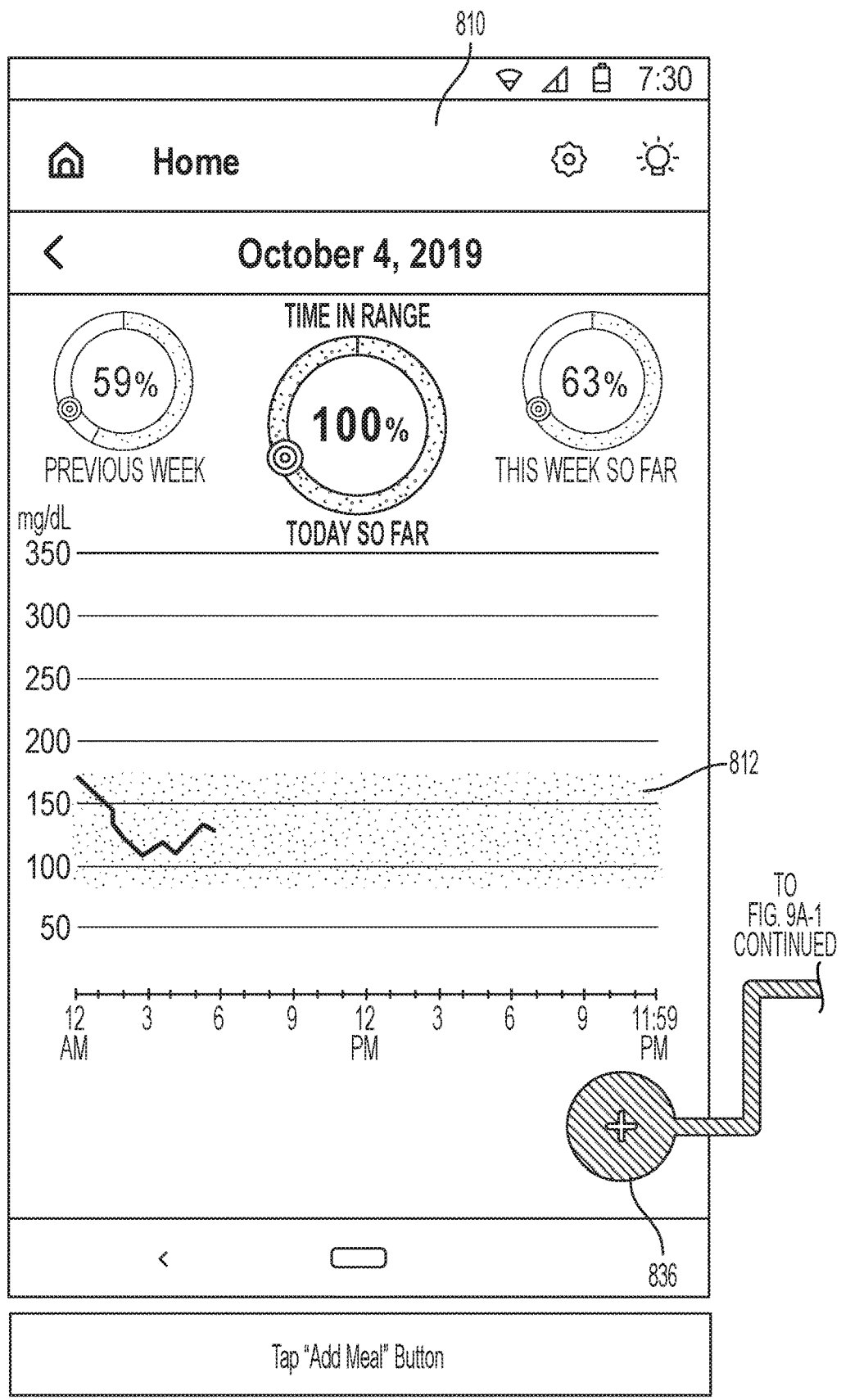
Figures 1, 9A:
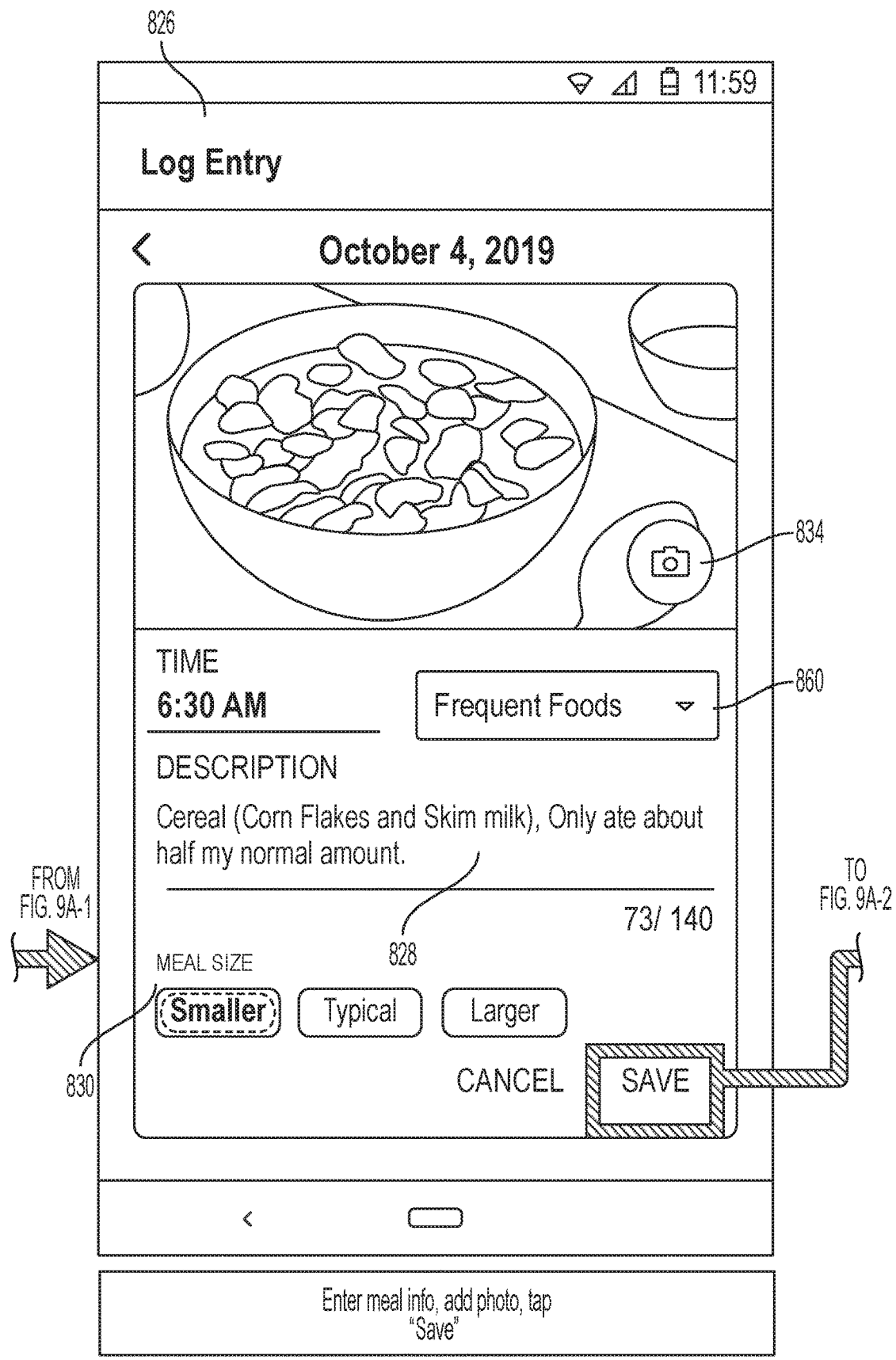
Figures 2, 9A:
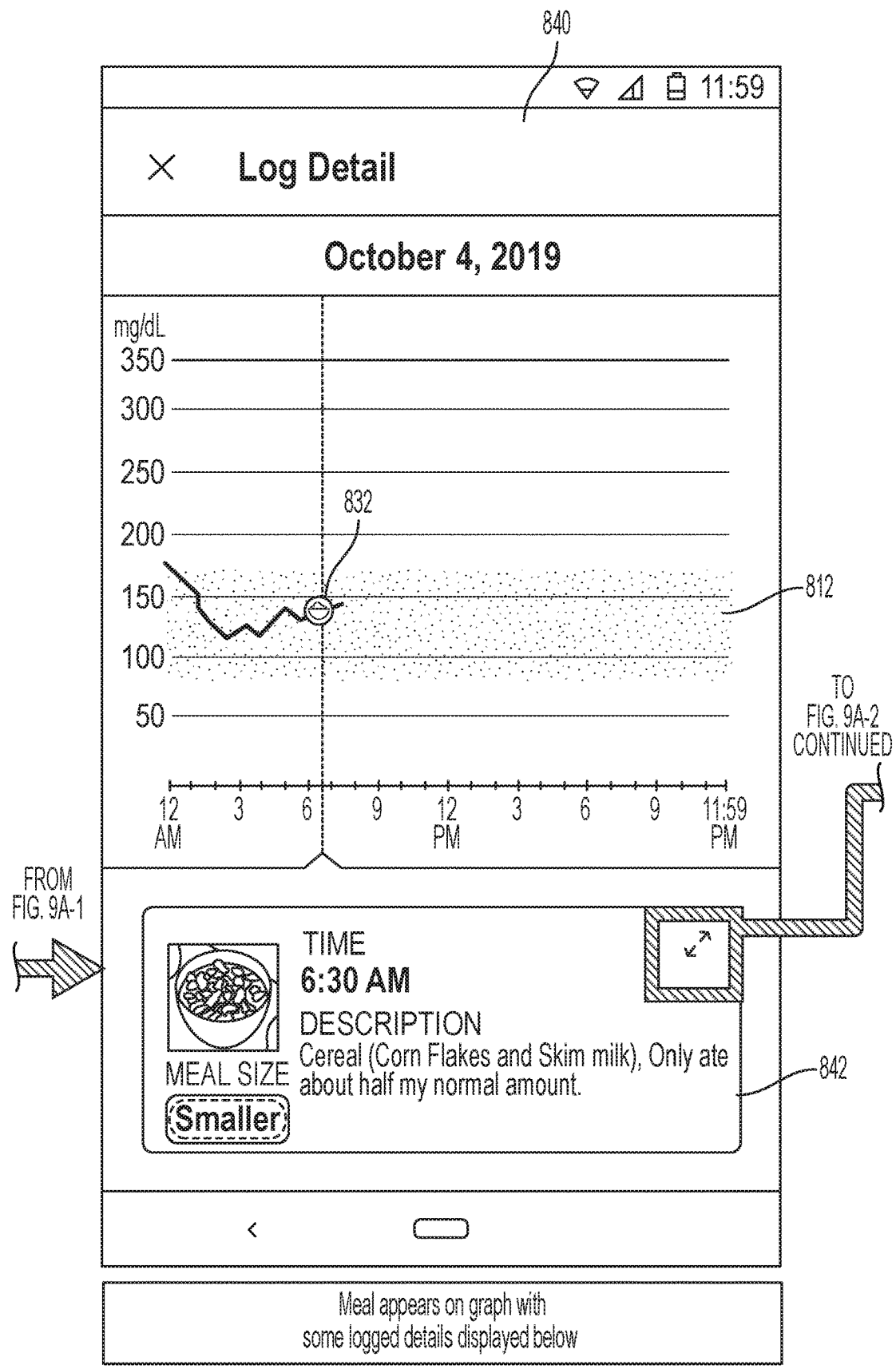
Figures 2, 9A:
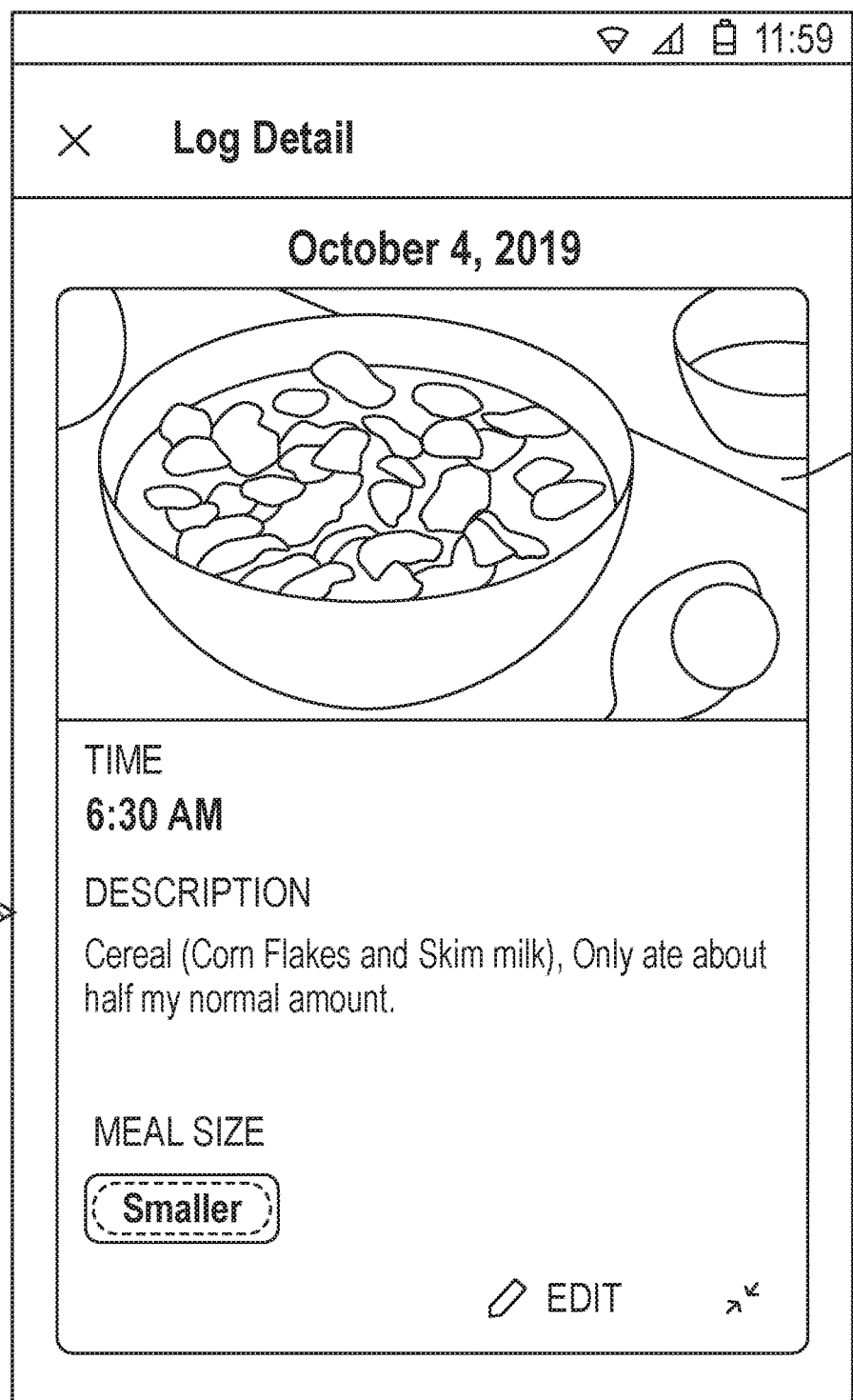

The meal monitor application can prompt users to log a meal, e.g., if an event or episode is detected and/or if an event is detected outside of the goal range. Users of the meal monitor application can also voluntarily log a meal without any prompting. As seen in FIG. 9A-1, if the user wants to voluntarily add a meal, at the home screen 810, the user can select an option to add a meal, e.g., by tapping "+" icon 836, after which a log entry screen 826 will pop up with multiple fields for the user to input meal information. Log entry screen 826 may include a "description" field 828 where the user can type in a description of the food that they consumed. Log entry screen 826 may also contain options that indicate the relative size of the meal consumed 830, e.g., selectable buttons indicating different sizes of meals such as "Smaller," "Typical," and "Larger." The user can also add a photo of the meal to be associated with the meal. For example, log entry screen 826 may include a camera icon 834 that, when tapped, opens the camera of the device on which the meal monitor application is installed, and the user can take a picture of the food or alternatively select a picture from a library of photos. The log entry screen 826 may or may not include a field to include a carbohydrate content of the meal. After the meal information is entered, the user can click "save" to log the meal, after which the user can be directed to a log detail screen 840. As seen on the log detail screen 840, the indication of the logged meal 832 appears on the graph 812 and an abbreviated description of the logged details 842 of the meal can be displayed below the graph in an abbreviated description window 842. The user can select to expand abbreviated description window 842 to see a full view of the logged details, as seen in log detail screen 844.

Figure 9B:
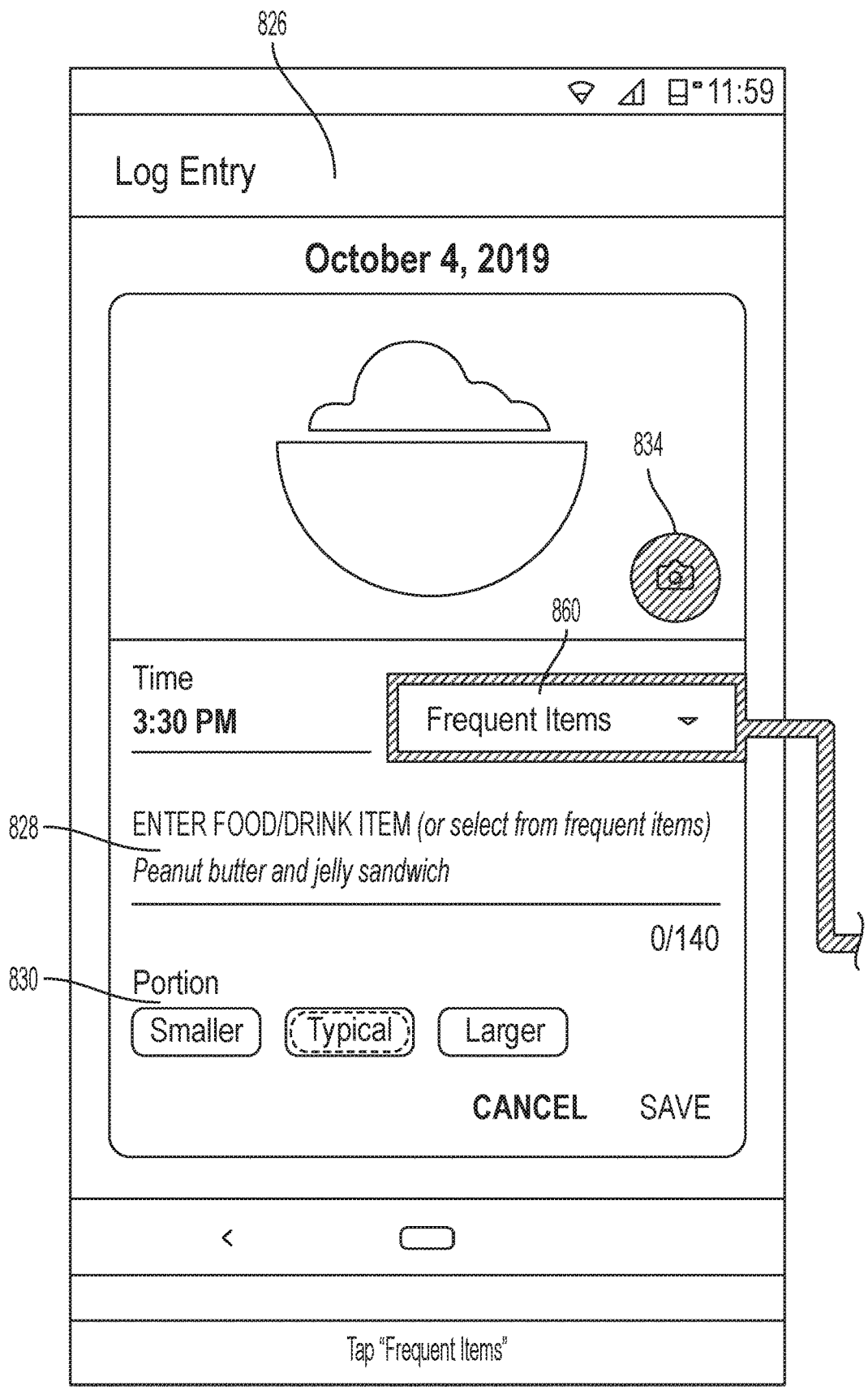
Figure 9B:
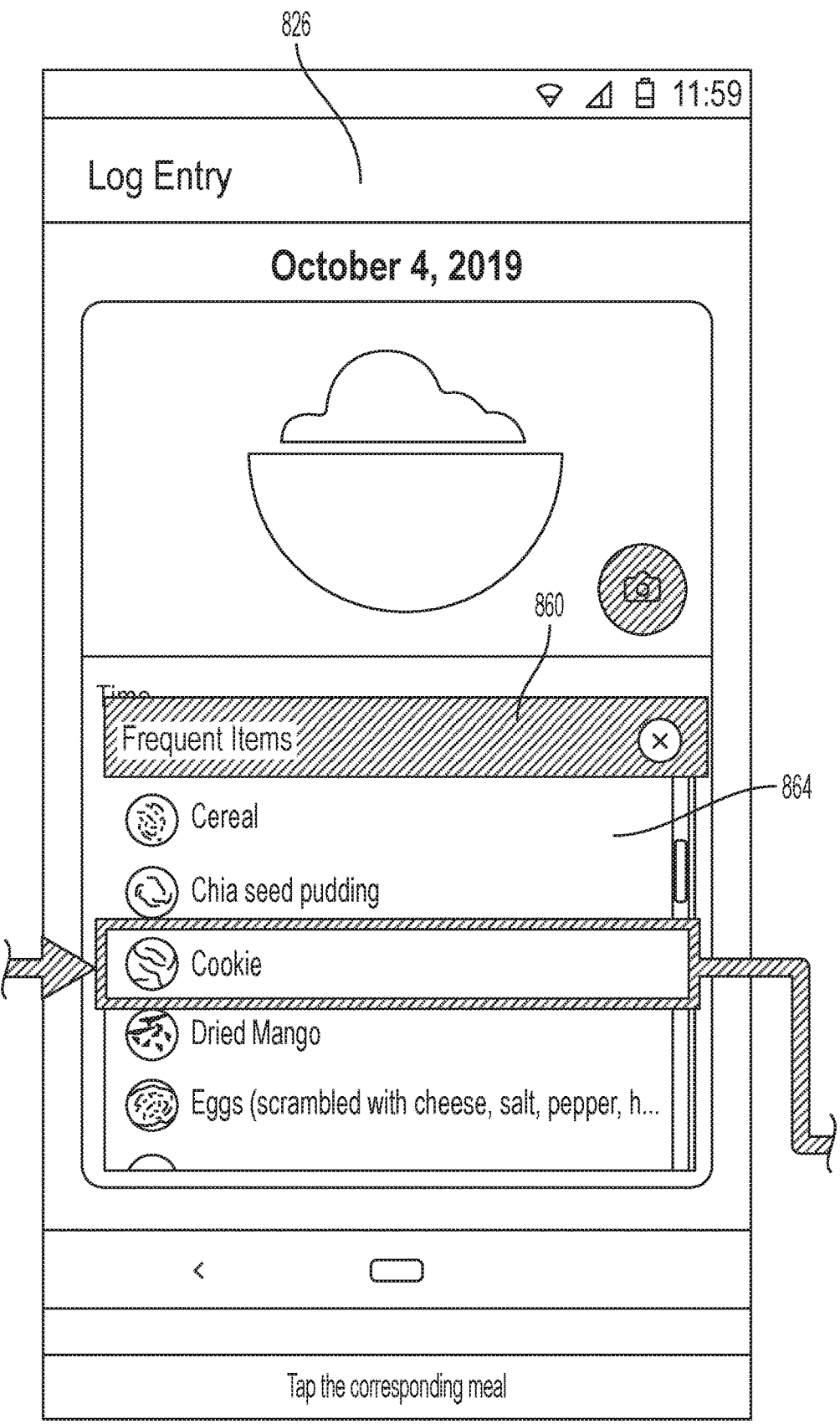
Figure 9B:
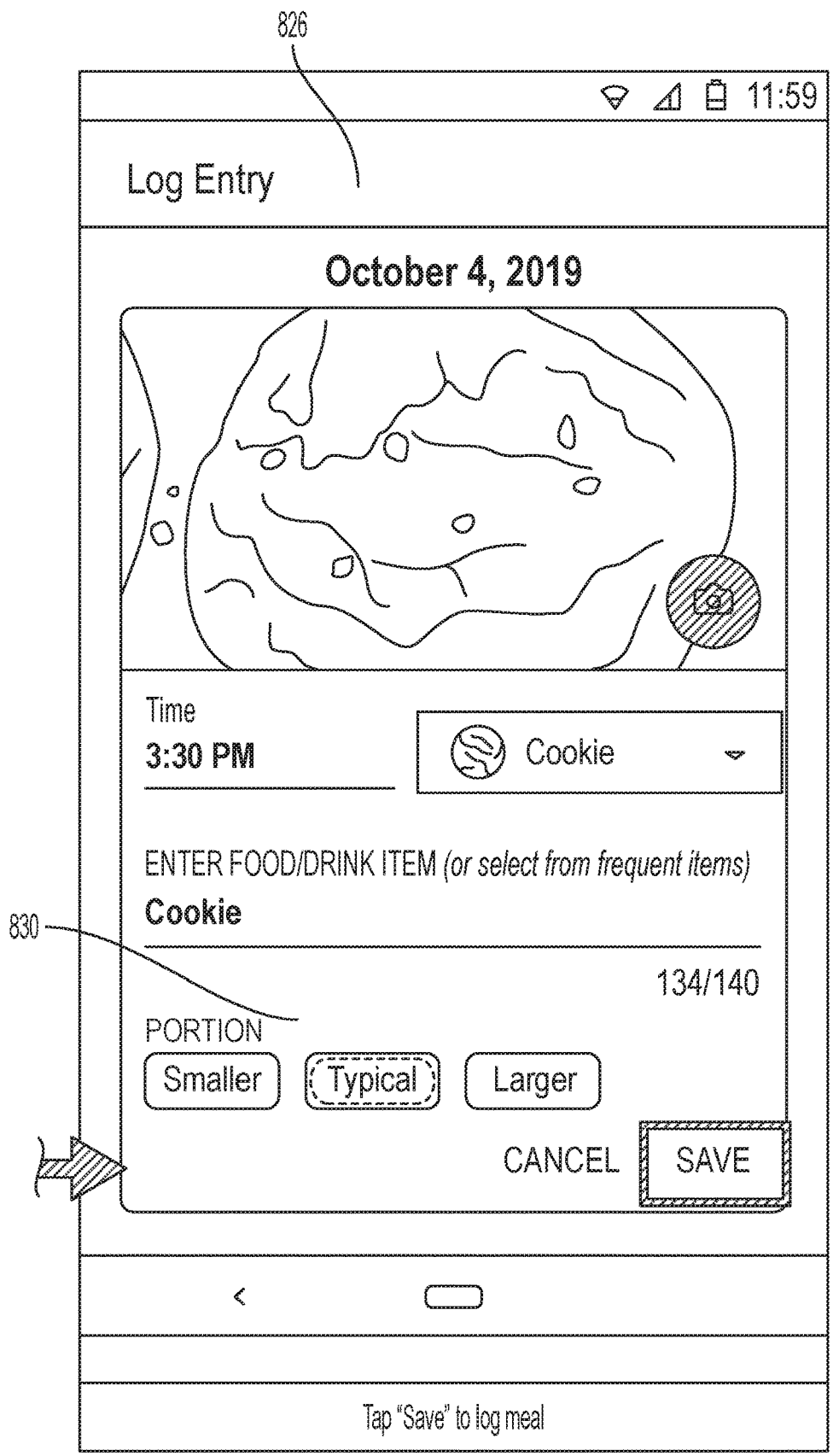

As seen in FIGS. 9A-1 and 9B, instead of entering a description of a meal, the user can also select an item included in a list of frequently consumed meals by selecting or opening the drop down menu 860 for "Frequent Items." This alternative method for logging meals allows for quick entry of meal information if a user has already logged the meal before. As seen in FIG. 9B, the user can tap or otherwise open the "Frequent Items" pull down menu 860, which opens a list 864 of items that the user has previously consumed. The user can scroll down the list 864 and select the meal that they would like to log by, e.g., tapping on or otherwise selecting the entry. Tapping on the entry will open a log entry screen 826 corresponding to the selected food item that is pre-populated with a description. The user can then select the relative portion size of the meal consumed from the portion options 830. After the meal information is entered, the user can click "save" to log the meal. After the meal is logged, the user can access the same information as described with respect to the manual entry of a new meal in FIGS. 9A-1-9A-2.

Figures 1, 9C:
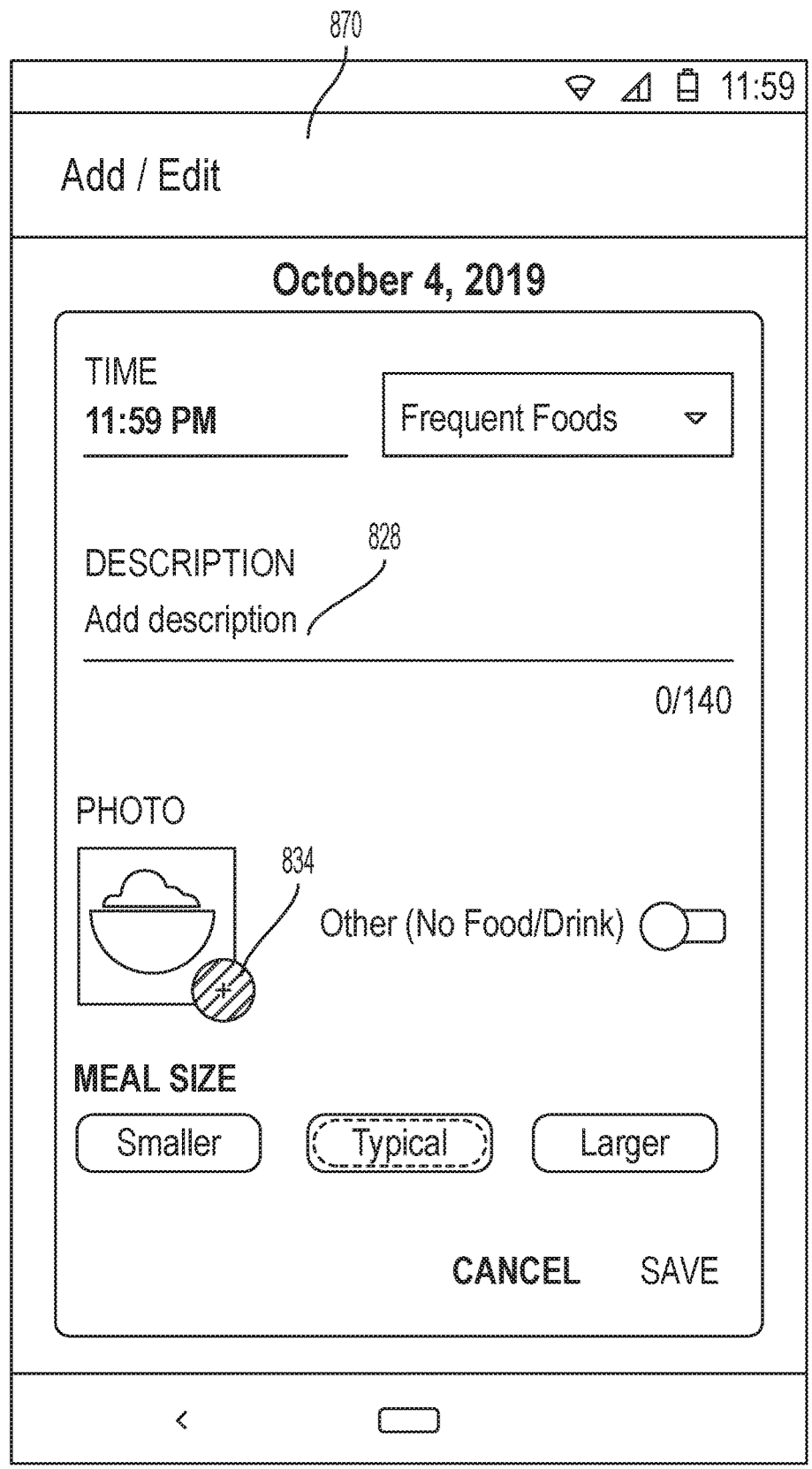
Figures 2, 9C:
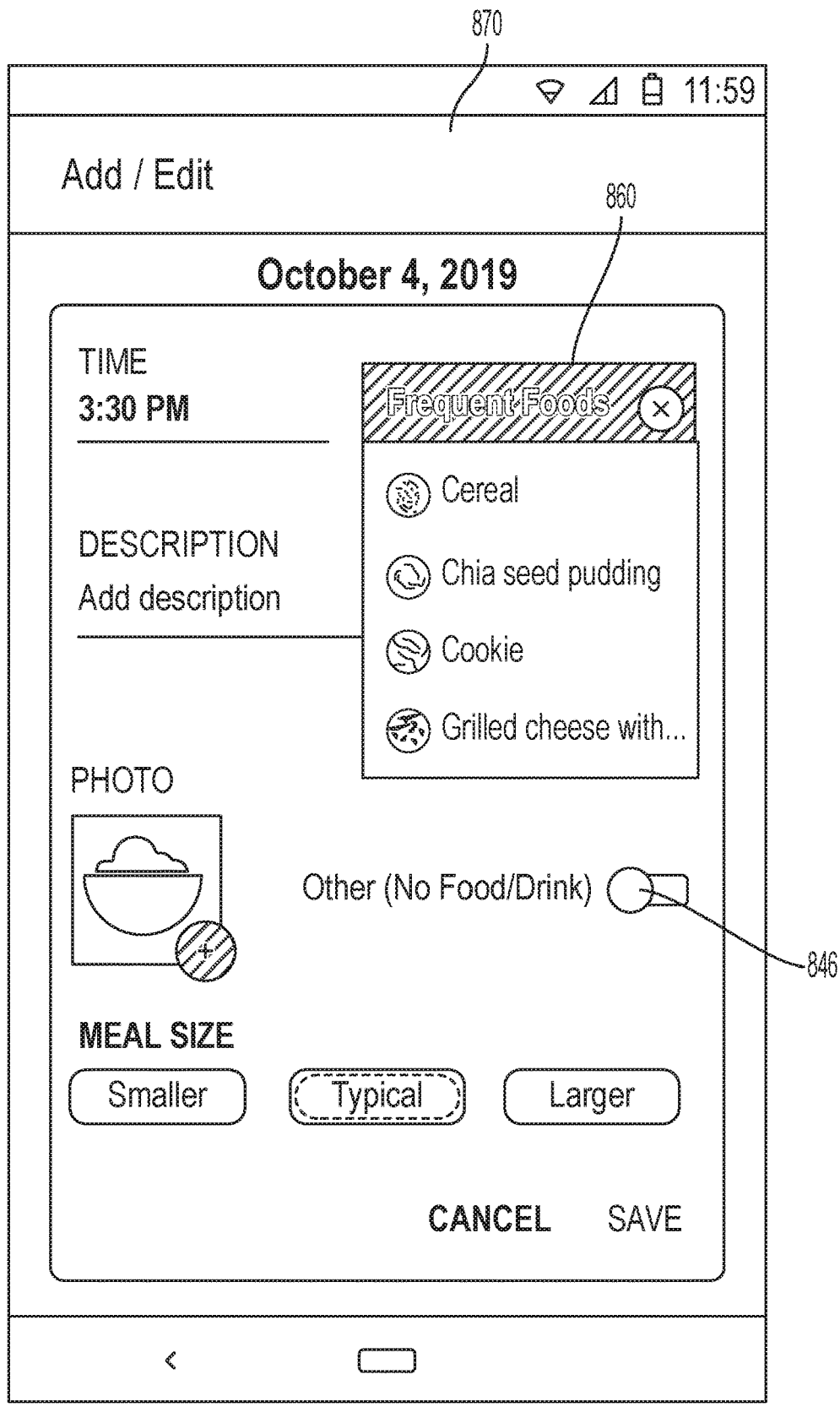
Figures 3, 9C:
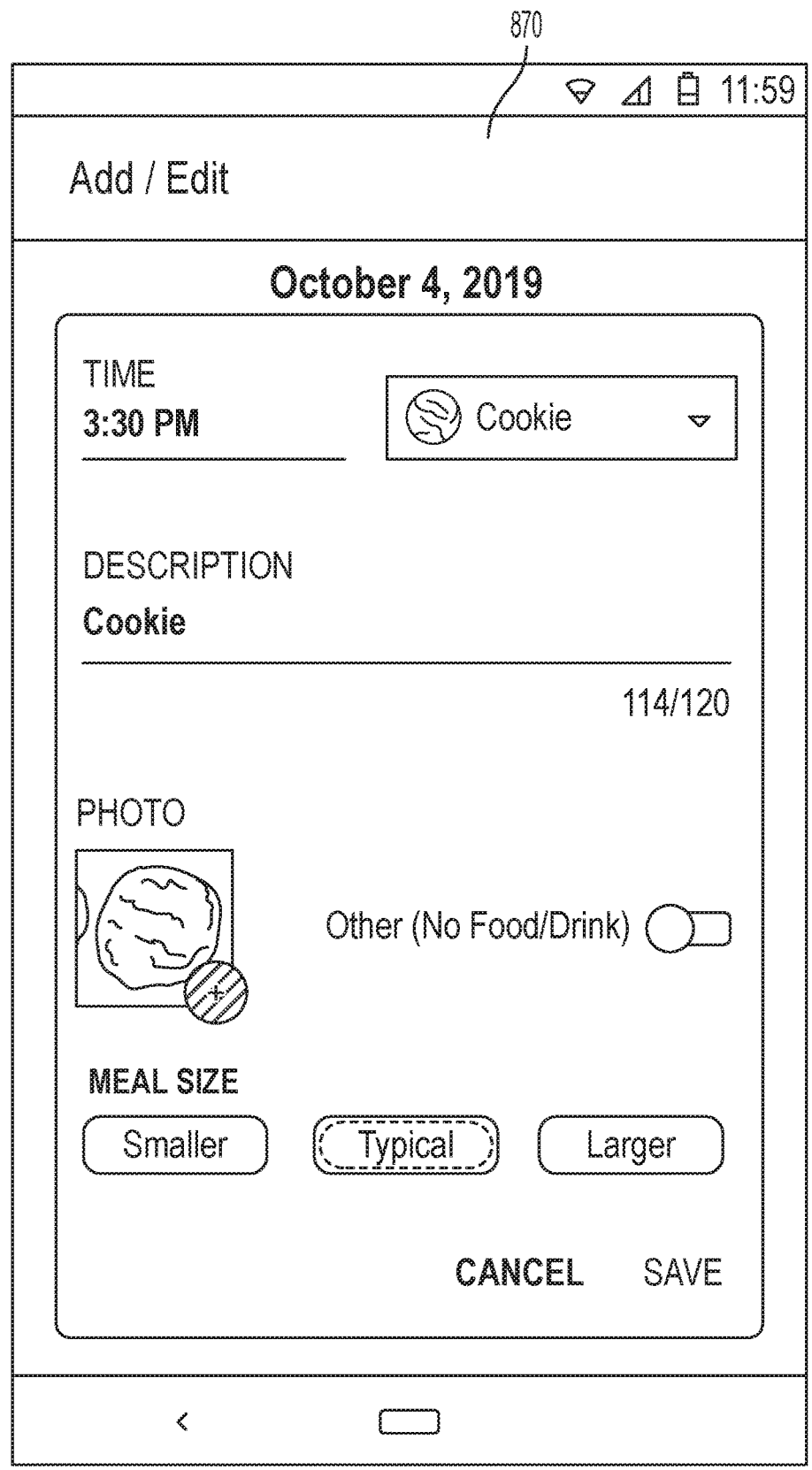
FIGS. 13A-13D-3 depict example embodiments of graphical user interfaces for insight reports.
Figures 4, 9C:
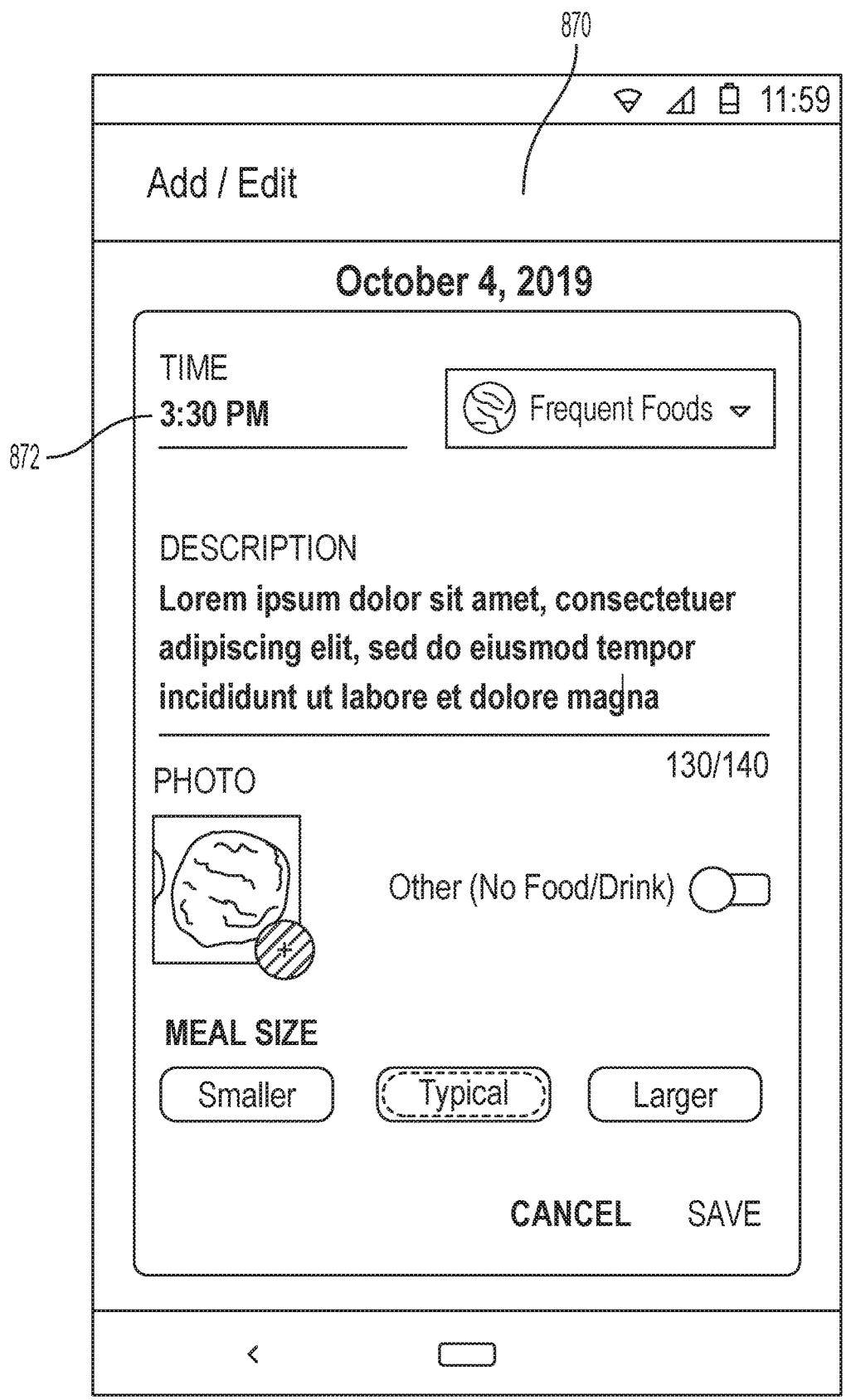
Figures 5, 9C:
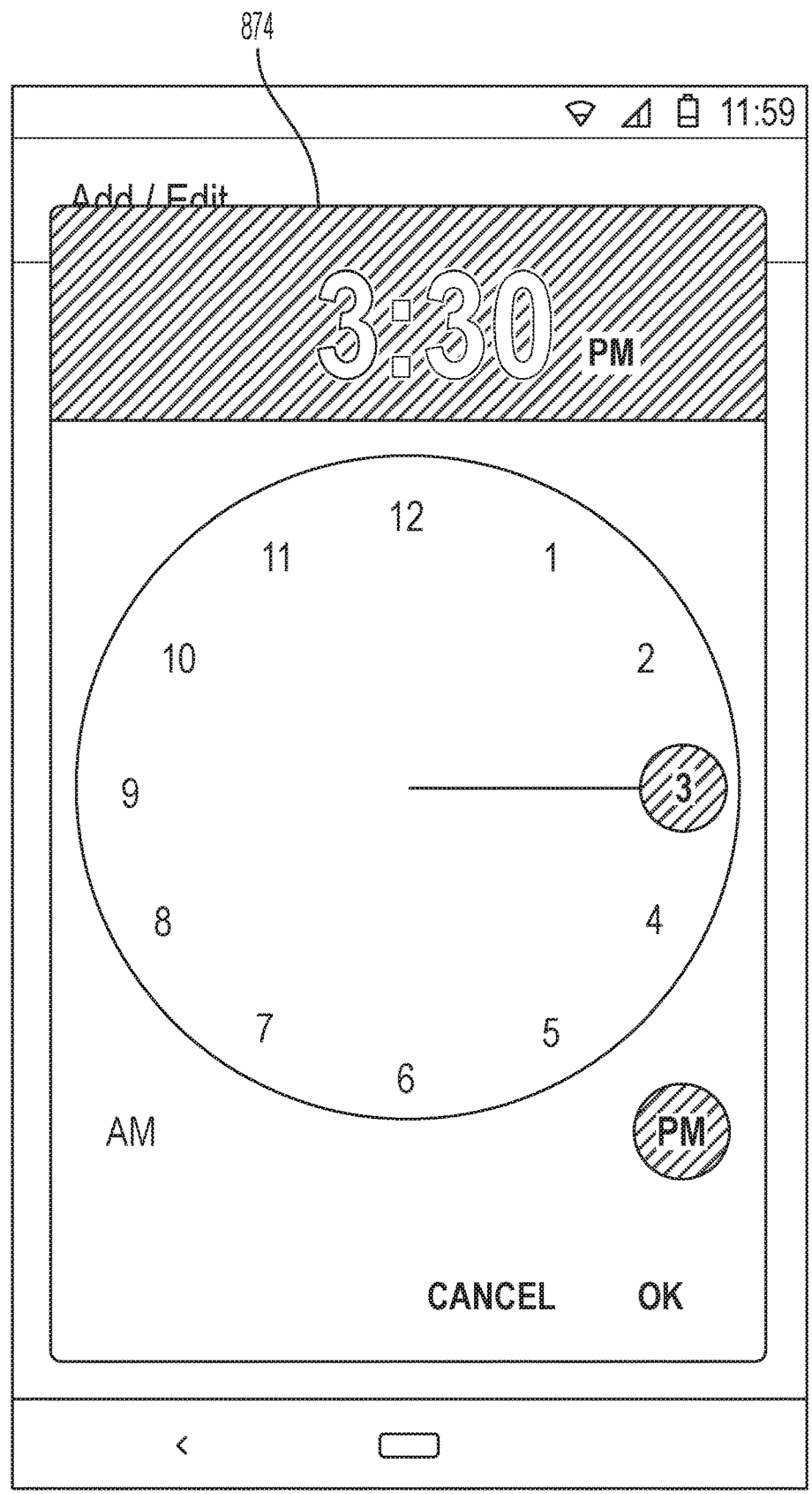

In an alternative embodiment of the application, as seen in FIGS. 9C-1-9C-5, an alternative log entry screen 870 may be used in the meal monitor application. Log entry screen 870 may include all of the options and fields as were discussed with respect to other log entry screens, including but not limited to, a field to add a description 828 of the meal, an option to select the meal size 830, an option to associated a photo 834 with the meal, a frequent foods menu 860 from which a user can select previously entered meals (see FIG. 9C-2), and an option to indicate that no food was ingested 846 (e.g., Other (No food/drinks) toggle switch). The user may also change or enter the time associated with the event by, e.g., clicking on the time 872 displayed in the log entry screen 870. As seen in FIG. 9C-5, a time screen 874 can open up in which the user can select the time that they want associated with the event, e.g., by turning the handles of a clock to a certain time or by entering a certain time in digital format.

In an alternative embodiment, a user may log a meal from a home screen by tapping on a plus sign or other link and selecting "food". A GUI may then appear, which may display a list of recent meals, frequently eaten meals, and all meals on different selectable tabs. If a user selects a meal that was already entered, the meal entry may prepopulate with the past meal's information and assign the current date and time. Moreover, the user may be able to edit the meal entry as needed. An option to add a new meal may also appear. If the user selects the option to add a new meal, a different GUI may appear, which contains a plurality of tags to associate with the meal. The user may edit the entry to add a name of the meal. The user may also select a camera icon and add a picture to associate with the meal entry. The user may also select a meal tag, to specify the types of meal consumed. The meal tags may include breakfast, lunch, dinner, dessert, snack, or other appropriate name. The user may also select one or more description tags that describe the contents or a characteristic of the meal. For instance, the description tags may relate to the carbohydrate content of the meal, e.g., low-carb or high-carb. The description tags may also relate to the specific content of the meal, and list types of food, e.g., vegetables, chicken, beef, pork, fish, salad, pasta, vegetarian. The user may also select a portion size tag, which may list relative portion sizes. These may include typical, larger, and smaller, compared to the user's usual serving. The user may also enter an amount of carbohydrates associated with the meal. A meal time and date may be automatically associated with the meal entry. The time and date may be edited as necessary by the user. The user may also enter any relevant notes with the meal entry. The notes may include a more detailed description of the meal that may be used in a natural language search to analyze individual foods included in the meal.

After several meals have been logged, a GUI for a food note may display a list of recent meals, frequently eaten meals, and all meals on different selectable tabs. If a user selects a meal that was already entered, the meal entry may prepopulate with the past meal's information and assign the current date and time. Moreover, the user may be able to edit the meal entry as needed. Risk tags, which may indicate that the meal is low, risky, or high, or alternatively low, medium (or moderate), or high risk, may also be associated with each meal or food. These risk tags may be determined in a manner similar to the determination of "good" and "bad" meals described elsewhere in the application. For example, meals that resulted in the user staying above a goal/target range or about 180 mg/dl for a period of time, e.g., at least about 1 hour, may be classified as "bad" or "high risk", while meals that resulted in the user staying within the target range of about 70 mg/dL to about 180 mg/dL for a period of time may be classified as "good" or "low risk". Meals that resulted in the user staying above a goal/target range or about 180 mg/dl for a period of time that is less than the period of time for bad or high risk meals, e.g., between about 15 minutes and about 60 minutes, alternatively between about 30 minutes and about 60 minutes, may be classified as "risky" or "moderate risk".

The user may also tap a link to recommendations, which may result in the display of in-app modal GUI. The in-app modal GUI may include details of a suggested meal plan from the ADA or other organization.

Figures 1, 10A:
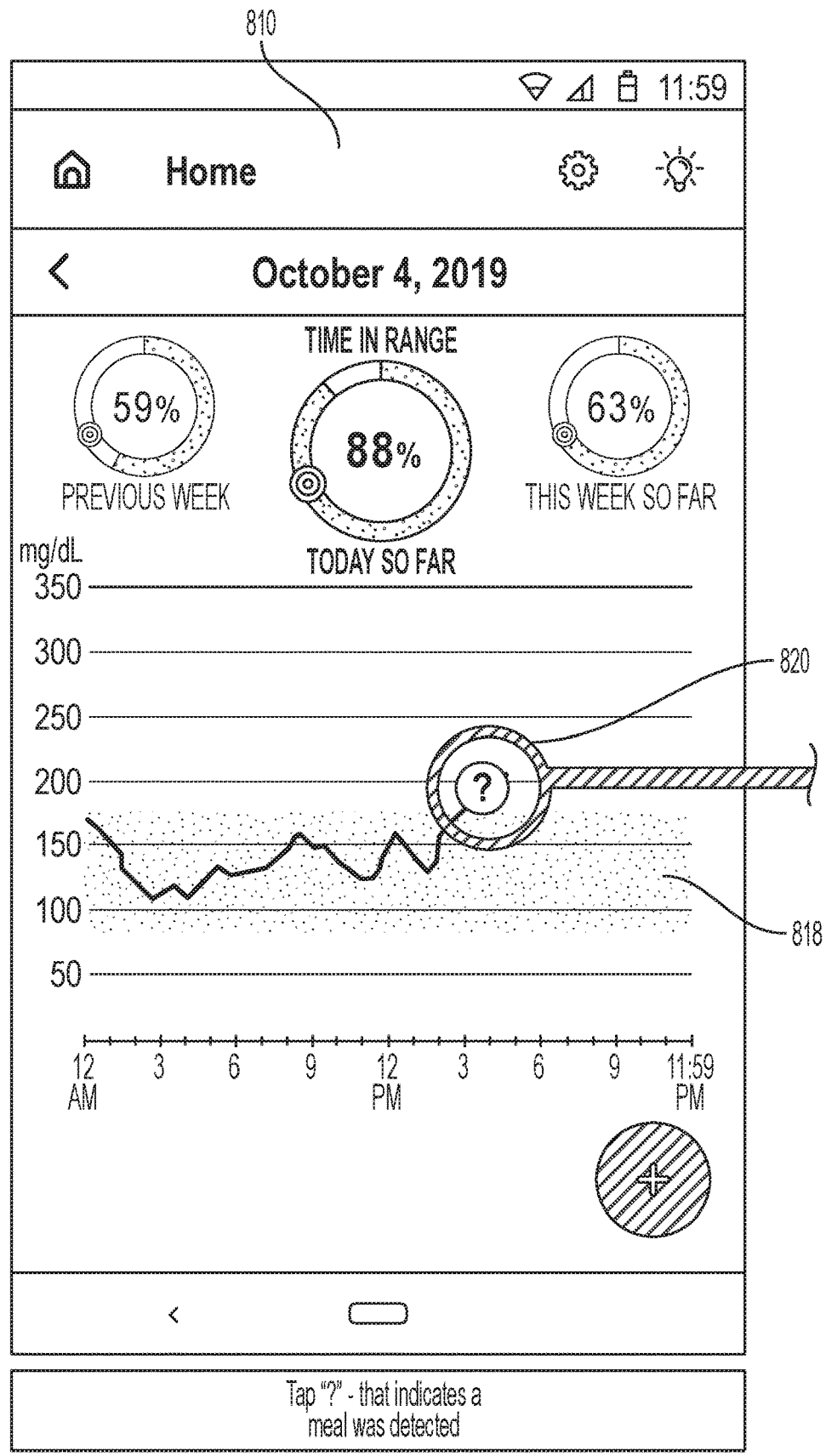
Figures 1, 10A:
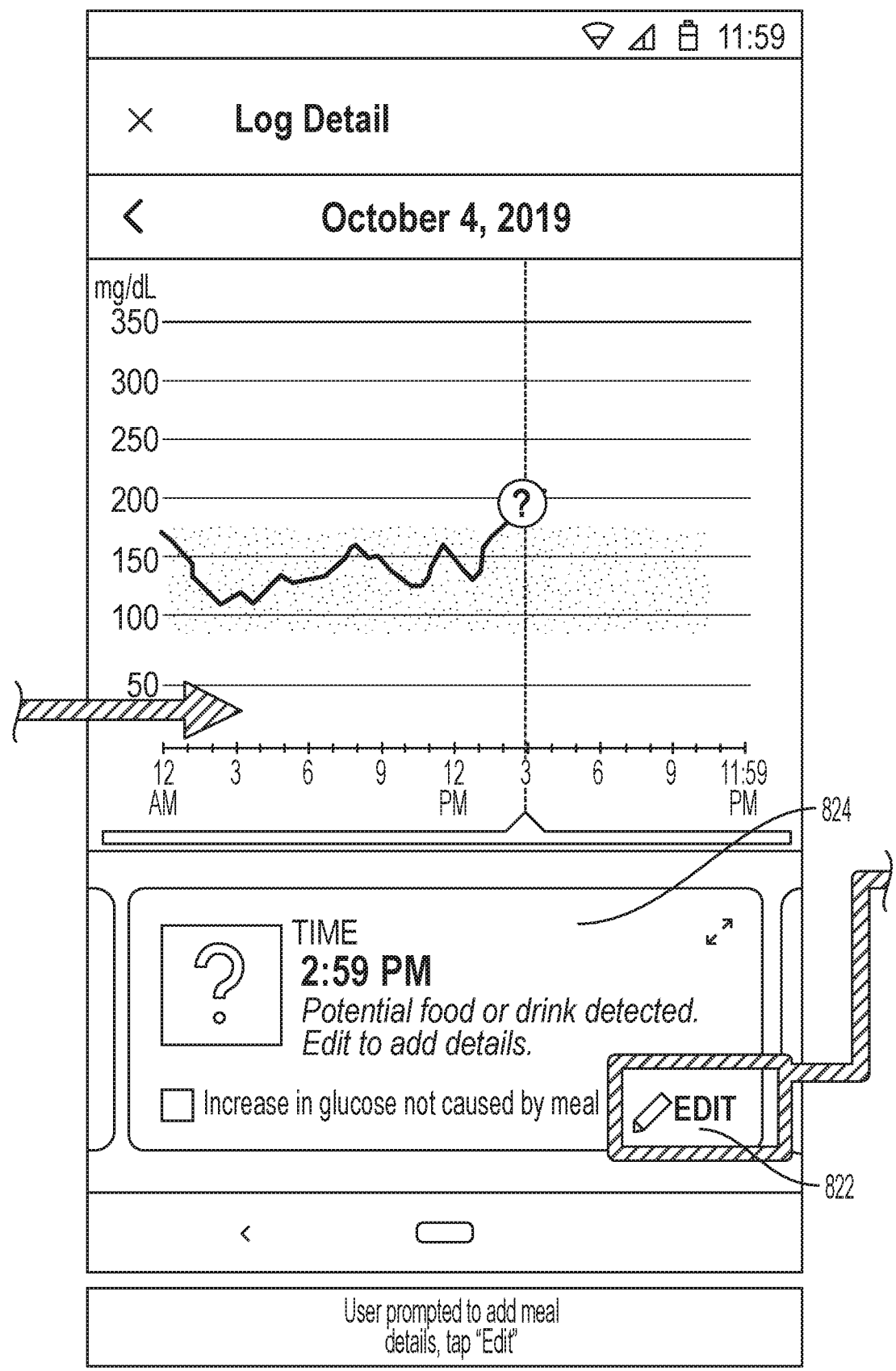
Figures 1, 10A:
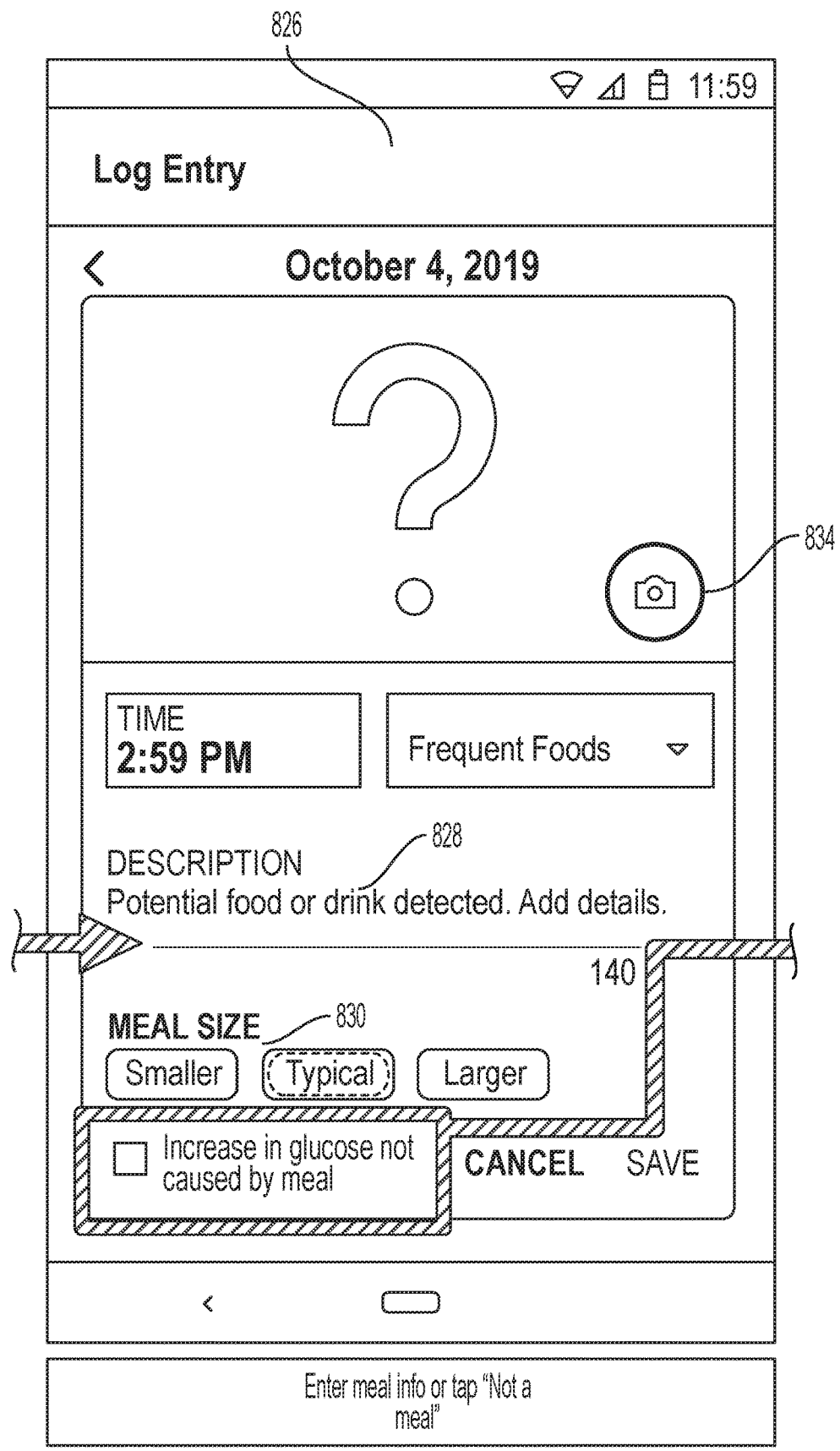
Figures 2, 10A:
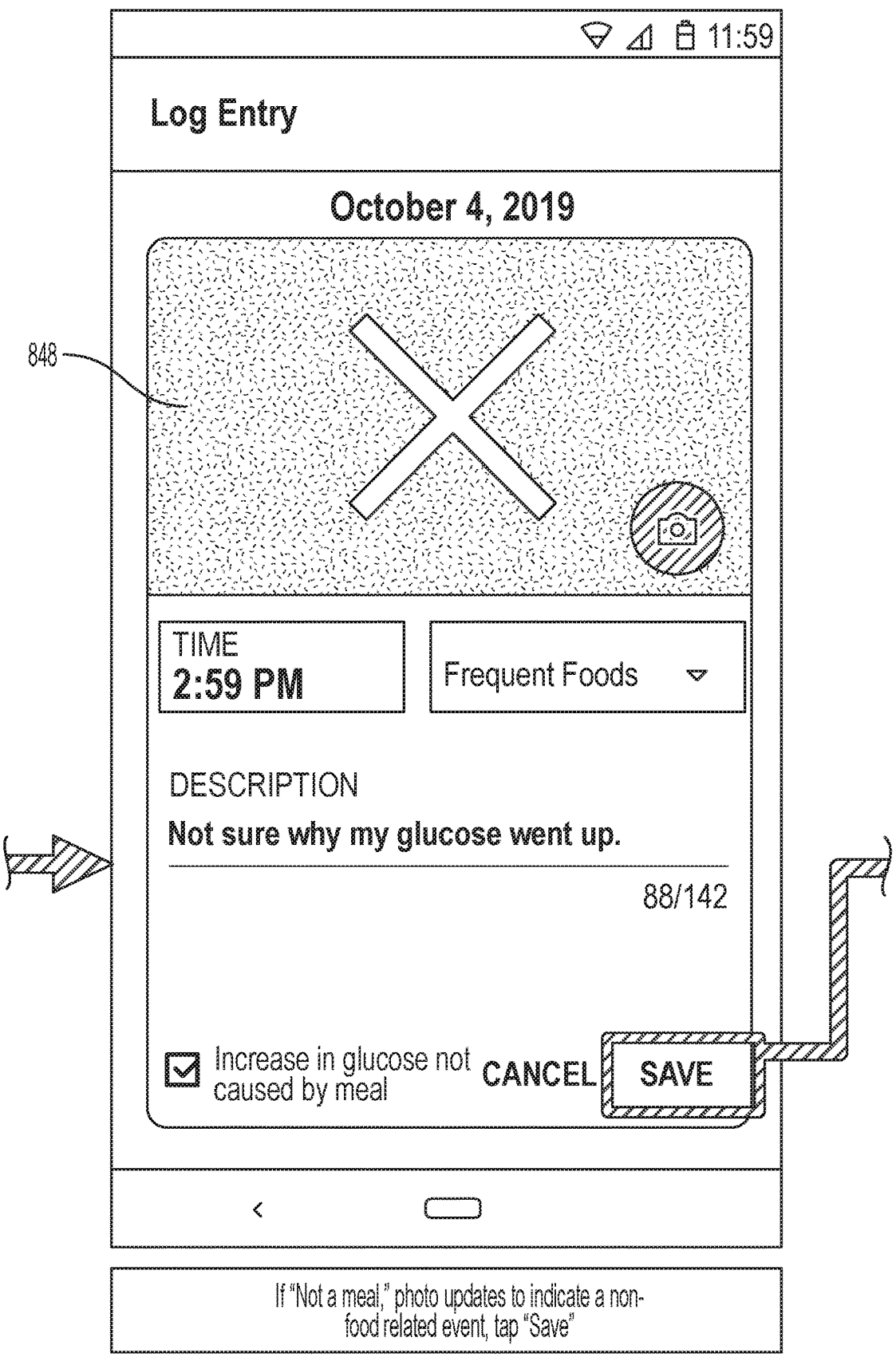
Figures 2, 10A:
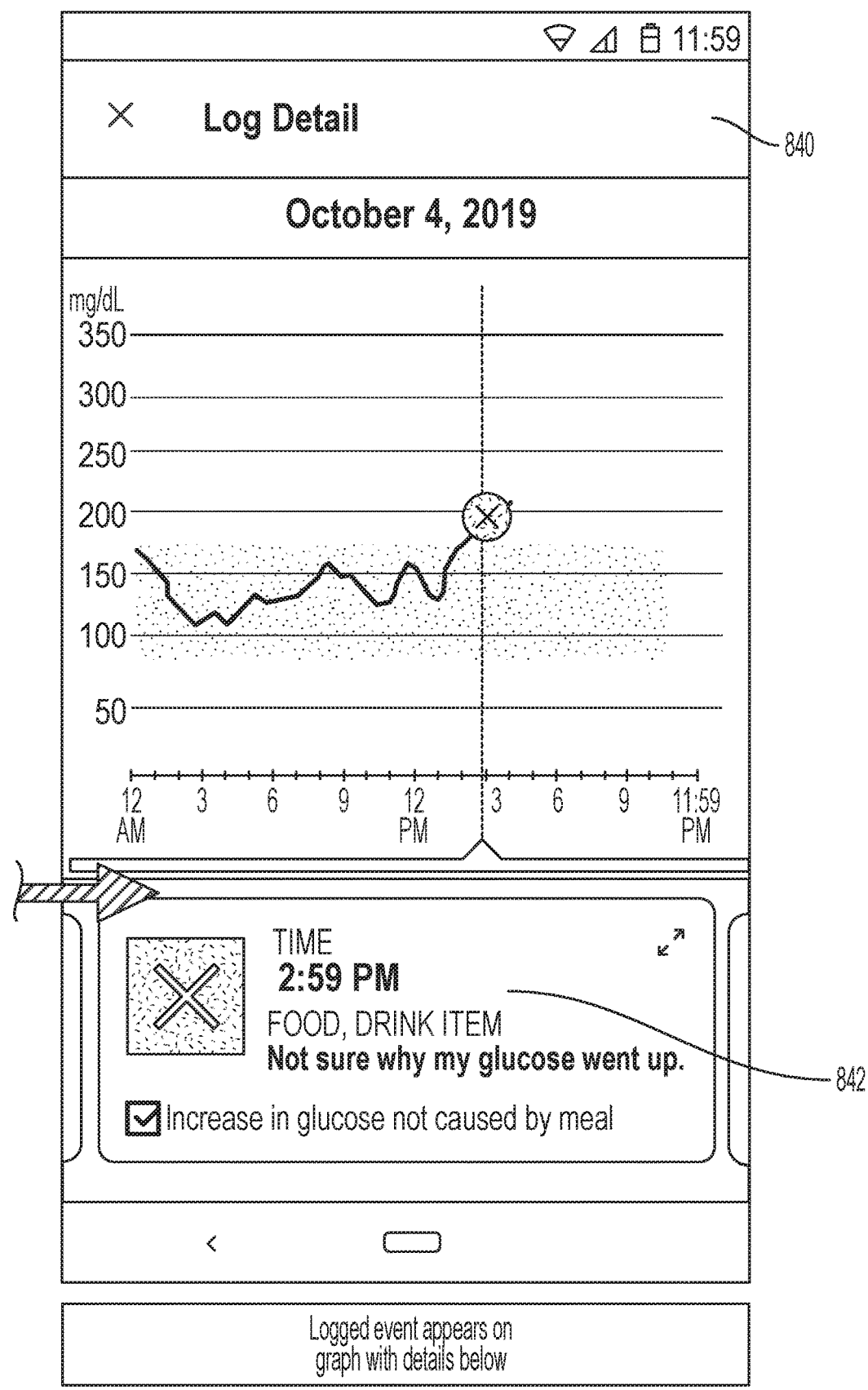
Figure 10B:
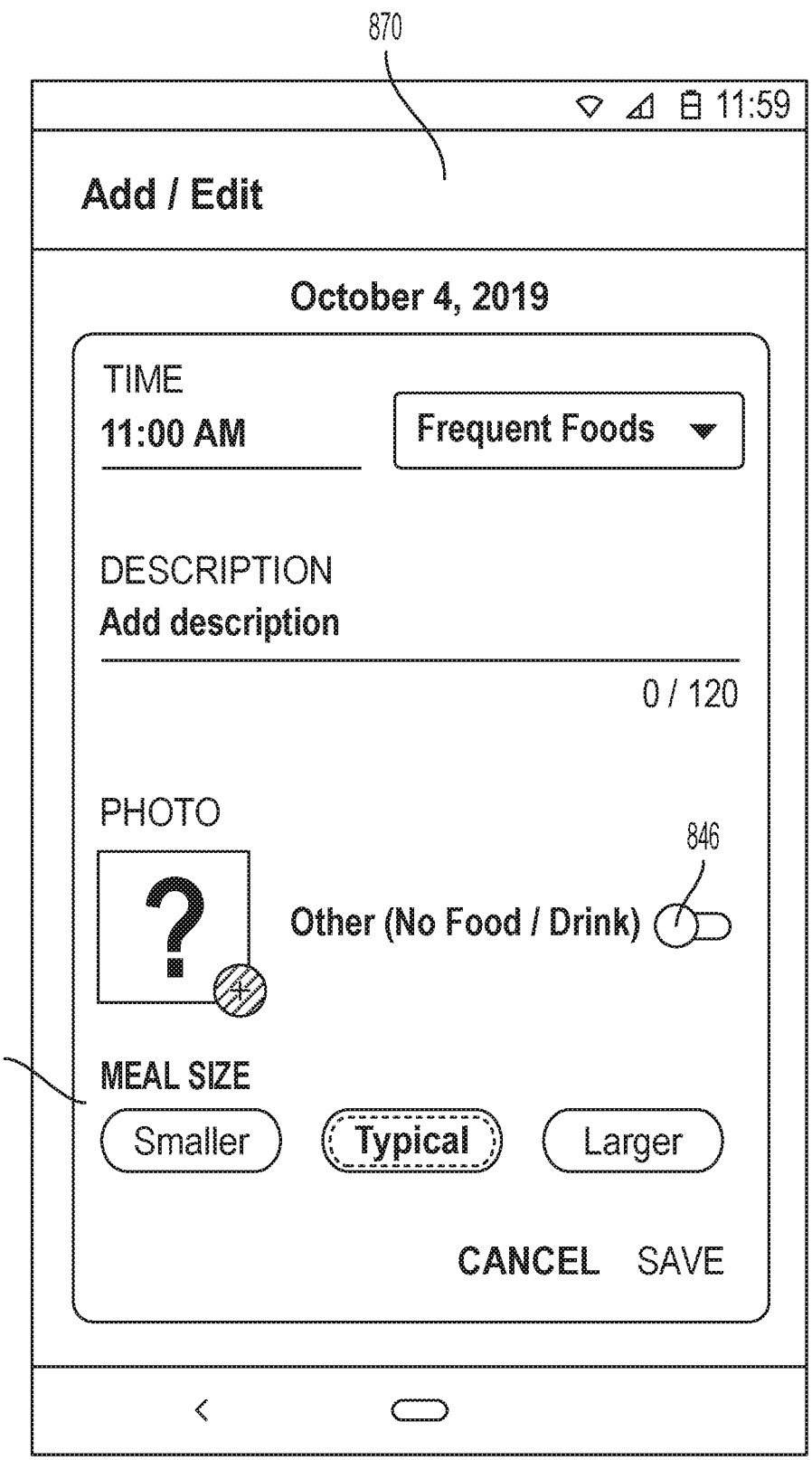

The user can also be prompted to enter meal information when an event is detected. When an event is detected, the meal monitor application increments the badge on the application icon and shows a "?" icon 820 on the analyte level graph at the time that it is estimated that the meal started by the episode detector. As seen in home screen 810 in FIG. 10A-1, the user may add information to this event by tapping on the "?" icon, which can open log entry screen 826. Alternatively, the user may tap on the "?" icon to open, a window 824 that prompts the user to add details about the meal. The user can click "edit" 822, which will open a larger log entry screen 826. Once the user is at the log entry screen 826, either by tapping the "?" or by clicking "edit," the user can enter a description 828 of the meal and can also indicate the relative size of the meal consumed 830, e.g., selectable buttons indicating different sizes of meals such as "Smaller," "Typical," and "Larger." The user can also associate a photo with the meal. For example, log entry screen 826 may include a camera icon 834 that, when tapped, opens the camera of the device on which the meal monitor application is installed, and the user can take a picture of the food or alternatively select a picture from a library of photos. The log entry screen 826 may or may not include a field to include a carbohydrate content of the meal. The log entry screen 826 can also contain an option to indicate that the increase in glucose was not caused by a meal 846, as seen in FIG. 10A-2. In log entry screen 826, this option 846 is a selectable box labeled "Increase in glucose not caused by meal." In an alternative embodiment shown in FIG. 10B, this option 846 appears as a toggle switch labeled "Other (No Food/Drink)." If option 846 is selected, a symbol 848 (such as an "X") may populate the display space reserved for the photo to highlight that this event is not associated with a meal. After the information associated with the event is entered, the user can click "save" to log the information. After the event information is logged, in the log detail screen 840, a small version of the symbol 848 or the meal can be associated with the event on the graph. The details of the logged event can appear in abbreviated form in a window 842 below the graph.

Figure 11:
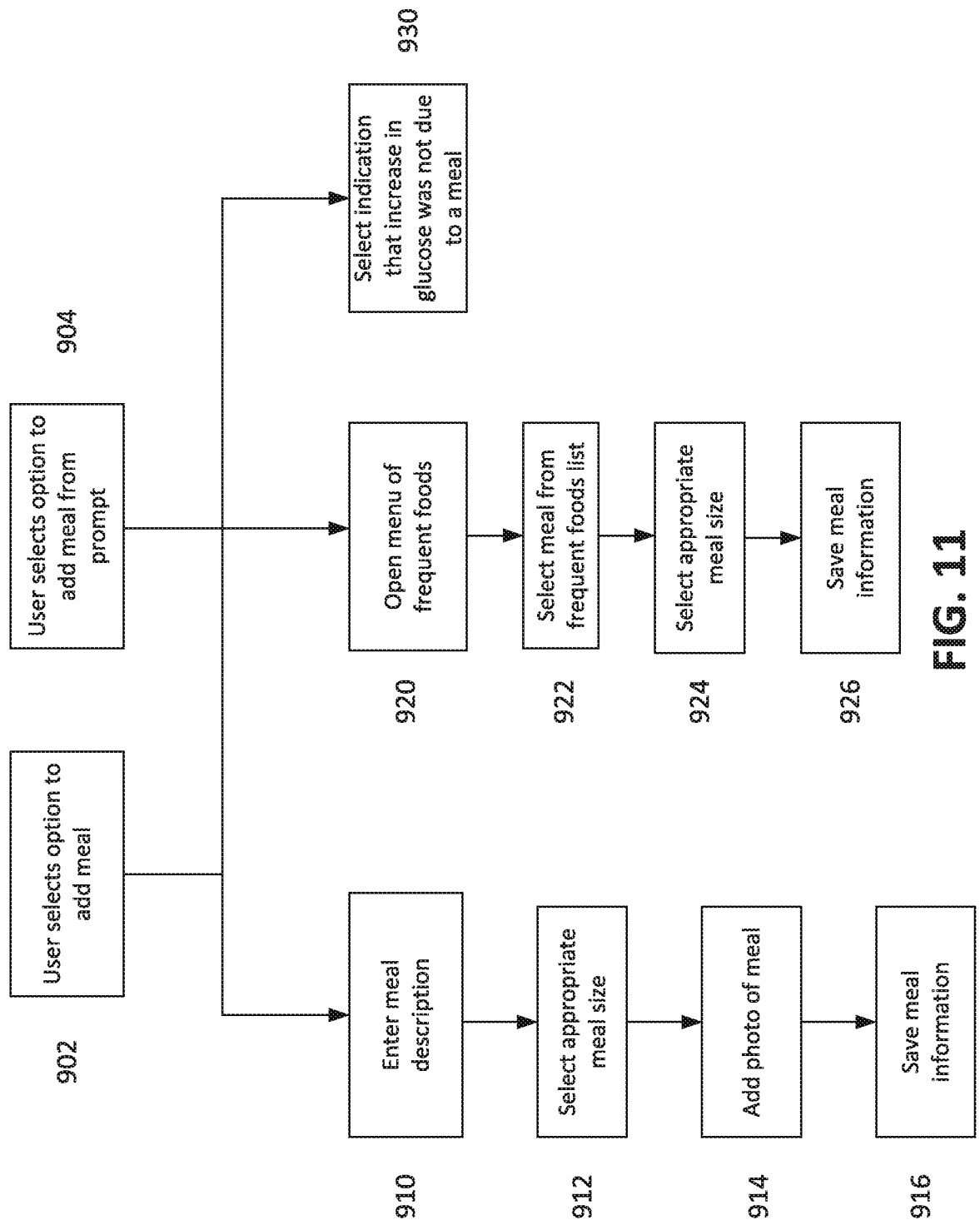
FIG. 11 depicts an example embodiment of a representative flow chart for logging meal information.

Thus, as summarized in the flow chart in FIG. 11, there are two ways in which a user can enter a meal in the meal monitor application. The user may either elect to log a meal 902 or be prompted to log a meal by the application 904. In one method, the user may enter a meal description 910, select the meal size that was ingested (e.g., smaller, typical, larger) 912, add a photo of the meal 914, and then save the meal information 916, which will then be associated with that meal event. The user may also edit the time associated with a meal entry. Alternatively, the user can elect to log a meal by opening the menu (e.g., a drop down menu) of frequent foods 920, select a meal from the frequent foods list 922, select the appropriate meal size 924, and save the meal information 926, which will then be associated with the meal event. Alternatively, the user can indicate that the increase in glucose was not due to a meal 930.

Figure 9D:
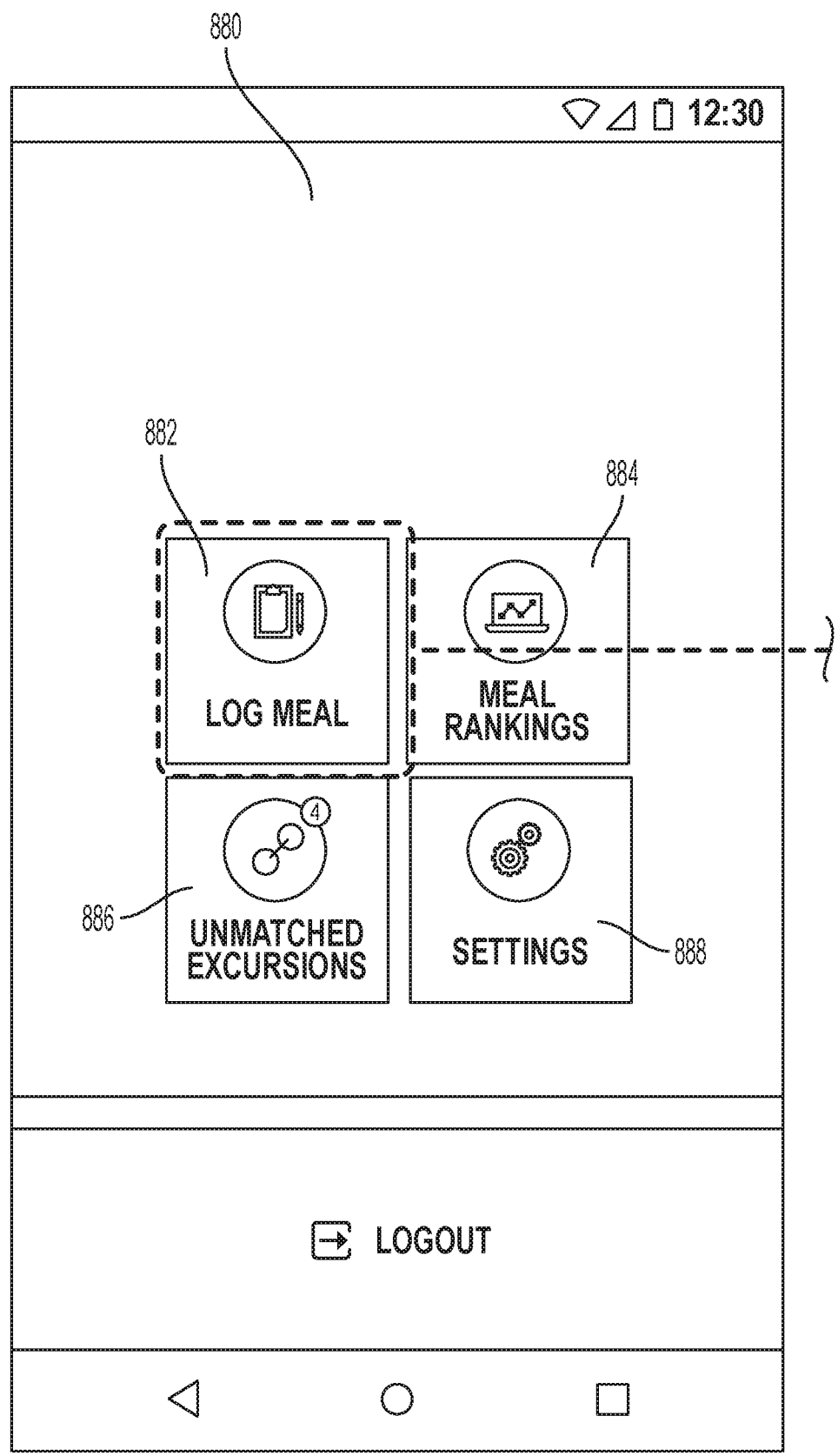
Figure 9D:
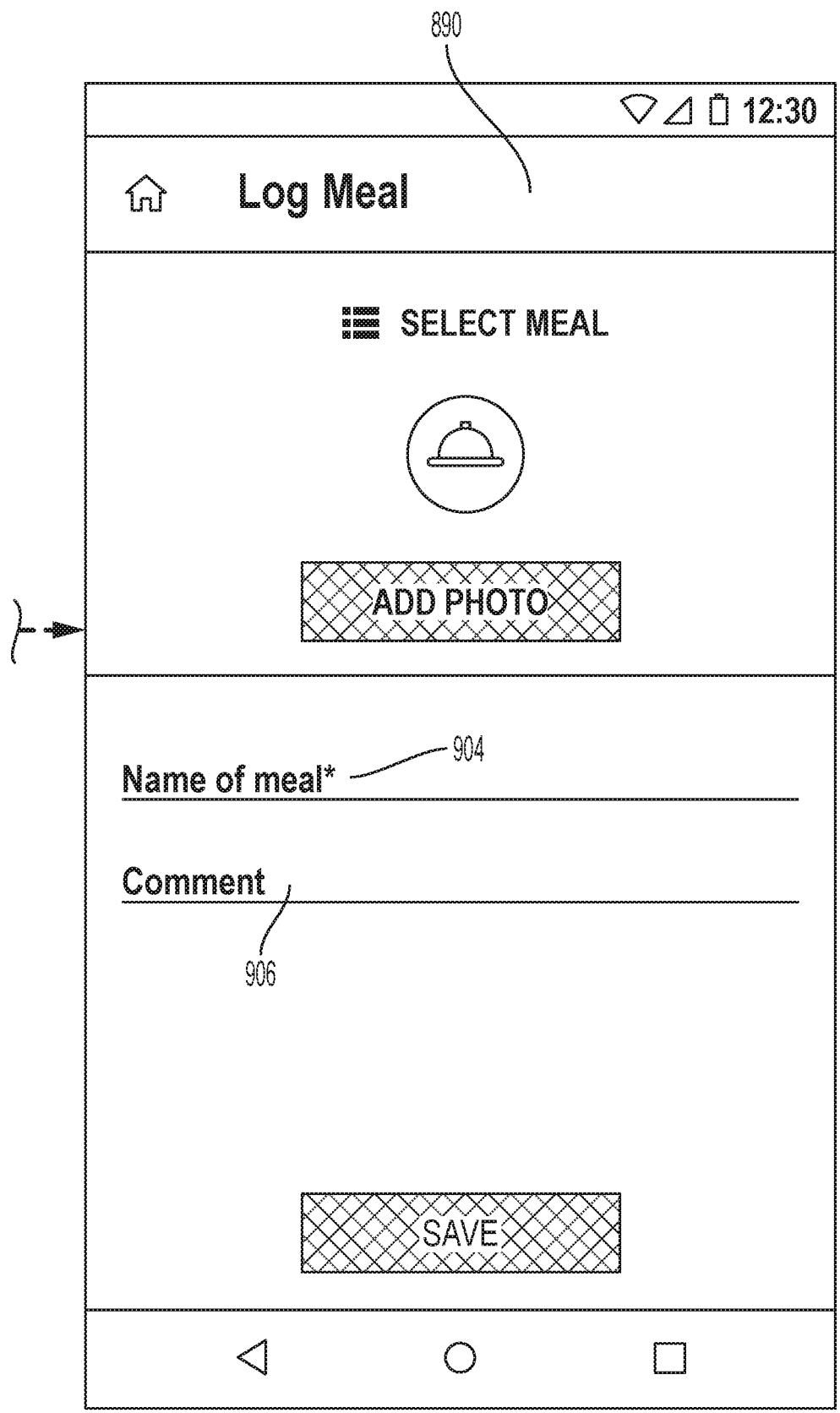
Figure 9D:
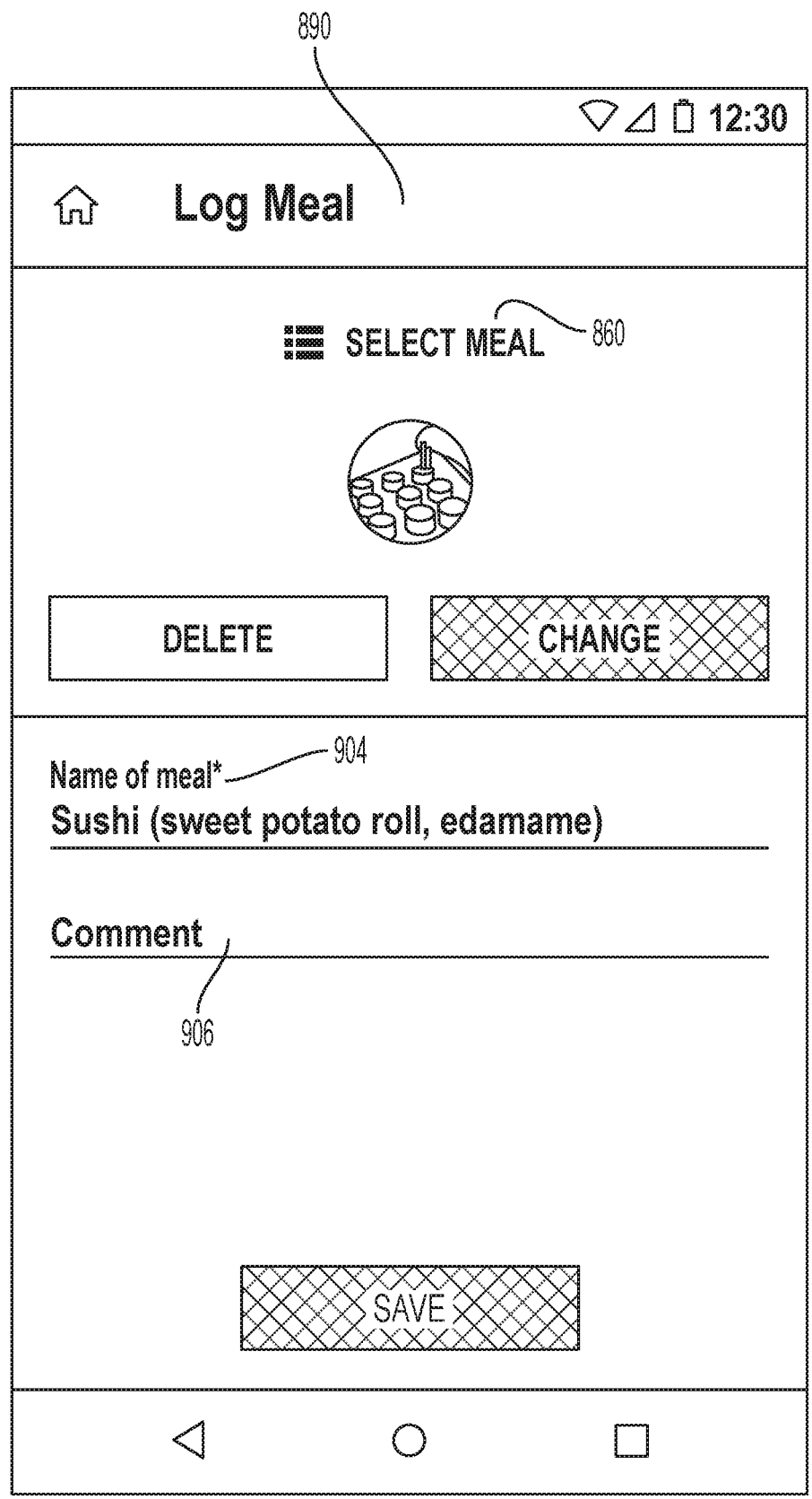

In an alternative embodiment of the application, as seen in FIG. 9D, the meal monitor application can also include a menu screen 880 that includes, but is not limited to, a log meal icon 882, a meal rankings icon 884, an unmatched excursions icon 886, and a settings icon 888. When the user selects the log meal icon 882, a log meal screen 890 will open, which can contain the same details as was described with respect to log entry screen 826. Log meal screen 890 can include a field for the name of the meal 904, a field for a comment 906, and an option to add a picture of the meal. Log meal screen 890 may also include an option to select a meal from a previously entered meal list 860 (see, e.g., "Select Meal").

Figure 9E:
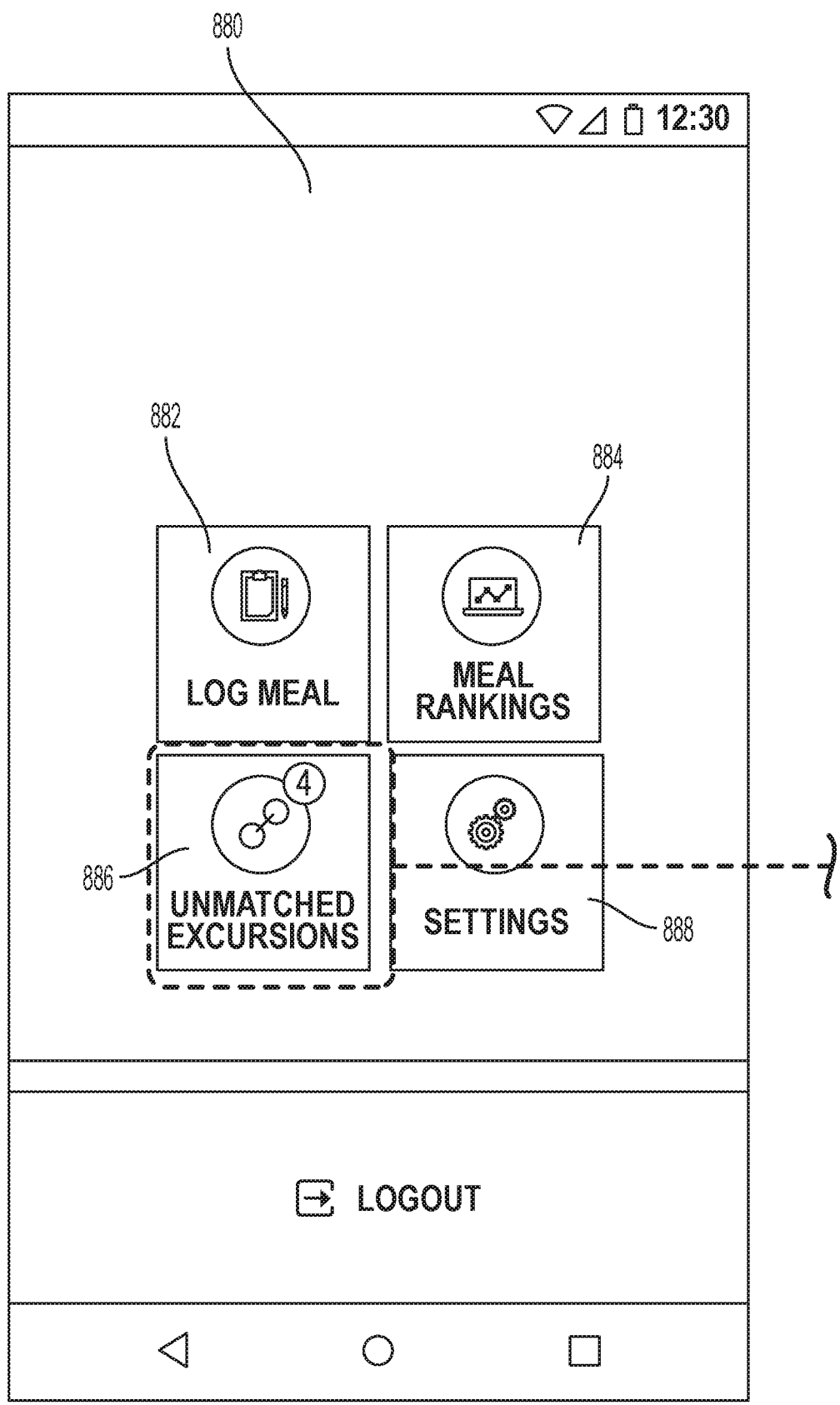
FIG. 9E depicts example embodiments of graphical user interfaces for viewing unmatched events.
Figure 9E:
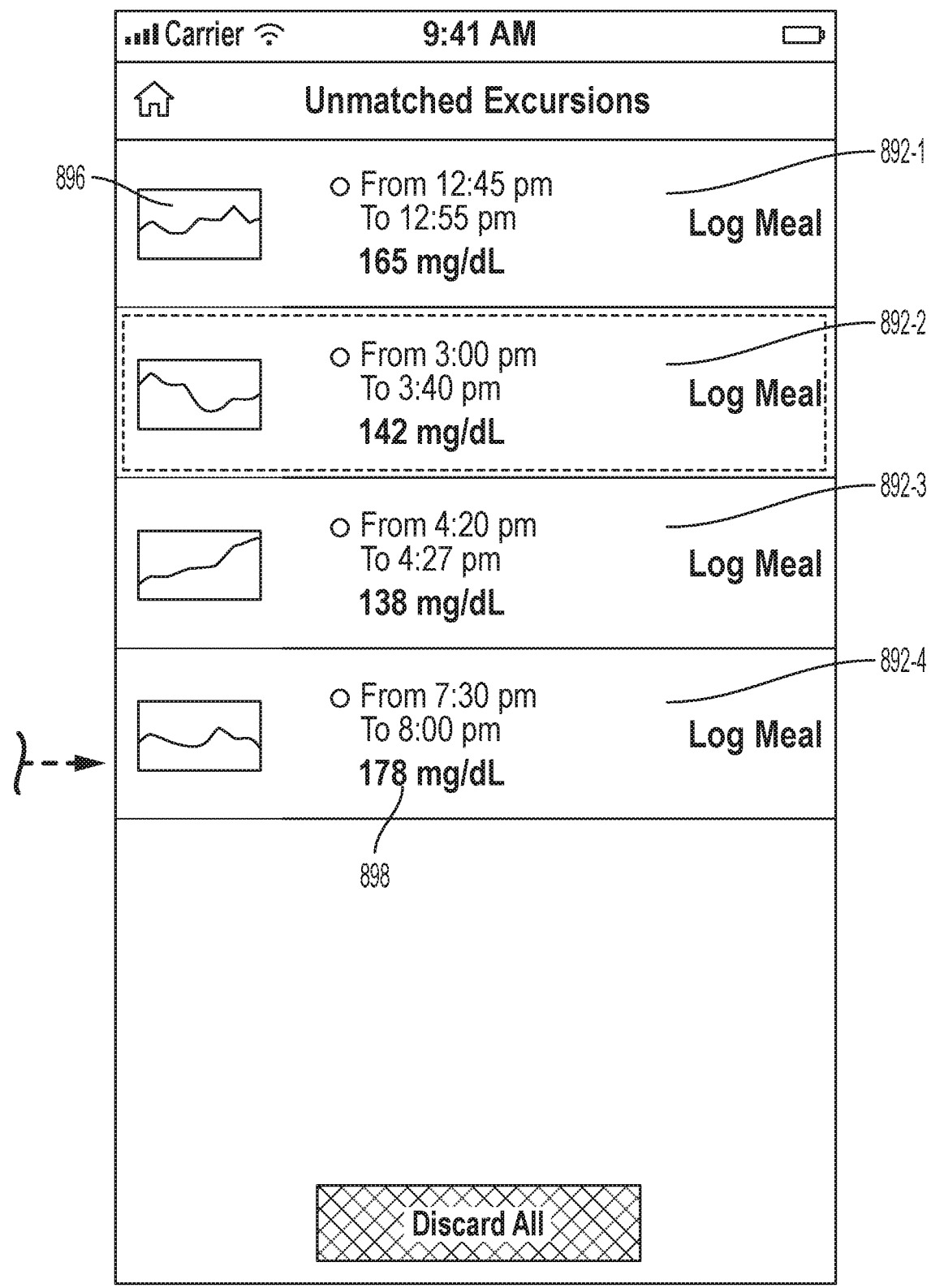

In this alternative embodiment of the application, the user may also have the option of viewing a list of detected events and associating meals with these detected events. As seen in FIG. 9E, when the user selects the unmatched excursions icon 880, unmatched excursions screen 890 appears with a list of events detected. Each entry 892-1-892-4, may include a time or time range 894 when the event/excursion occurred, a portion of the glucose concentration graph 896 showing the event, and a glucose concentration value associated with the event 898. The user can select an option to log a meal associated with a particular event, where the user will be presented with a log entry or log meal screen described herein, and the user can enter meal information as described in relation to other embodiments.

Meal Monitor Insights

Figure 12:
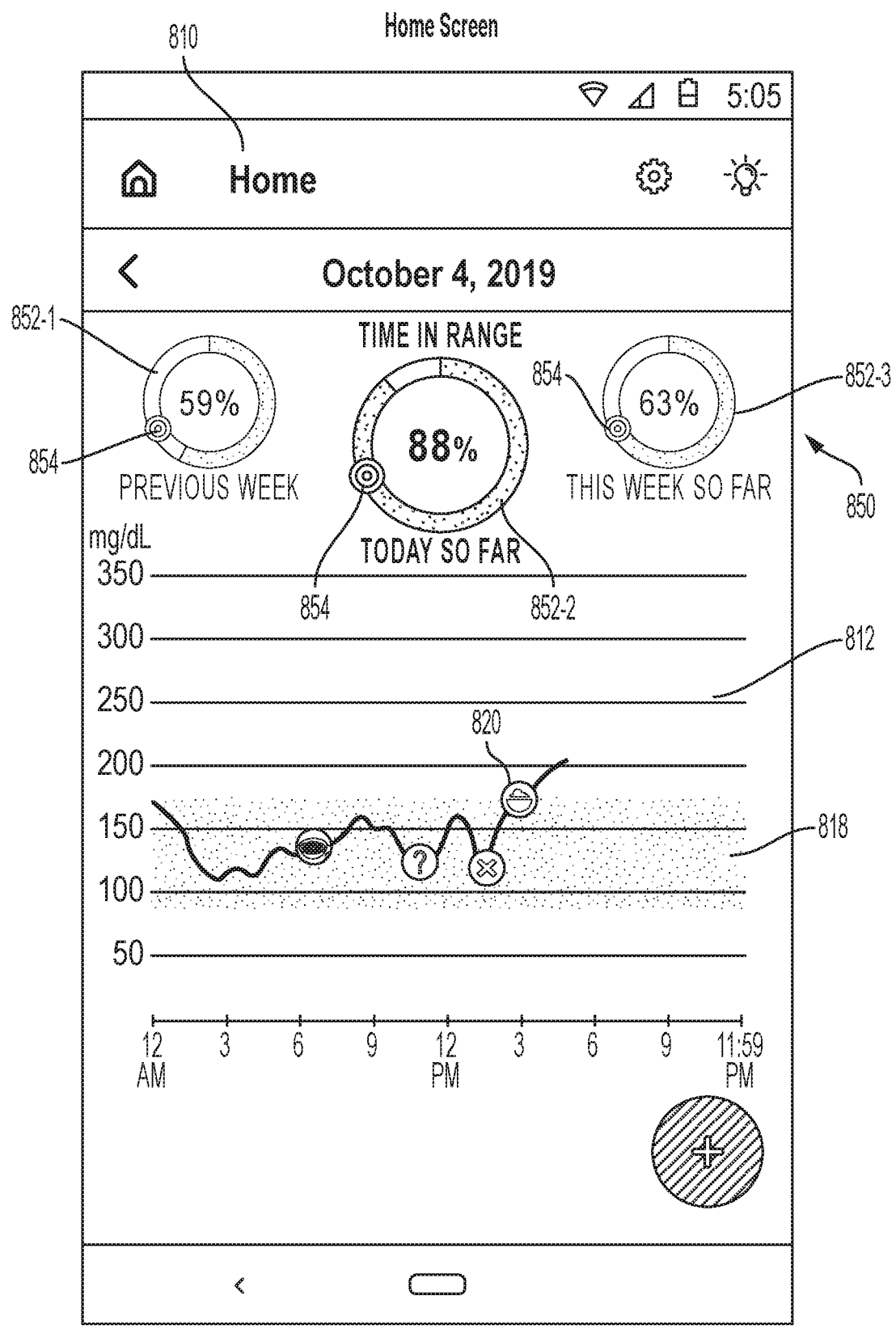
FIG. 12 depicts an example embodiment of a graphical user interface for displaying indicators of time in range and a graph of analyte concentration data.

The meal monitor application was designed to deliver multiple insights to the user by grouping various analyses together. As seen in FIG. 12, home screen 810 provides insights into how successful the user has been in reaching their goal in various time periods and what foods have caused a spike in glucose concentration. The small icon 820 in graph 812 gives the user insight into which foods spiked their glucose such that they were outside their goal range 818. The user can identity of the "bad food" at a glance if a picture is associated with the event or the user can click on the icon to see the log details of that meal. The TIR display for the current day 852-2 can inform the user how carefully they need to eat for the rest of the day in order to hit their TIR goal 854, which is clearly displayed on the TIR circle 852-2. If the TIR display for the current week so far 852-3 shows that they are above their TIR goal 854, it can inform the user that they can have a "cheat day" or "cheat meal" and still achieve their TIR goal 854. If, however, the TIR display for the current week so far 852-3 shows that they are below their TIR goal 854, it can inform the user that they need to make better meal choices to make up for bad choices earlier in the week. The TIR display for the past week 852-1 can give the user insight as to whether they are doing better in the current week so far as compared to last week. If the TIR display for the current week 852-2 shows a higher percentage of TIR as compared to the previous week, the user could be encouraged by seeing that the better choices that they made during the current week have successfully kept their levels within the goal range.

Figure 13A:
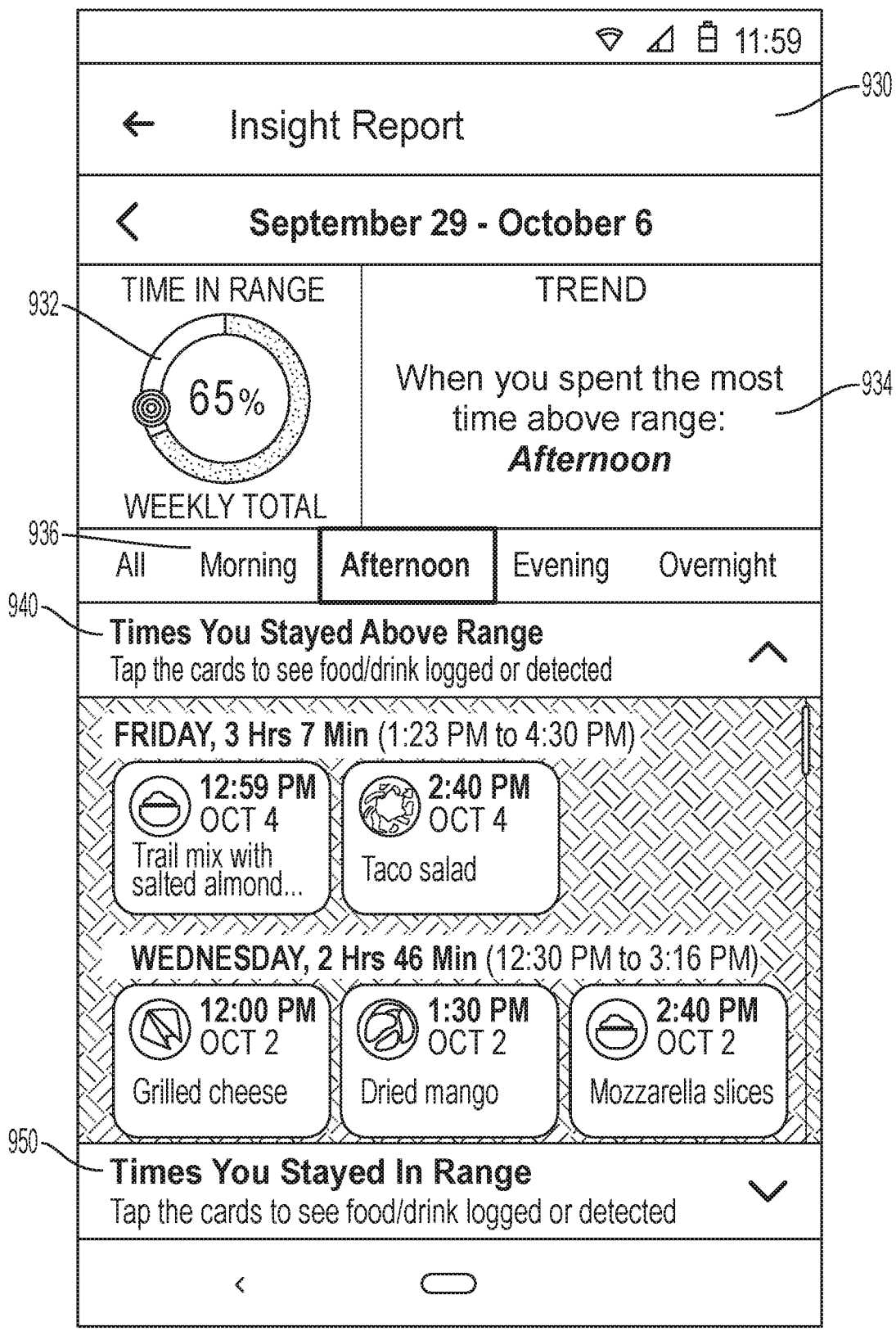

As seen in FIG. 13A, the weekly insights screen 930 can provide additional insights to the user as to the impact of consuming particular foods. The weekly insights screen 630 may include a TIR display for the total week so far 932, a trend statement 934, a display of a grouping of foods that the user ate after which their glucose rose above the goal/target range 940 or which had a TA180 above a certain threshold, and a display of a grouping of foods that the user ate after which their glucose stayed in range 950 or had a TA180 below a certain threshold. The displays of the groupings of foods 940, 950 can be displayed for different time periods 936 (e.g., all day, morning, afternoon, evening, and overnight) and may be expandable and collapsible. In an alternate Insight Report 930 seen in FIG. 13C, the screen may include a filter with options to select the time period 937 to be displayed. The TIR display for the total week so far 932 ("Weekly Total") can show the user if they are reaching their goal that week. The trend statement 934 can tell the user which period of the day had the greatest number of readings out of range (e.g., "When you spent the most time above range: Afternoon"). The display of groupings of foods that resulted in times that the user stayed above range 940 can give the user insight as to which foods they ate that consistently sent their glucose levels above the goal range and/or above 180 mg/dl (TA180) (e.g., the "bad" foods). From the display of food groupings 950, the user can see if there were any foods that were consistently keeping them in their goal range (e.g., the "good" foods). The displays of groupings of foods that resulted in times that the user stayed within the goal range 950 can give the user insight as to which foods they ate that consistently kept their glucose levels within the goal range. From the display 950, the user could see which "good" foods were consistently keeping their glucose levels within the goal range. The display of the groupings of food and time period being displayed may be programmed to show the user's "bad" time period of the day in which the user was above the goal range the longest amount of time (e.g., highest TA180) first, e.g., as a default. The program may alternatively be programmed to display the time period that the user stayed in the goal/target range the most (highest percentage of TIR) first, e.g., as a default, and display the "good" foods associated with this period in an effort to enforce good behavior.

The meals can be associated with episodes according to several rules. All episodes can be categorized as an in-range episode or an above-range episode. In-range episodes precede and succeed each out-of-range episode.

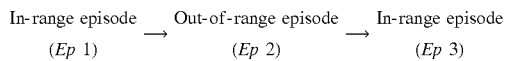

All meals logged can be characterized as belonging to an episode based on the following rules:
- If a meal was logged 30 minutes or less before the end of the episode, it belongs only to the succeeding episode. For example, if a meal is logged in Ep1 30 mins or less prior to the start of Ep2, then the meal logged is assigned to Ep2, NOT to Ep1.
- If a meal is logged more than 30 minutes but less than or equal to one hour prior to the end of the episode, it belongs to both the current episode and the next episode. For example, if a meal is logged in Ep1 1 hour prior to the start of Ep2, then the meal logged is assigned to BOTH Ep1 AND Ep2.
- If a meal is logged more than one hour prior to the end of the current episode/start of the next, it belongs only to the current episode. For example, if a meal is logged in Ep1 1 hr and 1 min prior to the start of Ep2, then the meal logged is assigned ONLY to Ep1.

Thus, for example, if a meal was logged in Episode 1 (an in-range episode) 15 minutes before Episode 1 ended and Episode 2 (an out-of-range episode, e.g., above 180 mg/dL) started, the meal would be assigned to Episode 2, not Episode 1.

Figures 1, 13B:
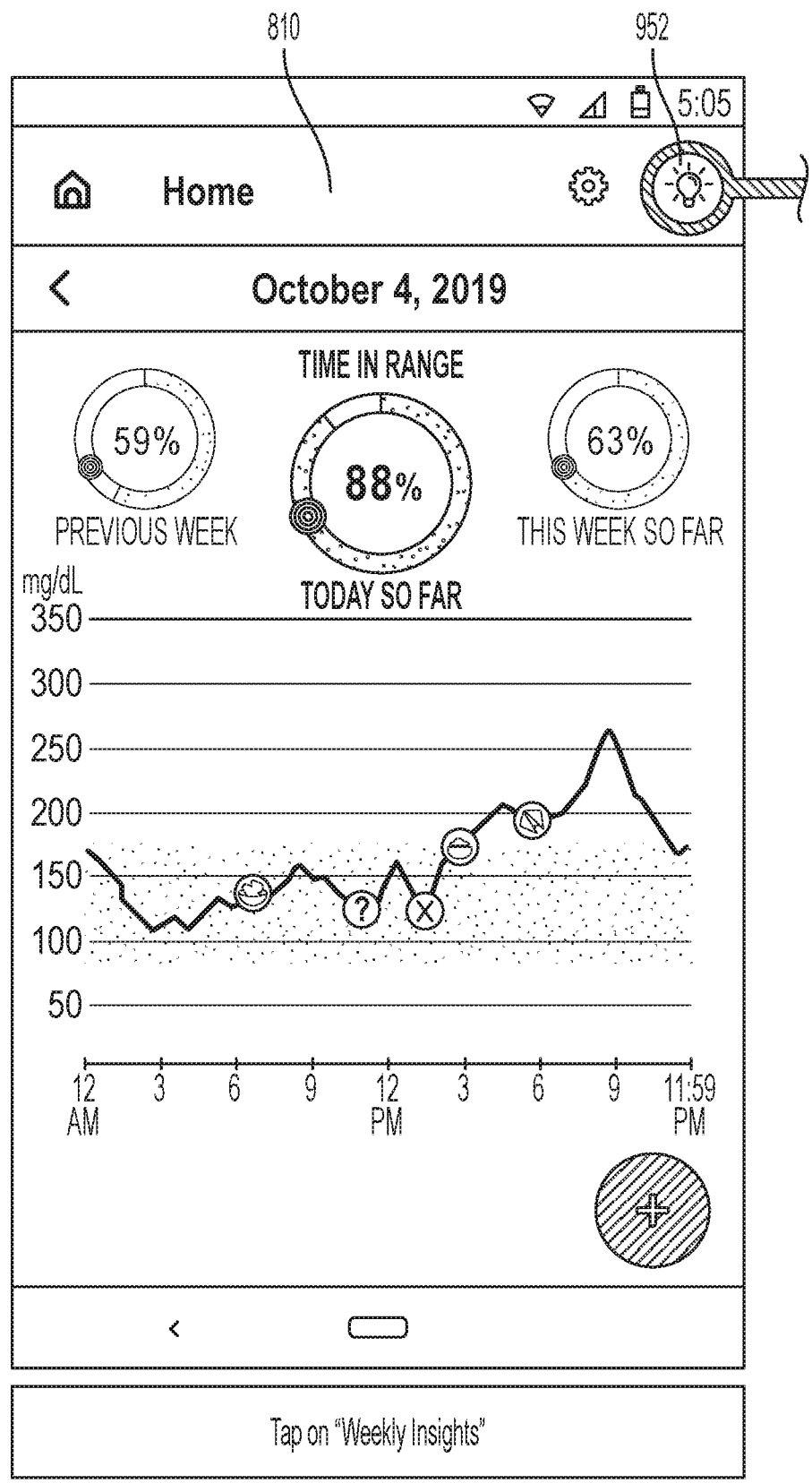
Figures 2, 13B:
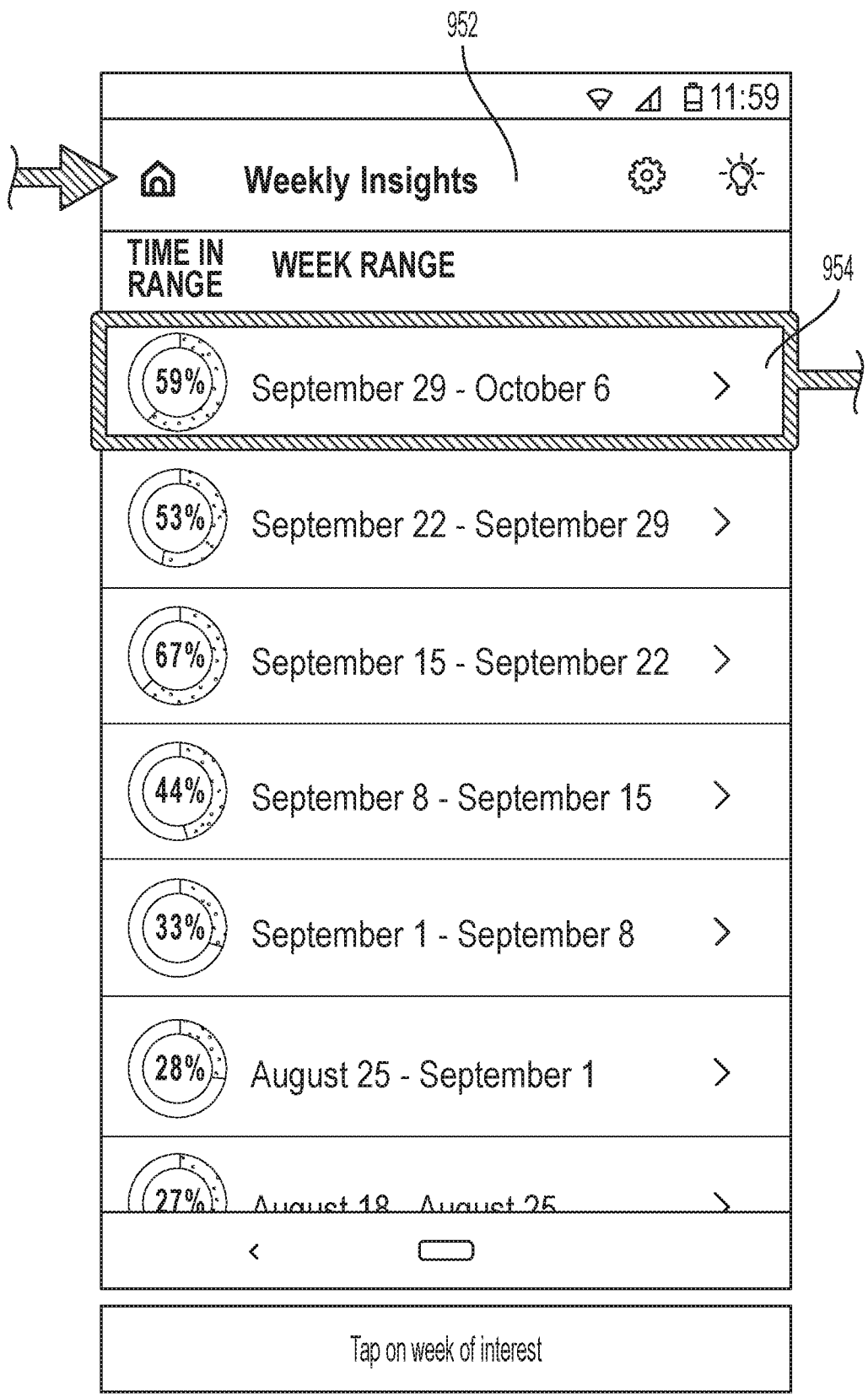
Figures 3, 13B:
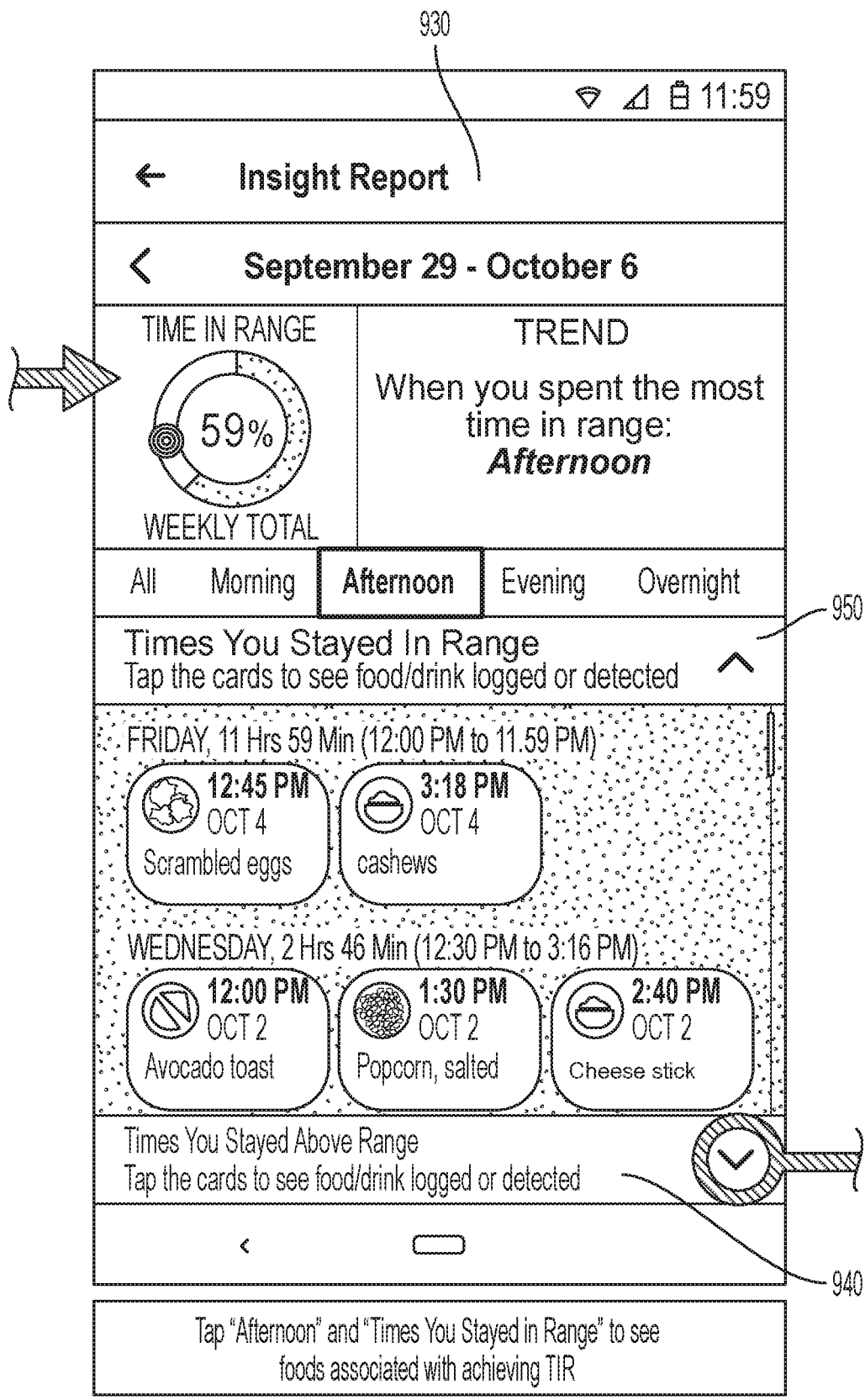
Figures 4, 13B:
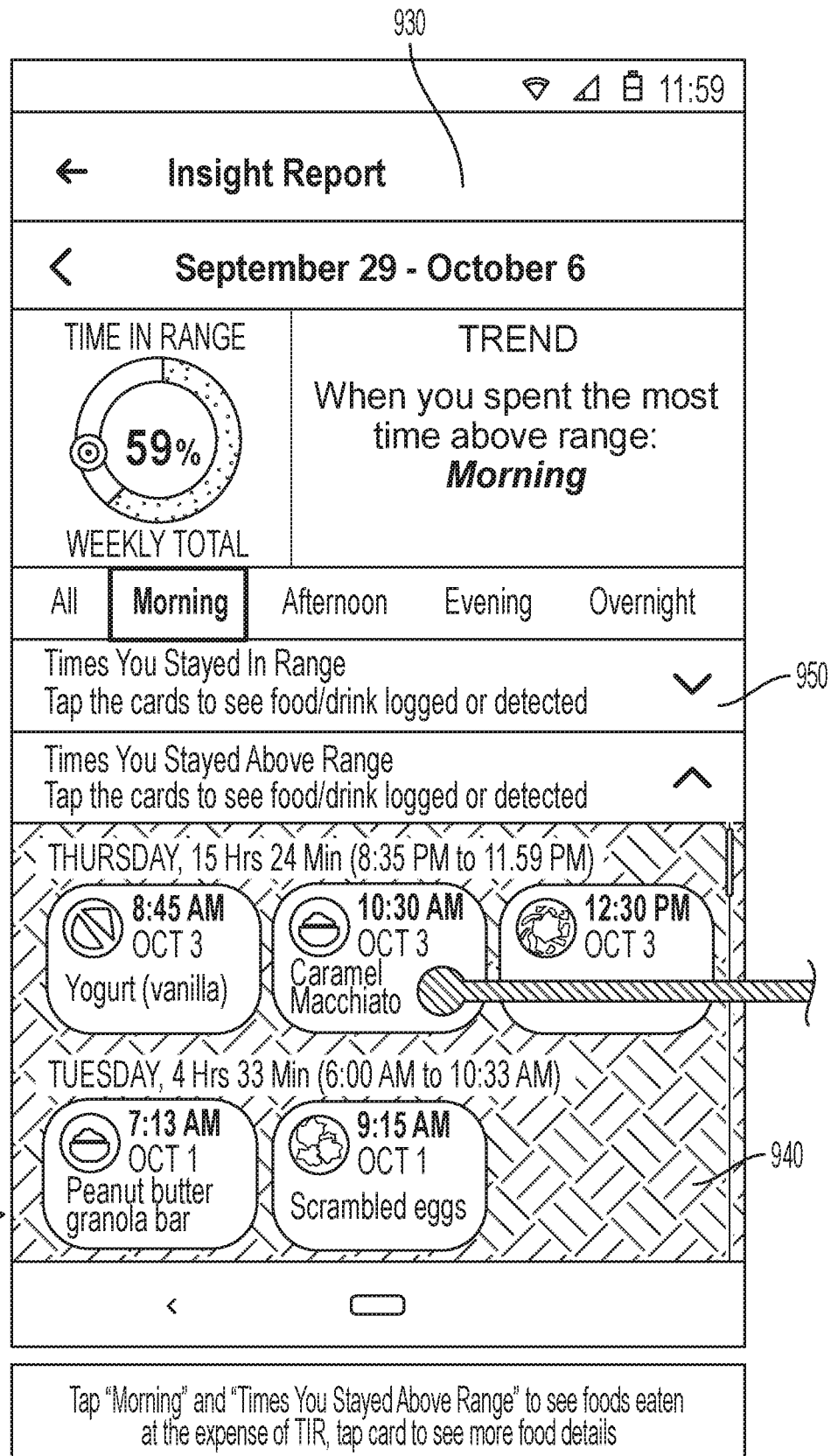
Figures 5, 13B:
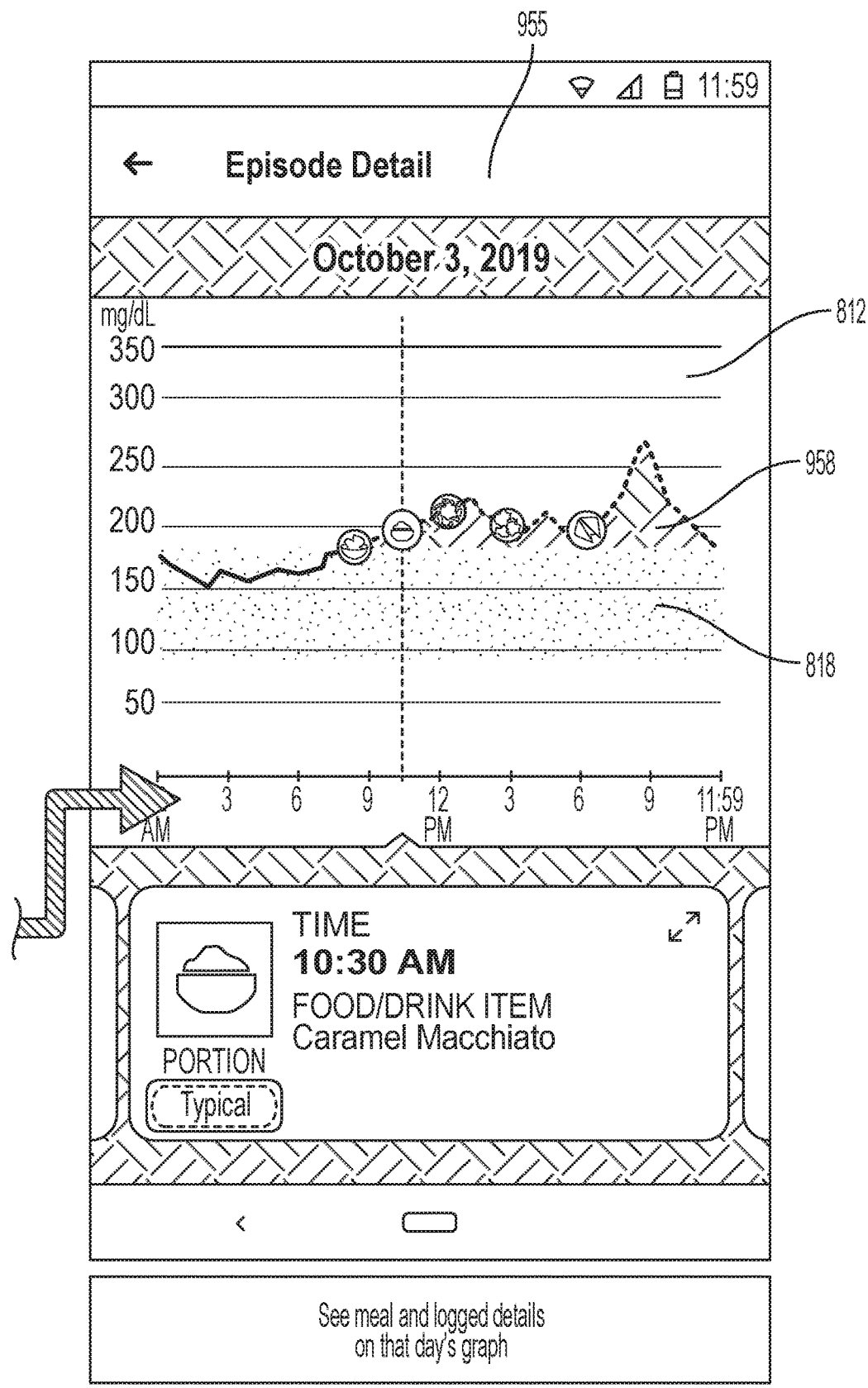
Figure 13C:
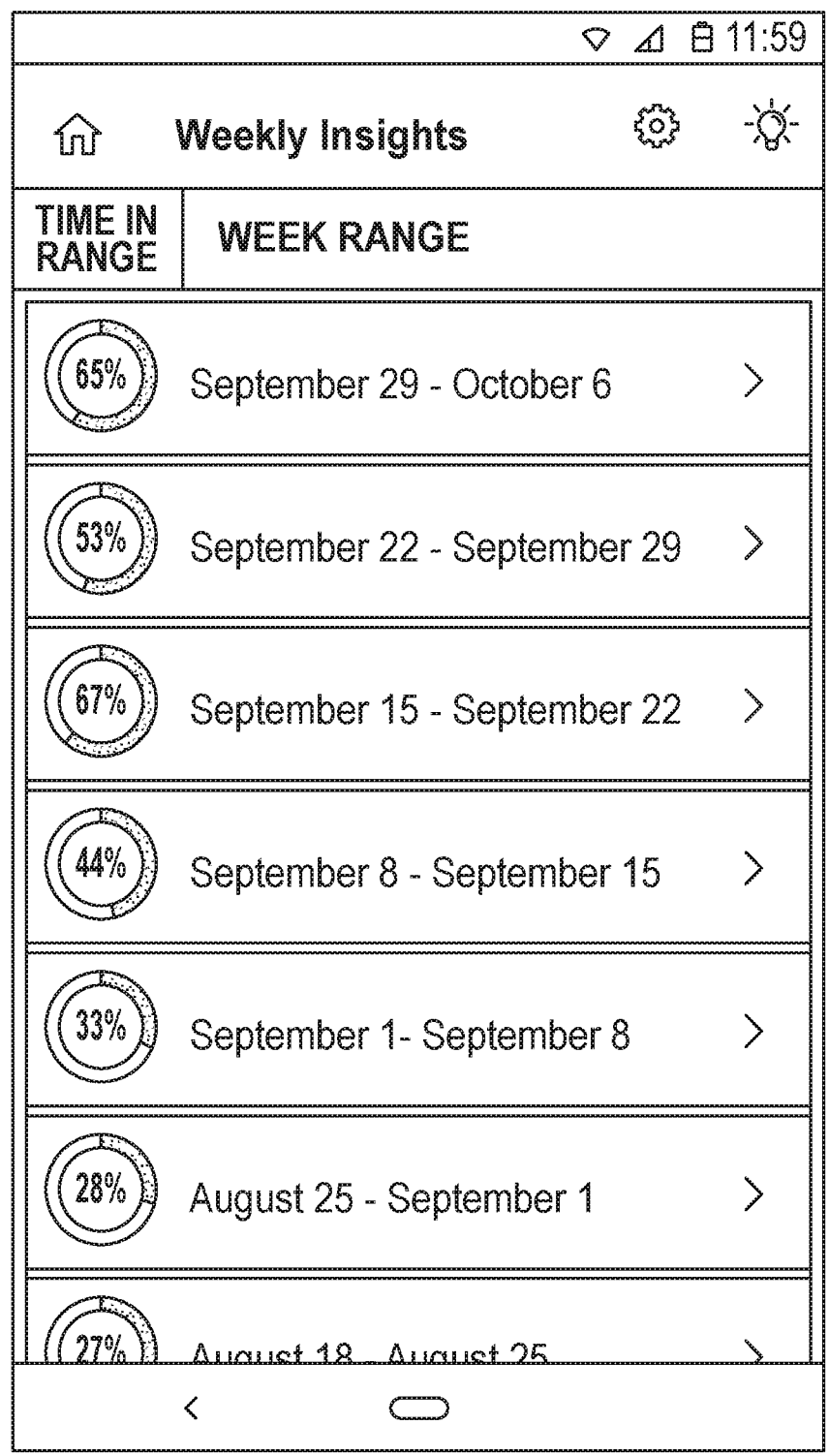
Figure 13C:
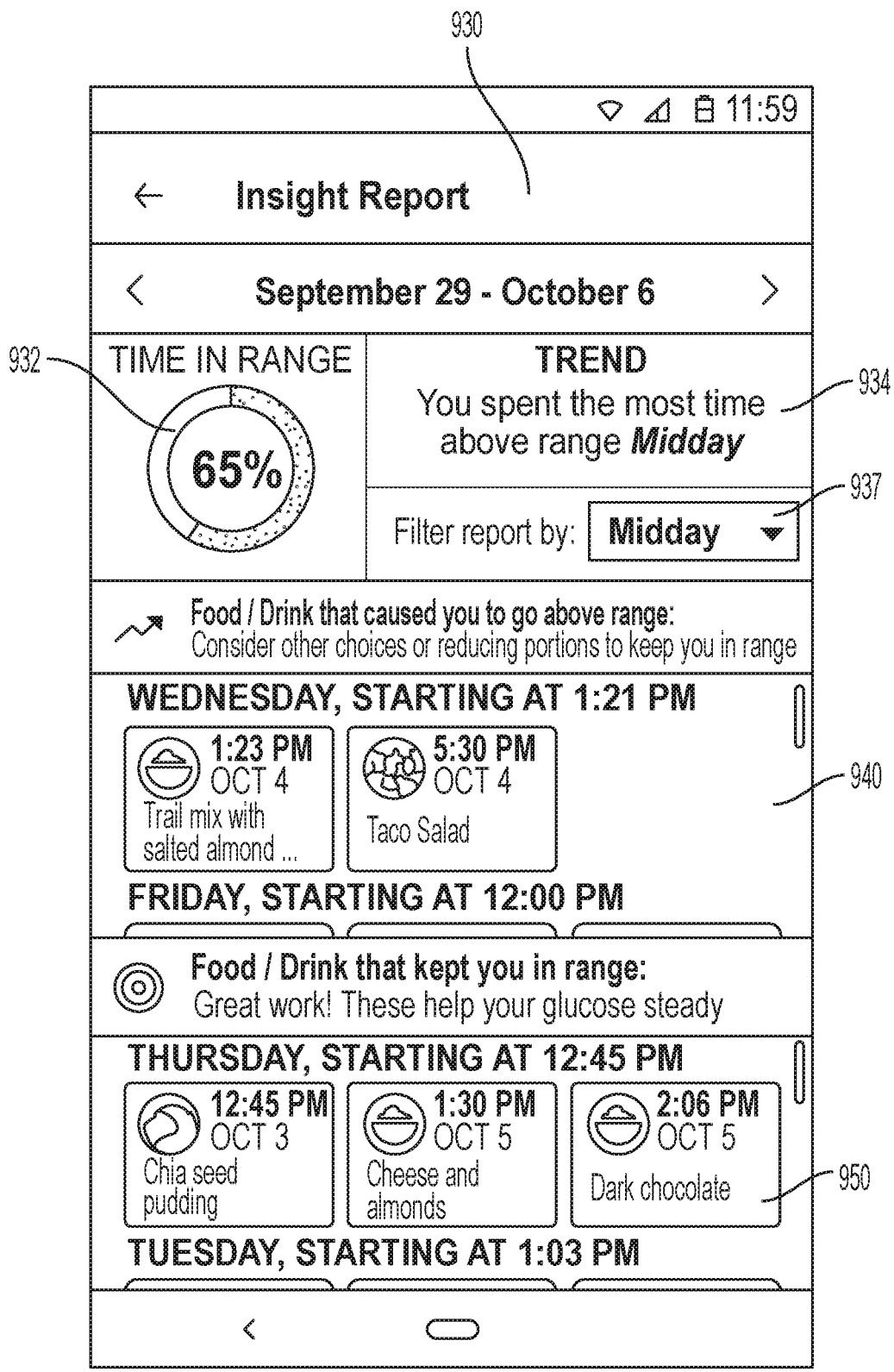
Figure 13C:
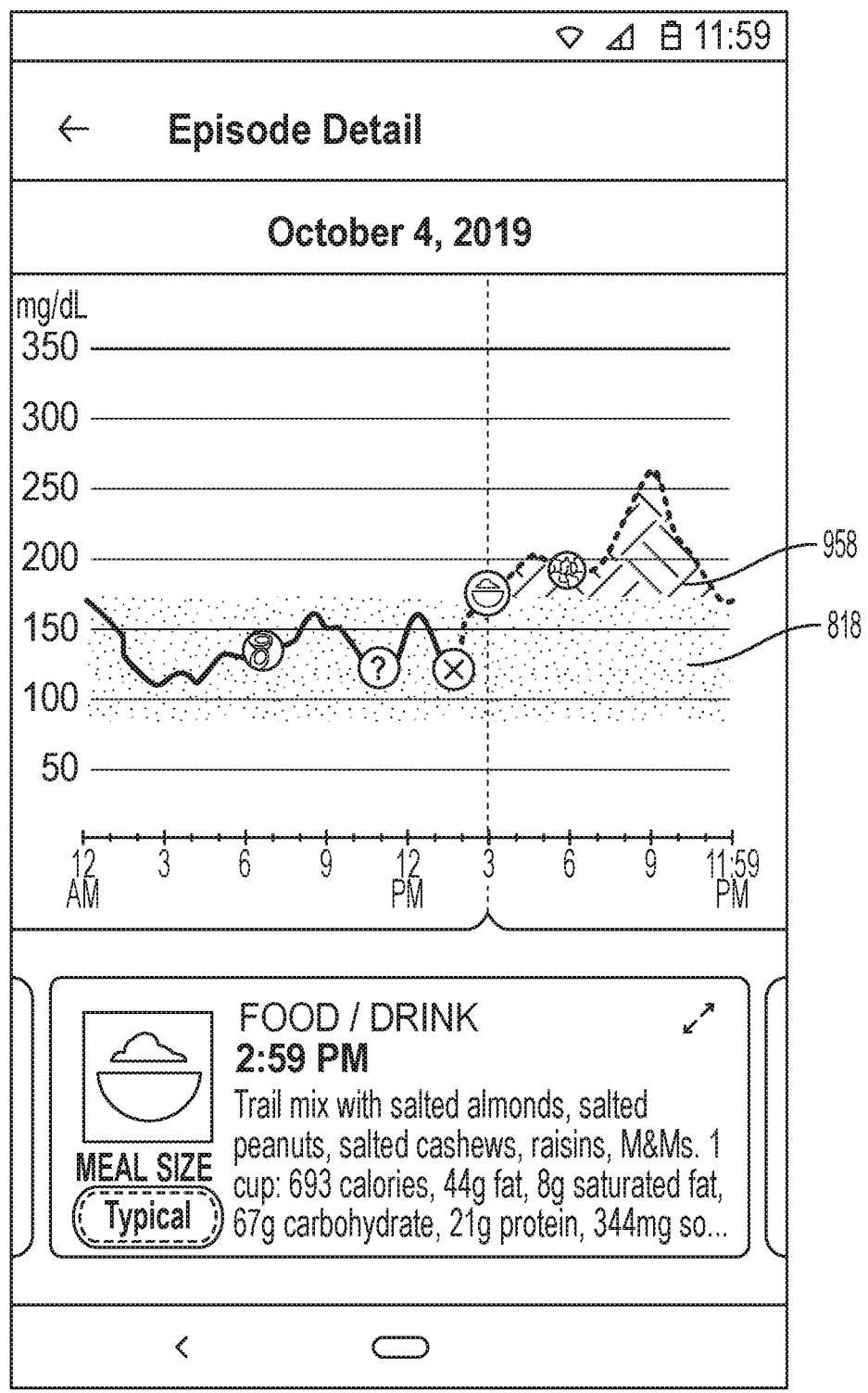

FIGS. 13B-1-13B-5 and 13C show how to access a weekly insights report. As seen in FIG. 13B-1, from the home screen 810, the user can tap or select the light bulb icon 952 and a weekly insights week range screen 952 can open, which includes a list of various weeks with the relevant date ranges. Each week's entry can include a TIR display 852 that includes a visual or graphical indication of the amount of time the user has spent in the goal range (e.g., colored bar along the perimeter of the circle or other progress indicator) in addition to reporting a numerical value of the percentage of time spent in the goal/target range. The time in range for the full week can be calculated according to the following formula:

$$TIR_{week} = \frac{\text{\# of readings in range during the week}}{\text{\# of readings total during the week}}$$

For example, where glucose readings are taken every 15 minutes, the total number of readings during a week is 672. The time in range for the week so far can be calculated according to the following formula:

$$TIR_{week\ so\ far} = \frac{\text{\# of readings in range}}{\text{\# of readings since start of the week}}$$

For example, where glucose readings are taken every 15 minutes, a week may be set to start at Sunday at 12 am, the denominator for $TIR_{week}$ so far at Tuesday at noon would be 240 readings.

The user can select a specific week and view an Insight Report 930 for that week, which will open up an Insight Report screen 930 for the selected week. The TIR display can also be filtered to represent a full week or specific times of the day (e.g., morning, afternoon, or evening). The Insight Report 930 can have a default setting to display the time period of the day in which the user stayed in the goal/target range the longest, which includes a display of the "good" foods associated with this period in an effort to enforce good behavior. The background color of the screen can be colored to indicate that the user was in range, e.g., the background color can be set to green for the display of the "good" foods. As seen in FIGS. 13B-3 and 13B-4, the user can also select to display the time period in which the user was above the goal/target range or about 180 mg/dl for the longest period of time ("Times You Stayed Above Range") 940, which will display the "bad" foods that were eaten before or during the time that the user's glucose levels were above the goal range. To be characterized as a "bad" food, the time-above-180 may be greater than about 1 hour, alternatively greater than about alternative 30 minutes, alternatively greater than about 1.5 hours. The background color of the screen can be colored to indicate that the user was above the goal range, e.g., the background color can be set to yellow, orange, or red for the display of the "bad" foods. Moreover, for any of the foods displayed on the Insight Report screen 930, the user can select a particular food entry icon to view the episode details 955 associated with that meal.

The meal monitor application can rank the episodes to determine which meals to display in the Insight Report 930. All in-range and above-range episodes that occur each week can be ranked in ascending order by duration. The episodes with the longest duration in-range (e.g., top 5, alternatively top 7, alternatively top 10, alternatively between top 5 and top 10) can be displayed along with the meals associated with them. Similarly, the episodes with the longest duration above-range (e.g., top 5, alternatively top 7, alternatively to 10, alternatively between top 5 and top 10) can be displayed along with the meals associated with them. Within the display of the top episodes, users can scroll to view meals associated with that specific episode. The user can also scroll between episodes to identify recurring themes (e.g., a chocolate bar is in all 5 of my top episodes). Ranked episodes are also filterable, similar to TIR displays, to include only episodes during specific parts of the day.

The user can also click on an episode to view a glucose trace for that specific episode. The episode detail screen 955 can include a graph of the user's glucose levels for a relevant time period that includes that meal (as highlighted by a corresponding icon) and an abbreviated screen below the graph (which can be expanded to reveal more meal details) can be displayed below the graph. The graph 812 of the glucose concentrations can have the goal range concentration color-coded green 818 and have the concentrations above the goal range (e.g., the area under the curve) color-coded yellow, orange, or red 958.

In an alternative embodiment, a weekly insights screen 960 can include a TIR display for the week 852, a trend statement 934, and a display of "bad" foods 940 that tended to increase the user's glucose levels above the goal range. (See FIG. 13D-3). The weekly insights screen 960 can also include a display of how many meals entered were in range and above range 964. Similar to the TIR display 852, the meals in range and above range display 964 can include a visual indication of the number of meals entered in which the user stayed in the goal range (e.g., colored bar along the perimeter of the circle) in addition to reporting a numerical value of the percentage of the number of meals where the user stayed in the goal/target range. Another circle can be displayed for meals that resulted in the user's glucose levels rising above the goal range. The weekly insights screen 960 can also include a graph 968 of the median or average glucose levels for the week displayed over a one-day period, where the day is divided into segments (e.g., overnight, morning, afternoon, and evening). The graph 968 can be color-coded to indicate which parts of the graph are within range and which parts of the graph are above range.

In an alternative embodiment, a weekly insights screen may include a TIR display for the week, a trend statement, a display of "bad" foods that tended to increase the user's glucose levels above the goal range, and a display of "good" foods that the user ate after which their glucose stayed in range or had a TA180 below a certain threshold. In a simplified layout, the meals may be grouped according to above range or in range and may not be subdivided according to time of day or separated by meals consumed on different days.

In an alternative embodiment, a weekly insights screen may include a TIR display for the week, a trend statement, a display of "bad" foods that tended to increase the user's glucose levels above the goal range, and a display of "good" foods that the user ate after which their glucose stayed in range or had a TA180 below a certain threshold. The bad foods and good foods may be located on separate tabs, which the user can toggle between. Individual meals may be displayed on a meal card, which may include a larger picture of the meal, the name of the meal, the size of the meal, the date and time the meal was consumed, and TIR displays for the periods before the meal and after the meal (e.g., 2 hours after the meal).

Figure 14A:
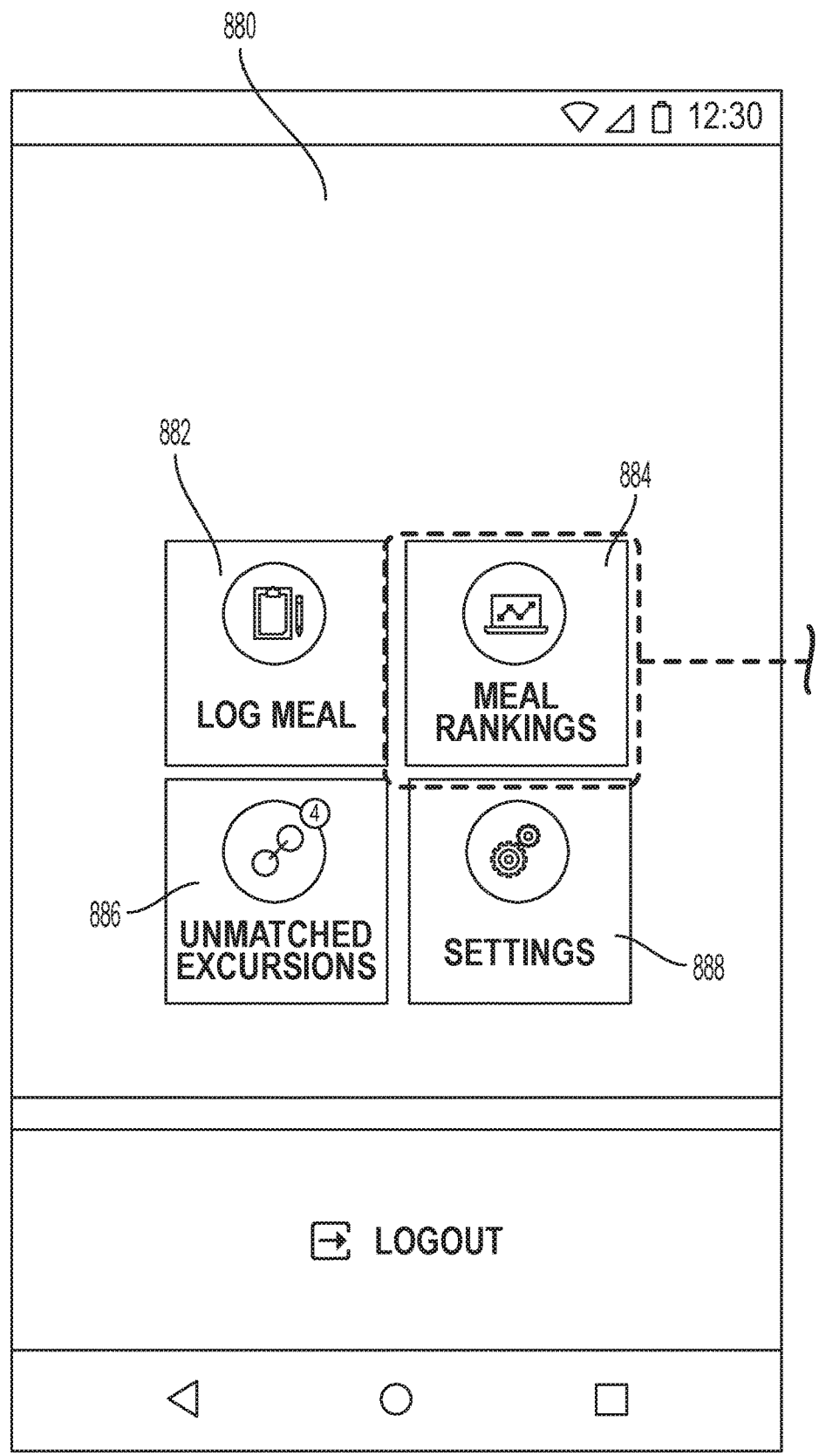
FIGS. 14A-14B depict example embodiments of graphical user interfaces for displaying meal rankings.
Figure 14A:
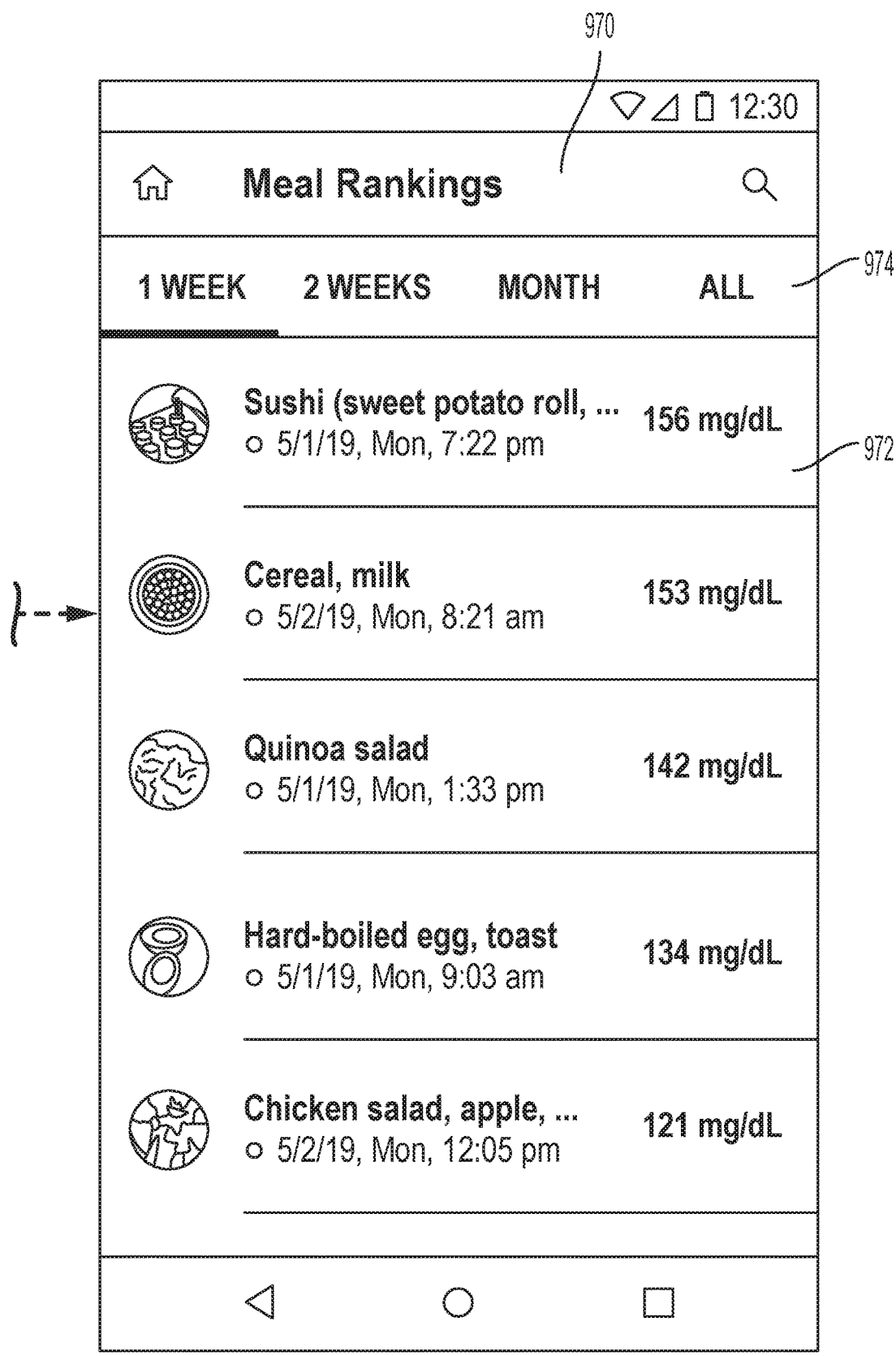
Figure 14B:
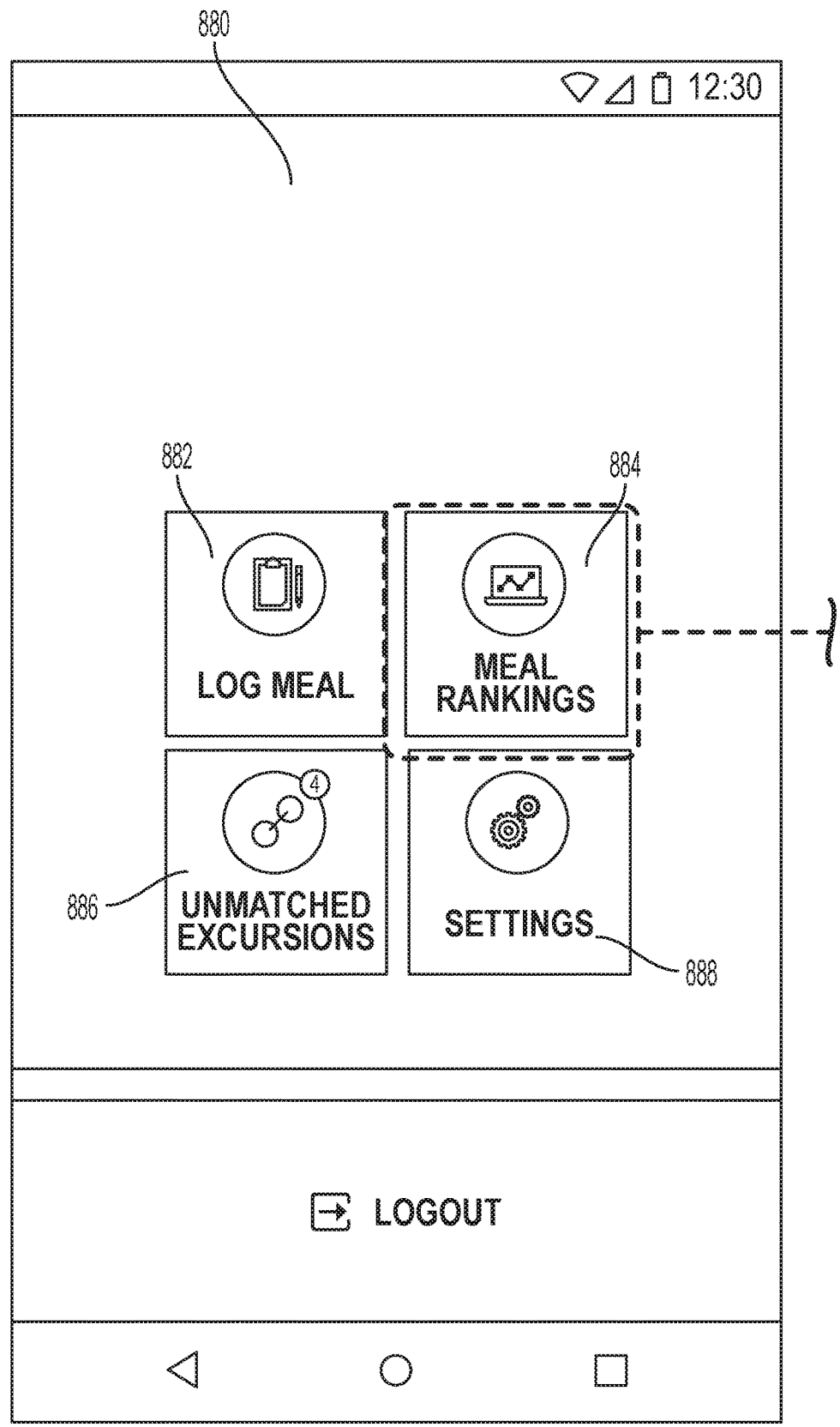
Figure 14B:
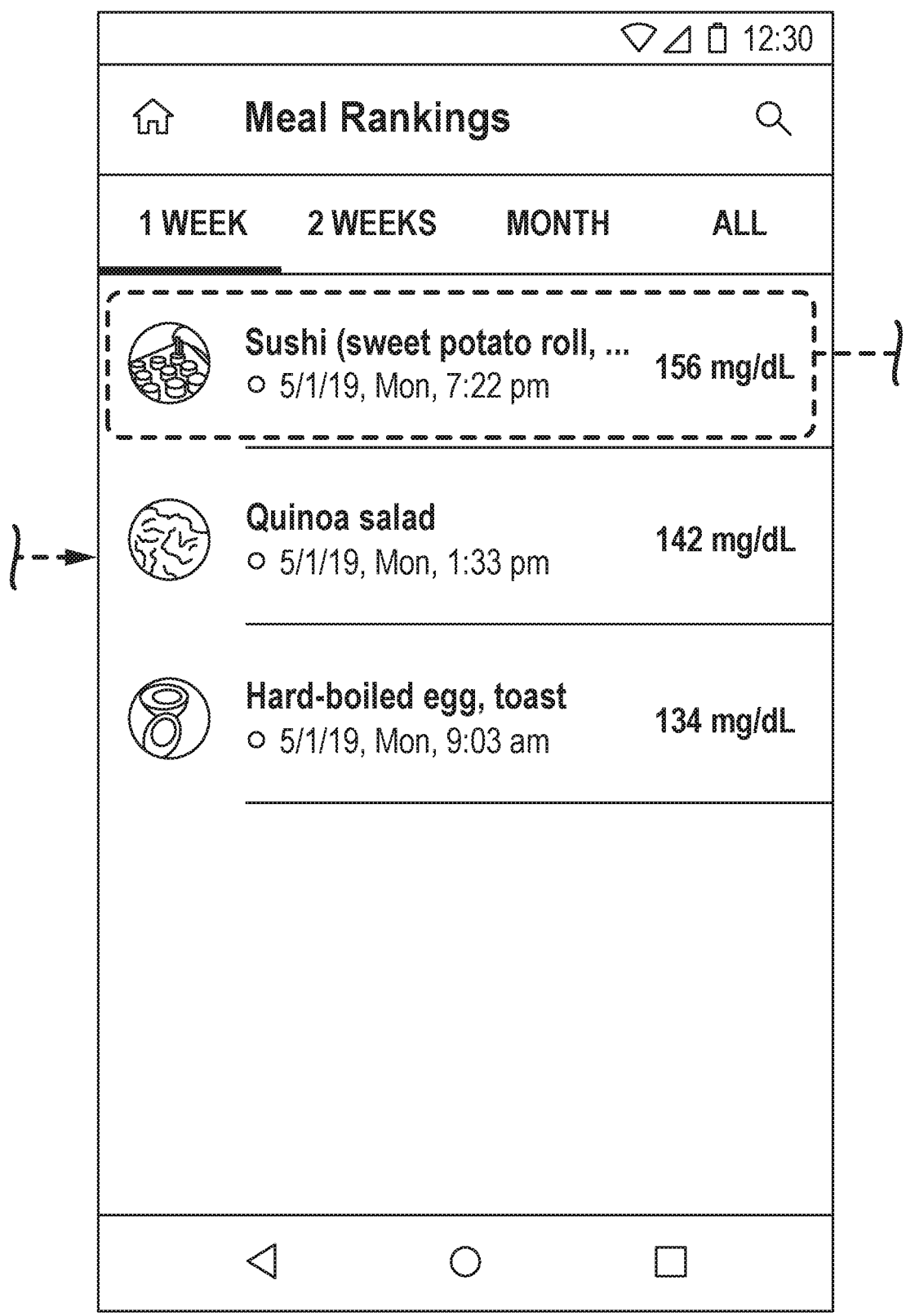
Figure 14B:
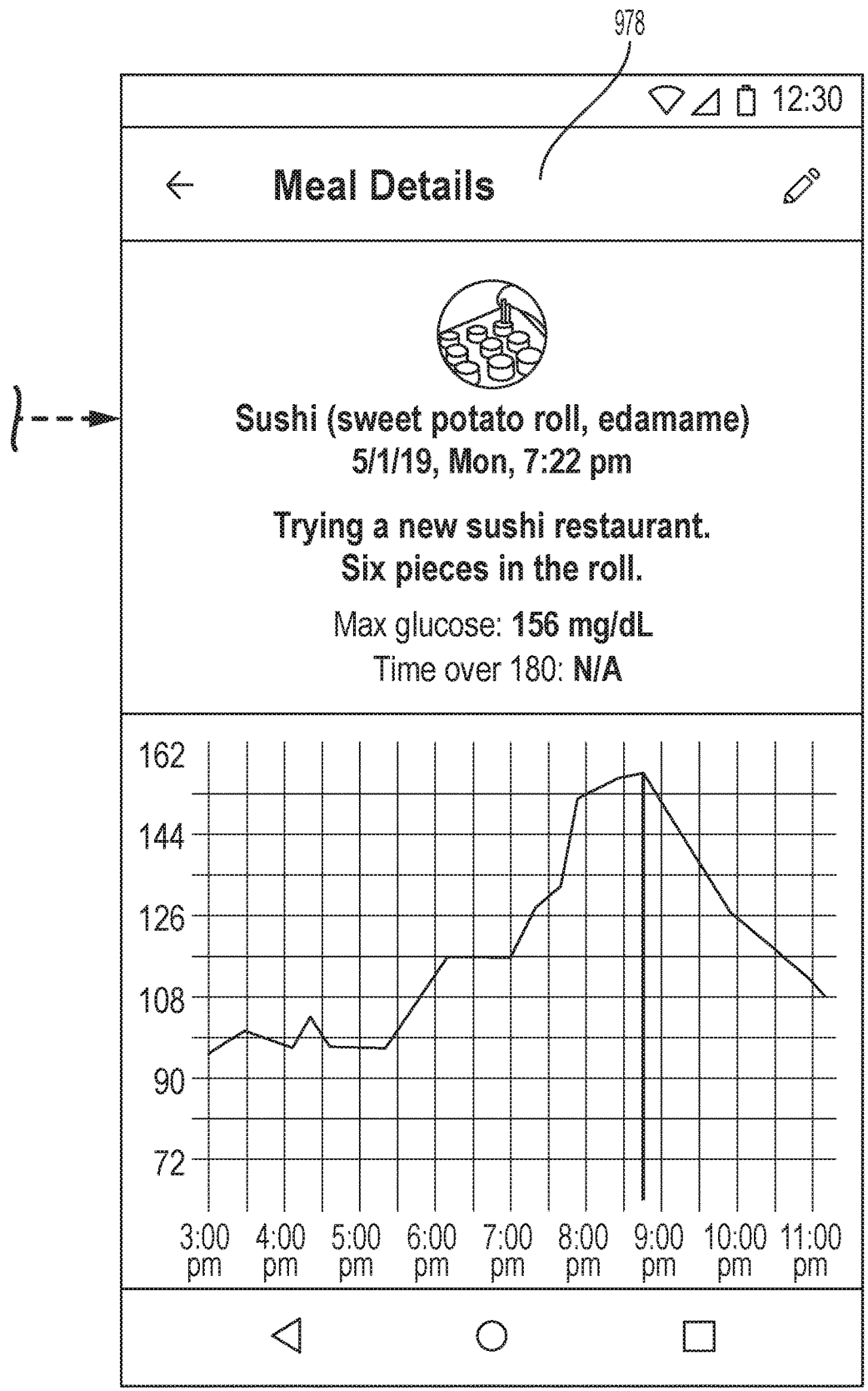

In an alternative embodiment of the application, as seen in FIGS. 14A and 14B, the user may access a list of meals ranked according to the corresponding glucose level recorded. A meal rankings screen 970 can be accessed from meal ranking icon 884 on the menu screen 880. The meal ranking screen 970 can list all of the meals logged in different time periods 974 (e.g., daily, 1 week, 2 weeks, month, all). In the meal list 972, the meals can be ordered from highest glucose level to lowest glucose level or alternatively, from lowest glucose level to highest glucose level, where the glucose levels may be the highest glucose concentration associated with that meal event. As seen in FIG. 14B, the user can select a meal and a meal details screen 978 or log detail screen 840 can open to show all of the details of the meal, including a picture, description, maximum glucose level, time over 180, and a glucose concentration graph containing the relevant time period in which the meal was eaten.

Figures 1, 13D:
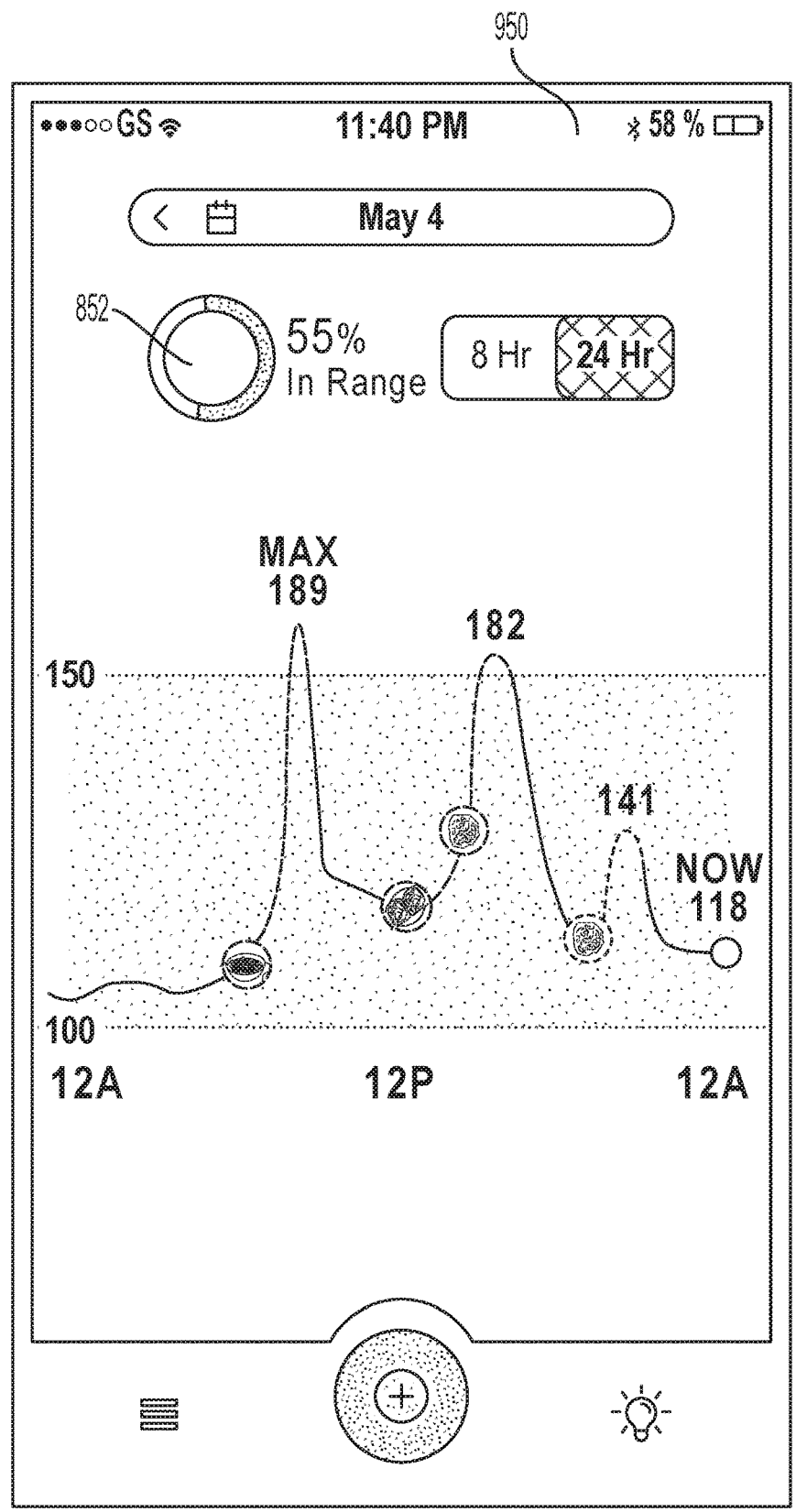
Figures 2, 13D:
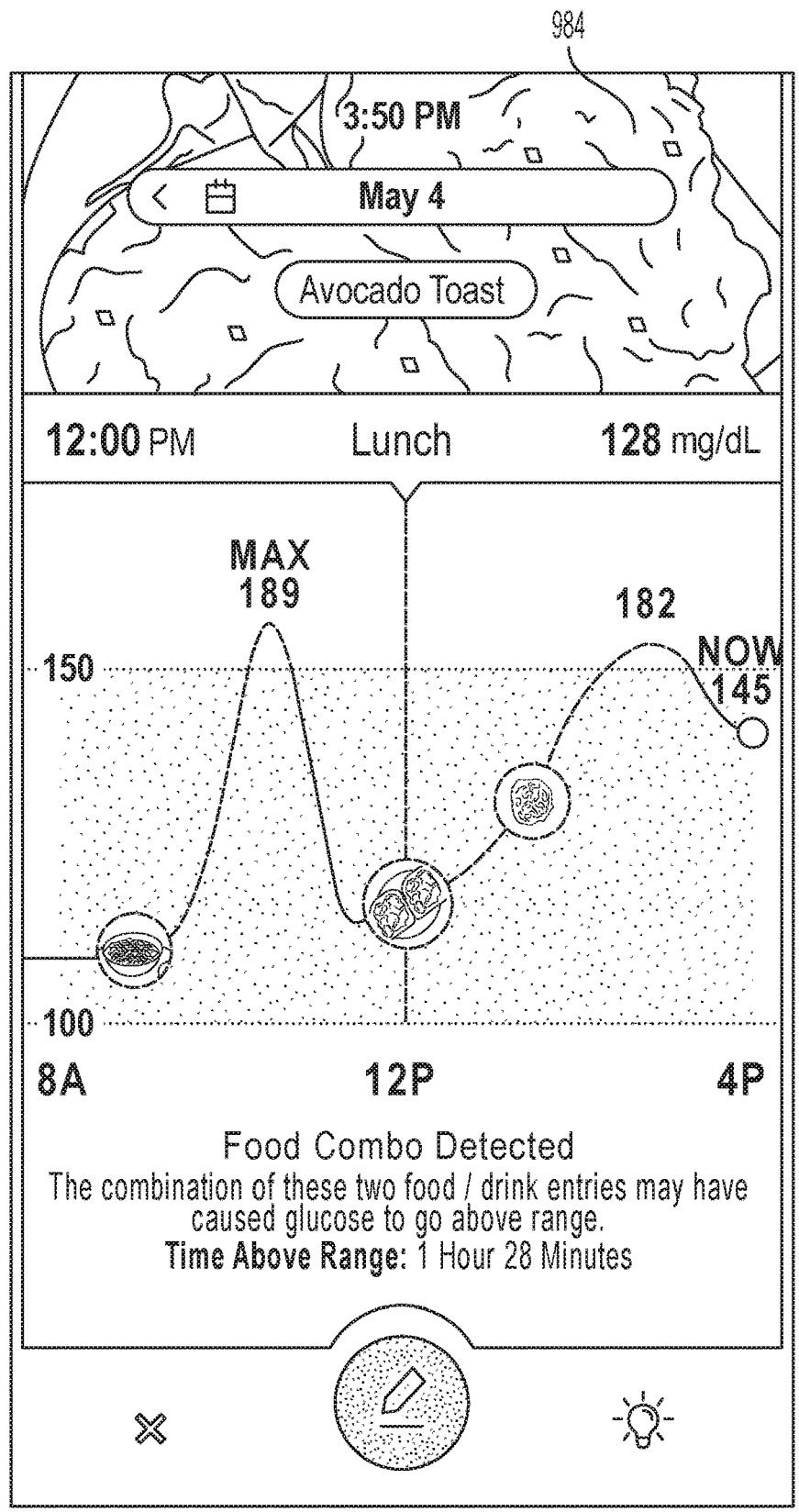
Figures 3, 13D:
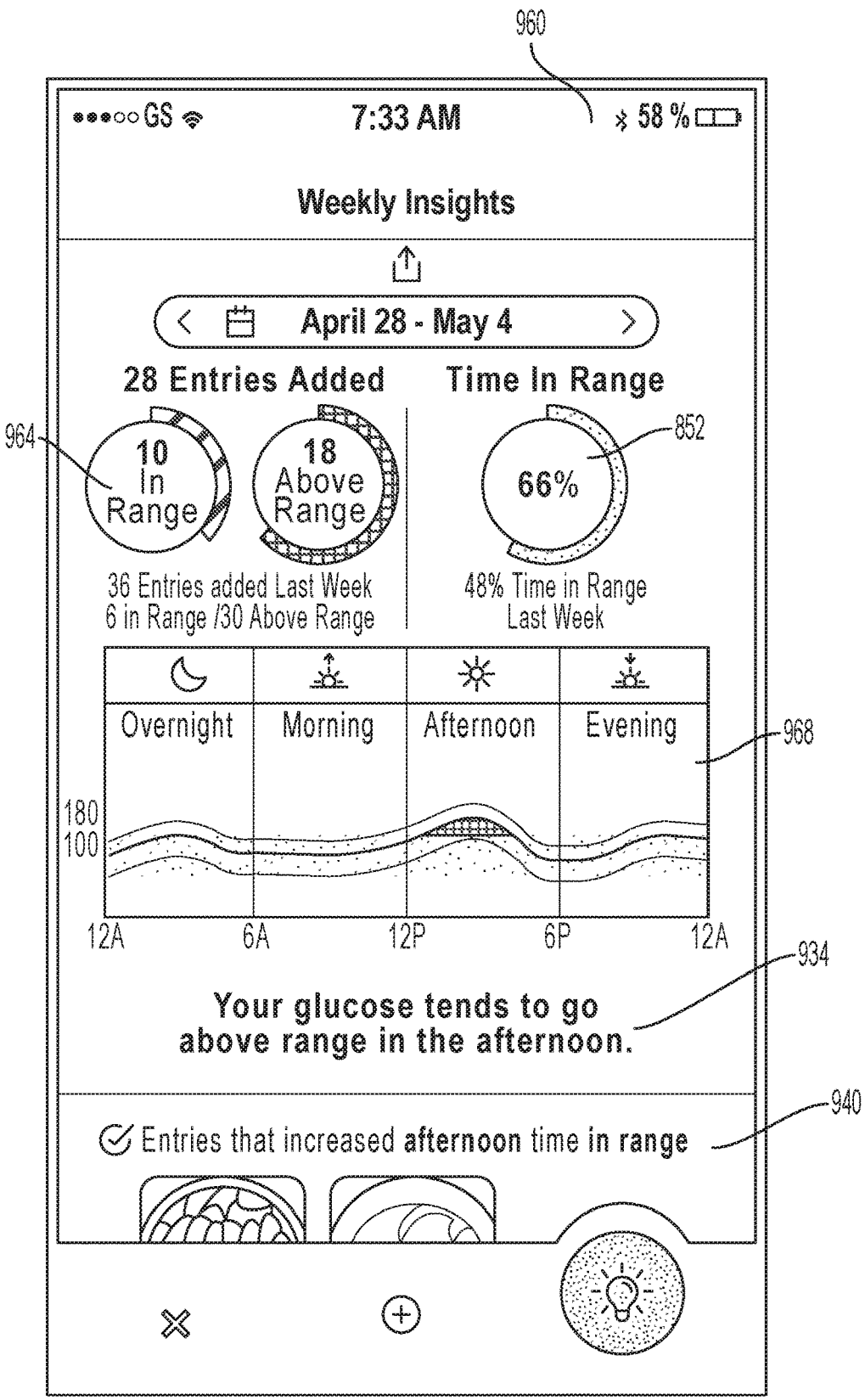

In the alternative embodiment of the application, as seen in FIGS. 13D-1-13D-3, the user can also have access to time-of-day (TOD) instance ranking instead of meal specific ranking. The user is able to view the meals, drinks, and snacks with each TOD instance. As seen in an alternative home screen 980, the user can easily see the food and drink associated with the glucose response curve, along with a daily TIR display 852. By clicking on a meal icon, the user can open a log details screen 984 that gives more details about the meal, which can include a picture of the meal, a description, and the time above range that resulted from that meal.

Figure 15A:
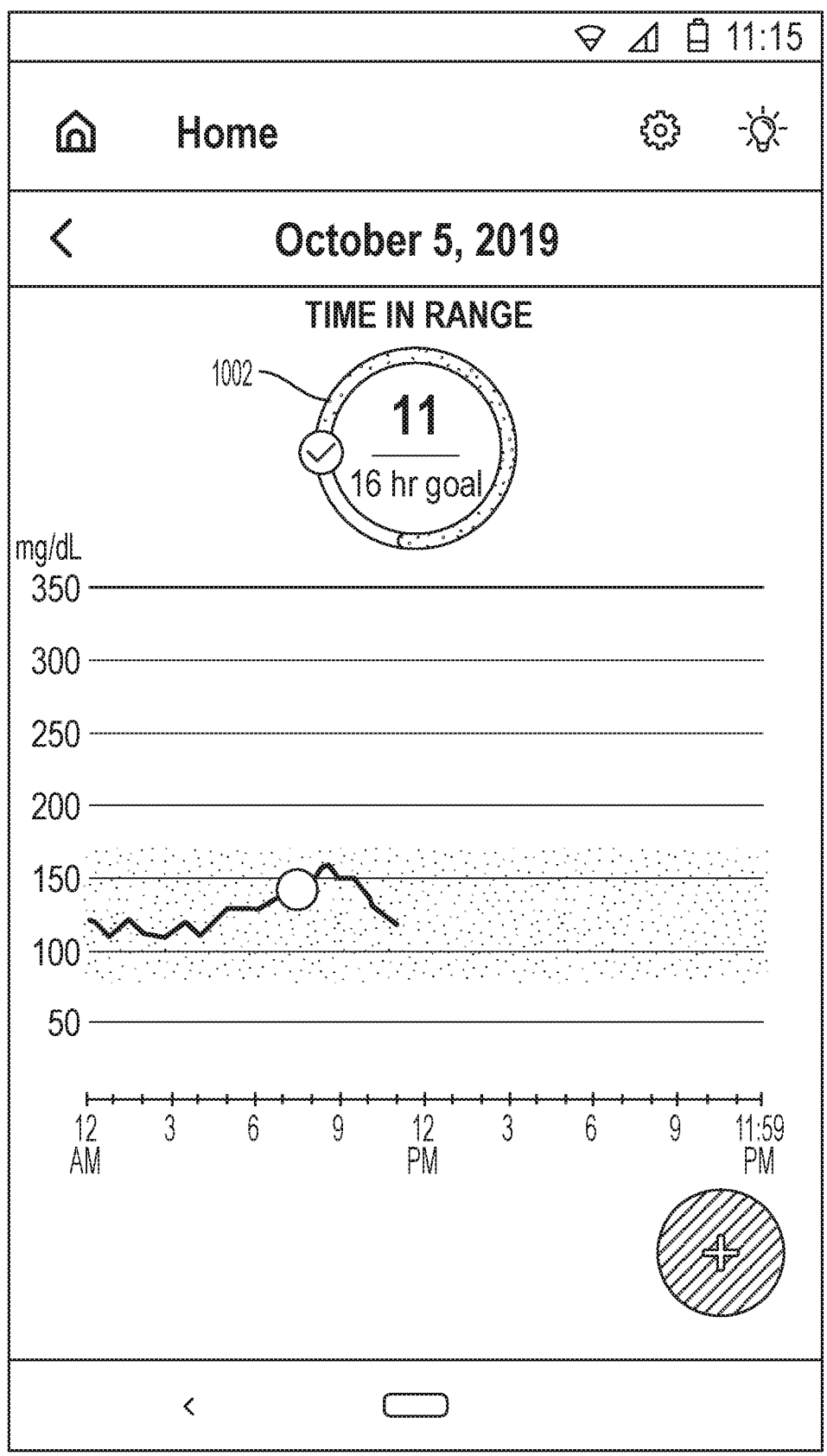
FIGS. 15A-15C depict example embodiments of graphical user interfaces for displaying time in range metrics.
Figure 15B:
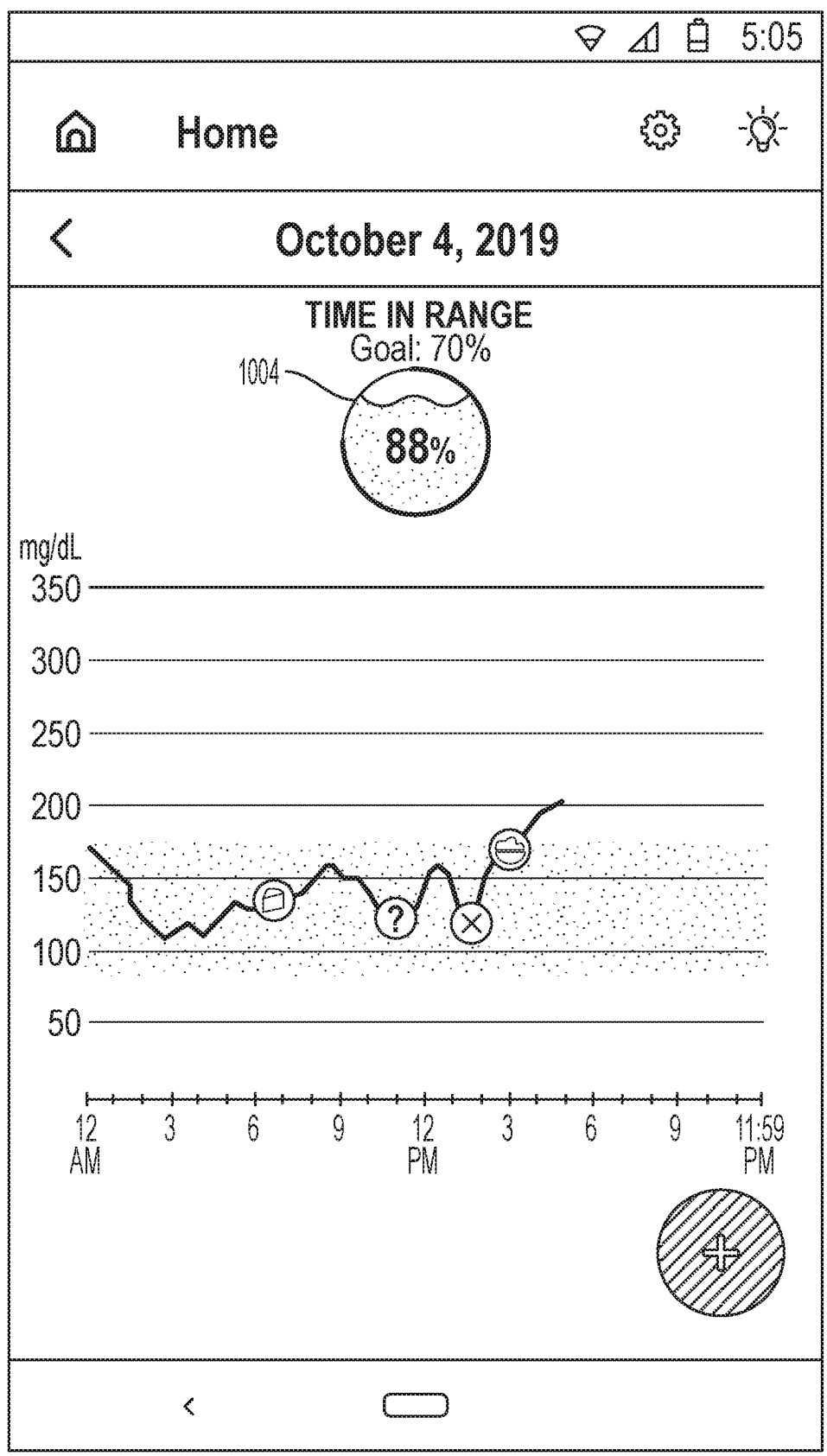
Figure 15C:
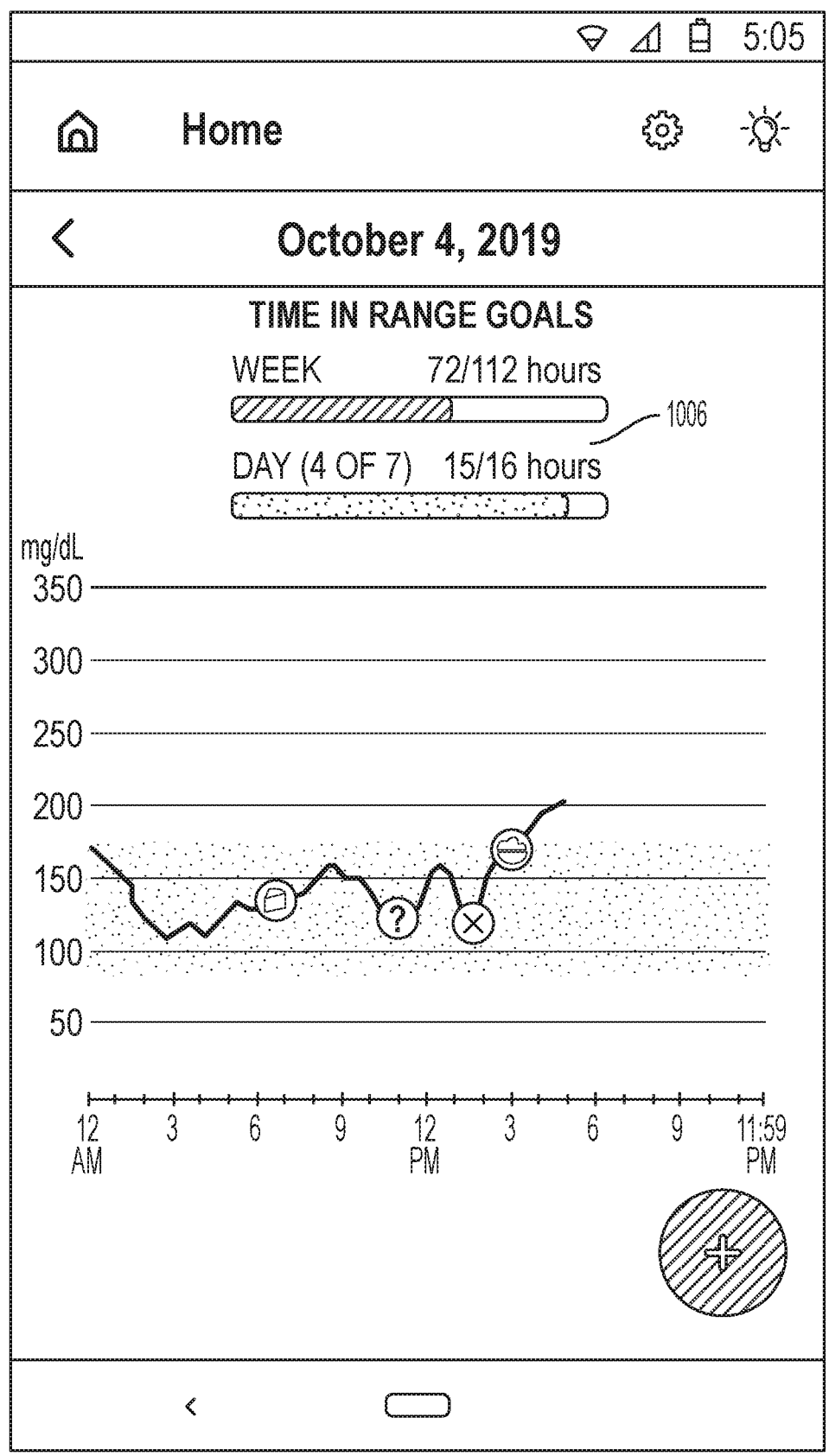

Alternative TIR displays are shown in FIGS. 15A-C, which highlights hours in range using circles (FIG. 15A), percentage of hours in range using circles with a portion of the circle shaded (fill the bucket) (FIG. 15B), and hours in range using bars (FIG. 15C). As seen in FIG. 15A, TIR display 1002 shows a circle with the goal (number of hours for TIR) inside. The current number of hours that the user has spent in the target/goal range can be displayed two ways: the numerical value may be listed inside the circle, along with the goal value, and the number of hours may be visually displayed as a band or progress indicator (e.g., colored green) extending along the perimeter of the circle to X % of the total perimeter of the circle, to indicate that the user has spent X % TIR (where X % is the amount of hours spent in range divided by the goal in hours). As seen in FIG. 15B, TIR display 1004 shows a circle with the goal percentage listed near (e.g., above or below) the circle. The percentage of TIR can be displayed two ways: the numerical value may be listed inside the circle and the number of hours may be visually displayed as a band or progress indicator (e.g., black) extending along the perimeter of the circle the perimeter of the circle to a X % of the total perimeter of the circle, to indicate that the user has spent X % TIR. The inside of the circle may also be partially shaded to reflect the current percentage of TIR (similar to filling a bucket of water), where the percentage shaded is proportional to the % of the TIR so far for that time period. For example, if the user has 88% TIR, 88% of the area of the circle is shaded. As seen in FIG. 15C, TIR display 1006 may also use bars or other progress indicators to visually depict the user's TIR relative to the TIR goals. TIR display 1006 displays both the TIR goals for the day so far and for the week so far. The length of the bar can represent the total goal and the bar will be filled to represent the percentage of TIR that the user has achieved for that specific time period. The TIR bars for the day and the week can be in different colors.

Figures 1, 16A:
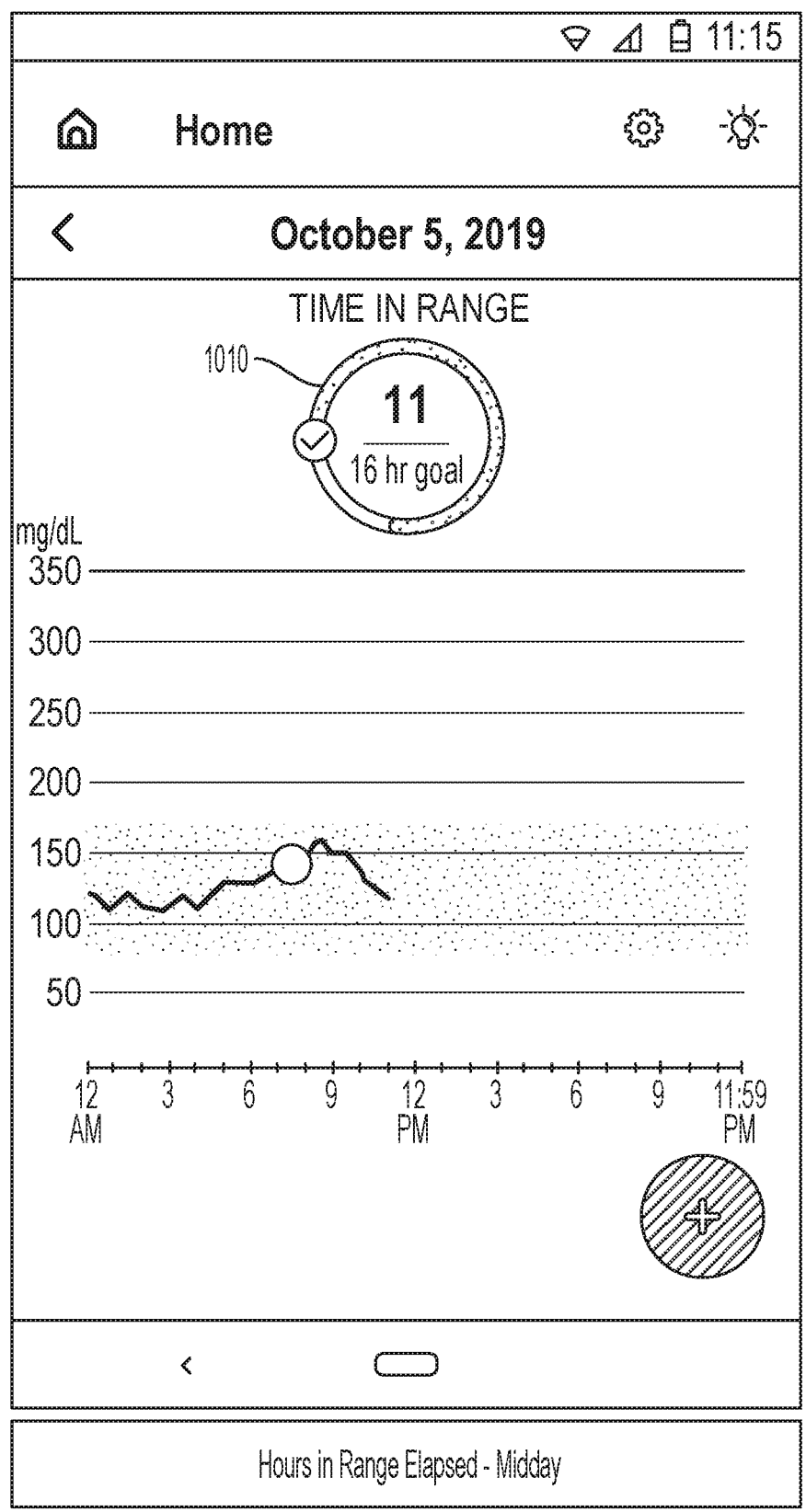
Figures 2, 16A:
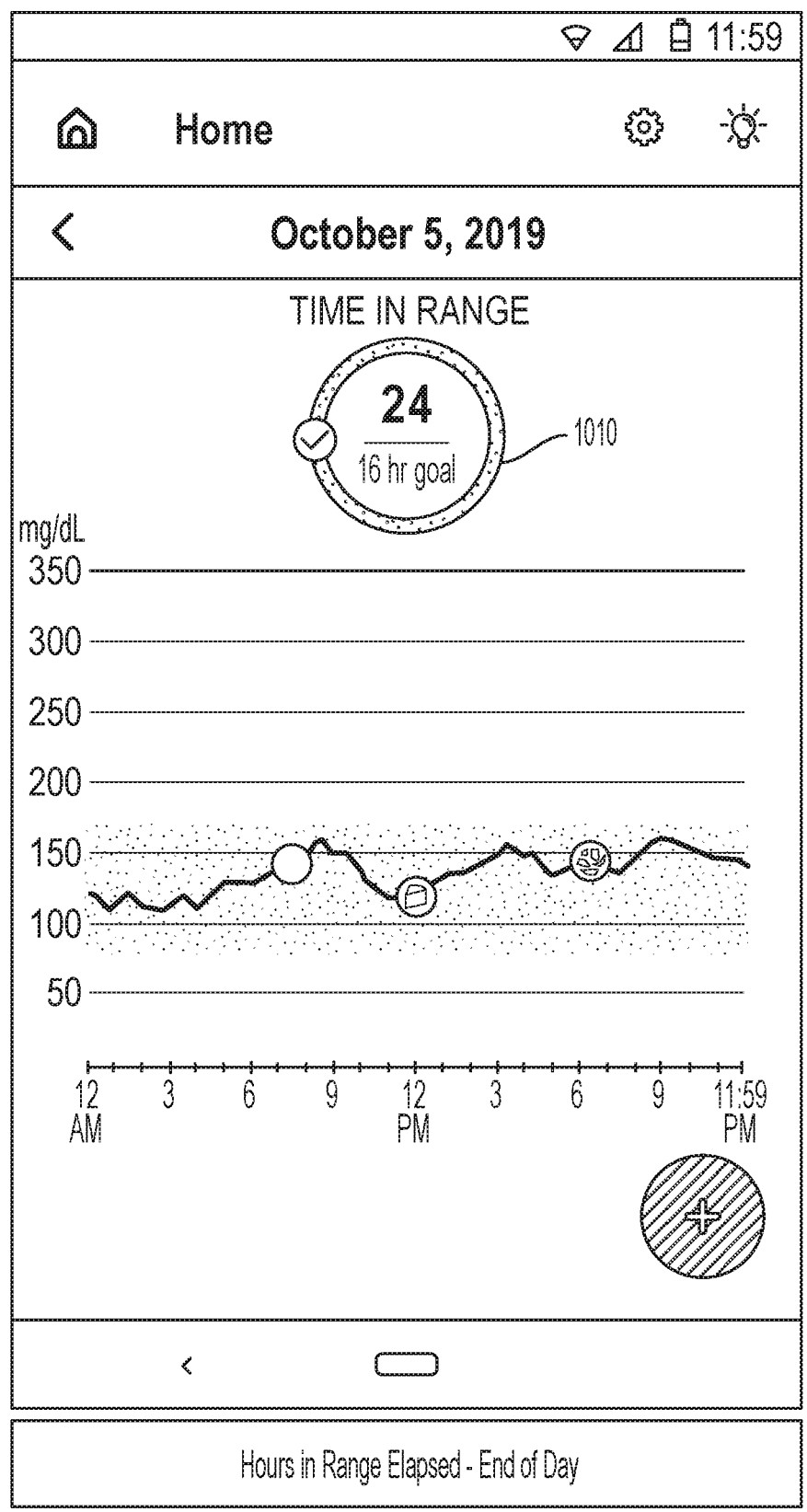
Figures 1, 16B:
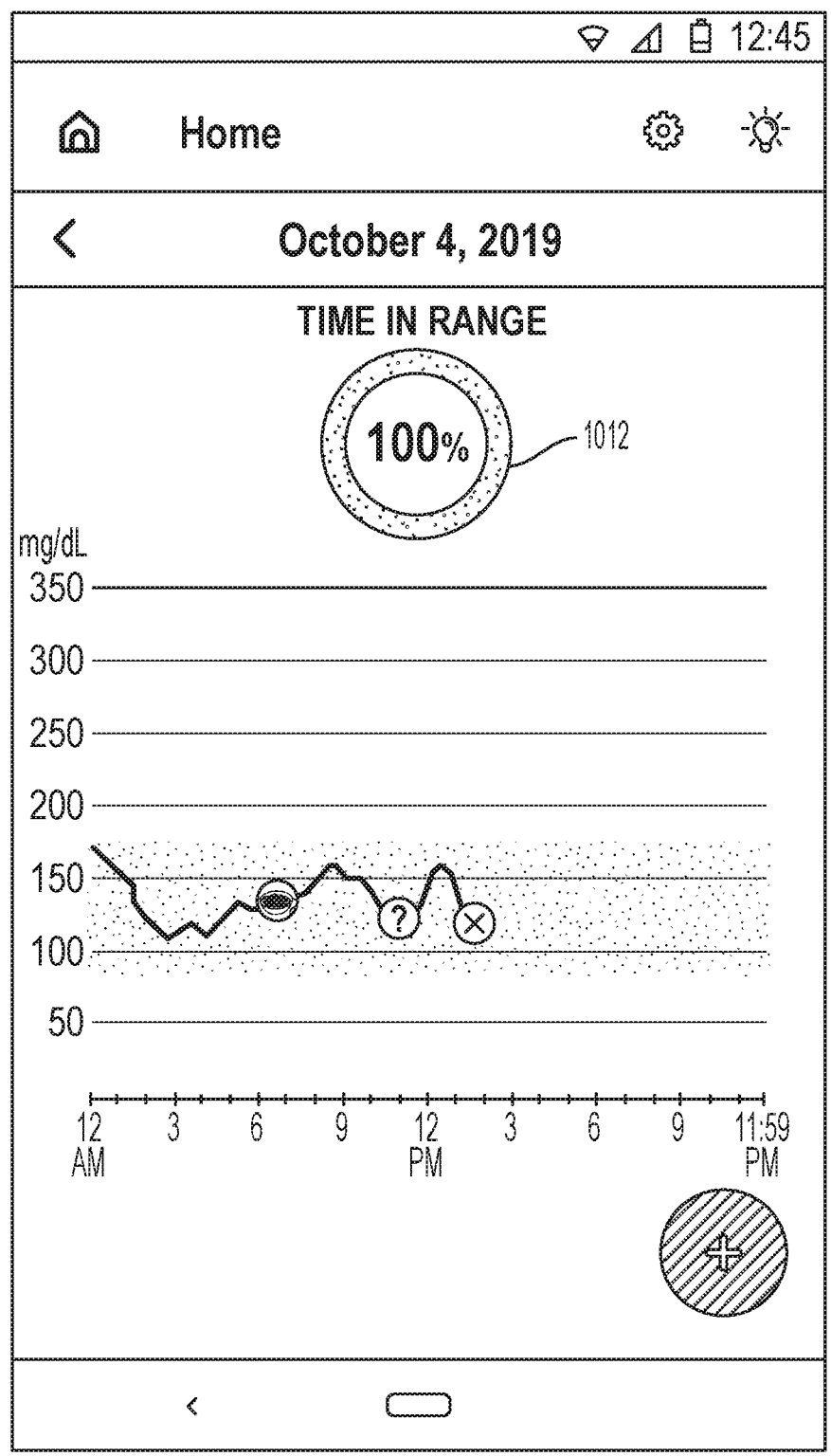
Figures 1, 16B:
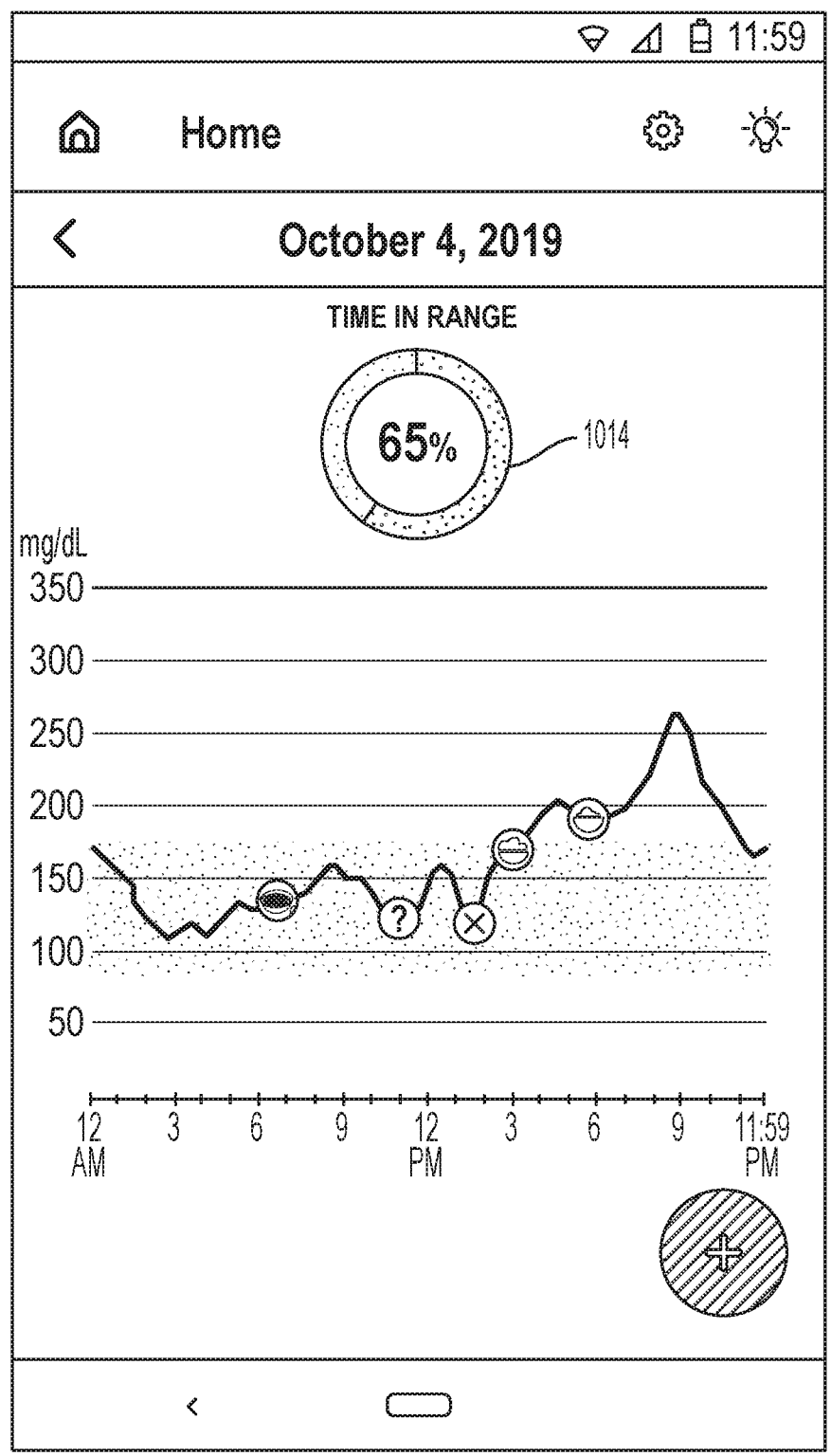
Figures 2, 16B:
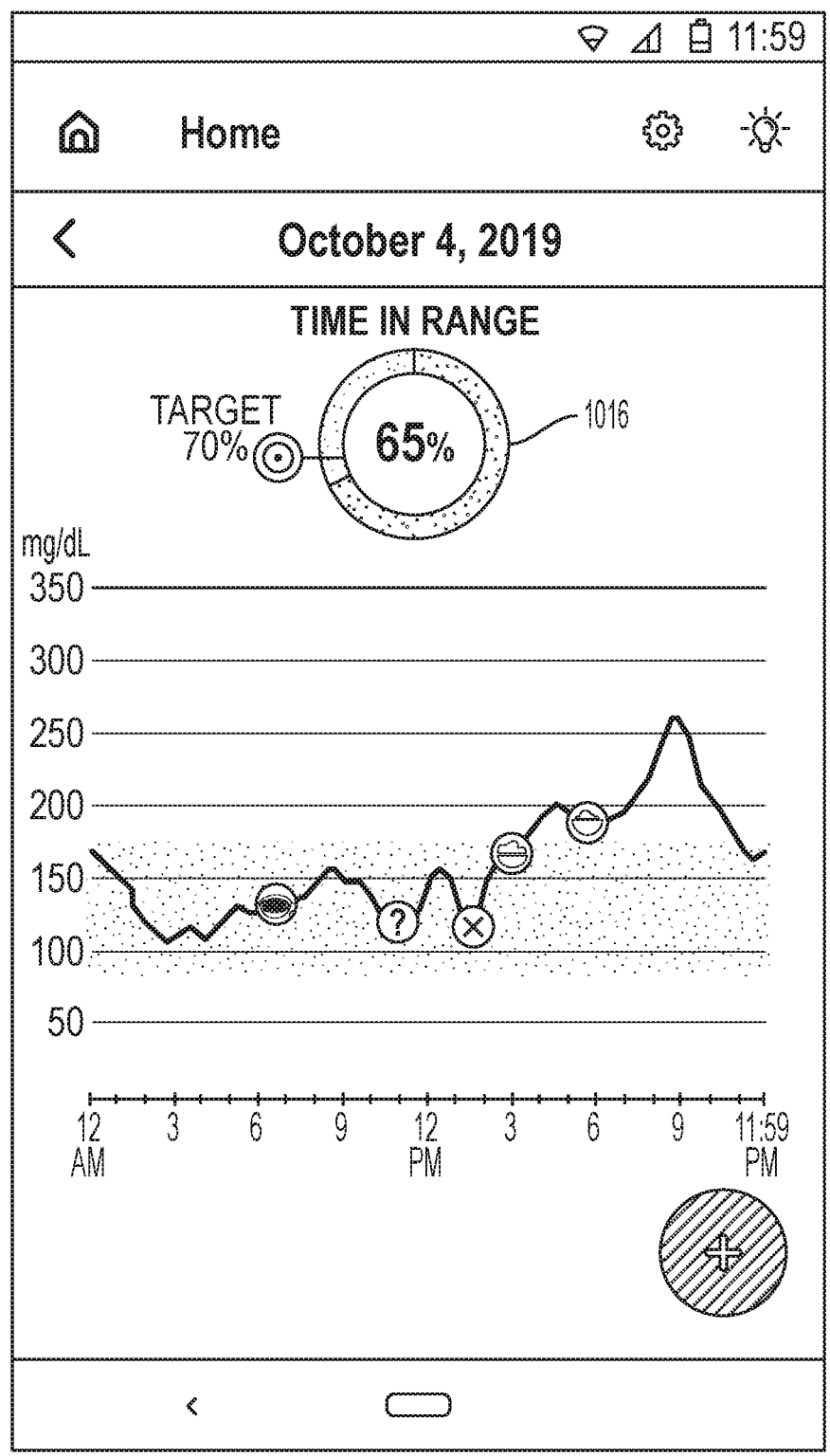
Figures 2, 16B:
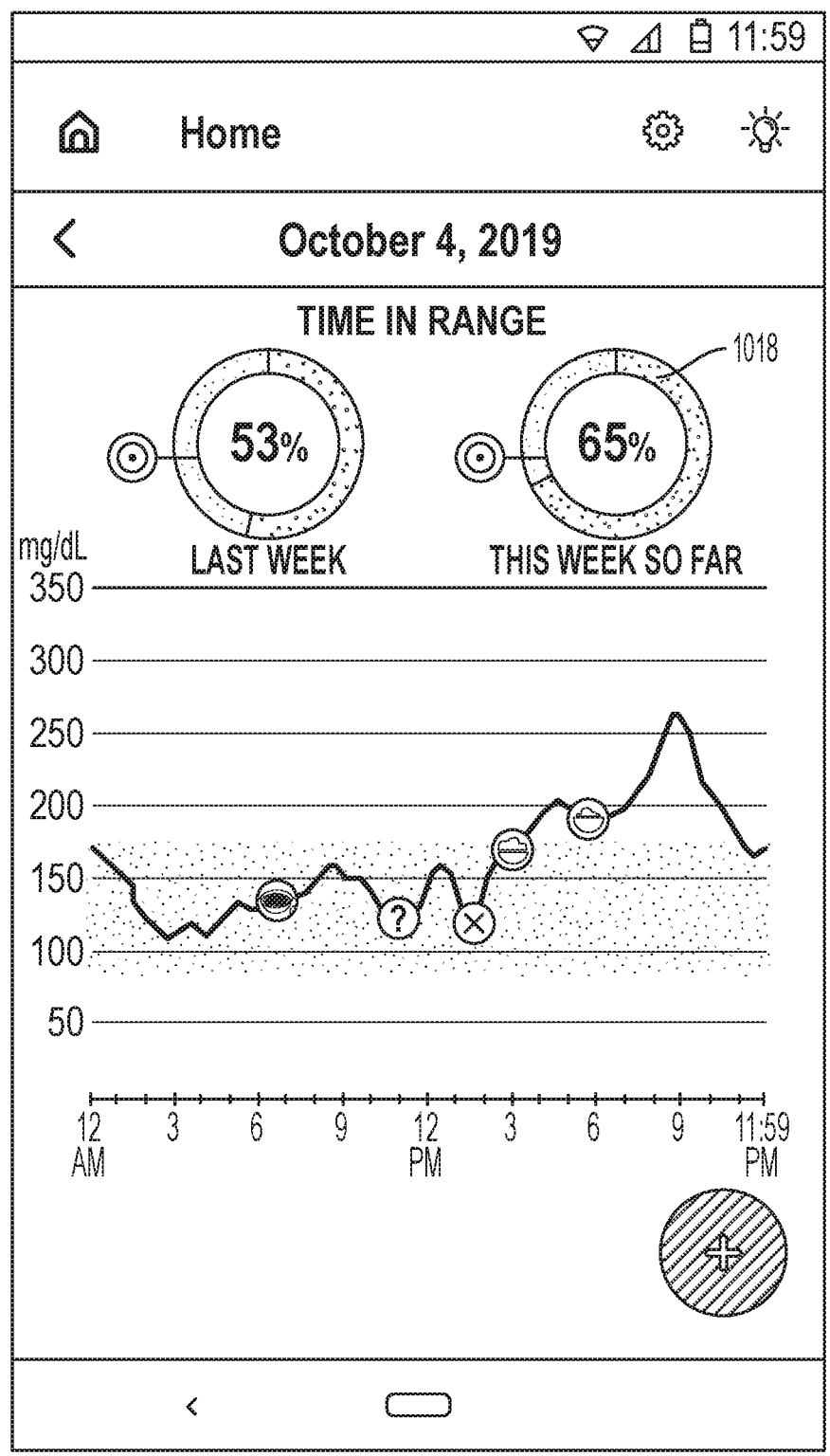
Figures 1, 16C:
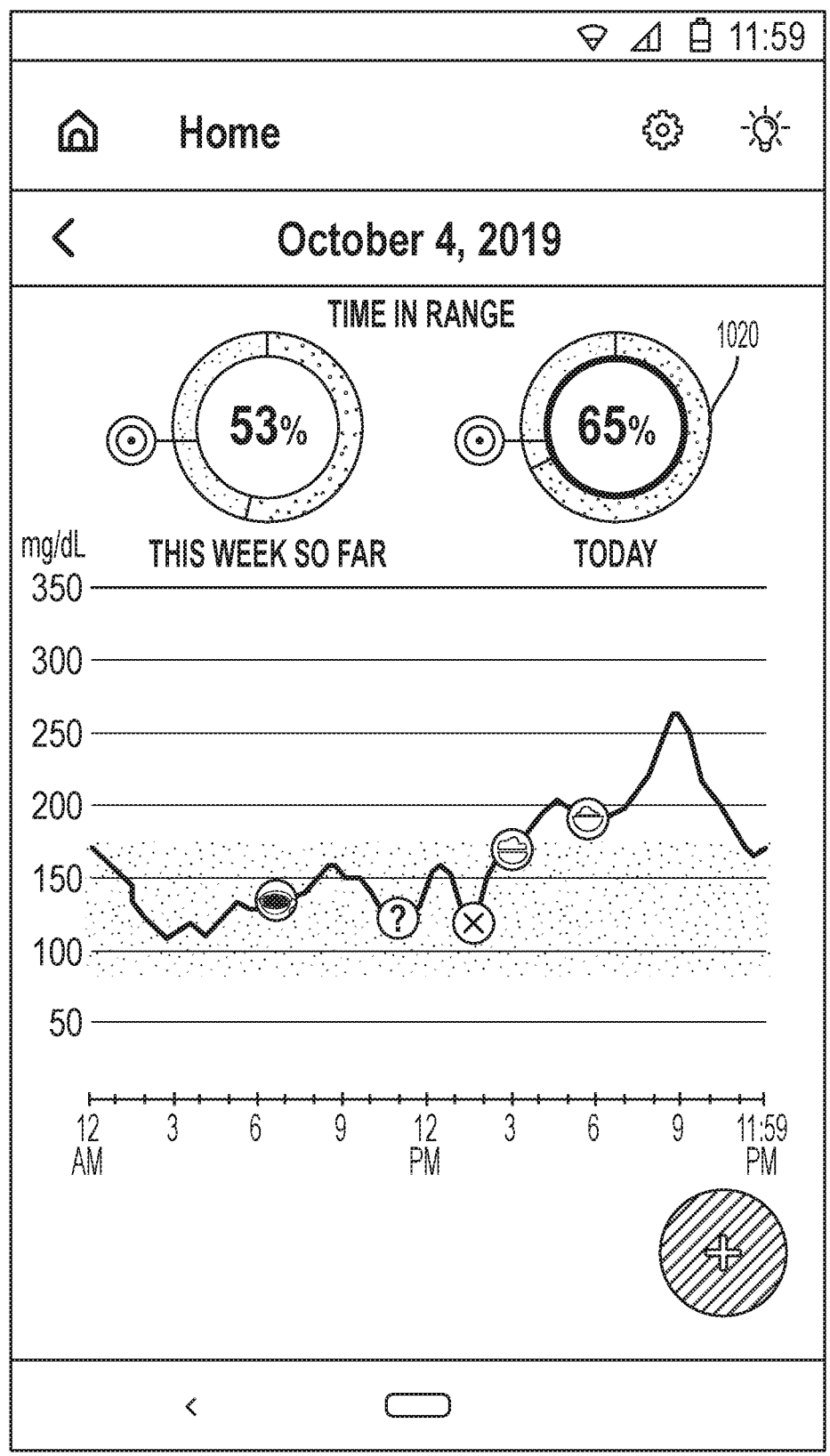
Figures 1, 16C:
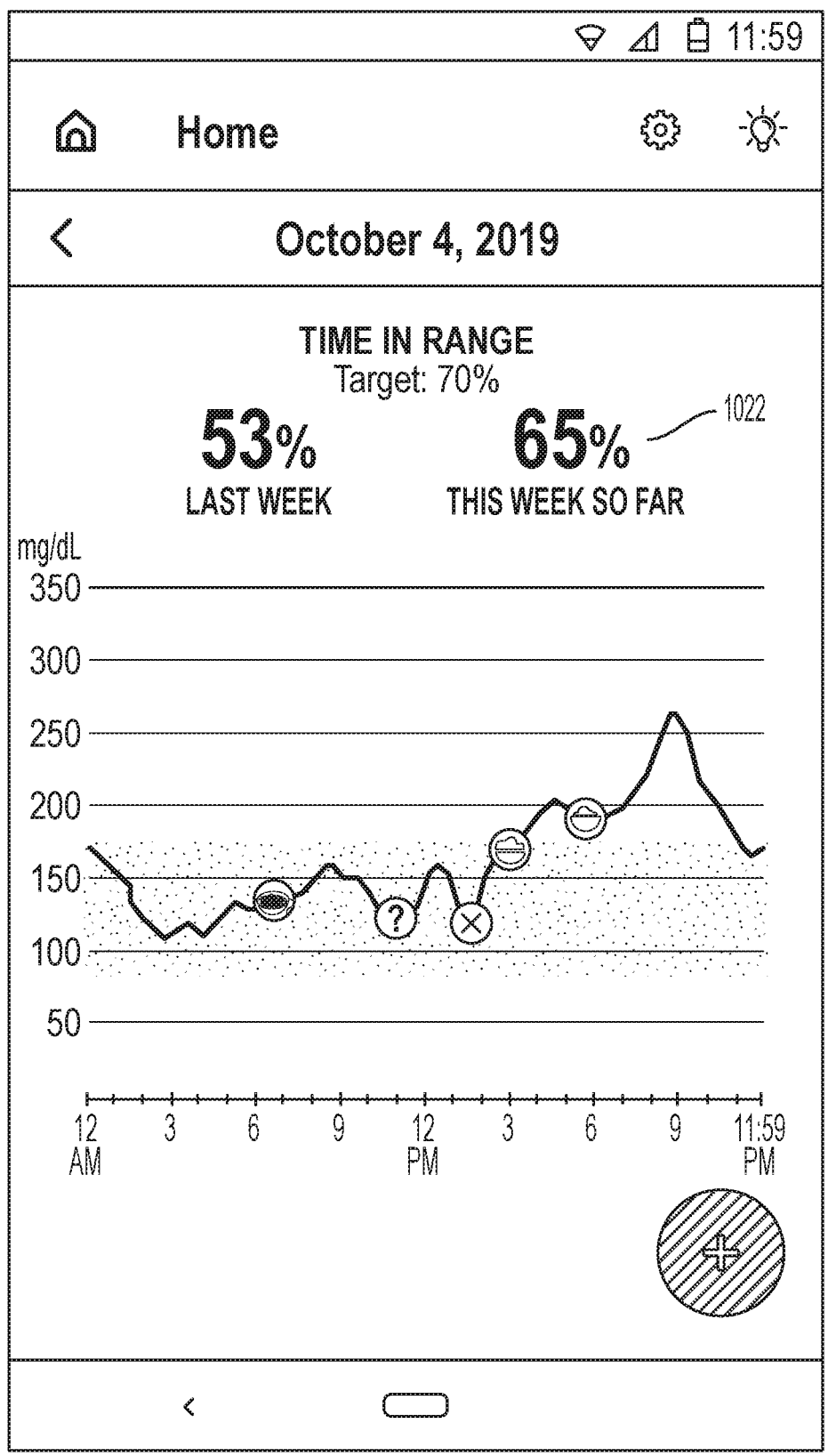
Figures 1, 16C:
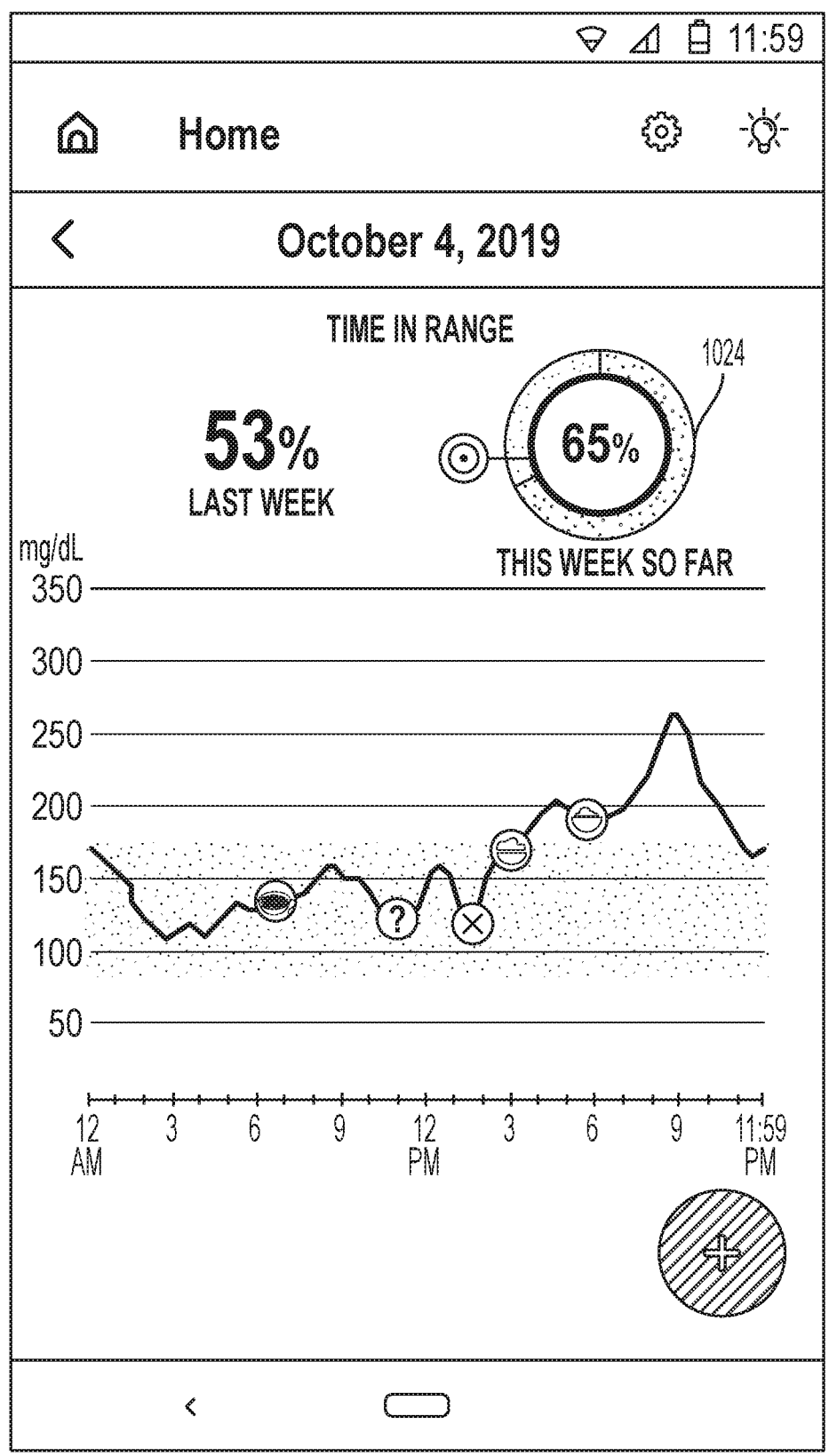
Figures 2, 16C:
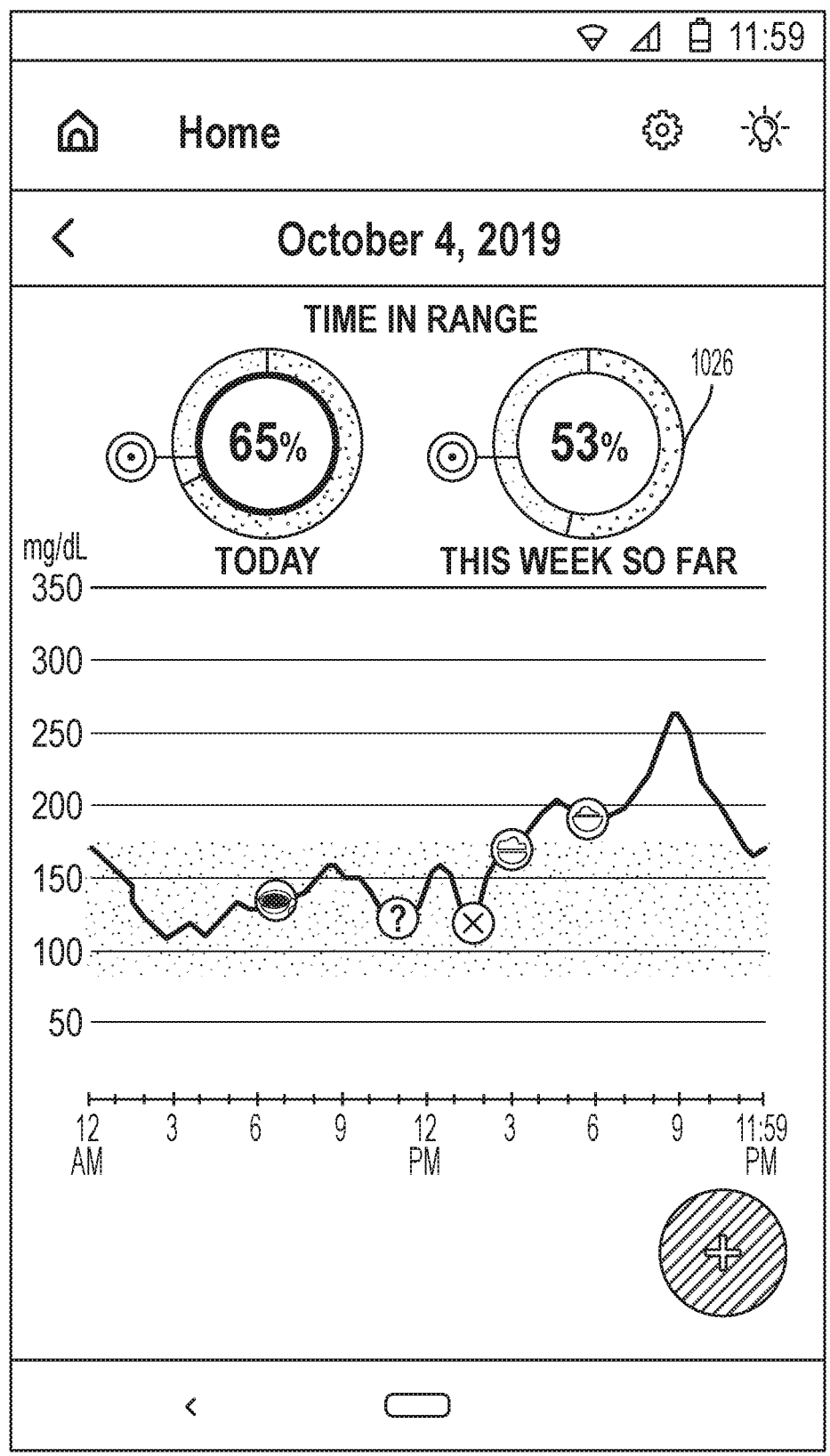
Figures 2, 16C:
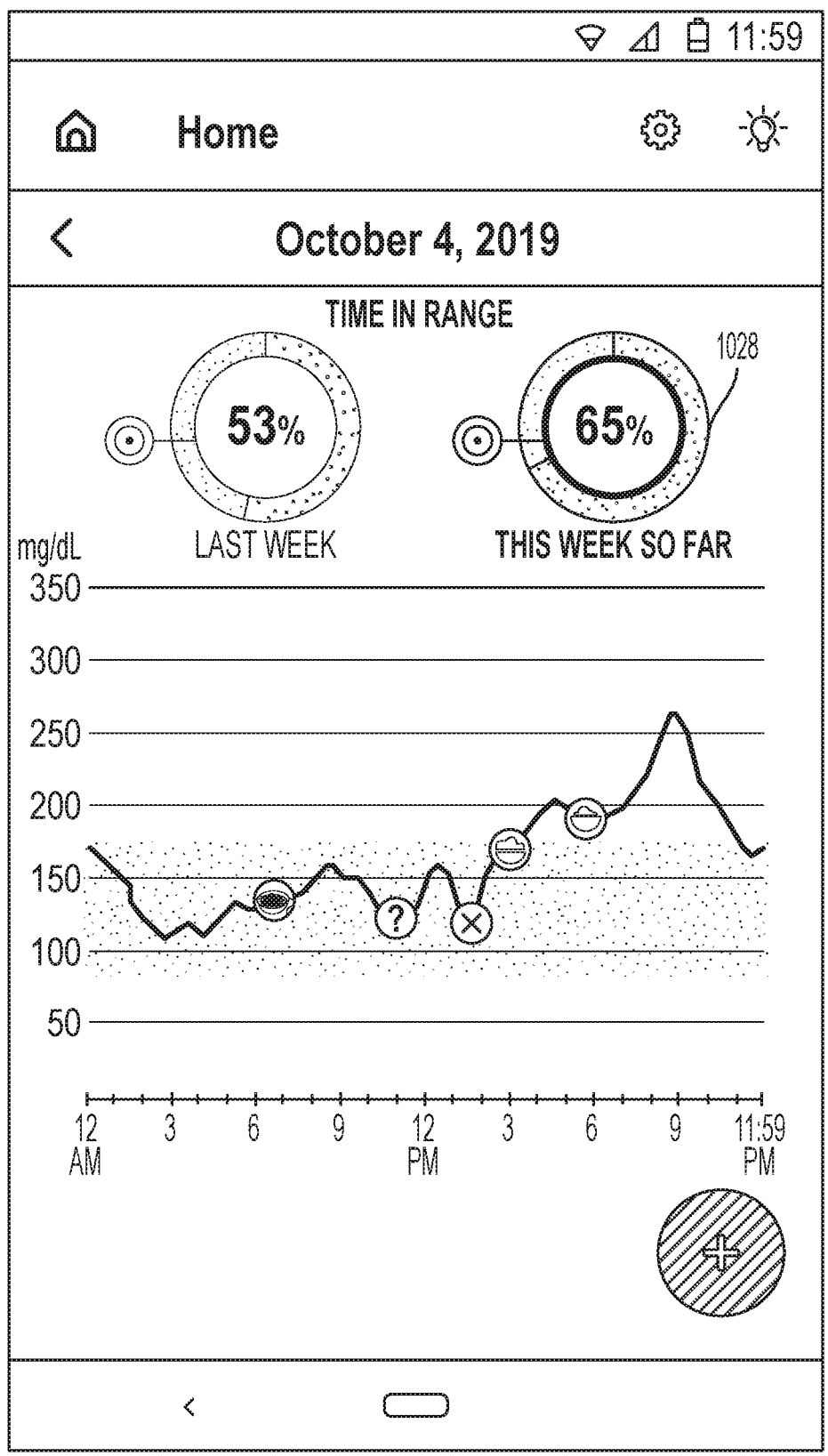
Figures 1, 16D:
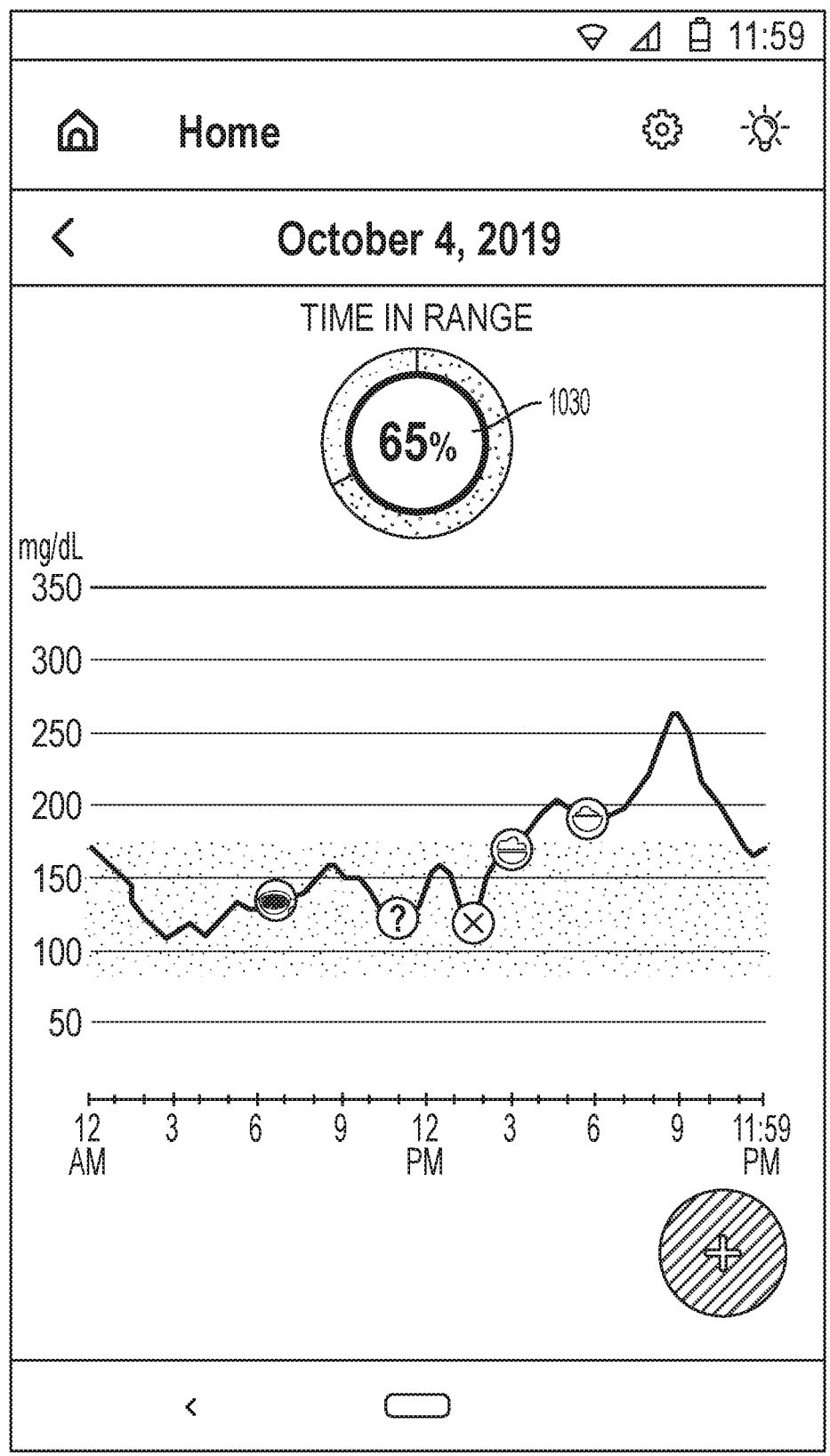
Figures 1, 16D:
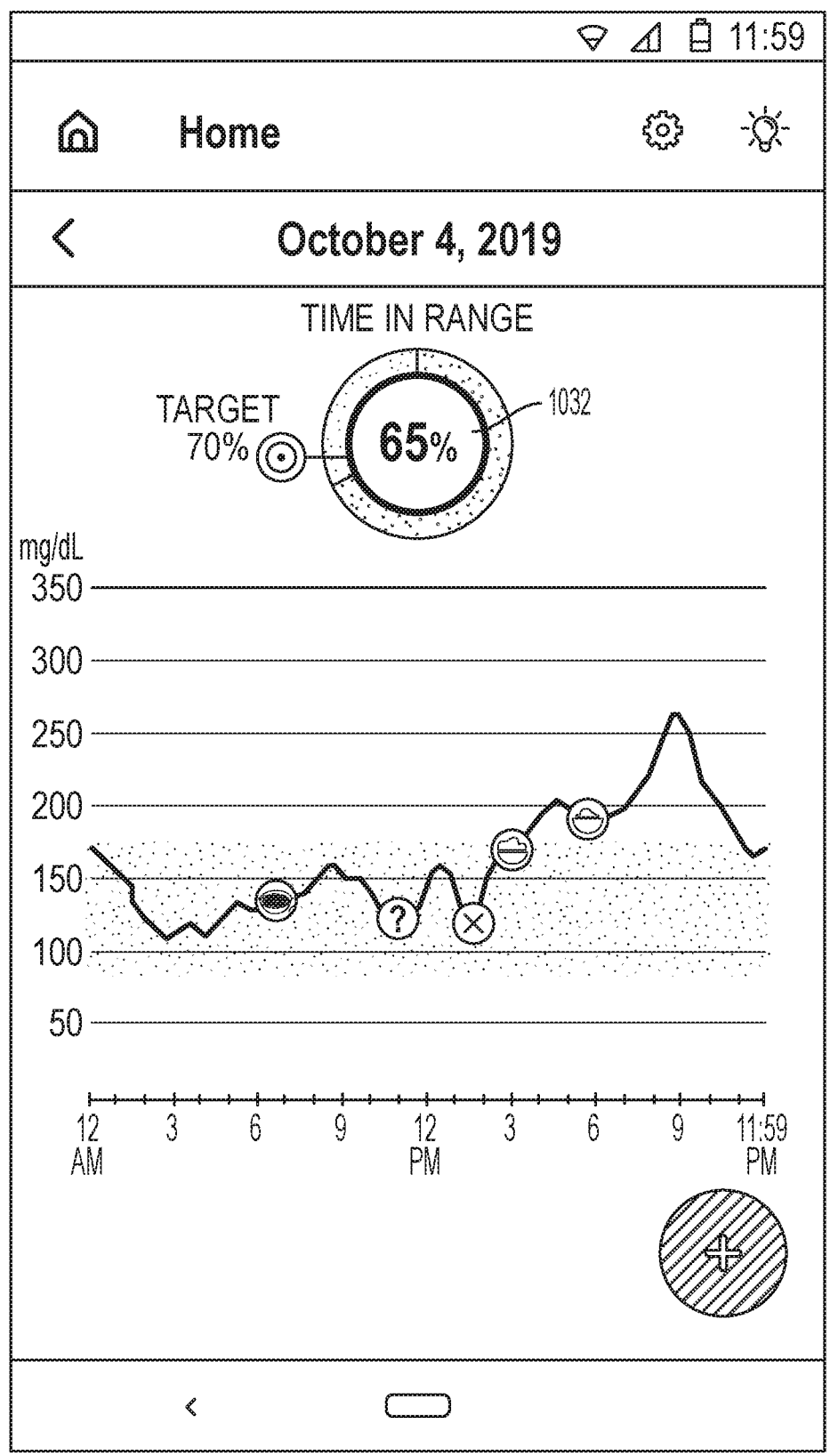
Figures 2, 16D:
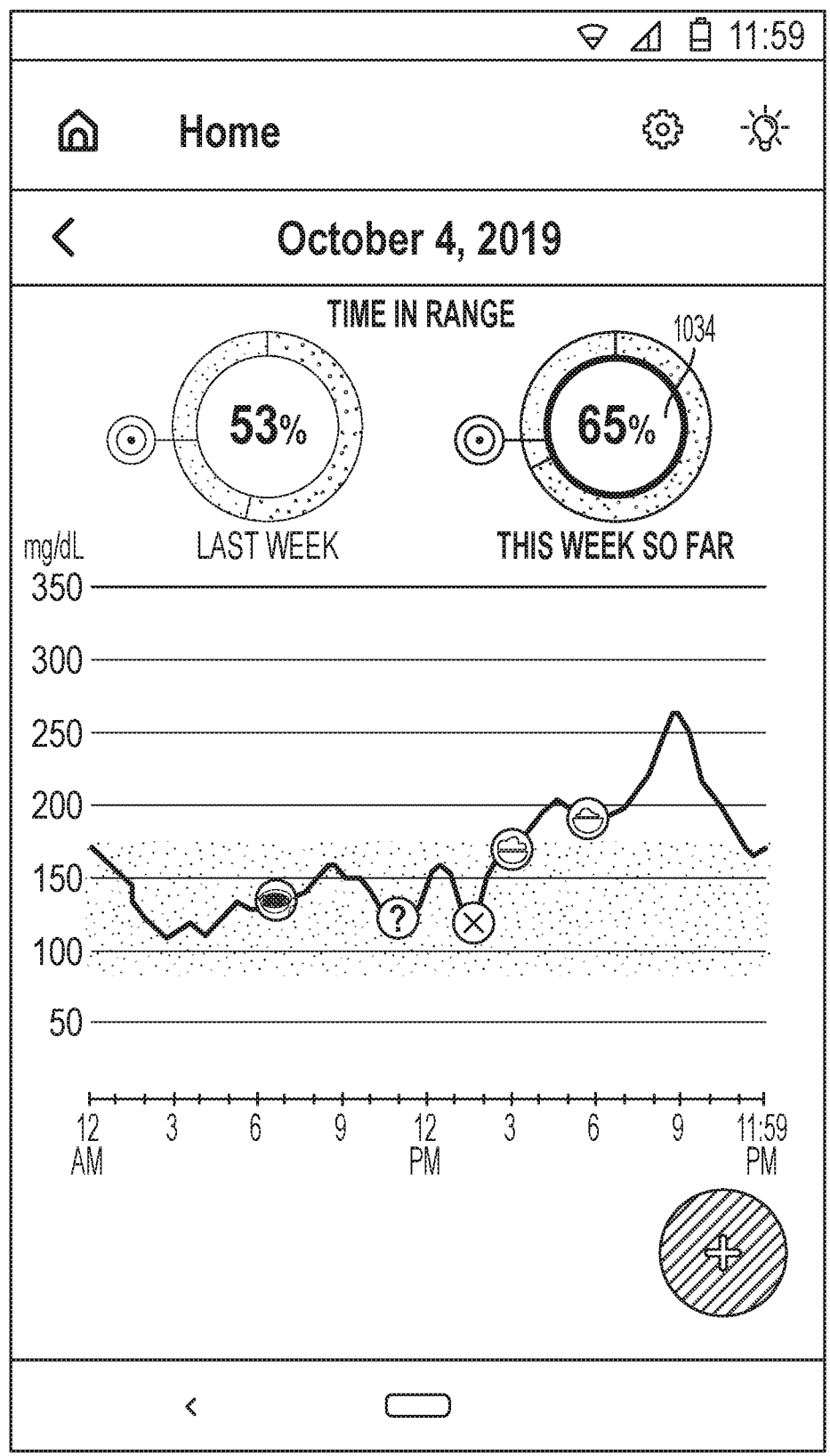
Figures 2, 16D:
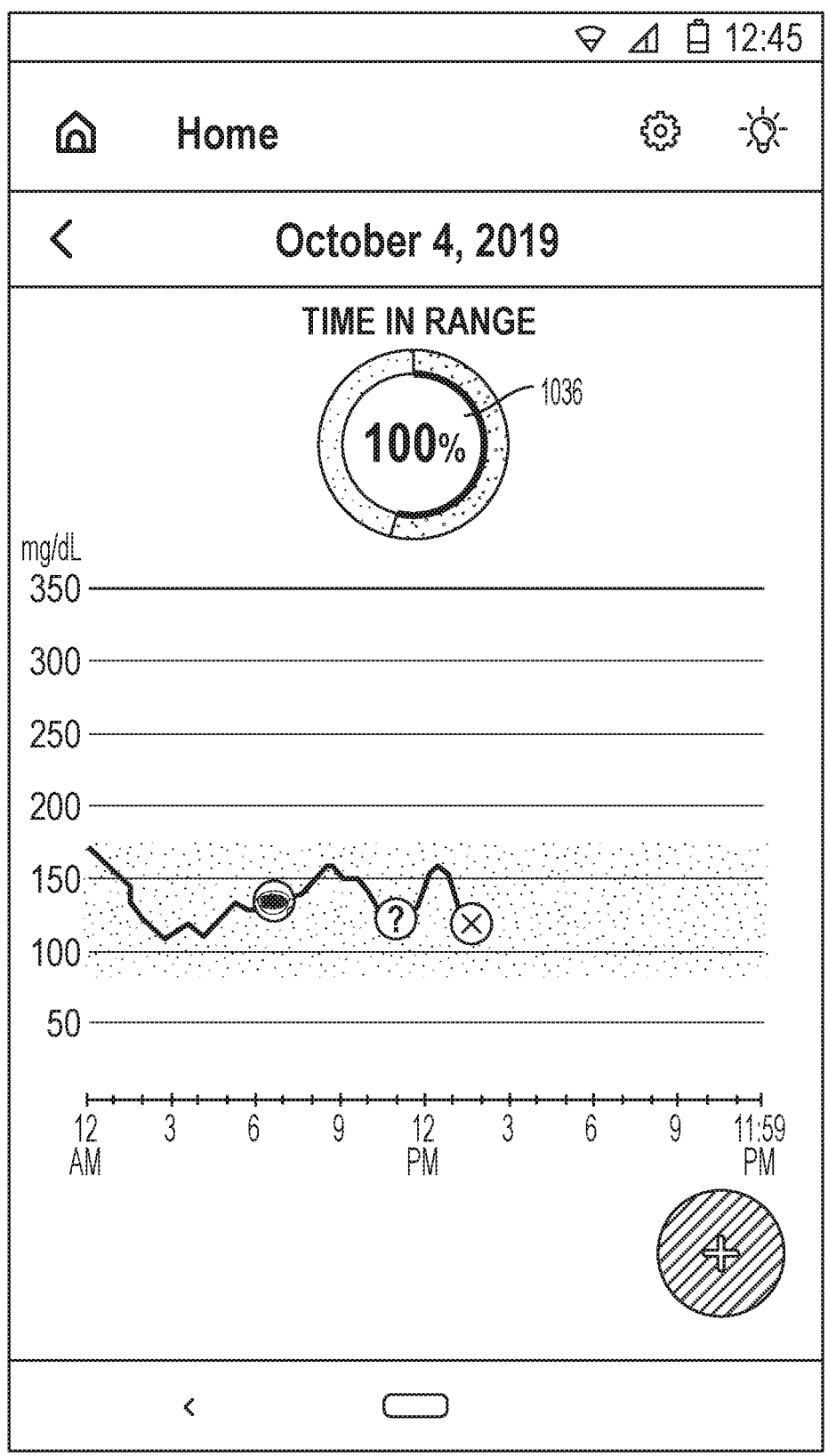

In alternative embodiments, as seen in FIGS. 16A-1-16A-2, TIR display 1010 can display the elapsed hours that are in range, along with the hours in range and the goal hours reported in the center of the circle. A band or progress indicator (e.g., colored green) can extend along the perimeter of the circle to X % of the total perimeter of the circle, to indicate that the user has spent X % TIR (where X % is the amount of hours spent in range divided by the goal in hours). For example, in FIG. 16A-1, the user has been in range for 11 hours so far and the circle shows a visual indication of the percentage of hours in range relative to the hour goal (16 hours) with a band or progress indicator (e.g., colored green) extending along the perimeter of the circle the perimeter of the circle to cover 11/16 of the total perimeter of the circle. FIG. 16A-2 shows the hours elapsed in the goal/target range at the end of the day. FIGS. 16B-1-16B-2 illustrate alternative TIR displays 1012, 1014, 1016, 1018 with simple ring options. TIR displays 1012, 1014, 1016, 1018 display the current percentage of TIR in the center or a circle and include the band, as described in other TIR displays, to visually illustrate the TIR. Instead of listing the goal percentage inside the circle, alternative TIR displays 1016 and 1018 can include a marker that intersects a position along the perimeter of the circle corresponding to the goal percentage so that the user can quickly determine of their TIR percentage is above or below their goal percentage. FIGS. 16C-1-16C-2 illustrate alternative TIR displays 1020, 1022, 1024, 1026, 1028 that have cumulative ring options. The TIR display may compare two or more different time periods. For example, the TIR display may show the TIR display for the current week so far and the current day so far (1020), the TIR display for the current week so far and the previous week without circles (1022), the TIR display for the current week so far and the previous week with circle(s) (1024), the TIR display for the current day and the current week so far (1026), and the previous week and the current week so far (1028). FIGS. 16D-1-16D-2 illustrate alternative TIR displays 1030, 1032, 1034, 1036 that have alternative cumulative ring options that report the percentage spent in the goal/target range in the center of a circle and the colored band (progress indicator) along a portion of the perimeter of the circle illustrating the relative percentage of TIR. The TIR displays optionally include a marker of the goal percentage along the perimeter of the circle corresponding to the relative position of the goal.

Figure 17A:
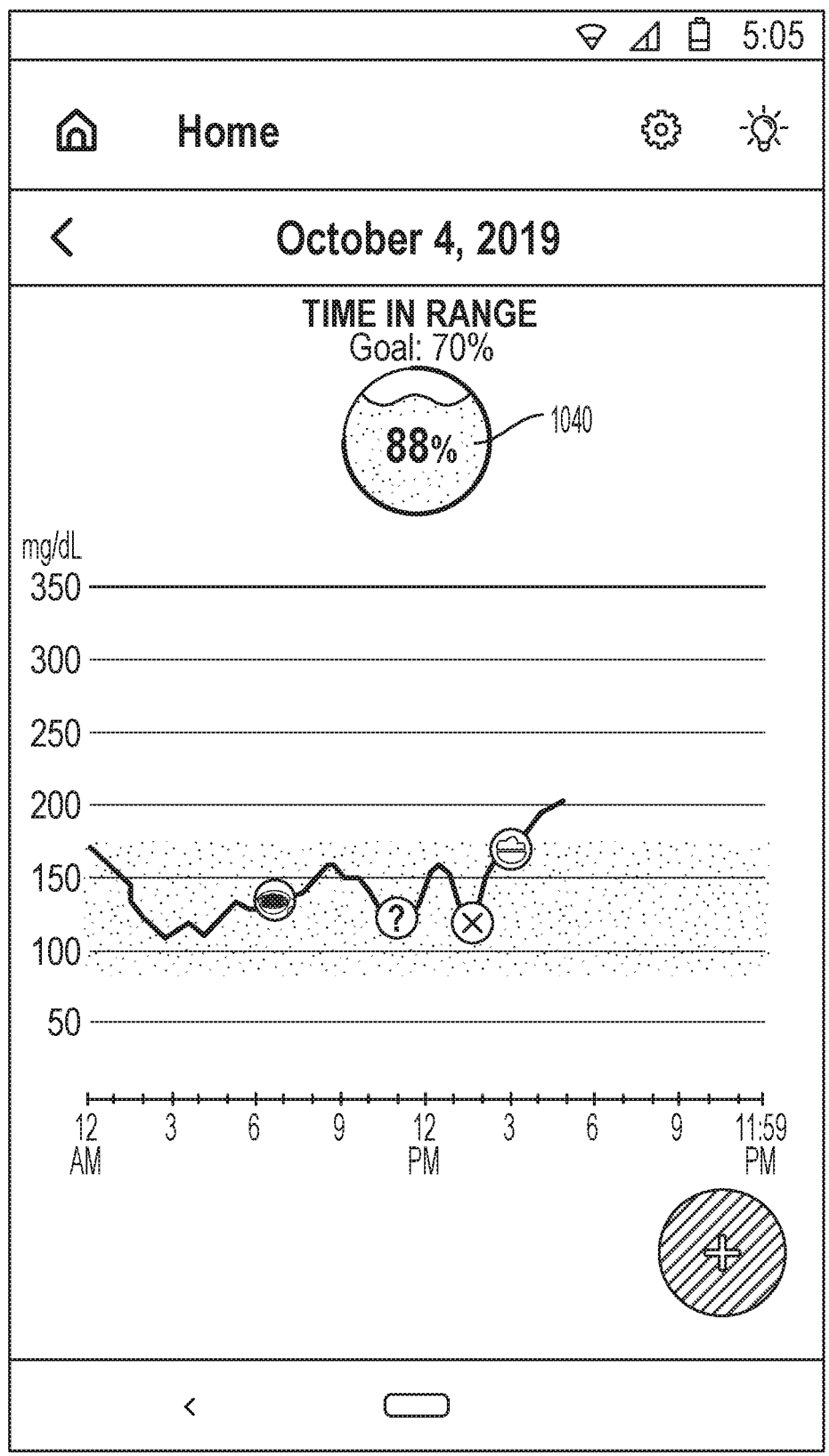
FIGS. 17A-17B depict additional example embodiments of graphical user interfaces for displaying time in range metrics.
Figure 17B:
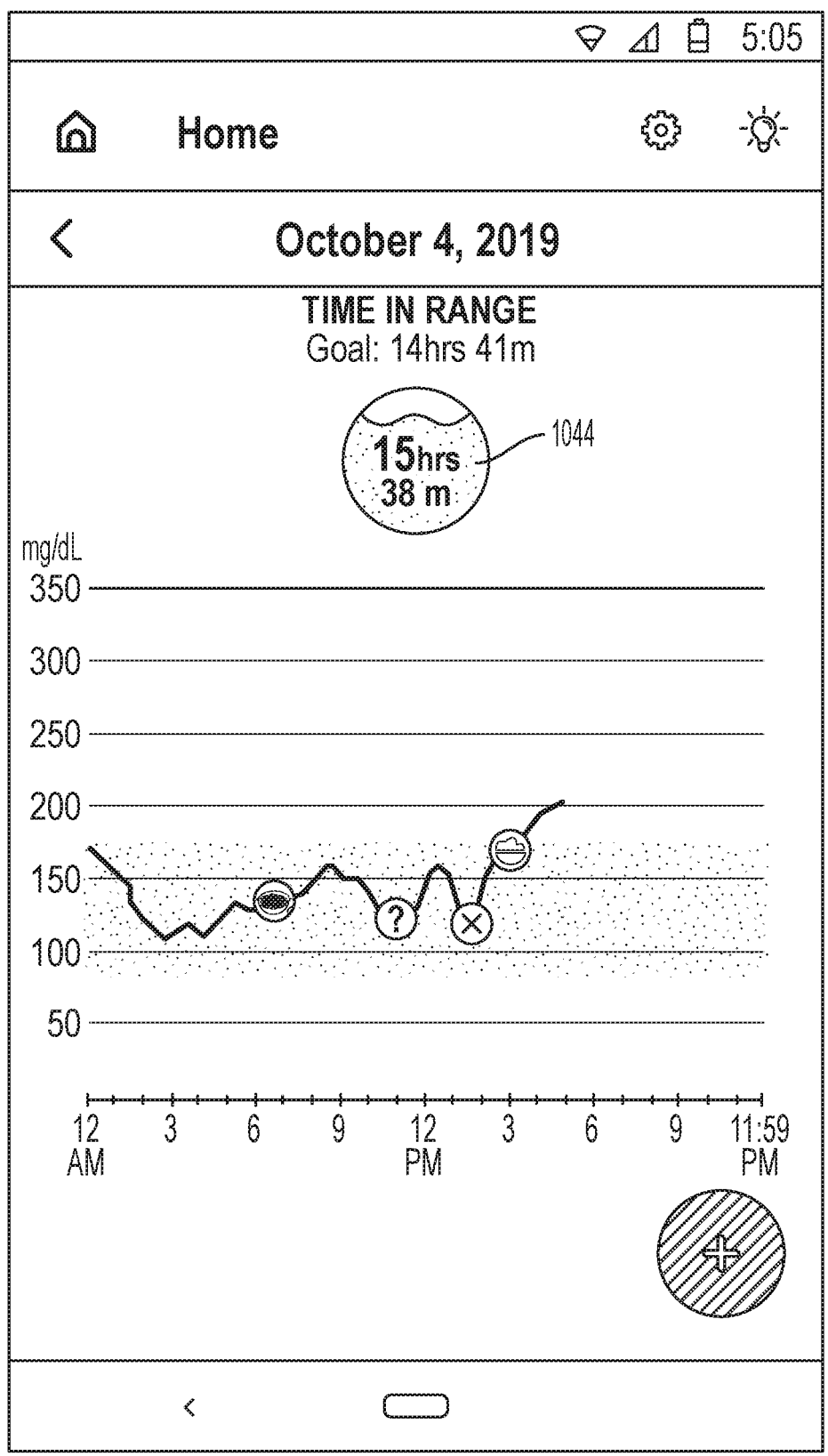

FIGS. 17A and 17B illustrate further alternative TIR displays showing the percentage of hours in range using circles with a portion of the circle shaded (fill the bucket). The goal percentage or hours can be listed near the circle. FIG. 17A reports the TIR as a percentage 1040 and FIG. 17B reports the TIR as a total number of hours 1044. For each TIR display, the center of the circle can be shaded to indicate the percentage of the goal that the user has been in range, where the percentage shaded is proportional to the % of the TIR so far for that time period.

Figure 18A:
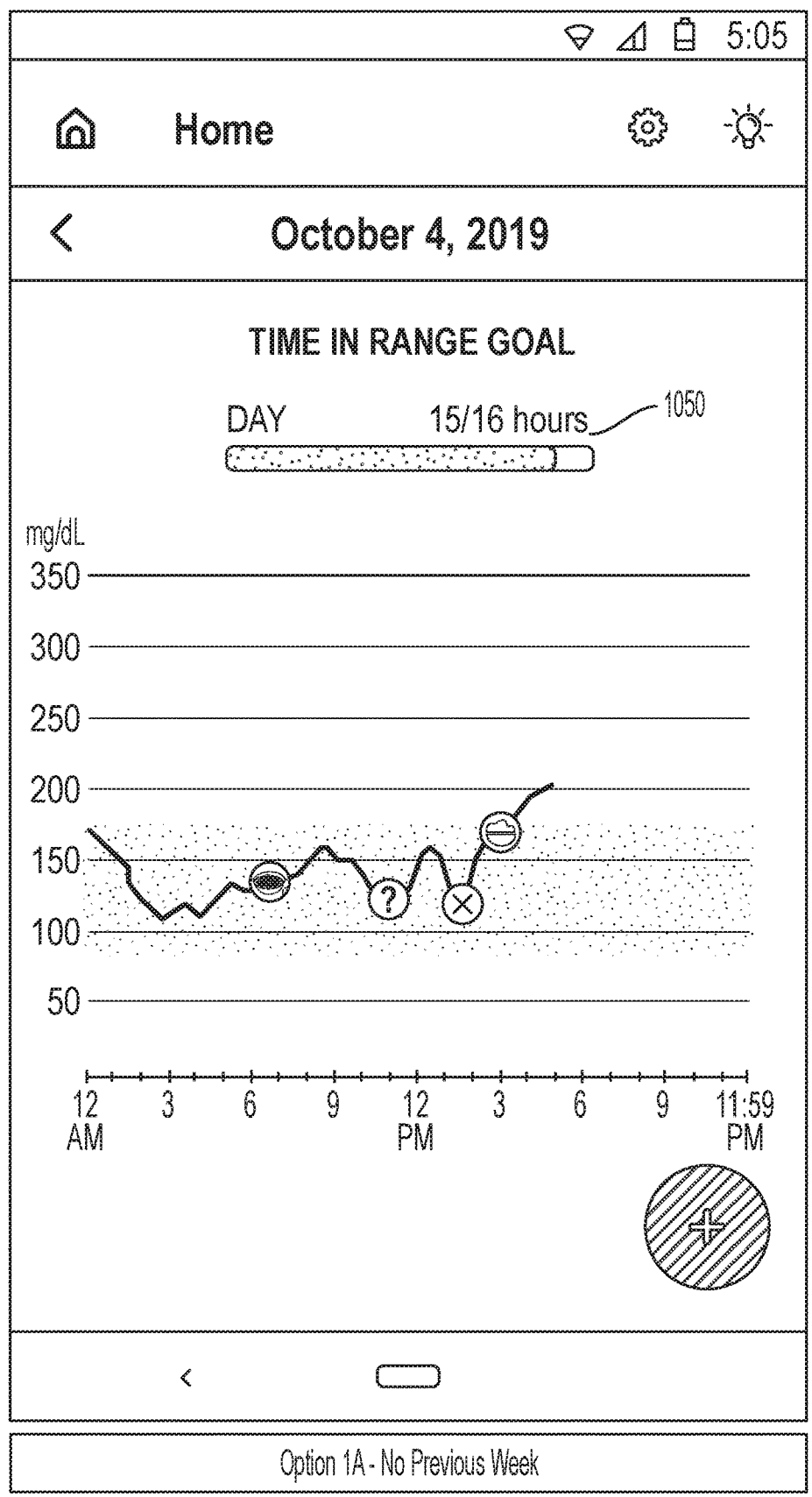
FIGS. 18A-18B depict additional example embodiments of graphical user interfaces for displaying time in range metrics.
Figure 18B:
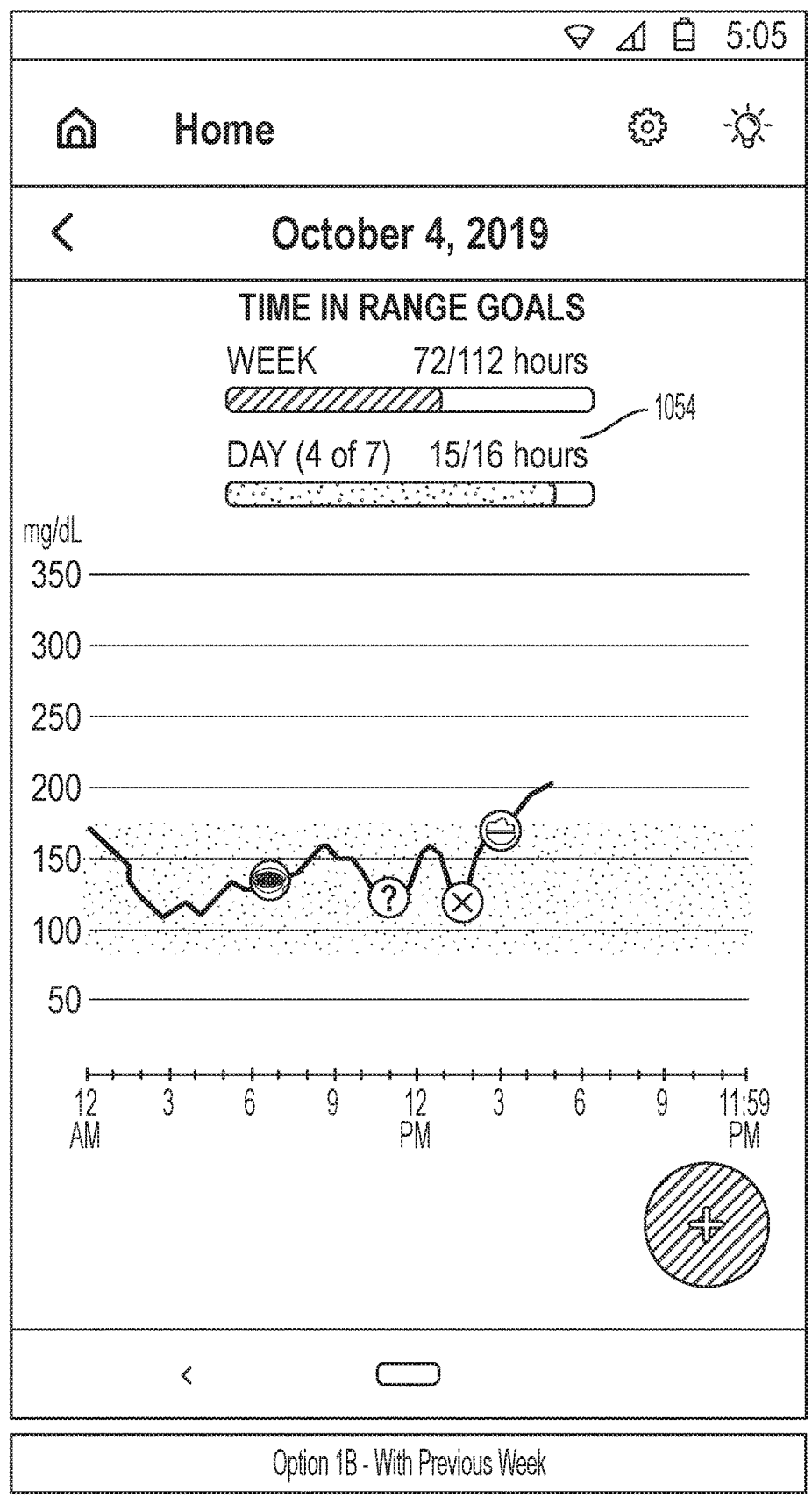

FIGS. 18A and 18B illustrate further alternative TIR displays using progress bars to show hours in range. A progress bar having a length equal to the goal hour or percentage can have a progress indicator (shaded or colored extension) to illustrate the user's TIR. For example, where the goal is 16 hours of a day in range, and the user had 14 hours in range, the progress indicator (shaded or colored extension) can fill 14/16 of the total bar. The TIR display can indicate the TIR for the day (1050) or can report both the TIR for the day and the week (1054), or other time period (e.g., past week, past month, or current month).

TIR Banking

As explained above, the meal monitor application may calculate a tracking metric and display to the user in a way to show if they are ahead of target or behind target goal for TIR. Specifically, the tracking metric may be a post-meal TA180 metric average over all of the logged meals over the past week. A post-meal TA180 is not the same as a TA180 metric calculated for a full twenty-four-hour period, which is likely greater. These two metrics are correlated to some degree and a linear correlation factor (or other functional fit) can be estimated based on either population data, per person, or both.

The post-meal TA180 metric can be displayed in numerous ways. TA180 can be displayed as is or converted to an equivalent value for twenty-four hours by applying a correlation factor. The meal monitor application can provide a default twenty four-hour TA180 target value, and/or require/allow the user to set a value. A typical TA180 target value that is considered in good control for people with diabetes is about 30%, alternatively between about 25% to about 35%, alternatively between about 20% and about 40%.

According to some embodiments, the meal monitor application can determine a target value based on past glucose data collected for the user (e.g., for a day or two), set at a level that may be an achievable goal for the user. For example, if the measured TA180 was substantially greater than 30%, the app could determine an achievable target TA180 of about 5%-10% less than the measured value. The meal monitor application can also determine new target values after the user has achieved—or is close to achieving—the previous target. The meal monitor application can also determine a new target only after the user has maintained the current target for some period of time.

Figure 19A:
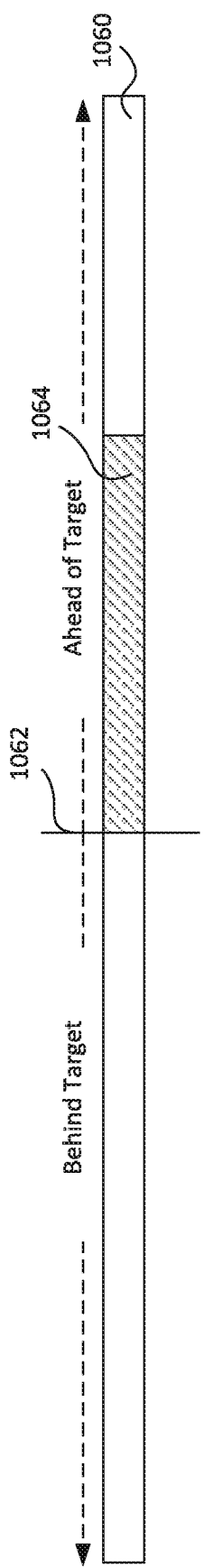
FIGS. 19A-19C depict an example embodiment for banking time in a goal or target range.

The meal monitor application can display the tracking metric as a progress bar. When a new target is set, the tracking metric can begin to average subsequent meals and not include meals prior to the new target setting. An example of a progress bar is shown in FIG. 19A.

The progress bar 1060 can indicate that the user is ahead of target, which means that the user has been doing a good job choosing foods and avoiding overeating, thereby exceeding their target. The shaded bar extension 1064 (e.g., shaded green) to the right of the midline 1062 is proportional to the difference between the average measured TA180 less the target, assuming the measured is less than the target (good).

Figure 19B:
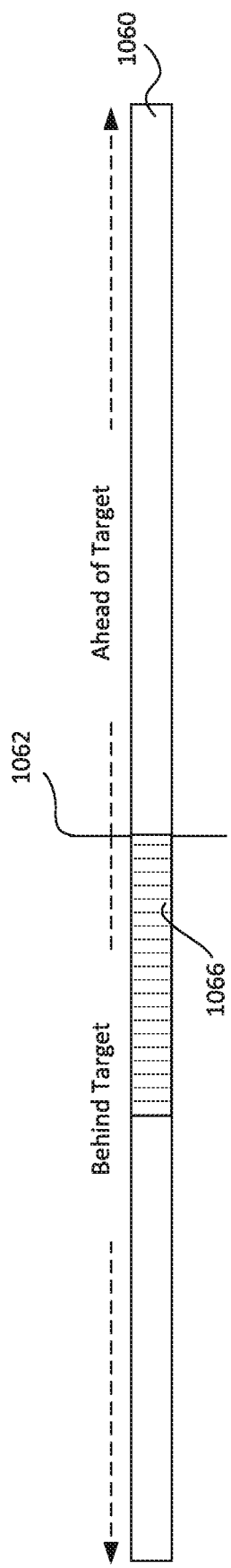

By contrast, an example of a progress bar for when the measured TA180 is greater than the target (bad) is shown in FIG. 19B. The shaded bar extension 1066 to the left of midline 1062 is proportional to the difference between the target less the average measured TA180, assuming the measured is greater than the target (bad). This progress bar example indicates that the user is behind target, which means that the user has not been doing a good job choosing foods, avoiding overeating, and has not reached the target goal. The progress bar 1060 may or may not actually show the measured TA180 value and the target value, or the differences.

Figure 19C:
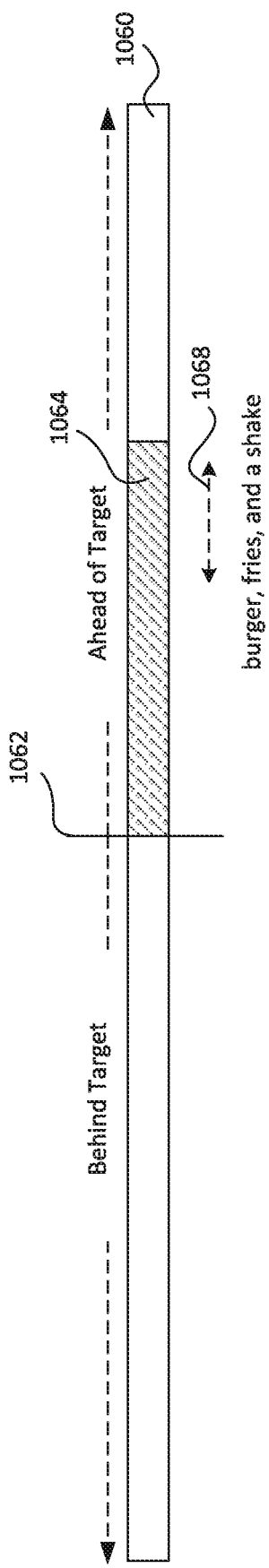

As seen in FIG. 19C, the meal monitor application can help the user "bank" TA180 less than the target with the objective of the user feeling that it is acceptable to eat a "bad" meal without getting behind target. The objective of this feature is to allow the user to feel more in control with managing their glucose levels. For example, the meal monitor application can list the logged meals that the application considers "bad" based on the TA180 recorded for the meals, as described with reference to other embodiments. This would be done by determining a "bad" post-meal TA180 threshold, for example, by applying the correlation factor to the target TA180 or to a fixed TA180 such as 30%. In some embodiments, for example, the application can display "bad" meals and provide a user interface (UI) means for the user to identify bad meals that they actually would like to continue eating (e.g., can't live without).

An example embodiment of a progress bar that displays additional information to facilitate the "banking concept" is shown in FIG. 19C. The width of the impact indicator 1068 for this meal corresponds to a TA180 previously measured for that meal and shows how the meal could contribute/change to the average TA180 metric. For example, assuming that the average is for one week of meals, 7×3=21 meals. If the target is 30%, the average measured TA180 is 24% and the TA180 for the "bad" meal is 45%. This bad meal is well within the margin (green bar).

Impact=45%/21=2.1%

Margin=30%−24%=6%

FIG. 19C can indicate that the user is doing so well that they can easily eat their favorite "bad" food without risking their progress metric. This encourages the user to do well and reward themselves later. In some embodiments, the progress bar can rotate through all of the favorites foods that are indicated whenever it is displayed, or on a timer. Alternatively, or in addition to the above, the application can provide a means for the user to select a favorite food, or toggle through all the selections, and the app would calculate and display the "impact" (i.e., the percent ahead of target) that is needed to cover that meal.

Alerts

The application may also display various alerts and notifications to remind and/or encourage the user to log meals in order to assist the user in improving or maintaining their glycemic control. For example, a lock screen notification may appear to notify the user that a high glucose meal was detected and to prompt the user to log the good based on the detected glucose spike. Alternatively, the notification may be a celebratory notification that informs the user that, e.g., they have stayed in range after a meal or that they have logged a certain number of meals. The application may also present in-app modals in response to the users tapping on a notification on the lock screen to remind and/or encourage the user. The in-app modal may be a more vibrant and visual modal within the application that provides more context for prompting action. The in-app modal may present a graphic and text that gently nudges the user to log a meal by reminding them that many reasons may have caused the detected glucose spike and logging meals will help the user discern the cause of the glucose spike. The in-app modal may include possible answers such that the user can indicate that they did not eat anything or the user can select a link to add food, which may open a food logging screen, examples of which are described elsewhere in the application. Alternatively, the in-app modal may be a celebratory notification, which contains encouraging words and a graphic that complement the user for, e.g., staying within target.

Guidance

In an alternative embodiment, the user may access a guidance GUI, which provides insight as to many statistics and metrics regarding how the user is doing that week so far. The guidance GUI may include a counter that illustrates the user's progress in meeting a milestone, e.g., how many meals have been logged that week, along with a progress indicator that graphically shows how many meals still need to be logged to meet a goal of, e.g., logging 10 meals. The guidance GUI may also include TIR displays for the day so far and the week so far may also be displayed so that the user can easily discern how well they are managing their glucose. Groupings of meals above range and meals in range that were consumed that week may be accessible on separate tabs. These groupings may include foods from different meal types grouped together. These groupings may allow the user to learn after each logged meal if it was a good or bad meal without waiting to see a summary in the weekly insights report. The grouping of meals above range may be color coded red and the grouping of meals in range may be color coded green. The guidance GUI may also contain a recommendations section, which includes a listing of recommendations for meals and/or foods that may help the user boost their TIR to meet their goal. The recommendations may include a list of ADA-approved meal suggestions and may also include other meal and food options that have been determined to have a positive effect on the user's TIR and improve their glycemic control, or alternatively have been determined have a positive effect on the glycemic control (e.g., an associated post-prandial glucose trace remained in a goal range) of a population or subset of a population to which the user belongs. The suggested meals or foods may include a name of the meal or food, a picture, and a suggested meal type (e.g., breakfast, lunch, dinner, and/or snack).

The GUIs associated with various tabs in a logbook screen may also include information from the application. A log GUI may include a listing of various events detected on a certain day, such as meals, alarms, exercise, and insulin doses. Each entry may include a glucose level, trend arrow, graphical display of the type of event, and a time. A graph GUI of the logbook may include a glucose trace with the target or goal range highlighted in green. Event markers, which may be color coded, corresponding to the various events listed in the log GUI may also be plotted on the glucose trace. For an event marker corresponding to a meal, a window may appear in association with the even marker and list the time, glucose level, and graphical symbol of the event. Moreover, a graph GUI may also include a meal tile associated with the meal event marker. The meal tile may include the name of the meal, a picture of the meal, tags, text description, portion size, and the time/date of the meal. The insights GUI of the logbook may include a TIR tile that contains TIR displays for the day so far and the week so far may also be displayed so that the user can easily discern how well they are managing their glucose, along with the target TIR. The insights GUI may also include a glucose tile that includes a graphical display of glucose levels for that day, in addition to a listing of the highest glucose level recorded that day with the recorded time, the lowest glucose level recorded that day with the recorded time, and the percentages of time spent in range, above a high glucose threshold ("very high"), and out of range (which may include times spent above the target range (e.g., above a glucose threshold that is lower than the high glucose threshold) and below the target range). The graphical display may be in the shape of a circle, which includes color-coded sections corresponding to the percentage of time spent in range, above range, and out of range. The insights GUI may also include a food tile, which may list the amount of carbohydrates consumed that day, the target daily carbohydrate amount, the number of meals logged, the number of meals in range, and the number of meals above range. The insights GUI may also include an exercise tile, which may list the amount of time spent exercising and/or the periods of time spent exercising.

Ratings and Recommendations

Figure 20A:
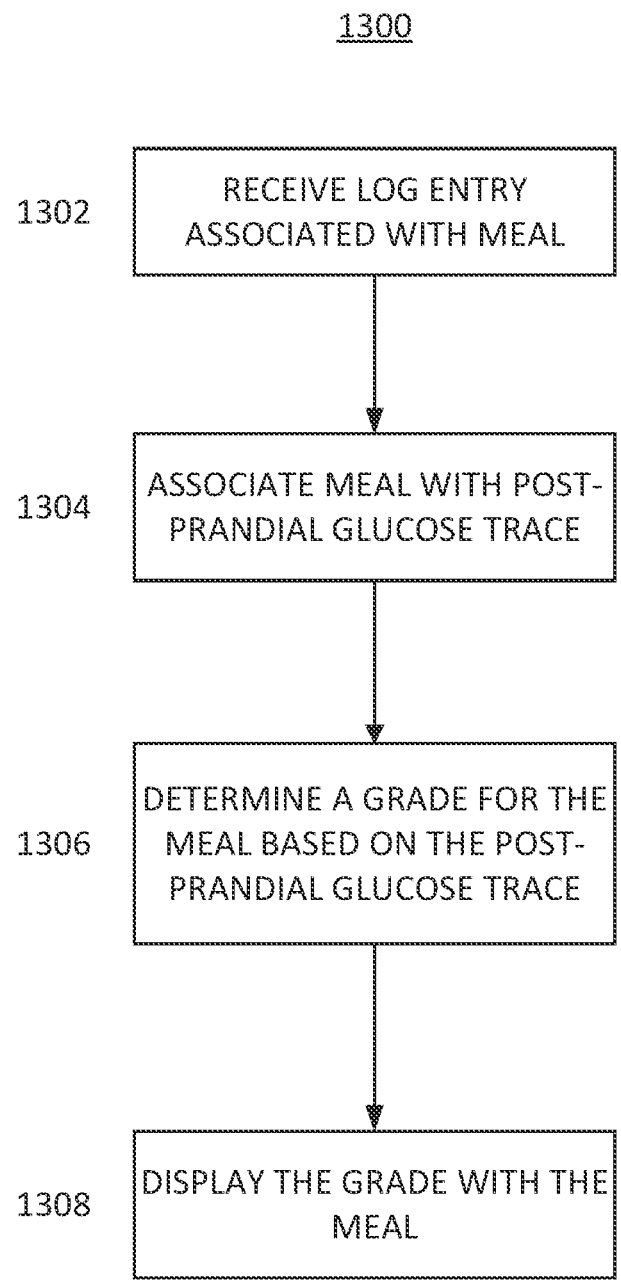
FIGS. 20A-D are flow diagrams of example embodiments of methods for analyzing meals and food.

The application may also be able to identify good and bad meals over time. In one exemplary method, as seen in FIG. 20A, a method 1300 for analyzing meal data may include, at step 1302, receiving an inputted log entry associated with a consumed meal. The log entry may include a meal content and a meal size of the consumed meal.

In step 1304, the consumed meal may be associated with at least one post-prandial glucose trace. The post-prandial glucose trace may include the analyte levels from the meal start time (or estimated meal start time) to an end time. The end time may be at least about 2 hours, alternatively at least about 4 hours, alternatively at least about 4.5 hours, alternatively until about the next meal start time.

In step 1306, a grade may be determined for the consumed meal based on at least one characteristic of the at least one post-prandial glucose trace.

In step 1308, the grade may be displayed in association with the consumed meal in a graphical user interface.

The steps described above are only exemplary and the contemplated methods include methods in which the steps are in different orders or in which certain steps are omitted or added.

Figure 20B:
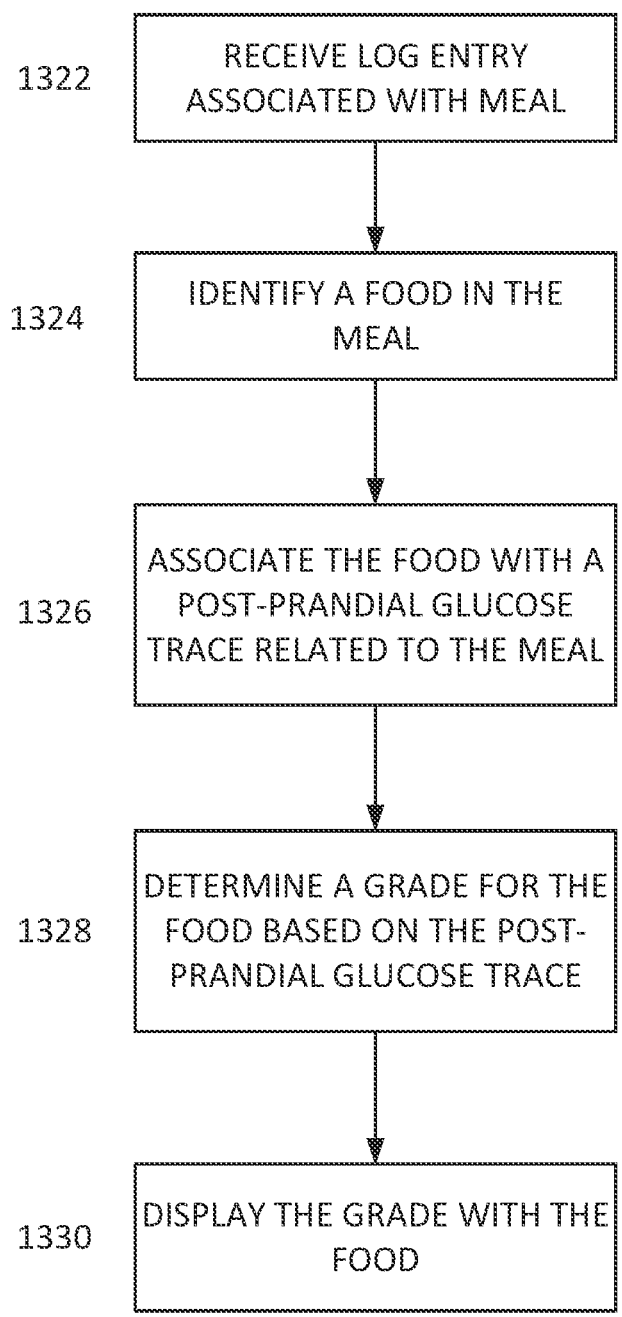

The application may also be able to identify good and bad foods over time. In one exemplary method, as seen in FIG. 20B, a method 1320 for analyzing meal data may include, at step 1322, receiving an inputted log entry associated with a consumed meal, and in step 1324, identifying at least one food included in the consumed meal. In step 1326, the at least one food may be associated with at least one post-prandial glucose trace related to the consumed meal. In step 1328, a grade may be determined for the food based on the post-prandial glucose trace. In step 1330, the grade for the food may be displayed in association with the at least one food in a graphical user interface. The steps described above are only exemplary and the contemplated methods include methods in which the steps are in different orders or in which certain steps are omitted or added.

Figure 20C:
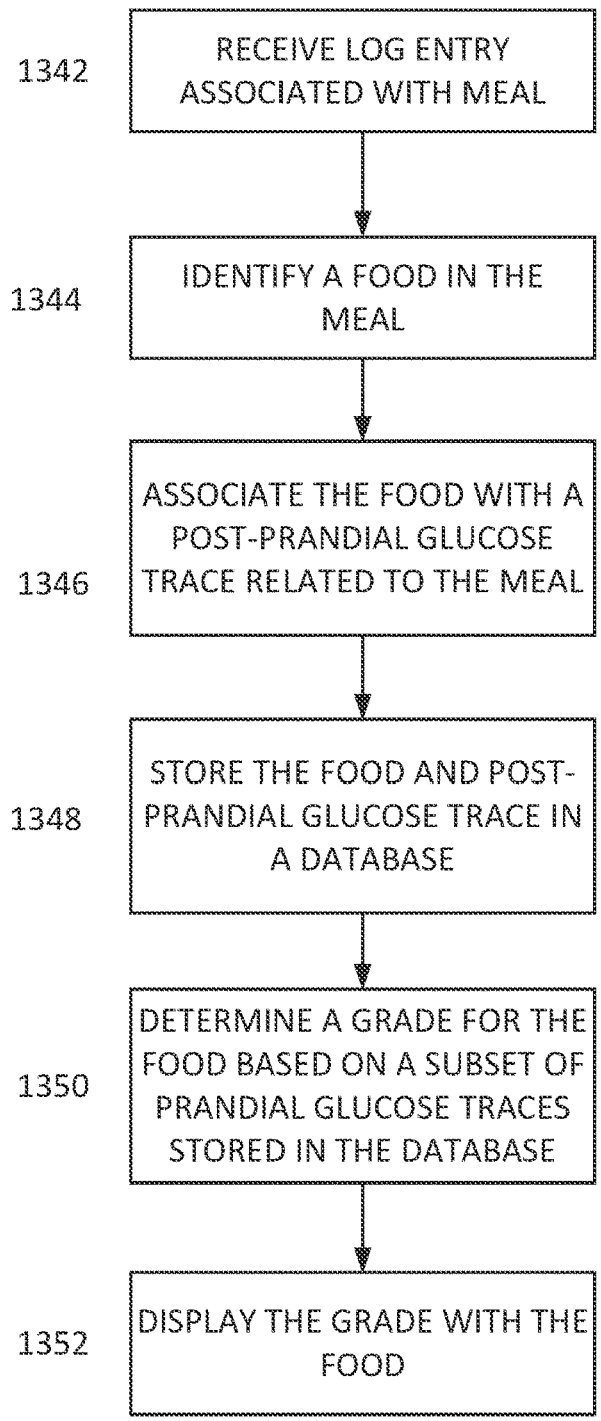

The application may also be able to identify good and bad foods for various populations. In one exemplary method, as seen in FIG. 20C, a method 1340 for analyzing meal data may include, at step 1342, receiving an inputted log entry associated with a consumed meal, and in step 1344, identifying at least one food included in the consumed meal. In step 1346, the at least one food may be associated with at least one post-prandial glucose trace related to the consumed meal. In step 1348, the application may store the at least one food and the at least one post-prandial glucose trace related to the consumed meal in a database. The database may include a plurality of foods and associated post-prandial glucose traces for a population.

In step 1350, the application may determine a grade for the at least one food. The grade may be based on a subset of post-prandial glucose traces associated with the at least one food. The subset of post-prandial glucose traces may be based on or associated with a segment of the population. The segment of the population may have a disease condition in common, e.g., prediabetes, Type 1 diabetes, Type 2 diabetes, gestational diabetes, etc. For example, a segment for users that have been diagnosed with T2 diabetes may have a high incidence of high fat, high calorie foods that are classified as highly bad, whereas for other segments, such as prediabetes and T1 diabetes users, this type of food is classified predominantly as moderately bad. Thus, the system may report back to users with T2 diabetes that foods in this category are likely bad for them, but for the other user segments, the system may report that these types of foods are only moderately bad.

In step 1352, the application may display the grade in association with the at least one food in a graphical user interface.

The steps described above are only exemplary and the contemplated methods include methods in which the steps are in different orders or in which certain steps are omitted or added.

Figure 20D:
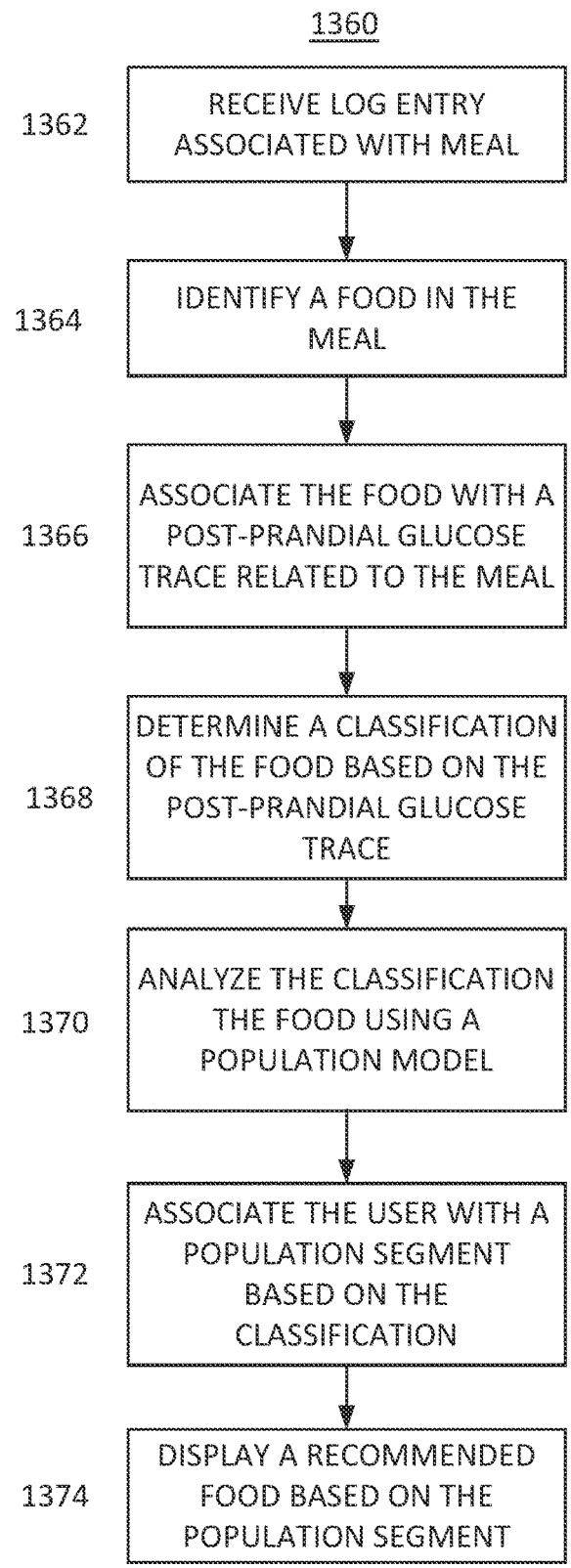

The application may also be also to categorize users by how they respond to various foods and make recommendations for different foods based on the categorizations. In one exemplary method, as seen in FIG. 20D, a method 1360 for recommending food choices may include, at step 1362, receiving an inputted log entry associated with a consumed meal from a user, and in step 1364, identifying at least one food included in the consumed meal. In step 1366, the application may associate the at least one food with at least one post-prandial glucose trace related to the consumed meal. In step 1368, the application may determine a classification of the at least one food based on at least one characteristic of the at least one post-prandial glucose trace.

In step 1370, the application may analyze the classification and the at least one food using a population model comprising a database of food classifications and associated foods for a plurality of population segments. The database may include meals, post-prandial glucose traces, user demographics, and user preferences. The population model may use machine learning techniques to divide a population into the plurality of population segments. The population model may include a first model that assigns the user to the segment of the plurality of population segments based on analysis of the classification, the at least one food, at least one post-prandial glucose trace related to the at least one food, demographic information of the user, and/or preferences of the user. The population model may also include a second model that maps the segment of the plurality of population segments to a plurality of good food items and a plurality of bad food items.

In step 1372, the application may associate the user with a segment of the plurality of population segments based on the classification and the at least one food. The segment of the plurality of population segments may be associated with a plurality of foods having a positive classification. In step 1374, the application may display a recommended food. The recommended food may be one of the plurality of foods having a positive classification for the segment of the plurality of population segments.

The steps described above are only exemplary and the contemplated methods include methods in which the steps are in different orders or in which certain steps are omitted or added.

Figure 21:
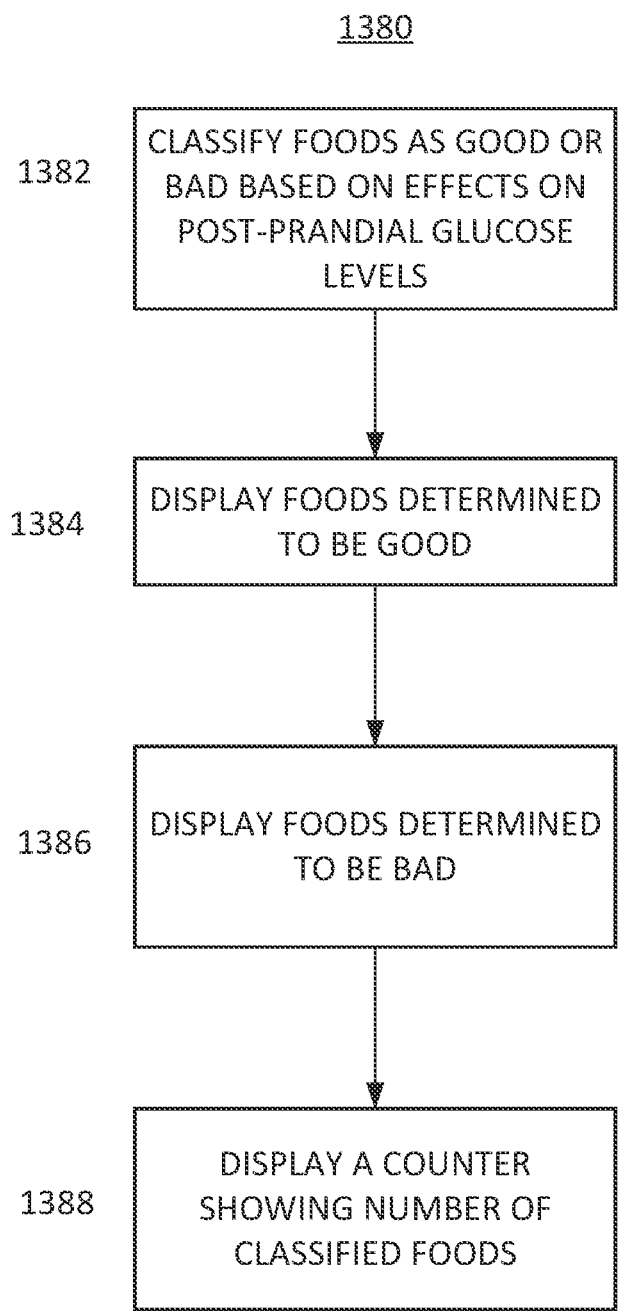
FIG. 21 is a flow diagram of an example embodiment of a method for displaying a counter for assessed meals and foods.

The application may also be able to grade or classify the meals and foods as good and bad and display a count of the current number of meals or food that have been analyzed. In one exemplary method 1380, as depicted in FIG. 21, in step 1382, the application may classify a plurality of foods as good or bad based on an effect of each of the plurality of foods on a post-prandial glucose level of the subject. In step 1384, the application may display a plurality of foods that have been determined to be good for the subject. In step 1386, the application may display a plurality of foods that have been determined to be bad for the subject. In step 1388, the application may display a counter showing a number or quantity of foods that have been graded or classified as good and bad.

The application may also prioritize a TOD with the highest glucose pattern, e.g., the TOD period with the most time or highest AUC above a threshold amount. The system may also determine and display a recommendation for alternative foods or meals for the user to try to improve their glycemic control.

Figure 22A:
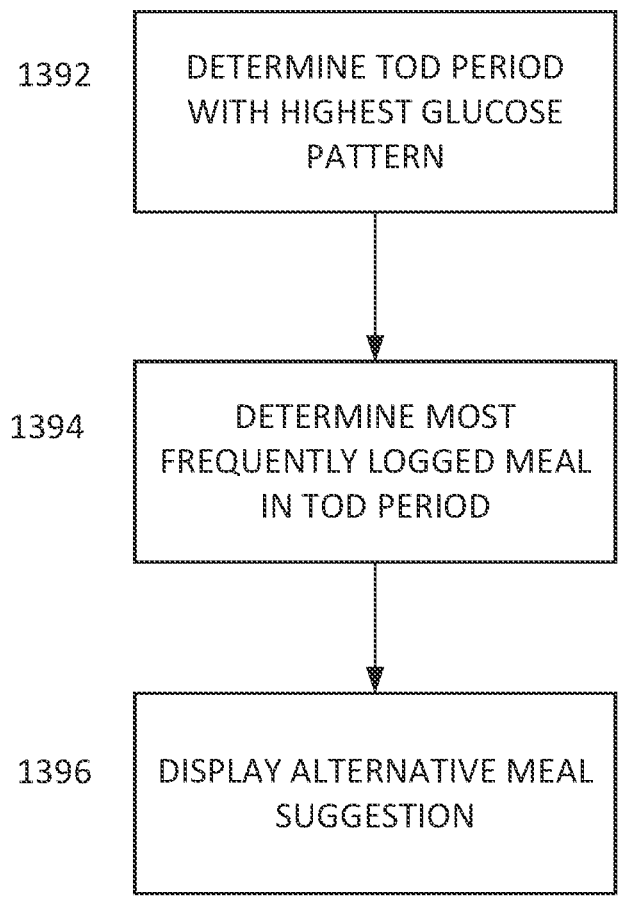
FIGS. 22A-B are flow diagrams of example embodiments of methods for making food recommendations.

In one exemplary method 1390, in FIG. 22A, in step 1392, the application may determine a TOD period having a highest glucose pattern based on a metric determined with reference to an upper glucose threshold. As indicated in other parts of this application, the upper glucose threshold may be about 180 mg/dL, alternatively about 175 mg/dL, alternatively about 170 mg/dL, alternatively about 190 mg/dL, alternatively about 200 mg/dL, and may vary per individual.

In step 1394, the application may determine a most frequently logged meal in the TOD period having the highest glucose pattern. The most frequently logged meal in the TOD period having the highest glucose pattern may be associated with a post-prandial glucose trace having a high glucose pattern.

In step 1396, the application may display an alternative meal suggestion to replace the most frequently logged meal in the TOD period having the highest glucose pattern.

The method may also include additional steps. For instance, a step of displaying a comparison of a post-prandial glucose trace associated with the alternative meal suggestion and a post-prandial glucose trace associated with the most frequently logged meal after a user has eaten the alternative meal suggestion may be included. The method may also include a step of displaying the alternative meal suggestion in a list of frequently logged foods. The alternative meal suggestion may be displayed at the beginning of the list. The method may also include a step of determining the alternative meal suggestion by searching a database of healthy options for the TOD period having the highest glucose pattern.

Figure 22B:
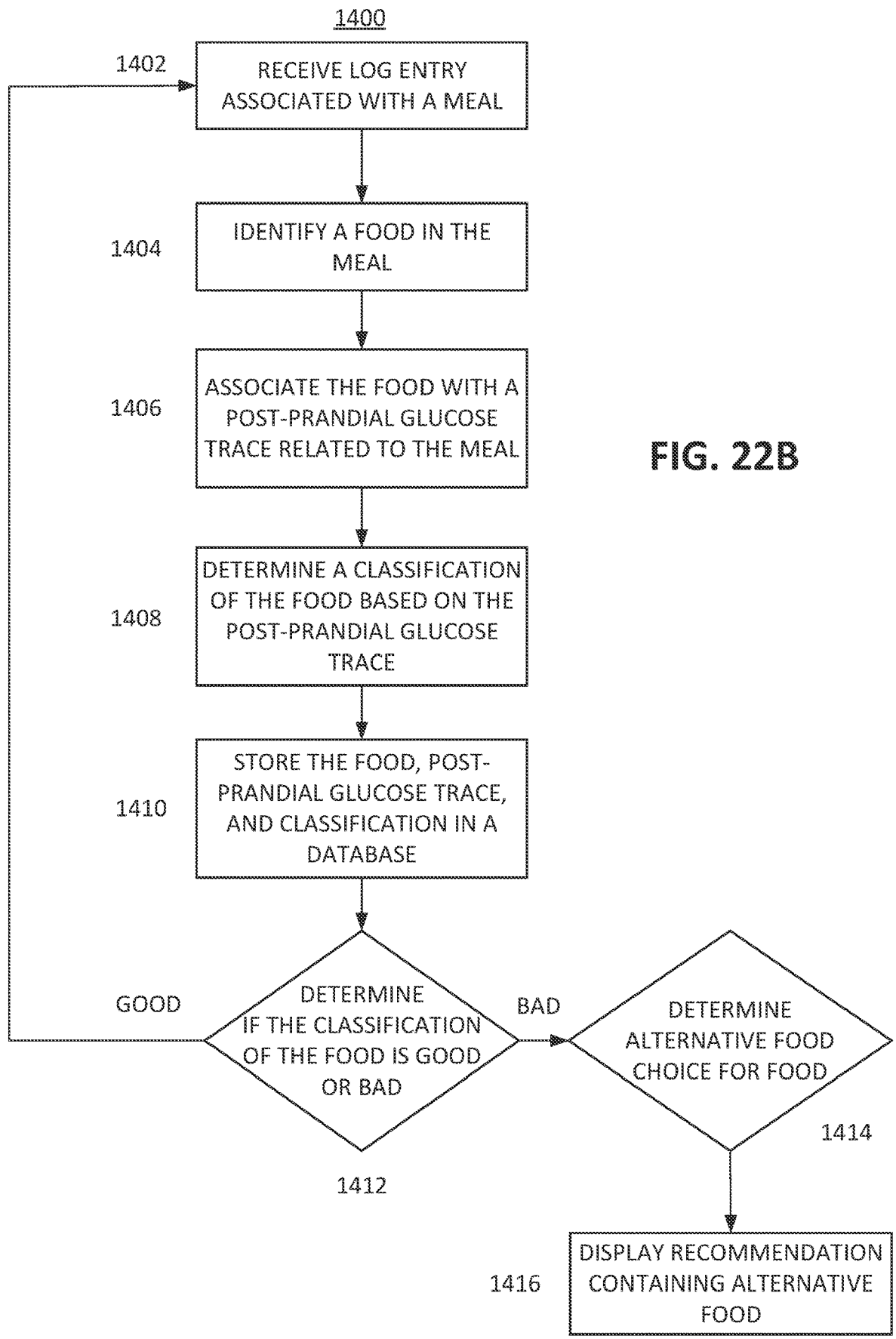

The application may also facilitate experimentation with other foods based on natural language learning. In one exemplary method 1400, as seen in FIG. 22B, a method recommending alternative food choices is described. In step 1402, the application receives an inputted log entry associated with a consumed meal. The inputted log entry may include a text description of the consumed meal. In step 1404, the application may identify at least one food included in the text description of the at least one logged meal. In step 1406, the application may associate the at least one food with at least one post-prandial glucose trace related to the consumed meal. In step 1408, the application may determine a classification of the at least one food as positive or negative, or good or bad, or other equivalent classification, based on an effect of the at least one food on the post-prandial glucose trace.

In step 1410, the application may store the at least one food, the at least one post-prandial glucose trace related to the consumed meal, and the classification in a database. The database may include a plurality of foods, associated post-prandial glucose traces, and classifications for a population and a plurality of alternative food choices.

In step 1414, in response to a classification of the at least one food as bad, the application may determine an alternative food choice from the plurality of alternative food choices. The alternative food choices may have been classified as good for a plurality of individuals. In step 1416, the application may display a recommendation comprising the alternative food choice as a replacement of the at least one food that was classified as bad.

The method may also include the steps of determining a TOD period having a highest glucose pattern for a user based on a metric determined with reference to an upper glucose threshold, determining a most frequently logged food in the TOD period having the highest glucose pattern, and displaying an additional alternative food choice to replace the most frequently logged food.

The method may also prompt a user for input on food preferences and may display an additional alternative food choice to replace the at least one food that was classified as bad based on the database and the food preferences inputted by the user.

Figure 23:
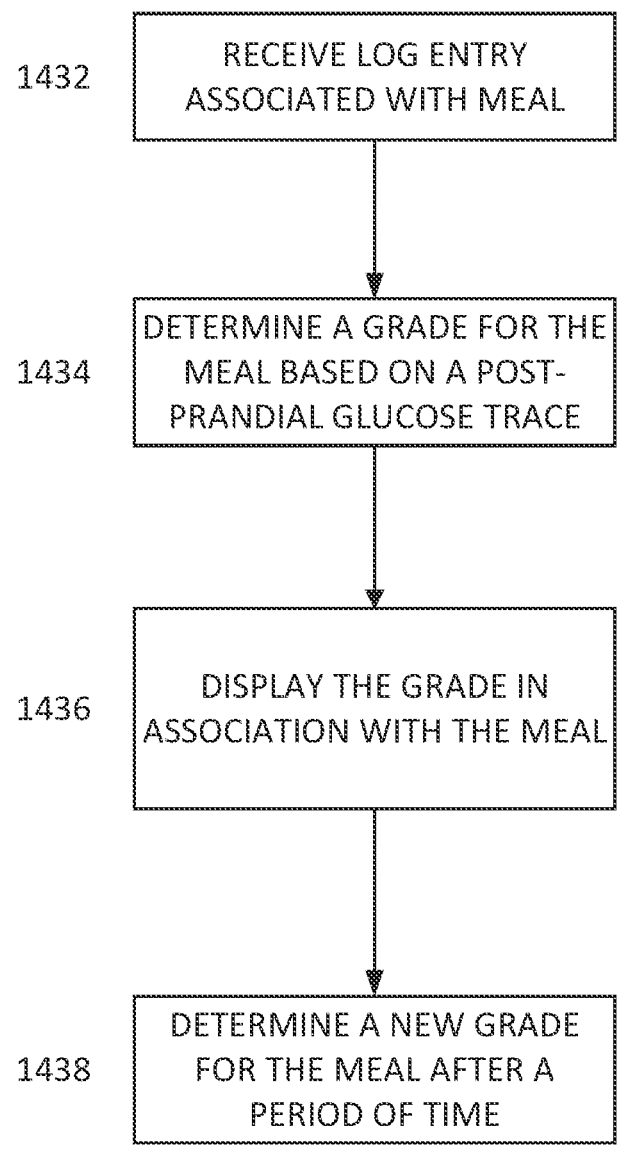
FIG. 23 is a flow diagram of an example embodiment of a method for reassessing a meal grade.

The application may also enable a meal or food to be assigned a new grade or for a grade to be removed from an association with a meal or food. In one exemplary method 1430, as seen in FIG. 23, a method for analyzing meal or food data is described. In step 1432, the application may receive an inputted log entry from a user associated with a consumed meal or food.

In step 1434, the application may determine a grade for the consumed meal or food based on at least one characteristic of at least one post-prandial glucose trace associated with the consumed meal. In step 1436, the application may display the grade in association with the meal. For example, the grade may be changed by the user. The grade in association with the meal.

The grade may be changeable. The grade may be removed or no longer associated with the meal after a period of time after the grade was first assigned or associated with the meal or food. Optionally, the method may include step 1438, where a new grade may be determined for the meal or food after a period of time since the first grade was assigned. Or the user may change the grade. The period of time may be about 6 months, alternatively 3 months, alternatively 4 months, alternatively 5 months.

For the various methods described, the meals and food may be assigned grades based on various characteristics of the post-prandial glucose traces associated with the meal. The meal or food may be assigned a bad grade under various circumstances, including but not limited to, a determination that the at least one post-prandial glucose trace comprises at least two post-prandial glucose traces having a high glucose pattern, a determination that the at least one post-prandial glucose trace does not include at least one post-prandial glucose trace having an in-range post-prandial pattern. The meal or food may be assigned a good grade under various circumstances, including but not limited to, a determination that the at least one post-prandial glucose trace comprises at least one post-prandial glucose trace having an in-range post-prandial pattern. The meal or food may be assigned an inconclusive grade under various circumstances, including but not limited to, to a determination that the at least one post-prandial glucose trace does not include at least one post-prandial glucose trace having an in-range post-prandial pattern and does not include at least two post-prandial glucose traces having a high glucose pattern.

A high glucose pattern may be based on an area under the curve above about 180 mg/dL or, alternatively, an amount of time above about 180 mg/dL. A goal range to determine an amount of time in range may be between about 70 mg/dL and 180 mg/dL.

The grade may be displayed as a number or letter. Alternatively, the grade may be displayed as a plurality of stars, where a higher number of stars indicates a better grade and a lower number of stars indicates a lower grade. For example, the grading can be based on a model that maps the inputs to a grade variable, such as a range of 0 to 4, where 0 may correspond to 1 star and 4 may correspond to 5 stars.

In one embodiment, the grade may also be based on a relationship between a start time of the consumed meal and the at least one characteristic. In another embodiment, the grade may also be based on an additional logged meal, wherein the additional logged meal is associated with the at least one post-prandial glucose trace. Additionally, or in the alternative, the grade may further be based on a model that maps a plurality of inputs to a grade variable.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible. The embodiments described herein are restated and expanded upon in the following paragraphs without explicit reference to the figures.

In many methods, a method for processing analyte data is provided, the method including: receiving analyte data sensed from an individual; detecting an episode in the received analyte data; displaying a first episode marker associated with the detected episode on a graph of analyte data; providing a screen configured to receive information regarding the detected episode; and displaying a second episode marker associated with the detected episode on the graph of analyte data after information is received regarding the detected episode.

In some embodiments, the method further includes the step of displaying a notification that the episode was detected. In some embodiments, the step of displaying the notification can include displaying a numeric value corresponding to a number of detected episodes on an icon. In some embodiments, the numeric value is incremented when an episode is detected. In some embodiments, the numeric value is decremented after information has been received for a detected episode. In some embodiments, the numeric value is decremented after a predetermined time has passed after the episode was detected.

In some embodiments, the step of displaying the notification comprises displaying an alert.

In some embodiments, the first episode marker is different from the second episode marker.

In some embodiments, the first episode marker includes a question mark.

In some embodiments, the second episode marker includes a picture related to the received information.

In some embodiments, the second episode marker comprises an X.

In some embodiments, the detected episode is an out-of-range episode.

In some embodiments, the first episode marker is placed at a time on the graph of analyte data at an estimated start time of the detected episode.

In some embodiments, the analyte data is glucose data.

In many methods, a method for processing analyte data using an in vivo analyte monitoring system is provided, the method including: receiving analyte data sensed from an individual; processing the analyte data to detect, with processing circuitry, a plurality of portions of analyte data that satisfy a criteria for a period of time; and associating one or more meal events with one or more of the plurality of portions of analyte data, where each of the one or more meal events has an associated time that the associated one or more plurality of portions of analyte data satisfied the criteria.

In some embodiments, the criteria requires that a portion of the analyte data is above a threshold analyte concentration level for the period of time. In some embodiments, the threshold analyte concentration level is about 180 mg/dl.

In some embodiments, the criteria requires that a portion of the analyte data is within a range of values for the period of time. In some embodiments, the range of values is defined by a minimum analyte concentration level of about 80 mg/dL to a maximum analyte concentration level of about 170 mg/dL.

In some embodiments, the period of time is about 30 minutes.

In some embodiments, the method further includes the step of ranking each of the one or more meal events according to the associated time. In some embodiments, the associated time of each of the one or more meal events are ranked in ascending order. In some embodiments, the method further includes the step of displaying a group of the one or more meal events, where each of the group has an associated time ranked as one of the top 5 longest associated times of the one or more meal events. In some embodiments, each of the group of the one or more meal events displayed is associated with a first time period of a day. In some embodiments, the first time period of the day is a time period in which the plurality of portions of analyte data satisfied the criteria for a highest amount of time. In some embodiments, the criteria requires that a portion of the analyte data is within a range of values for the period of time. In some embodiments, the criteria requires that a portion of the analyte data is above a threshold analyte concentration level for the period of time. In some embodiments, the method further includes the step of displaying a graph of analyte data over time, where the first time period of the day is highlighted. In some embodiments, the method further includes the step of displaying a second group of one or more meal events, where each of the second group has an associated time ranked as one of the top 5 longest associated times of the one or more meal events, where each of the second group of the one or more meal events displayed is associated with a second time period of a day, the second time period of the day being different than the first time period of the day. In some embodiments, the criteria requires that a portion of the analyte data is within a range of values for the period of time. In some embodiments, the criteria requires that a portion of the analyte data is above a threshold analyte concentration level for the period of time. In some embodiments, the method further includes the step of displaying a graph of analyte data over time, where the first time period of the day is highlighted.

In many methods, a method for displaying on an electronic interface of a device, a graphical interface related to physiological analyte data and meal information, is provided, the method including: receiving analyte data sensed from an individual; processing the analyte data to detect, with processing circuitry, a plurality of portions of analyte data that satisfy a criteria for a period of time; generating a plurality of indications of meal events, each of the plurality of indications corresponding to when one of the plurality of portions of analyte data that satisfied the criteria for the period of time; associating meal information, an event time, and an associated time with each of the at least a portion of the plurality of indication of meal events, where the associated time is an amount of time that the corresponding one or more plurality of portions of analyte data satisfied the criteria; and displaying a first grouping of the at least a portion of the plurality of indication of meal events having associated meal information, where the event time of each of the indication of meal events in the first grouping occurs in a first time period during a day.

In some embodiments, the method further includes the step of displaying a graphical element indicative of an amount of time the analyte data is within a goal range for a second period of time.

In some embodiments, the first time period was determined to have a highest amount of time that the plurality of portions of analyte data satisfied the criteria. In some embodiments, the criteria requires that a portion of the analyte data is above a threshold analyte concentration level for the period of time. In some embodiments, the threshold analyte concentration is about 180 mg/dl, and the period of time is about 30 minutes. In some embodiments, the criteria requires that a portion of the analyte data is within a range of values for the period of time. In some embodiments, the range of values is defined by a minimum analyte concentration level of about 80 gm/dL to a maximum analyte concentration level of about 170 mg/dL.

In some embodiments, the method further includes the step of displaying a statement indicating which time period of the day has a highest amount of amount of time that the plurality of portions of analyte data satisfied the criteria.

In some embodiments, the method further includes the step of displaying a second grouping of the at least a portion of the plurality of indication of meal events having associated meal information, where the event time of each of the indication of meal events in the second grouping occurs in a second time period during a day, the second time period being different than the first time period.

In some embodiments, the associated time of each of the at least a portion of the plurality of indication of meal events are ranked in ascending order. In some embodiments, each of the first grouping has an associated time ranked as one of the top 5 longest associated times of each of the at least a portion of the plurality of indication of meal events. In some embodiments, the first time period of the day is a time period in which the plurality of portions of analyte data satisfied the criteria for a highest amount of time.

In many embodiments, a method for displaying on an electronic interface of a device, a graphical interface related to physiological analyte data, is described, the method including: receiving analyte data sensed from an individual; determining an amount of time that the received analyte data is within a goal range for a first time period; displaying a first graphical element indicative of an amount of time the analyte data is within a goal range for a first period of time, the first graphical element comprising: a numeric value corresponding to the amount of time the received analyte data was determined to be in the goal range for the first time period, and a progress indicator having a length that is proportional to the amount of time that the analyte data is determined to be within the goal range for the first time period.

In some embodiments, the first time period is the current day.

In some embodiments, the first time period is selected from the group consisting of the current day, the current week, and the previous week.

In some embodiments, the progress indicator is part of progress bar.

In some embodiments, the progress indicator is part of a circular graph.

In some embodiments, the method further includes the step of displaying an indication of a target goal associated with the progress indicator.

In some embodiments, the method further includes a second graphical element indicative of an amount of time the analyte data is within a goal range for a second period of time, the second graphical element comprising: a numeric value corresponding to the amount of time the received analyte data was determined to be in the goal range for the second time period, and a progress indicator having a length that is proportional to the amount of time that the analyte data is determined to be within the goal range for the second time period. In some embodiments, the method further includes a third graphical element indicative of an amount of time the analyte data is within a goal range for a third period of time, the third graphical element comprising: a numeric value corresponding to the amount of time the received analyte data was determined to be in the goal range for the third time period, and a progress indicator having a length that is proportional to the amount of time that the analyte data is determined to be within the goal range for the third time period. In some embodiments, each of the first, second, and third time periods are individually selected from the group consisting of the current day, the current week, and the previous week.

In many embodiments, a method for displaying on an electronic interface of a device, a graphical interface related to physiological analyte data, is provided, the method including: receiving analyte data sensed from an individual; determining an amount of time that the received analyte data is within a goal range for first, second, and third time periods; displaying, on the electronics interface, a first graphical element indicative of an amount of time the analyte data is within a goal range for a first period of time, a second graphical element indicative of an amount of time the analyte data is within a goal range for a second period of time, and a third graphical element indicative of an amount of time the analyte data is within a goal range for a third period of time, wherein each of the first, second, and third graphical elements includes a first, second, and third progress indicator, wherein a length of the progress indicator is proportional to an amount of time that the analyte data is determined to be within the goal range for the first, second, and third time periods, respectively.

In some embodiments, the first time period is the current day.

In some embodiments, the second time period is the previous week.

In some embodiments, the third time period is the current week.

In some embodiments, each of the first, second, and third graphical elements comprise at least a portion of a circular shape, and where the first, second, and third progress indicators extend along a perimeter of each of the at least a portion of the circular shapes of the first, second, and third graphical elements.

In some embodiments, each of the first, second, and third graphical elements further comprise a goal indicator associated with a goal value, where the goal value corresponds to an amount of time or percentage of time the analyte data is within a goal range. In some embodiments, the goal indicator is located at a position along the perimeter of the at least a portion of the circular shape, where the position of the goal indicator is proportional to value of the goal.

In some embodiments, the method further includes the step of displaying a numerical representation of the amount of time that the received analyte data is determined to be within the goal range for first, second, and third time periods in association with the first, second, and third graphical elements, respectively. In some embodiments, the numerical representation of the amount of time that the received analyte data is determined to be within the goal range is displayed in a center of the at least a portion of the circular shapes of the first, second, and third graphical elements.

In many embodiments, an apparatus for processing analyte data is provided, which includes: a non-volatile memory in which is stored a program; an input configured to receive measured analyte data; a processor connected with the non-volatile memory and the input, the processor configured to execute the program, where execution of the program causes the processor to: detect an episode in the received analyte data; display a first episode marker associated with the detected episode on a graph of analyte data; provide a screen configured to receive information regarding the detected episode; and display a second episode marker associated with the detected episode on the graph of analyte data after information is received regarding the detected episode.

In some embodiments, execution of the program causes the processor to display a notification that the episode was detected. In some embodiments, the display of the notification can include a display of a numeric value corresponding to a number of detected episodes on an icon. In some embodiments, the numeric value is incremented when an episode is detected. In some embodiments, the numeric value is decremented after information has been received for a detected episode. In some embodiments, the numeric value is decremented after a predetermined time has passed after the episode was detected.

In some embodiments, the display of the notification is a display of an alert.

In some embodiments, the first episode marker is different from the second episode marker.

In some embodiments, the first episode marker includes a question mark.

In some embodiments, the second episode marker includes a picture related to the received information.

In some embodiments, the second episode marker comprises an X.

In some embodiments, the detected episode is an out-of-range episode.

In some embodiments, the first episode marker is placed at a time on the graph of analyte data at an estimated start time of the detected episode.

In some embodiments, the analyte data is glucose data.

In many embodiments, an apparatus for processing analyte data is provided, which includes: a non-volatile memory in which is stored a program; an input configured to receive measured analyte data; a processor connected with the non-volatile memory and the input, the processor configured to execute the program, where execution of the program causes the processor to: process the analyte data to detect a plurality of portions of analyte data that satisfy a criteria for a period of time; and associate one or more meal events with one or more of the plurality of portions of analyte data, where each of the one or more meal events has an associated time that the associated one or more plurality of portions of analyte data satisfied the criteria.

In some embodiments, the criteria requires that a portion of the analyte data is above a threshold analyte concentration level for the period of time. In some embodiments, the threshold analyte concentration level is about 180 mg/dl.

In some embodiments, the criteria requires that a portion of the analyte data is within a range of values for the period of time. In some embodiments, the range of values is defined by a minimum analyte concentration level of about 80 mg/dL to a maximum analyte concentration level of about 170 mg/dL.

In some embodiments, the period of time is about 30 minutes.

In some embodiments, the execution of the program further causes the processor to rank each of the one or more meal events according to the associated time. In some embodiments, the associated time of each of the one or more meal events are ranked in ascending order. In some embodiments, the execution of the program further causes the processor to display a group of the one or more meal events, where each of the group has an associated time ranked as one of the top 5 longest associated times of the one or more meal events. In some embodiments, each of the group of the one or more meal events displayed is associated with a first time period of a day. In some embodiments, the first time period of the day is a time period in which the plurality of portions of analyte data satisfied the criteria for a highest amount of time. In some embodiments, the criteria requires that a portion of the analyte data is within a range of values for the period of time. In some embodiments, the criteria requires that a portion of the analyte data is above a threshold analyte concentration level for the period of time. In some embodiments, execution of the program further causes the processor to display a graph of analyte data over time, where the first time period of the day is highlighted. In some embodiments, execution of the program further causes the processor to display a second group of one or more meal events, where each of the second group has an associated time ranked as one of the top 5 longest associated times of the one or more meal events, where each of the second group of the one or more meal events displayed is associated with a second time period of a day, the second time period of the day being different than the first time period of the day. In some embodiments, the criteria requires that a portion of the analyte data is within a range of values for the period of time. In some embodiments, the criteria requires that a portion of the analyte data is above a threshold analyte concentration level for the period of time. In some embodiments, execution of the program further causes the processor to display a graph of analyte data over time, where the first time period of the day is highlighted.

In many embodiments, an apparatus for displaying on an electronic interface of a device, a graphical interface related to physiological analyte data and meal information, which includes: a non-volatile memory in which is stored a program; an input configured to receive measured analyte data and meal information; a display configured to visually present analytics of the measured analyte data; a processor connected with the non-volatile memory, the input, and the display, the processor configured to execute the program, where execution of the program causes the processor to: detect a plurality of portions of analyte data above a threshold analyte concentration level for a period of time; generate a plurality of indications of meal events, each of the plurality of indications corresponding to when one of the plurality of portions of analyte data was above a threshold analyte concentration level for a minimum threshold of time; associate meal information and an event time with at least a portion of the plurality of indication of meal events; control the display to visually present a first grouping of the at least a portion of the plurality of indication of meal events having associated meal information, where the event time of each of the indication of meal events in the first grouping occurs in a first time period during a day.

In some embodiments, execution of the program further causes the processor to display a graphical element indicative of an amount of time the analyte data is within a goal range for a second period of time.

In some embodiments, the first time period was determined to have a highest amount of time that the plurality of portions of analyte data satisfied the criteria. In some embodiments, the criteria requires that a portion of the analyte data is above a threshold analyte concentration level for the period of time. In some embodiments, the threshold analyte concentration is about 180 mg/dl, and the period of time is about 30 minutes. In some embodiments, the criteria requires that a portion of the analyte data is within a range of values for the period of time. In some embodiments, the range of values is defined by a minimum analyte concentration level of about 80 gm/dL to a maximum analyte concentration level of about 170 mg/dL.

In some embodiments, execution of the program further causes the processor to display a statement indicating which time period of the day has a highest amount of amount of time that the plurality of portions of analyte data satisfied the criteria.

In some embodiments, execution of the program further causes the processor to display a second grouping of the at least a portion of the plurality of indication of meal events having associated meal information, where the event time of each of the indication of meal events in the second grouping occurs in a second time period during a day, the second time period being different than the first time period.

In some embodiments, the associated time of each of the at least a portion of the plurality of indication of meal events are ranked in ascending order. In some embodiments, each of the first grouping has an associated time ranked as one of the top 5 longest associated times of each of the at least a portion of the plurality of indication of meal events. In some embodiments, the first time period of the day is a time period in which the plurality of portions of analyte data satisfied the criteria for a highest amount of time.

In many embodiments, an apparatus displaying on an electronic interface of a device, a graphical interface related to physiological analyte data, which includes: a non-volatile memory in which is stored a program; an input configured to receive measured analyte data and meal information; a display configured to visually present analytics of the measured analyte data; a processor connected with the non-volatile memory, the input, and the display, the processor configured to execute the program, where execution of the program causes the processor to: determine an amount of time that the received analyte data is within a goal range for a first time period; control the display to visually present a first graphical element indicative of an amount of time the analyte data is within a goal range for a first period of time, the first graphical element comprising: a numeric value corresponding to the amount of time the received analyte data was determined to be in the goal range for the first time period, and a progress indicator having a length that is proportional to the amount of time that the analyte data is determined to be within the goal range for the first time period.

In some embodiments, the first time period is the current day.

In some embodiments, the first time period is selected from the group consisting of the current day, the current week, and the previous week.

In some embodiments, the progress indicator is part of progress bar.

In some embodiments, the progress indicator is part of a circular graph.

In some embodiments, the execution of the program further causes the processor to display an indication of a target goal associated with the progress indicator.

In some embodiments, execution of the program further causes the processor to determine an amount of time that the received analyte data is within a goal range for a second time period; control the display to visually present a second graphical element indicative of an amount of time the analyte data is within a goal range for the second period of time, the second graphical element comprising: a numeric value corresponding to the amount of time the received analyte data was determined to be in the goal range for the second time period, and a progress indicator having a length that is proportional to the amount of time that the analyte data is determined to be within the goal range for the second time period. In some embodiments, execution of the program further causes the processor to determine an amount of time that the received analyte data is within a goal range for a third time period; control the display to visually present a third graphical element indicative of an amount of time the analyte data is within a goal range for a third period of time, the third graphical element comprising: a numeric value corresponding to the amount of time the received analyte data was determined to be in the goal range for the third time period, and a progress indicator having a length that is proportional to the amount of time that the analyte data is determined to be within the goal range for the third time period. In some embodiments, each of the first, second, and third time periods are individually selected from the group consisting of the current day, the current week, and the previous week.

In many embodiments, an apparatus for displaying on an electronic interface of a device, a graphical interface related to physiological analyte data, is provided, which includes: a non-volatile memory in which is stored a program; an input configured to receive measured analyte data; a display configured to visually present analytics of the measured analyte data; a processor connected with the non-volatile memory, the input, and the display, the processor configured to execute the program, where execution of the program causes the processor to: determine an amount of time that the received analyte data is within a goal range for first, second, and third time periods; control the display to visually present: a first graphical element indicative of an amount of time the analyte data is within a goal range for a first period of time; a second graphical element indicative of an amount of time the analyte data is within a goal range for a second period of time; and a third graphical element indicative of an amount of time the analyte data is within a goal range for a third period of time, where each of the first, second, and third graphical elements includes a first, second, and third progress indicator, where a length of the progress indicator is proportional to an amount of time that the analyte data is determined to be within the goal range for the first, second, and third time periods, respectively.

In some embodiments, the first time period is the current day.

In some embodiments, the second time period is the previous week.

In some embodiments, the third time period is the current week.

In some embodiments, each of the first, second, and third graphical elements comprise at least a portion of a circular shape, and where the first, second, and third progress indicators extend along a perimeter of each of the at least a portion of the circular shapes of the first, second, and third graphical elements.

In some embodiments, each of the first, second, and third graphical elements further comprise a goal indicator associated with a goal value, where the goal value corresponds to an amount of time or percentage of time the analyte data is within a goal range. In some embodiments, the goal indicator is located at a position along the perimeter of the at least a portion of the circular shape, where the position of the goal indicator is proportional to value of the goal.

In some embodiments, execution of the program further causes the processor to display a numerical representation of the amount of time that the received analyte data is determined to be within the goal range for first, second, and third time periods in association with the first, second, and third graphical elements, respectively. In some embodiments, the numerical representation of the amount of time that the received analyte data is determined to be within the goal range is displayed in a center of the at least a portion of the circular shapes of the first, second, and third graphical elements.

In many methods, a method of analyzing meal data is described. The method includes the steps of receiving an inputted log entry associated with a consumed meal, wherein the log entry includes a meal content and meal size of the consumed meal; associating the consumed meal with at least one post-prandial glucose trace; determining a grade of the consumed meal based on at least one characteristic of the at least one post-prandial glucose trace; and displaying the grade in association with the consumed meal in a graphical user interface.

In some methods, the meal content includes a text description of the meal content.

In some methods, the meal content is selected from a list of frequent items.

In some methods, the consumed meal is assigned a bad grade in response to a determination that the at least one post-prandial glucose trace comprises at least two post-prandial glucose traces having a high glucose pattern.

In some methods, the consumed meal is assigned a bad grade in response to a determination that the at least one post-prandial glucose trace does not include at least one post-prandial glucose trace having an in-range post-prandial pattern.

In some methods, the consumed meal is assigned a good grade in response to a determination that the at least one post-prandial glucose trace comprises at least one post-prandial glucose trace having an in-range post-prandial pattern.

In some methods, the consumed meal is assigned an inconclusive grade in response to a determination that the at least one post-prandial glucose trace does not include at least one post-prandial glucose trace having an in-range post-prandial pattern and does not include at least two post-prandial glucose traces having a high glucose pattern.

In some methods, the grade is a range of starts, wherein a higher number of stars indicates a better grade, and a lower number of stars indicates a lower grade. In some methods, a plurality of stars that are a gray color are indicative on an inconclusive grade.

In some methods, the grade is based on at least one characteristic of the at least one post-prandial glucose trace. In some methods, the at least one characteristic is a degree of a high glucose pattern. In some methods, the degree of the high glucose pattern is based on an area under the curve above about 180 mg/dL. In some methods, the degree of the high glucose pattern is based on an amount of time above about 180 mg/dL. In some methods, the at least one characteristic of the at least one post-prandial glucose trace is an amount of time within a goal range. In some methods, the goal range is between about 70 mg/dL and 180 mg/dL. In some methods, the grade is further based on a relationship between a start time of the consumed meal and the at least one characteristic.

In some methods, the grade is further based on an additional logged meal, wherein the additional logged meal is associated with the at least one post-prandial glucose trace.

In some methods, the grade is further based on a model that maps a plurality of inputs to a grade variable. In some methods, the grade variable is a range of 0 to 4, wherein 0 corresponds to a 1 star grade and 4 corresponds to a 5 star grade.

In many systems, a system for analyzing meal data is described. The system includes: an input configured to an inputted log entry associated with a consumed meal, wherein the log entry includes a meal content and meal size of the consumed meal; a display configured to visually present meal data; one or more processors coupled with the input, the display, and a memory storing instructions, wherein the instructions, when executed by the one or more processors, cause the one or more processors to: associate the consumed meal with at least one post-prandial glucose trace; determine a grade of the consumed meal based on at least one characteristic of the at least one post-prandial glucose trace; and display the grade in association with the consumed meal in a graphical user interface.

In some systems, the meal content includes a text description of the meal content.

In some systems, the meal content is selected from a list of frequent items.

In some systems, the consumed meal is assigned a bad grade in response to a determination that the at least one post-prandial glucose trace comprises at least two post-prandial glucose traces having a high glucose pattern.

In some systems, the consumed meal is assigned a bad grade in response to a determination that the at least one post-prandial glucose trace does not include at least one post-prandial glucose trace having an in-range post-prandial pattern.

In some systems, the consumed meal is assigned a good grade in response to a determination that the at least one post-prandial glucose trace comprises at least one post-prandial glucose trace having an in-range post-prandial pattern.

In some systems, the consumed meal is assigned an inconclusive grade in response to a determination that the at least one post-prandial glucose trace does not include at least one post-prandial glucose trace having an in-range post-prandial pattern and does not include at least two post-prandial glucose traces having a high glucose pattern.

In some systems, the grade is a range of starts, wherein a higher number of stars indicates a better grade, and a lower number of stars indicates a lower grade. In some systems, a plurality of stars that are a gray color are indicative on an inconclusive grade.

In some systems, the grade is based on at least one characteristic of the at least one post-prandial glucose trace. In some systems, the at least one characteristic is a degree of a high glucose pattern. In some systems, the degree of the high glucose pattern is based on an area under the curve above about 180 mg/dL. In some methods, the degree of the high glucose pattern is based on an amount of time above about 180 mg/dL. In some systems, the at least one characteristic of the at least one post-prandial glucose trace is an amount of time within a goal range. In some systems, the goal range is between about 70 mg/dL and 180 mg/dL. In some systems, the grade is further based on a relationship between a start time of the consumed meal and the at least one characteristic.

In some systems, the grade is further based on an additional logged meal, wherein the additional logged meal is associated with the at least one post-prandial glucose trace.

In some systems, the grade is further based on a model that maps a plurality of inputs to a grade variable. In some methods, the grade variable is a range of 0 to 4, wherein 0 corresponds to a 1 star grade and 4 corresponds to a 5 star grade.

In many methods, a method of analyzing meal data is described. The method includes the steps of: receiving an inputted log entry associated with a consumed meal; identifying at least one food included in the consumed meal;

associating the at least one food with at least one post-prandial glucose trace related to the consumed meal; determining a grade of the at least one food based on at least one characteristic of the at least one post-prandial glucose trace; and displaying the grade in association with the at least one food in a graphical user interface.

In some methods, the inputted log entry comprises a text description of the consumed meal, and wherein the identifying step comprises using natural language processing.

In some methods, the at least one food is assigned a bad grade in response to a determination that the at least one post-prandial glucose trace related to the consumed meal comprises at least two post-prandial glucose traces having a high glucose pattern.

In some methods, the at least one food is assigned a bad grade in response to a determination that the at least one post-prandial glucose trace does not include at least one post-prandial glucose trace having an in-range post-prandial pattern.

In some methods, the at least one food is assigned a good grade in response to a determination that the at least one post-prandial glucose trace comprises at least one post-prandial glucose trace having an in-range post-prandial pattern.

In some methods, the at least one food is assigned a good grade in response to a determination that the at least one post-prandial glucose trace does not include at least one post-prandial glucose trace having an in-range post-prandial pattern and does not include at least two post-prandial glucose traces having a high glucose pattern.

In some methods, the grade is a range of starts, wherein a higher number of stars indicates a better grade and a lower number of stars indicates a lower grade. In some methods, a plurality of stars that are a gray color are indicative on an inconclusive grade.

In some methods, the grade is based on at least one characteristic of the at least one post-prandial glucose trace. In some methods, the at least one characteristic of the at least one post-prandial glucose trace is a degree of a high glucose pattern. In some methods, the degree of the high glucose pattern is based on an area under the curve above about 180 mg/dL. In some methods, the degree of the high glucose pattern is based on an amount of time above about 180 mg/dL. In some methods, the at least one characteristic of the at least one post-prandial glucose trace is an amount of time within a goal range. In some methods, the goal range is between about 70 mg/dL and 180 mg/dL.

In some methods, the grade is further based on a relationship between a start time of the consumed meal and the at least one characteristic of the at least one post-prandial glucose traces.

In some methods, the grade is further based on an additional logged meal containing the at least one food, wherein the additional logged meal is associated with the at least one post-prandial glucose trace.

In some methods, the grade is further based on a model that maps a plurality of inputs to a grade variable. In some methods, the grade variable is a range of 0 to 4, wherein 0 corresponds to a 1 star grade and 4 corresponds to a 5 star grade.

In many systems, a system for analyzing meal data is described. The system includes: an input configured to an inputted log entry associated with a consumed meal; a display configured to visually present food data; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; determine a grade of the at least one food based on at least one characteristic of the at least one post-prandial glucose trace; and display the grade in association with the at least one food in a graphical user interface.

In some systems, the inputted log entry comprises a text description of the consumed meal, and wherein the identifying step comprises using natural language processing.

In some systems, the at least one food is assigned a bad grade in response to a determination that the at least one post-prandial glucose trace related to the consumed meal comprises at least two post-prandial glucose traces having a high glucose pattern.

In some systems, the at least one food is assigned a bad grade in response to a determination that the at least one post-prandial glucose trace does not include at least one post-prandial glucose trace having an in-range post-prandial pattern.

In some systems, the at least one food is assigned a good grade in response to a determination that the at least one post-prandial glucose trace comprises at least one post-prandial glucose trace having an in-range post-prandial pattern.

In some systems, the at least one food is assigned a good grade in response to a determination that the at least one post-prandial glucose trace does not include at least one post-prandial glucose trace having an in-range post-prandial pattern and does not include at least two post-prandial glucose traces having a high glucose pattern.

In some systems, the grade is a range of starts, wherein a higher number of stars indicates a better grade, and a lower number of stars indicates a lower grade. In some systems, a plurality of stars that are a gray color are indicative on an inconclusive grade.

In some systems, the grade is based on at least one characteristic of the at least one post-prandial glucose trace. In some systems, the at least one characteristic of the at least one post-prandial glucose trace is a degree of a high glucose pattern. In some systems, the degree of the high glucose pattern is based on an area under the curve above about 180 mg/dL. In some systems, the degree of the high glucose pattern is based on an amount of time above about 180 mg/dL. In some systems, the at least one characteristic of the at least one post-prandial glucose trace is an amount of time within a goal range. In some systems, the goal range is between about 70 mg/dL and 180 mg/dL.

In some systems, the grade is further based on a relationship between a start time of the consumed meal and the at least one characteristic of the at least one post-prandial glucose traces.

In some systems, the grade is further based on an additional logged meal containing the at least one food, wherein the additional logged meal is associated with the at least one post-prandial glucose trace.

In some systems, the grade is further based on a model that maps a plurality of inputs to a grade variable. In some systems, the grade variable is a range of 0 to 4, wherein 0 corresponds to a 1 star grade and 4 corresponds to a 5 star grade.

In many methods, a method of analyzing meal data is described. The method includes the steps of: receiving an inputted log entry associated with a consumed meal; identifying at least one food included in the consumed meal; associating the at least one food with at least one post-prandial glucose trace related to the consumed meal; storing the at least one food and the at least one post-prandial glucose trace related to the consumed meal in a database, wherein the database comprises a plurality of foods and associated post-prandial glucose traces for a population; determining a grade for the at least one food, wherein the grade is based on a subset of post-prandial glucose traces associated with the at least one food, and wherein the subset of post-prandial glucose traces are based on a segment of the population; and displaying the grade in association with the at least one food in a graphical user interface.

In some methods, the segment of the population has prediabetes.

In some methods, the segment of the population has Type 1 diabetes.

In some methods, the segment of the population has Type 2 diabetes.

In some methods, the grade is based on at least one characteristic of the subset of post-prandial glucose traces associated with the at least one food. In some methods, the at least one characteristic is a degree of a high pattern. In some methods, the degree of the high pattern is based on an area under the curve above about 180 mg/dL. In some methods, the degree of the high pattern is based on an amount of time above about 180 mg/dL. In some methods, the at least one characteristic of the at least one post-prandial glucose trace is an amount of time within a goal range. In some methods, the goal range is between about 70 mg/dL and 180 mg/dL. In some methods, the grade is further based on a relationship between a start time of the consumed meal and the at least one characteristic of the subset of post-prandial glucose traces associated with the at least one food.

In some methods, the grade is further based on an additional inputted log entry associated with a consumed meal containing the at least one food, wherein the inputted log entry is associated with the at least one post-prandial glucose trace.

In many systems, a system for analyzing meal data is described. The system includes: an input configured to an inputted log entry associated with a consumed meal; a display configured to visually present food data; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; store the at least one food and the at least one post-prandial glucose trace related to the consumed meal in a database, wherein the database comprises a plurality of foods and associated post-prandial glucose traces for a population; determine a grade for the at least one food, wherein the grade is based on a subset of post-prandial glucose traces associated with the at least one food, and wherein the subset of post-prandial glucose traces are based on a segment of the population; and display the grade in association with the at least one food in a graphical user interface.

In some systems, the segment of the population has prediabetes.

In some systems, the segment of the population has Type 1 diabetes.

In some systems, the segment of the population has Type 2 diabetes.

In some systems, the grade is based on at least one characteristic of the subset of post-prandial glucose traces associated with the at least one food. In some systems, the at least one characteristic is a degree of a high pattern. In some systems, the degree of the high pattern is based on an area under the curve above about 180 mg/dL. In some systems, the degree of the high pattern is based on an amount of time above about 180 mg/dL. In some systems, the at least one characteristic of the at least one post-prandial glucose trace is an amount of time within a goal range. In some systems, the goal range is between about 70 mg/dL and 180 mg/dL. In some systems, the grade is further based on a relationship between a start time of the consumed meal and the at least one characteristic of the subset of post-prandial glucose traces associated with the at least one food.

In some systems, the grade is further based on an additional inputted log entry associated with a consumed meal containing the at least one food, wherein the inputted log entry is associated with the at least one post-prandial glucose trace.

In many methods, a method for recommending food choices is described. The method includes the steps of: receiving an inputted log entry associated with a consumed meal from a user; identifying at least one food included in the consumed meal; associating the at least one food with at least one post-prandial glucose trace related to the consumed meal; determining a classification of the at least one food based on at least one characteristic of the at least one post-prandial glucose trace; analyzing the classification and the at least one food using a population model comprising a database of food classifications and associated foods for a plurality of population segments; associating the user with a segment of the plurality of population segments based on the classification and the at least one food, wherein the segment of the plurality of population segments is associated with a plurality of foods having a positive classification; and displaying a recommended food, wherein the recommended food is one of the plurality of foods having a positive classification for the segment of the plurality of population segments.

In some methods, the database further comprises meals, post-prandial glucose traces, user demographics, and user preferences. In some methods, the population model uses machine learning techniques to divide a population into the plurality of population segments. In some methods, the population model comprises a first model that assigns the user to the segment of the plurality of population segments based on analysis of the classification, the at least one food, at least one post-prandial glucose trace related to the at least one food, demographic information of the user, and preferences of the user. In some methods, the population model comprises a second model that maps the segment of the plurality of population segments to a plurality of good food items and a plurality of bad food items.

A system for recommending food choices is described. The system includes: an input configured to an inputted log entry associated with a consumed meal from a user; a display configured to visually present food; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; determine a classification of the at least one food based on at least one characteristic of the at least one post-prandial glucose trace; analyze the classification and the at least one food using a population model comprising a database of food classifications and associated foods for a plurality of population segments; associate the user with a segment of the plurality of population segments based on the classification and the at least one food, wherein the segment of the plurality of population segments is associated with a plurality of foods having a positive classification; and display a recommended food, wherein the recommended food is one of the plurality of foods having a positive classification for the segment of the plurality of population segments.

In some systems, the database further comprises meals, post-prandial glucose traces, user demographics, and user preferences. In some systems, the population model uses machine learning techniques to divide a population into the plurality of population segments. In some systems, the population model comprises a first model that assigns the user to the segment of the plurality of population segments based on analysis of the classification, the at least one food, at least one post-prandial glucose trace related to the at least one food, demographic information of the user, and preferences of the user. In some systems, the population model comprises a second model that maps the segment of the plurality of population segments to a plurality of good food items and a plurality of bad food items.

In many methods, a method for classifying meals is described. The method includes the steps of: receiving analyte data and meal information from a subject; classifying a plurality of foods as good or bad based on an effect of each of the plurality of foods on a post-prandial glucose level of the subject; displaying a plurality of foods that have been determined to be good for the subject; displaying a plurality of foods that have been determined to be bad for the subject; and displaying a counter showing a number of foods that have been classified as good and bad.

In some methods, the method further includes the steps of displaying a plurality of foods that have been determined to have a neutral effect on the subject; and displaying a counter showing a number of foods that have been classified as good, bad, and neutral.

In some methods, displaying the counter on a home screen.

In many systems, a system for classifying meals is described. The system includes an input configured to receive analyte data and meal information from a subject; a display configured to visually present a display of meal groupings; one or more processors coupled with the input, the display, and a memory storing instructions, wherein the instructions, when executed by the one or more processors, cause the one or more processors to: classify a plurality of foods as good or bad based on an effect of each of the plurality of foods on a post-prandial glucose level of the subject; display a plurality of foods that have been determined to be good for the subject; display a plurality of foods that have been determined to be bad for the subject; and display a counter showing a number of foods that have been classified as good and bad.

In some systems, the instructions further cause the one or more processors to: display a plurality of foods that have been determined to have a neutral effect on the subject; and display a counter showing a number of foods that have been classified as good, bad, and neutral.

In some systems, the instructions further cause the one or more processors to display the counter on a home screen.

In many methods, a method for recommending meals is described. The method includes the steps of: determining a time-of-day period having a highest glucose pattern based on a metric determined with reference to an upper glucose threshold; determining a most frequently logged meal in the time-of-day period having the highest glucose pattern; and displaying an alternative meal suggestion to replace the most frequently logged meal in the time-of-day period having the highest glucose pattern.

In some methods, the upper glucose threshold is about 180 mg/dL.

In some methods, the metric is an area under the curve above about 180 mg/dL.

In some methods, the metric is a time above about 180 mg/dL.

In some methods, the most frequently logged meal in the time-of-day period having the highest glucose pattern is associated with a post-prandial glucose trace having a high glucose pattern.

In some methods, the method further includes the step of displaying a comparison of a post-prandial glucose trace associated with the alternative meal suggestion and a post-prandial glucose trace associated with the most frequently logged meal after a user has eaten the alternative meal suggestion.

In some methods, the method further includes the step of displaying the alternative meal suggestion in a list of frequently logged foods. In some methods, the alternative meal suggestion is displayed at the beginning of the list.

In some methods, the method further includes the step of determining the alternative meal suggestion by searching a database of healthy options for the time-of-day period having the highest glucose pattern.

In some methods, the time-of-day period is breakfast, lunch, or dinner.

In many systems, a system for recommending meals is described. The system includes: an input configured to receive analyte data and meal information from a subject; a display configured to visually present a display meals or food; one or more processors coupled with the input, the display, and a memory storing instructions, wherein the instructions, when executed by the one or more processors, cause the one or more processors to: determine a time-of-day period having a highest glucose pattern based on a metric determined with reference to an upper glucose threshold; determine a most frequently logged meal in the time-of-day period having the highest glucose pattern; and display an alternative meal suggestion to replace the most frequently logged meal in the time-of-day period having the highest glucose pattern.

In some systems, the upper glucose threshold is about 180 mg/dL.

In some systems, the metric is an area under the curve above about 180 mg/dL.

In some systems, the metric is a time above about 180 mg/dL.

In some systems, the most frequently logged meal in the time-of-day period having the highest glucose pattern is associated with a post-prandial glucose trace having a high glucose pattern.

In some systems, the instructions further cause the one or more processors to: display a comparison of a post-prandial glucose trace associated with the alternative meal suggestion and a post-prandial glucose trace associated with the most frequently logged meal after a user has eaten the alternative meal suggestion.

In some systems, the instructions further cause the one or more processors to: display the alternative meal suggestion in a list of frequently logged foods. In some systems, the alternative meal suggestion is displayed at the beginning of the list.

In some systems, the instructions further cause the one or more processors to:

determine the alternative meal suggestion by searching a database of healthy options for the time-of-day period having the highest glucose pattern.

In some systems, the time-of-day period is breakfast, lunch, or dinner.

In many methods, a method recommending alternative food choices is described. The method includes the steps of: receiving an inputted log entry associated with a consumed meal, wherein the inputted log entry comprises a text description with the consumed meal; identifying at least one food included in the text description of the at least one logged meal; associating the at least one food with at least one post-prandial glucose trace related to the consumed meal; determining a classification of the at least one food as positive or negative (or alternatively good or bad) based on an effect of the at least one food on the post-prandial glucose trace; storing the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determining an alternative food choice from the plurality of alternative food choices; and displaying a recommendation comprising the alternative food choice as a replacement of the at least one food that was classified as bad.

In some methods, the alternative food choices have been classified as good for a plurality of individuals.

In some methods, the method further includes the steps of: determining a time-of-day period having a highest glucose pattern for a user based on a metric determined with reference to an upper glucose threshold; determining a most frequently logged food in the time-of-day period having the highest glucose pattern; and displaying an additional alternative food choice to replace the most frequently logged food.

In some methods, the method further includes the steps of: prompting a user for input on food preferences; and displaying an additional alternative food choice to replace the at least one food that was classified as bad based on the database and the food preferences inputted by the user.

In many systems, a system for recommending alternative food choices is described. The system includes: an input configured to receive an inputted log entry associated with a consumed meal, wherein the inputted log entry comprises a text description with the consumed meal; a display configured to visually present a display meals or food; one or more processors coupled with the input, the display, and a memory storing instructions, wherein the instructions, when executed by the one or more processors, cause the one or more processors to: identify at least one food included in the text description of the at least one logged meal; associate the at least one food with at least one post-prandial glucose trace related to the consumed meal; determine a classification of the at least one food as positive or negative based on an effect of the at least one food on the post-prandial glucose trace; store the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determine an alternative food choice from the plurality of alternative food choices; and display a recommendation comprising the alternative food choice as a replacement of the at least one food that was classified as bad.

In some systems, the alternative food choices have been classified as good for a plurality of individuals.

In some systems, the instructions further cause the one or more processors to: determine a time-of-day period having a highest glucose pattern for a user based on a metric determined with reference to an upper glucose threshold; determine a most frequently logged food in the time-of-day period having the highest glucose pattern; and display an additional alternative food choice to replace the most frequently logged food.

In some systems, the instructions further cause the one or more processors to: prompt a user for input on food preferences; and display an additional alternative food choice to replace the at least one food that was classified as bad based on the database and the food preferences inputted by the user.

In many methods, a method for recommending alternative food choices is described. The method includes the steps of identifying at least one food included in the text description of the at least one logged meal; associating the at least one food with at least one post-prandial glucose trace related to the consumed meal; determining a classification of the at least one food as positive or negative based on an effect of the at least one food on the post-prandial glucose trace; storing the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determining an alternative food choice from the plurality of alternative food choices; and displaying a recommendation comprising the alternative food choice as a replacement of the at least one food that was classified as bad.

In some methods, the alternative food choices have been classified as good for a plurality of individuals.

In some methods, the method further includes the steps of: determining a time-of-day period having a highest glucose pattern for a user based on a metric determined with reference to an upper glucose threshold; determining a most frequently logged food in the time-of-day period having the highest glucose pattern; and displaying an additional alternative food choice to replace the most frequently logged food.

In some methods, the method further includes the steps of: prompting a user for input on food preferences; and displaying an additional alternative food choice to replace the at least one food that was classified as bad based on the database and the food preferences inputted by the user.

In many methods, a method of analyzing meal data is described. The method includes the steps of: receiving an inputted log entry from a user associated with a consumed meal; determining a grade for the consumed meal based on at least one characteristic of at least one post-prandial glucose trace associated with the consumed meal, wherein the grade is changeable; and displaying the grade in association with the consumed meal in a graphical user interface.

In some methods, the grade may be changed by the user.

In some methods, the inputted log entry was received at a first time, and the method further includes the step of: removing the grade for the consumed meal after a period of time after the first time. In some methods, the period of time is about 6 months.

In some methods, the inputted log entry was received at a first time, further comprising the step of determining a new grade to the at least one logged meal after a period of time after the first time. In some methods, the period of time is about 6 months.

In many systems, a system for analyzing meals is described. The system includes: an input configured to receive receiving an inputted log entry from a user associated with a consumed meal; a display configured to visually present a display meals or food and a grade; one or more processors coupled with the input, the display, and a memory storing instructions, wherein the instructions, when executed by the one or more processors, cause the one or more processors to: determine a grade for the consumed meal based on at least one characteristic of at least one postprandial glucose trace associated with the consumed meal, wherein the grade is changeable; and display the grade in association with the consumed meal in a graphical user interface.

In some methods, the grade may be changed by the user.

In some methods, the inputted log entry was received at a first time, wherein the instructions further cause the one or more processors to: remove the grade for the consumed meal after a period of time after the first time. In some methods, the period of time is about 6 months.

In some methods, the inputted log entry was received at a first time, further comprising the step of determining a new grade to the at least one logged meal after a period of time after the first time. In some methods, the period of time is about 6 months.

Systems, devices, and methods for detecting, measuring and classifying meals for an individual based on analyte measurements. These results and related information can be presented to the individual to show the individual which meals are causing the most severe analyte response. These results can be organized and categorized based on preselected criteria or previous meals and results so as to organize and present the results in a format with reference to glucose as the monitored analyte. Various embodiments disclosed herein relate to methods, systems, and software applications intended to engage an individual by providing direct and timely feedback regarding the individual's meal-related glycemic response.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

In many instances, entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

The subject matter described herein and in the accompanying figures is done so with sufficient detail and clarity to permit the inclusion of claims, at any time, in means-plus-function format pursuant to 35 U.S.C. section 112, part (f). However, a claim is to be interpreted as invoking this means-plus-function format only if the phrase "means for" is explicitly recited in that claim.

Aspects of the invention are set out in the independent claims and preferred features are set out in the dependent claims. The preferred features of the dependent claims may be provided in combination in a single embodiment and preferred features of one aspect may be provided in conjunction with other aspects.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

While the embodiments are susceptible to various modifications and alternative forms, specific examples thereof have been shown in the drawings and are herein described in detail. These embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the scope of the claims by features, functions, steps, or elements that are not within that scope.

CLAUSES

Exemplary embodiments are set out in the following numbered clauses.

Clause 1. A method of processing analyte data, the method comprising: receiving analyte data sensed from an individual; detecting an episode in the received analyte data; displaying a first episode marker associated with the detected episode on a graph of analyte data; providing a screen configured to receive information regarding the detected episode; and displaying a second episode marker associated with the detected episode on the graph of analyte data after information is received regarding the detected episode.

Clause 2. The method of clause 1, further comprising the step of displaying a notification that the episode was detected.

Clause 3. The method of clause 2, wherein the step of displaying the notification comprises displaying a numeric value corresponding to a number of detected episodes on an icon.

Clause 4. The method of clause 3, wherein the numeric value is incremented when an episode is detected.

Clause 5. The method of clause 3, wherein the numeric value is decremented after information has been received for a detected episode.

Clause 6. The method of clause 3, wherein the numeric value is decremented after a predetermined time has passed after the episode was detected.

Clause 7. The method of clause 2, wherein the step of displaying the notification comprises displaying an alert.

Clause 8. The method of clause 1, wherein the first episode marker is different from the second episode marker.

Clause 9. The method of clause 1, wherein the first episode marker comprises a question mark.

Clause 10. The method of clause 1, wherein the second episode marker comprises a picture related to the received information.

Clause 11. The method of clause 1, wherein the second episode marker comprises an X.

Clause 12. The method of clause 1, wherein the detected episode is an out-of-range episode.

Clause 13. The method of clause 1, wherein the first episode marker is placed at a time on the graph of analyte data at an estimated start time of the detected episode.

Clause 14. The method of clause 1, wherein the analyte data is glucose data.

Clause 15. An apparatus for processing analyte data, comprising: an input configured to receive measured analyte data; a display configured to visually present analytics of the measured analyte data; and one or more processors coupled with the input, the display, and a memory storing instructions, wherein the instructions, when executed by the one or more processors, cause the one or more processors to: detect an episode in the received analyte data; display a first episode marker associated with the detected episode on a graph of analyte data; provide a screen configured to receive information regarding the detected episode; and display a second episode marker associated with the detected episode on the graph of analyte data after information is received regarding the detected episode.

Clause 16. The apparatus of clause 15, wherein execution of the program causes the processor to display a notification that the episode was detected.

Clause 17. The apparatus of clause 16, wherein the notification comprises displaying a numeric value corresponding to a number of detected episodes on an icon.

Clause 18. The apparatus of clause 17, wherein the numeric value is incremented when an episode is detected.

Clause 19. The apparatus of clause 17, wherein the numeric value is decremented after information has been received for a detected episode.

Clause 20. The apparatus of clause 17, wherein the numeric value is decremented after a predetermined time has passed after the episode was detected.

Clause 21. A method of processing analyte data using an in vivo analyte monitoring system, the method comprising: receiving analyte data sensed from an individual; processing the analyte data to detect, with processing circuitry, a plurality of portions of analyte data that satisfy a criteria for a period of time; and associating one or more meal events with one or more of the plurality of portions of analyte data, wherein each of the one or more meal events has an associated time that the associated one or more plurality of portions of analyte data satisfied the criteria.

Clause 22. The method of clause 21, wherein the criteria requires that a portion of the analyte data is above a threshold analyte concentration level for the period of time.

Clause 23. The method of clause 22, wherein the threshold analyte concentration level is about 180 mg/dl.

Clause 24. The method of clause 21, wherein the criteria requires that a portion of the analyte data is within a range of values for the period of time.

Clause 25. The method of clause 24, wherein the range of values is defined by a minimum analyte concentration level of about 80 mg/dL to a maximum analyte concentration level of about 170 mg/dL.

Clause 26. The method of clause 21, wherein the period of time is about 30 minutes.

Clause 27. The method of clause 21, wherein the method further comprises the step of ranking each of the one or more meal events according to the associated time.

Clause 28. The method of clause 27, wherein the associated time of each of the one or more meal events are ranked in ascending order.

Clause 29. The method of clause 27, further comprising the step of displaying a group of the one or more meal events, wherein each of the group has an associated time ranked as one of the top 5 longest associated times of the one or more meal events.

Clause 30. The method of clause 29, wherein each of the group of the one or more meal events displayed is associated with a first time period of a day.

Clause 31. The method of clause 30, wherein the first time period of the day is a time period in which the plurality of portions of analyte data satisfied the criteria for a highest amount of time.

Clause 32. The method of clause 31, wherein the criteria requires that a portion of the analyte data is within a range of values for the period of time.

Clause 33. The method of clause 31, wherein the criteria requires that a portion of the analyte data is above a threshold analyte concentration level for the period of time.

Clause 34. The method of clause 31, further comprising the step of displaying a graph of analyte data over time, wherein the first time period of the day is highlighted.

Clause 35. The method of clause 30, further comprising the step of displaying a second group of one or more meal events, wherein each of the second group has an associated time ranked as one of the top 5 longest associated times of the one or more meal events, wherein each of the second group of the one or more meal events displayed is associated with a second time period of a day, the second time period of the day being different than the first time period of the day.

Clause 36. The method of clause 35, wherein the criteria requires that a portion of the analyte data is within a range of values for the period of time.

Clause 37. The method of clause 35, wherein the criteria requires that a portion of the analyte data is above a threshold analyte concentration level for the period of time.

Clause 38. The method of clause 35, further comprising the step of displaying a graph of analyte data over time, wherein the first time period of the day is highlighted.

Clause 39. An apparatus for the processing analyte data, the apparatus comprising: an input configured to receive measured analyte data; one or more processors coupled with the input, the display, and a memory storing instructions, wherein the instructions, when executed by the one or more processors, causes the one or more processors to: process the analyte data to detect a plurality of portions of analyte data that satisfy a criteria for a period of time; and associate one or more meal events with one or more of the plurality of portions of analyte data, wherein each of the one or more meal events has an associated time that the associated one or more plurality of portions of analyte data satisfied the criteria.

Clause 40. The apparatus of clause 39, wherein the criteria requires that a portion of the analyte data is above a threshold analyte concentration level for the period of time.

Clause 41. The apparatus of clause 40, wherein the threshold analyte concentration level is about 180 mg/dl.

Clause 42. The apparatus of clause 39, wherein the criteria requires that a portion of the analyte data is within a range of values for the period of time.

Clause 43. The apparatus of clause 42, wherein the range of values is defined by a minimum analyte concentration level of about 80 mg/dL to a maximum analyte concentration level of about 170 mg/dL.

Clause 44. The apparatus of clause 39, wherein the period of time is about 30 minutes.

Clause 45. A method for displaying on an electronic interface of a device, a graphical interface related to physiological analyte data and meal information, the method comprising the steps of: receiving analyte data sensed from an individual; processing the analyte data to detect, with processing circuitry, a plurality of portions of analyte data that satisfy a criteria for a period of time; generating a plurality of indications of meal events, each of the plurality of indications corresponding to when one of the plurality of portions of analyte data that satisfied the criteria for the period of time; associating meal information, an event time, and an associated time with each of the at least a portion of the plurality of indication of meal events, wherein the associated time is an amount of time that the corresponding one or more plurality of portions of analyte data satisfied the criteria; and displaying a first grouping of the at least a portion of the plurality of indication of meal events having associated meal information, wherein the event time of each of the indication of meal events in the first grouping occurs in a first time period during a day.

Clause 46. The method of clause 45, further comprising the step of displaying a graphical element indicative of an amount of time the analyte data is within a goal range for a second period of time.

Clause 47. The method of clause 45, wherein the first time period was determined to have a highest amount of time that the plurality of portions of analyte data satisfied the criteria.

Clause 48. The method of clause 47, wherein the criteria requires that a portion of the analyte data is above a threshold analyte concentration level for the period of time.

Clause 49. The method of clause 48, wherein the threshold analyte concentration is about 180 mg/dl, and the period of time is about 30 minutes.

Clause 50. The method of clause 47, wherein the criteria requires that a portion of the analyte data is within a range of values for the period of time.

Clause 51. The method of clause 50, wherein the range of values is defined by a minimum analyte concentration level of about 80 gm/dL to a maximum analyte concentration level of about 170 mg/dL.

Clause 52. The method of clause 45, further comprising the step of displaying a statement indicating which time period of the day has a highest amount of amount of time that the plurality of portions of analyte data satisfied the criteria.

Clause 53. The method of clause 45, further comprising the step of displaying a second grouping of the at least a portion of the plurality of indication of meal events having associated meal information, wherein the event time of each of the indication of meal events in the second grouping occurs in a second time period during a day, the second time period being different than the first time period.

Clause 54. The method of clause 45, wherein the associated time of each of the at least a portion of the plurality of indication of meal events are ranked in ascending order.

Clause 55. The method of clause 54, wherein each of the first grouping has an associated time ranked as one of the top 5 longest associated times of each of the at least a portion of the plurality of indication of meal events.

Clause 56. The method of clause 54, wherein the first time period of the day is a time period in which the plurality of portions of analyte data satisfied the criteria for a highest amount of time.

Clause 57. An apparatus for the displaying on an electronic interface of a device, a graphical interface related to physiological analyte data and meal information, the apparatus comprising: an input configured to receive measured analyte data and meal information; a display configured to visually present analytics of the measured analyte data; and one or more processors coupled with the input, the display, and a memory storing instructions, wherein the instructions, when executed by the one or more processors, cause the one or more processors to: detect a plurality of portions of analyte data above a threshold analyte concentration level for a period of time; generate a plurality of indications of meal events, each of the plurality of indications corresponding to when one of the plurality of portions of analyte data was above a threshold analyte concentration level for a minimum threshold of time; associate meal information and an event time with at least a portion of the plurality of indication of meal events; and control the display to visually present a first grouping of the at least a portion of the plurality of indication of meal events having associated meal information, wherein the event time of each of the indication of meal events in the first grouping occurs in a first time period during a day.

Clause 58. The apparatus of clause 57, wherein execution of the program causes the one or more processors to display a graphical element indicative of an amount of time the analyte data is within a goal range for a second period of time.

Clause 59. The apparatus of clause 57, wherein the first time period was determined to have a highest amount of time that the plurality of portions of analyte data satisfied the criteria.

Clause 60. The apparatus of clause 59, wherein the criteria requires that a portion of the analyte data is above a threshold analyte concentration level for the period of time.

Clause 61. The apparatus of clause 60, wherein the threshold analyte concentration is about 180 mg/dl, and the period of time is about 30 minutes.

Clause 62. The apparatus of clause 59, wherein the criteria requires that a portion of the analyte data is within a range of values for the period of time.

Clause 63. The apparatus of clause 62, wherein the range of values is defined by a minimum analyte concentration level of about 80 gm/dL to a maximum analyte concentration level of about 170 mg/dL.

Clause 64. A method for displaying on an electronic interface of a device, a graphical interface related to physiological analyte data, the method comprising the steps of: receiving analyte data sensed from an individual; determining an amount of time that the received analyte data is within a goal range for a first time period; displaying a first graphical element indicative of an amount of time the analyte data is within a goal range for a first period of time, the first graphical element comprising: a numeric value corresponding to the amount of time the received analyte data was determined to be in the goal range for the first time period, and a progress indicator having a length that is proportional to the amount of time that the analyte data is determined to be within the goal range for the first time period.

Clause 65. The method of clause 64, wherein the first time period is the current day.

Clause 66. The method of clause 64, wherein the first time period is selected from the group consisting of the current day, the current week, and the previous week.

Clause 67. The method of clause 64, wherein the progress indicator is part of progress bar.

Clause 68. The method of clause 64, wherein the progress indicator is part of a circular graph.

Clause 69. The method of clause 64, further comprising displaying an indication of a target goal associated with the progress indicator.

Clause 70. The method of clause 64, further comprising a second graphical element indicative of an amount of time the analyte data is within a goal range for a second period of time, the second graphical element comprising: a numeric value corresponding to the amount of time the received analyte data was determined to be in the goal range for the second time period, and a progress indicator having a length that is proportional to the amount of time that the analyte data is determined to be within the goal range for the second time period.

Clause 71. The method of clause 70, further comprising a third graphical element indicative of an amount of time the analyte data is within a goal range for a third period of time, the third graphical element comprising: a numeric value corresponding to the amount of time the received analyte data was determined to be in the goal range for the third time period, and a progress indicator having a length that is proportional to the amount of time that the analyte data is determined to be within the goal range for the third time period.

Clause 72. The method of clause 71, wherein each of the first, second, and third time periods are individually selected from the group consisting of the current day, the current week, and the previous week.

Clause 73. An apparatus for displaying on an electronic interface of a device, a graphical interface related to physiological analyte data, the apparatus comprising: an input configured to receive measured analyte data and meal information; a display configured to visually present analytics of the measured analyte data; and one or more processors coupled with the input, the display, and a memory storing instructions, wherein the instructions, when executed by the one or more processors, cause the one or more processors to: determine an amount of time that the received analyte data is within a goal range for a first time period; control the display to visually present a first graphical element indicative of an amount of time the analyte data is within a goal range for a first period of time, the first graphical element comprising: a numeric value corresponding to the amount of time the received analyte data was determined to be in the goal range for the first time period, and a progress indicator having a length that is proportional to the amount of time that the analyte data is determined to be within the goal range for the first time period.

Clause 74. The apparatus of clause 73, wherein the first time period is the current day.

Clause 75. The apparatus of clause 73, wherein the first time period is selected from the group consisting of the current day, the current week, and the previous week.

Clause 76. The apparatus of clause 73, wherein the progress indicator is part of progress bar.

Clause 77. The apparatus of clause 73, wherein the progress indicator is part of a circular graph.

Clause 78. The apparatus of clause 73, wherein execution of the program causes the processor to display an indication of a target goal associated with the progress indicator.

Clause 79. The apparatus of clause 73, wherein execution of the program further causes the one or more processors to: determine an amount of time that the received analyte data is within a goal range for a second time period; control the display to visually present a second graphical element indicative of an amount of time the analyte data is within a goal range for the second period of time, the second graphical element comprising: a numeric value corresponding to the amount of time the received analyte data as determined to be in the goal range for the second time period, and a progress indicator having a length that is proportional to the amount of time that the analyte data is determined to be within the goal range for the second time period.

Clause 80. The apparatus of clause 79, wherein execution of the program further causes the one or more processors to: determine an amount of time that the received analyte data is within a goal range for a third time period; control the display to visually present a third graphical element indicative of an amount of time the analyte data is within a goal range for a third period of time, the third graphical element comprising: a numeric value corresponding to the amount of time the received analyte data was determined to be in the goal range for the third time period, and a progress indicator having a length that is proportional to the amount of time that the analyte data is determined to be within the goal range for the third time period.

Clause 81. The apparatus of clause 80, wherein each of the first, second, and third time periods are individually selected from the group consisting of the current day, the current week, and the previous week.

Clause 82. A method for displaying on an electronic interface of a device, a graphical interface related to physiological analyte data, the method comprising the steps of: receiving analyte data sensed from an individual; determining an amount of time that the received analyte data is within a goal range for first, second, and third time periods; displaying, on the electronics interface, a first graphical element indicative of an amount of time the analyte data is within a goal range for a first period of time, a second graphical element indicative of an amount of time the analyte data is within a goal range for a second period of time, and a third graphical element indicative of an amount of time the analyte data is within a goal range for a third period of time, wherein each of the first, second, and third graphical elements includes a first, second, and third progress indicator, wherein a length of the progress indicator is proportional to an amount of time that the analyte data is determined to be within the goal range for the first, second, and third time periods, respectively.

Clause 83. The method of clause 82, wherein the first time period is the current day.

Clause 84. The method of clause 82, wherein the second time period is the previous week.

Clause 85. The method of clause 82, wherein the third time period is the current week.

Clause 86. The method of clause 82, wherein each of the first, second, and third graphical elements comprise at least a portion of a circular shape, and wherein the first, second, and third progress indicators extend along a perimeter of each of the at least a portion of the circular shapes of the first, second, and third graphical elements.

Clause 87. The method of clause 82, wherein each of the first, second, and third graphical elements further comprise a goal indicator associated with a goal value, wherein the goal value corresponds to an amount of time or percentage of time the analyte data is within a goal range.

Clause 88. The method of clause 87, wherein the goal indicator is located at a position along the perimeter of the at least a portion of the circular shape, wherein the position of the goal indicator is proportional to value of the goal.

Clause 89. The method of clause 82, further comprising displaying a numerical representation of the amount of time that the received analyte data is determined to be within the goal range for first, second, and third time periods in association with the first, second, and third graphical elements, respectively.

Clause 90. The method of clause 89, wherein the numerical representation of the amount of time that the received analyte data is determined to be within the goal range is displayed in a center of the at least a portion of the circular shapes of the first, second, and third graphical elements.

Clause 91. An apparatus for displaying on an electronic interface of a device, a graphical interface related to physiological analyte data, the apparatus comprising: an input configured to receive measured analyte data; a display configured to visually present analytics of the measured analyte data; and one or more processors coupled with the input, the display, and a memory storing instructions, wherein the instructions, when executed by the one or more processors, cause the one or more processors to: determine an amount of time that the received analyte data is within a goal range for first, second, and third time periods; control the display to visually present: a first graphical element indicative of an amount of time the analyte data is within a goal range for a first period of time; a second graphical element indicative of an amount of time the analyte data is within a goal range for a second period of time; and a third graphical element indicative of an amount of time the analyte data is within a goal range for a third period of time, wherein each of the first, second, and third graphical elements includes a first, second, and third progress indicator, wherein a length of the progress indicator is proportional to an amount of time that the analyte data is determined to be within the goal range for the first, second, and third time periods, respectively.

Clause 92. The apparatus of clause 91, wherein the first time period is the current day.

Clause 93. The apparatus of clause 91, wherein the second time period is the previous week.

Clause 94. The apparatus of clause 91, wherein the third time period is the current week.

Clause 95. The apparatus of clause 91, wherein each of the first, second, and third graphical elements comprise at least a portion of a circular shape, and wherein the first, second, and third progress indicators extend along a perimeter of each of the at least a portion of the circular shapes of the first, second, and third graphical elements.

Clause 96. The apparatus of clause 91, wherein each of the first, second, and third graphical elements further comprise a goal indicator associated with a goal value, wherein the goal value corresponds to an amount of time or percentage of time the analyte data is within a goal range.

Clause 97. The method of clause 96, wherein the goal indicator is located at a position along the perimeter of the at least a portion of the circular shape, wherein the position of the goal indicator is proportional to value of the goal.

Clause 98. A method of analyzing meal data, the method comprising: receiving an inputted log entry associated with a consumed meal, wherein the log entry includes a meal content and meal size of the consumed meal; associating the consumed meal with at least one post-prandial glucose trace; determining a grade of the consumed meal based on at least one characteristic of the at least one post-prandial glucose trace; and displaying the grade in association with the consumed meal in a graphical user interface.

Clause 99. The method of clause 98, wherein the meal content includes a text description of the meal content.

Clause 100. The method of clause 98, wherein the meal content is selected from a list of frequent items.

Clause 101. The method of clause 98, wherein the consumed meal is assigned a bad grade in response to a determination that the at least one post-prandial glucose trace comprises at least two post-prandial glucose traces having a high glucose pattern.

Clause 102. The method of clause 98, wherein the consumed meal is assigned a bad grade in response to a determination that the at least one post-prandial glucose trace does not include at least one post-prandial glucose trace having an in-range post-prandial pattern.

Clause 103. The method of clause 98, wherein the consumed meal is assigned a good grade in response to a determination that the at least one post-prandial glucose trace comprises at least one post-prandial glucose trace having an in-range post-prandial pattern.

Clause 104. The method of clause 98, wherein the consumed meal is assigned an inconclusive grade in response to a determination that the at least one post-prandial glucose trace does not include at least one post-prandial glucose trace having an in-range post-prandial pattern and does not include at least two post-prandial glucose traces having a high glucose pattern.

Clause 105. The method of clause 98, wherein the grade is a range of starts, wherein a higher number of stars indicates a better grade and a lower number of stars indicates a lower grade.

Clause 106. The method of clause 105, wherein a plurality of stars that are a gray color are indicative on an inconclusive grade.

Clause 107. The method of clause 98, wherein the grade is based on at least one characteristic of the at least one post-prandial glucose trace.

Clause 108. The method of clause 107, wherein the at least one characteristic is a degree of a high glucose pattern.

Clause 109. The method of clause 108, wherein the degree of the high glucose pattern is based on an area under the curve above about 180 mg/dL.

Clause 110. The method of clause 108, wherein the degree of the high glucose pattern is based on an amount of time above about 180 mg/dL.

Clause 111. The method of clause 107, wherein the at least one characteristic of the at least one post-prandial glucose trace is an amount of time within a goal range.

Clause 112. The method of clause 111, wherein the goal range is between about 70 mg/dL and 180 mg/dL.

Clause 113. The method of clause 107, wherein the grade is further based on a relationship between a start time of the consumed meal and the at least one characteristic.

Clause 114. The method of clause 98, wherein the grade is further based on an additional logged meal, wherein the additional logged meal is associated with the at least one post-prandial glucose trace.

Clause 115. The method of clause 98, wherein the grade is further based on a model that maps a plurality of inputs to a grade variable.

Clause 116. The method of clause 115, wherein the grade variable is a range of 0 to 4, wherein 0 corresponds to a 1 star grade and 4 corresponds to a 5 star grade.

Clause 117. A system for analyzing meal data, the system comprising: an input configured to an inputted log entry associated with a consumed meal, wherein the log entry includes a meal content and meal size of the consumed meal; a display configured to visually present meal data; one or more processors coupled with the input, the display, and a memory storing instructions, wherein the instructions, when executed by the one or more processors, cause the one or more processors to: associate the consumed meal with at least one post-prandial glucose trace; determine a grade of the consumed meal based on at least one characteristic of the at least one post-prandial glucose trace; and display the grade in association with the consumed meal in a graphical user interface.

Clause 118. The system of clause 117, wherein the meal content includes a text description of the meal content.

Clause 119. The system of clause 117, wherein the meal content is selected from a list of frequent items.

Clause 120. The system of clause 117, wherein the consumed meal is assigned a bad grade in response to a determination that the at least one post-prandial glucose trace comprises at least two post-prandial glucose traces having a high glucose pattern.

Clause 121. The system of clause 117, wherein the consumed meal is assigned a bad grade in response to a determination that the at least one post-prandial glucose trace does not include at least one post-prandial glucose trace having an in-range post-prandial pattern.

Clause 122. The system of clause 117, wherein the consumed meal is assigned a good grade in response to a determination that the at least one post-prandial glucose trace comprises at least one post-prandial glucose trace having an in-range post-prandial pattern.

Clause 123. The system of clause 117, wherein the consumed meal is assigned an inconclusive grade in response to a determination that the at least one post-prandial glucose trace does not include at least one post-prandial glucose trace having an in-range post-prandial pattern and does not include at least two post-prandial glucose traces having a high glucose pattern.

Clause 124. The system of clause 117, wherein the grade is a range of starts, wherein a higher number of stars indicates a better grade and a lower number of stars indicates a lower grade.

Clause 125. The system of clause 124, wherein a plurality of stars that are a gray color are indicative on an inconclusive grade.

Clause 126. The system of clause 117, wherein the grade is based on at least one characteristic of the at least one post-prandial glucose trace.

Clause 127. The system of clause 126, wherein the at least one characteristic is a degree of a high glucose pattern.

Clause 128. The system of clause 127, wherein the degree of the high glucose pattern is based on an area under the curve above about 180 mg/dL.

Clause 129. The system of clause 127, wherein the degree of the high glucose pattern is based on an amount of time above about 180 mg/dL.

Clause 130. The system of clause 126, the at least one characteristic of the at least one post-prandial glucose trace is an amount of time within a goal range.

Clause 131. The system of clause 130, wherein the goal range is between about 70 mg/dL and 180 mg/dL.

Clause 132. The system of clause 126, wherein the grade is further based on a relationship between a start time of the consumed meal and the at least one characteristic.

Clause 133. The system of clause 117, wherein the grade is further based on an additional logged meal, wherein the additional logged meal is associated with the at least one post-prandial glucose trace.

Clause 134. The system of clause 117, wherein the grade is further based on a model that maps a plurality of inputs to a grade variable.

Clause 135. The system of clause 134, wherein the grade variable is a range of 0 to 4, wherein 0 corresponds to a 1 star grade and 4 corresponds to a 5 star grade.

Clause 136. A method of analyzing meal data, the method comprising: receiving an inputted log entry associated with a consumed meal; identifying at least one food included in the consumed meal; associating the at least one food with at least one post-prandial glucose trace related to the consumed meal; determining a grade of the at least one food based on at least one characteristic of the at least one post-prandial glucose trace; and displaying the grade in association with the at least one food in a graphical user interface.

Clause 137. The method of clause 136, wherein the inputted log entry comprises a text description of the consumed meal, and wherein the identifying step comprises using natural language processing.

Clause 138. The method of clause 136, wherein the at least one food is assigned a bad grade in response to a determination that the at least one post-prandial glucose trace related to the consumed meal comprises at least two post-prandial glucose traces having a high glucose pattern.

Clause 139. The method of clause 136, wherein the at least one food is assigned a bad grade in response to a determination that the at least one post-prandial glucose trace does not include at least one post-prandial glucose trace having an in-range post-prandial pattern.

Clause 140. The method of clause 136, wherein the at least one food is assigned a good grade in response to a determination that the at least one post-prandial glucose trace comprises at least one post-prandial glucose trace having an in-range post-prandial pattern.

Clause 141. The method of clause 136, wherein the at least one food is assigned a good grade in response to a determination that the at least one post-prandial glucose trace does not include at least one post-prandial glucose trace having an in-range post-prandial pattern and does not include at least two post-prandial glucose traces having a high glucose pattern.

Clause 142. The method of clause 136, wherein the grade is a range of starts, wherein a higher number of stars indicates a better grade and a lower number of stars indicates a lower grade.

Clause 143. The method of clause 142, wherein a plurality of stars that are a gray color are indicative on an inconclusive grade.

Clause 144. The method of clause 136, wherein the grade is based on at least one characteristic of the at least one post-prandial glucose trace.

Clause 145. The method of clause 144, wherein the at least one characteristic of the at least one post-prandial glucose trace is a degree of a high glucose pattern.

Clause 146. The method of clause 145, wherein the degree of the high glucose pattern is based on an area under the curve above about 180 mg/dL.

Clause 147. The method of clause 145, wherein the degree of the high glucose pattern is based on an amount of time above about 180 mg/dL.

Clause 148. The method of clause 144, wherein the at least one characteristic of the at least one post-prandial glucose trace is an amount of time within a goal range.

Clause 149. The method of clause 148, wherein the goal range is between about 70 mg/dL and 180 mg/dL.

Clause 150. The method of clause 136, wherein the grade is further based on a relationship between a start time of the consumed meal and the at least one characteristic of the at least one post-prandial glucose traces.

Clause 151. The method of clause 136, wherein the grade is further based on an additional logged meal containing the at least one food, wherein the additional logged meal is associated with the at least one post-prandial glucose trace.

Clause 152. The method of clause 136, wherein the grade is further based on a model that maps a plurality of inputs to a grade variable.

Clause 153. The method of clause 152, wherein the grade variable is a range of 0 to 4, wherein 0 corresponds to a 1 star grade and 4 corresponds to a 5 star grade.

Clause 154. A system for analyzing meal data, the system comprising: an input configured to an inputted log entry associated with a consumed meal; a display configured to visually present food data; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; determine a grade of the at least one food based on at least one characteristic of the at least one post-prandial glucose trace; and display the grade in association with the at least one food in a graphical user interface.

Clause 155. The system of clause 154, wherein the inputted log entry comprises a text description of the consumed meal, and wherein the identifying step comprises using natural language processing.

Clause 156. The system of clause 154, wherein the at least one food is assigned a bad grade in response to a determination that the at least one post-prandial glucose trace related to the consumed meal comprises at least two post-prandial glucose traces having a high glucose pattern.

Clause 157. The system of clause 154, wherein the at least one food is assigned a bad grade in response to a determination that the at least one post-prandial glucose trace does not include at least one post-prandial glucose trace having an in-range post-prandial pattern.

Clause 158. The system of clause 154, wherein the at least one food is assigned a good grade in response to a determination that the at least one post-prandial glucose trace comprises at least one post-prandial glucose trace having an in-range post-prandial pattern.

Clause 159. The system of clause 154, wherein the at least one food is assigned a good grade in response to a determination that the at least one post-prandial glucose trace does not include at least one post-prandial glucose trace having an in-range post-prandial pattern and does not include at least two post-prandial glucose traces having a high glucose pattern.

Clause 160. The system of clause 154, wherein the grade is a range of starts, wherein a higher number of stars indicates a better grade and a lower number of stars indicates a lower grade.

Clause 161. The system of clause 160, wherein a plurality of stars that are a gray color are indicative on an inconclusive grade.

Clause 162. The system of clause 154, wherein the grade is based on at least one characteristic of the at least one post-prandial glucose trace.

Clause 163. The system of clause 162, wherein the at least one characteristic of the at least one post-prandial glucose trace is a degree of a high glucose pattern.

Clause 164. The system of clause 163, wherein the degree of the high glucose pattern is based on an area under the curve above about 180 mg/dL.

Clause 165. The system of clause 163, wherein the degree of the high glucose pattern is based on an amount of time above about 180 mg/dL.

Clause 166. The system of clause 162, wherein the at least one characteristic of the at least one post-prandial glucose trace is an amount of time within a goal range.

Clause 167. The system of clause 166, wherein the goal range is between about 70 mg/dL and 180 mg/dL.

Clause 168. The system of clause 154, wherein the grade is further based on a relationship between a start time of the consumed meal and the at least one characteristic of the at least one post-prandial glucose traces.

Clause 169. The system of clause 154, wherein the grade is further based on an additional logged meal containing the at least one food, wherein the additional logged meal is associated with the at least one post-prandial glucose trace.

Clause 170. The system of clause 154, wherein the grade is further based on a model that maps a plurality of inputs to a grade variable.

Clause 171. The system of clause 170, wherein the grade variable is a range of 0 to 4, wherein 0 corresponds to a 1 star grade and 4 corresponds to a 5 star grade.

Clause 172. A method of analyzing meal data, the method comprising: receiving an inputted log entry associated with a consumed meal; identifying at least one food included in the consumed meal; associating the at least one food with at least one post-prandial glucose trace related to the consumed meal; storing the at least one food and the at least one post-prandial glucose trace related to the consumed meal in a database, wherein the database comprises a plurality of foods and associated post-prandial glucose traces for a population; determining a grade for the at least one food, wherein the grade is based on a subset of post-prandial glucose traces associated with the at least one food, and wherein the subset of post-prandial glucose traces are based on a segment of the population; and displaying the grade in association with the at least one food in a graphical user interface.

Clause 173. The method of clause 172, wherein the segment of the population has prediabetes.

Clause 174. The method of clause 172, wherein the segment of the population has Type 1 diabetes.

Clause 175. The method of clause 172, wherein the segment of the population has Type 2 diabetes.

Clause 176. The method of clause 172, wherein the grade is based on at least one characteristic of the subset of post-prandial glucose traces associated with the at least one food.

Clause 177. The method of clause 176, wherein the at least one characteristic is a degree of a high pattern.

Clause 178. The method of clause 177, wherein the degree of the high pattern is based on an area under the curve above about 180 mg/dL.

Clause 179. The method of clause 177, wherein the degree of the high pattern is based on an amount of time above about 180 mg/dL.

Clause 180. The method of clause 176, wherein the at least one characteristic of the at least one post-prandial glucose trace is an amount of time within a goal range.

Clause 181. The method of clause 180, wherein the goal range is between about 70 mg/dL and 180 mg/dL.

Clause 182. The method of clause 176, wherein the grade is further based on a relationship between a start time of the consumed meal and the at least one characteristic of the subset of post-prandial glucose traces associated with the at least one food.

Clause 183. The method of clause 172, wherein the grade is further based on an additional inputted log entry associated with a consumed meal containing the at least one food, wherein the inputted log entry is associated with the at least one post-prandial glucose trace.

Clause 184. A system for analyzing meal data, the system comprising: an input configured to an inputted log entry associated with a consumed meal; a display configured to visually present food data; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; store the at least one food and the at least one post-prandial glucose trace related to the consumed meal in a database, wherein the database comprises a plurality of foods and associated post-prandial glucose traces for a population; determine a grade for the at least one food, wherein the grade is based on a subset of post-prandial glucose traces associated with the at least one food, and wherein the subset of post-prandial glucose traces are based on a segment of the population; and display the grade in association with the at least one food in a graphical user interface.

Clause 185. The system of clause 184, wherein the segment of the population has prediabetes.

Clause 186. The system of clause 184, wherein the segment of the population has Type 1 diabetes.

Clause 187. The system of clause 184, wherein the segment of the population has Type 2 diabetes.

Clause 188. The system of clause 184, wherein the grade is based on at least one characteristic of the subset of post-prandial glucose traces associated with the at least one food.

Clause 189. The system of clause 188, wherein the at least one characteristic is a degree of a high pattern.

Clause 190. The system of clause 189, wherein the degree of the high pattern is based on an area under the curve above about 180 mg/dL.

Clause 191. The system of clause 189, wherein the degree of the high pattern is based on an amount of time above about 180 mg/dL.

Clause 192. The system of clause 188, wherein the at least one characteristic of the at least one post-prandial glucose trace is an amount of time within a goal range.

Clause 193. The system of clause 192, wherein the goal range is between about 70 mg/dL and 180 mg/dL.

Clause 194. The system of clause 188, wherein the grade is further based on a relationship between a start time of the consumed meal and the at least one characteristic of the subset of post-prandial glucose traces associated with the at least one food.

Clause 195. The system of clause 184, wherein the grade is further based on an additional inputted log entry associated with a consumed meal containing the at least one food, wherein the inputted log entry is associated with the at least one post-prandial glucose trace.

Clause 196. A method of recommending food choices, the method comprising: receiving an inputted log entry associated with a consumed meal from a user; identifying at least one food included in the consumed meal; associating the at least one food with at least one post-prandial glucose trace related to the consumed meal; determining a classification of the at least one food based on at least one characteristic of the at least one post-prandial glucose trace; analyzing the classification and the at least one food using a population model comprising a database of food classifications and associated foods for a plurality of population segments; associating the user with a segment of the plurality of population segments based on the classification and the at least one food, wherein the segment of the plurality of population segments is associated with a plurality of foods having a positive classification; and displaying a recommended food, wherein the recommended food is one of the plurality of foods having a positive classification for the segment of the plurality of population segments.

Clause 197. The method of clause 196, wherein the database further comprises meals, post-prandial glucose traces, user demographics, and user preferences.

Clause 198. The method of clause 197, wherein the population model uses machine learning techniques to divide a population into the plurality of population segments.

Clause 199. The method of clause 198, wherein the population model comprises a first model that assigns the user to the segment of the plurality of population segments based on analysis of the classification, the at least one food, at least one post-prandial glucose trace related to the at least one food, demographic information of the user, and preferences of the user.

Clause 200. The method of clause 199, wherein the population model comprises a second model that maps the segment of the plurality of population segments to a plurality of good food items and a plurality of bad food items.

Clause 201. A system for recommending food choices, the system comprising: an input configured to an inputted log entry associated with a consumed meal from a user; a display configured to visually present food; one or more processors coupled with the input, the display, and a memory storing instructions, wherein the instructions, when executed by the one or more processors, cause the one or more processors to: identify at least one food included in the consumed meal; associate the at least one food with at least one post-prandial glucose trace related to the consumed meal; determine a classification of the at least one food based on at least one characteristic of the at least one post-prandial glucose trace; analyze the classification and the at least one food using a population model comprising a database of food classifications and associated foods for a plurality of population segments; associate the user with a segment of the plurality of population segments based on the classification and the at least one food, wherein the segment of the plurality of population segments is associated with a plurality of foods having a positive classification; and display a recommended food, wherein the recommended food is one of the plurality of foods having a positive classification for the segment of the plurality of population segments.

Clause 202. The system of clause 201, wherein the database further comprises meals, post-prandial glucose traces, user demographics, and user preferences.

Clause 203. The system of clause 202, wherein the population model uses machine learning techniques to divide a population into the plurality of population segments.

Clause 204. The system of clause 203, wherein the population model comprises a first model that assigns the user to the segment of the plurality of population segments based on analysis of the classification, the at least one food, at least one post-prandial glucose trace related to the at least one food, demographic information of the user, and preferences of the user.

Clause 205. The system of clause 204, wherein the population model comprises a second model that maps the segment of the plurality of population segments to a plurality of good food items and a plurality of bad food items.

Clause 206. A method for classifying meals, the method comprising the steps of: receiving analyte data and meal information from a subject; classifying a plurality of foods as good or bad based on an effect of each of the plurality of foods on a post-prandial glucose level of the subject; displaying a plurality of foods that have been determined to be good for the subject; displaying a plurality of foods that have been determined to be bad for the subject; and displaying a counter showing a number of foods that have been classified as good and bad.

Clause 207. The method of clause 206, further comprising the steps of: displaying a plurality of foods that have been determined to have a neutral effect on the subject; and displaying a counter showing a number of foods that have been classified as good, bad, and neutral.

Clause 208. The method of clause 206, further comprising the step of: displaying the counter on a home screen.

Clause 209. A system for classifying meals, the system comprising: an input configured to receive analyte data and meal information from a subject; a display configured to visually present a display of meal groupings; one or more processors coupled with the input, the display, and a memory storing instructions, wherein the instructions, when executed by the one or more processors, cause the one or more processors to: classify a plurality of foods as good or bad based on an effect of each of the plurality of foods on a post-prandial glucose level of the subject; display a plurality of foods that have been determined to be good for the subject; display a plurality of foods that have been determined to be bad for the subject; and display a counter showing a number of foods that have been classified as good and bad.

Clause 210. The system of clause 209, wherein the instructions further cause the one or more processors to: display a plurality of foods that have been determined to have a neutral effect on the subject; and display a counter showing a number of foods that have been classified as good, bad, and neutral.

Clause 211. The system of clause 209, wherein the instructions further cause the one or more processors to display the counter on a home screen.

Clause 212. A method for recommending meals, the method comprising: determining a time-of-day period having a highest glucose pattern based on a metric determined with reference to an upper glucose threshold; determining a most frequently logged meal in the time-of-day period having the highest glucose pattern; and displaying an alternative meal suggestion to replace the most frequently logged meal in the time-of-day period having the highest glucose pattern.

Clause 213. The method of clause 212, wherein the upper glucose threshold is about 180 mg/dL.

Clause 214. The method of clause 212, wherein the metric is an area under the curve above about 180 mg/dL.

Clause 215. The method of clause 212, wherein the metric is a time above about 180 mg/dL.

Clause 216. The method of clause 212, wherein the most frequently logged meal in the time-of-day period having the highest glucose pattern is associated with a post-prandial glucose trace having a high glucose pattern.

Clause 217. The method of clause 212, further comprising the step of displaying a comparison of a post-prandial glucose trace associated with the alternative meal suggestion and a post-prandial glucose trace associated with the most frequently logged meal after a user has eaten the alternative meal suggestion.

Clause 218. The method of clause 212, further comprising the step of displaying the alternative meal suggestion in a list of frequently logged foods.

Clause 219. The method of clause 218, wherein the alternative meal suggestion is displayed at the beginning of the list.

Clause 220. The method of clause 212, further comprising the step of determining the alternative meal suggestion by searching a database of healthy options for the time-of-day period having the highest glucose pattern.

Clause 221. The method of clause 212, wherein the time-of-day period is breakfast, lunch, or dinner.

Clause 222. A system for recommending meals, the system comprising: an input configured to receive analyte data and meal information from a subject; a display configured to visually present a display meals or food; one or more processors coupled with the input, the display, and a memory storing instructions, wherein the instructions, when executed by the one or more processors, cause the one or more processors to: determine a time-of-day period having a highest glucose pattern based on a metric determined with reference to an upper glucose threshold; determine a most frequently logged meal in the time-of-day period having the highest glucose pattern; and display an alternative meal suggestion to replace the most frequently logged meal in the time-of-day period having the highest glucose pattern.

Clause 223. The system of clause 222, wherein the upper glucose threshold is about 180 mg/dL.

Clause 224. The system of clause 222, wherein the metric is an area under the curve above about 180 mg/dL.

Clause 225. The system of clause 222, wherein the metric is a time above about 180 mg/dL.

Clause 226. The system of clause 222, wherein the most frequently logged meal in the time-of-day period having the highest glucose pattern is associated with a post-prandial glucose trace having a high glucose pattern.

Clause 227. The system of clause 222, wherein the instructions further cause the one or more processors to: display a comparison of a post-prandial glucose trace associated with the alternative meal suggestion and a post-prandial glucose trace associated with the most frequently logged meal after a user has eaten the alternative meal suggestion.

Clause 228. The system of clause 222, wherein the instructions further cause the one or more processors to: display the alternative meal suggestion in a list of frequently logged foods.

Clause 229. The system of clause 228, wherein the alternative meal suggestion is displayed at the beginning of the list.

Clause 230. The system of clause 222, wherein the instructions further cause the one or more processors to: determine the alternative meal suggestion by searching a database of healthy options for the time-of-day period having the highest glucose pattern.

Clause 231. The system of clause 222, wherein the time-of-day period is breakfast, lunch, or dinner.

Clause 232. A method recommending alternative food choices, the method comprising: receiving an inputted log entry associated with a consumed meal, wherein the inputted log entry comprises a text description with the consumed meal; identifying at least one food included in the text description of the at least one logged meal; associating the at least one food with at least one post-prandial glucose trace related to the consumed meal; determining a classification of the at least one food as positive or negative based on an effect of the at least one food on the post-prandial glucose trace; storing the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determining an alternative food choice from the plurality of alternative food choices; and displaying a recommendation comprising the alternative food choice as a replacement of the at least one food that was classified as bad.

Clause 233. The method of clause 232, wherein the alternative food choices have been classified as good for a plurality of individuals.

Clause 234. The method of clause 232, further comprising the steps of: determining a time-of-day period having a highest glucose pattern for a user based on a metric determined with reference to an upper glucose threshold; determining a most frequently logged food in the time-of-day period having the highest glucose pattern; and displaying an additional alternative food choice to replace the most frequently logged food.

Clause 235. The method of clause 232, further comprising the steps of: prompting a user for input on food preferences; and displaying an additional alternative food choice to replace the at least one food that was classified as bad based on the database and the food preferences inputted by the user.

Clause 236. A system for recommending alternative food choices, the system comprising: an input configured to receive an inputted log entry associated with a consumed meal, wherein the inputted log entry comprises a text description with the consumed meal; a display configured to visually present a display meals or food; one or more processors coupled with the input, the display, and a memory storing instructions, wherein the instructions, when executed by the one or more processors, cause the one or more processors to: identify at least one food included in the text description of the at least one logged meal; associate the at least one food with at least one post-prandial glucose trace related to the consumed meal; determine a classification of the at least one food as positive or negative based on an effect of the at least one food on the post-prandial glucose trace; store the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determine an alternative food choice from the plurality of alternative food choices; and display a recommendation comprising the alternative food choice as a replacement of the at least one food that was classified as bad.

Clause 237. The system of clause 236, wherein the alternative food choices have been classified as good for a plurality of individuals.

Clause 238. The system of clause 236, wherein the instructions further cause the one or more processors to: determine a time-of-day period having a highest glucose pattern for a user based on a metric determined with reference to an upper glucose threshold; determine a most frequently logged food in the time-of-day period having the highest glucose pattern; and display an additional alternative food choice to replace the most frequently logged food.

Clause 239. The system of clause 236, wherein the instructions further cause the one or more processors to: prompt a user for input on food preferences; and display an additional alternative food choice to replace the at least one food that was classified as bad based on the database and the food preferences inputted by the user.

Clause 240. A method for recommending alternative food choices, comprising the steps of: identifying at least one food included in the text description of the at least one logged meal; associating the at least one food with at least one post-prandial glucose trace related to the consumed meal; determining a classification of the at least one food as positive or negative based on an effect of the at least one food on the post-prandial glucose trace; storing the at least one food, the at least one post-prandial glucose trace related to the consumed meal, and the classification in a database, wherein the database comprises a plurality of foods, associated post-prandial glucose traces, and classifications for a population and a plurality of alternative food choices; in response to a classification of the at least one food as bad, determining an alternative food choice from the plurality of alternative food choices; and displaying a recommendation comprising the alternative food choice as a replacement of the at least one food that was classified as bad.

Clause 241. The method of clause 240, wherein the alternative food choices have been classified as good for a plurality of individuals.

Clause 242. The method of clause 240, further comprising the steps of: determining a time-of-day period having a highest glucose pattern for a user based on a metric determined with reference to an upper glucose threshold; determining a most frequently logged food in the time-of-day period having the highest glucose pattern; and displaying an additional alternative food choice to replace the most frequently logged food.

Clause 243. The method of clause 240, further comprising the steps of: prompting a user for input on food preferences; and displaying an additional alternative food choice to replace the at least one food that was classified as bad based on the database and the food preferences inputted by the user.

Clause 244. A method of analyzing meal data, the method comprising: receiving an inputted log entry from a user associated with a consumed meal; determining a grade for the consumed meal based on at least one characteristic of at least one post-prandial glucose trace associated with the consumed meal, wherein the grade is changeable; and displaying the grade in association with the consumed meal in a graphical user interface.

Clause 245. The method of clause 244, wherein the grade may be changed by the user.

Clause 246. The method of clause 244, wherein the inputted log entry was received at a first time, further comprising the step of: removing the grade for the consumed meal after a period of time after the first time.

Clause 247. The method of clause 246, wherein the period of time is about 6 months.

Clause 248. The method of clause 244, wherein the inputted log entry was received at a first time, further comprising the step of determining a new grade to the at least one logged meal after a period of time after the first time.

Clause 249. The method of clause 248, wherein the period of time is about 6 months.

Clause 250. A system for analyzing meals, comprising: an input configured to receive receiving an inputted log entry from a user associated with a consumed meal; a display configured to visually present a display meals or food and a grade; one or more processors coupled with the input, the display, and a memory storing instructions, wherein the instructions, when executed by the one or more processors, cause the one or more processors to: determine a grade for the consumed meal based on at least one characteristic of at least one post-prandial glucose trace associated with the consumed meal, wherein the grade is changeable; and display the grade in association with the consumed meal in a graphical user interface.

Clause 251. The system of clause 250, wherein the grade may be changed by the user.

Clause 252. The system of clause 250, wherein the inputted log entry was received at a first time, wherein the instructions further cause the one or more processors to: remove the grade for the consumed meal after a period of time after the first time.

Clause 253. The system of clause 252, wherein the period of time is about 6 months.

Clause 254. The system of clause 250, wherein the inputted log entry was received at a first time, further comprising the step of determining a new grade to the at least one logged meal after a period of time after the first time.

Clause 255. The system of clause 254, wherein the period of time is about 6 months.

What is claimed is:

1. A system for processing analyte data, comprising:
   wireless communications circuitry configured to receive measured analyte data;
   a display configured to visually present analytics of the measured analyte data; and
   one or more processors coupled with the wireless communication circuitry, the display, and a memory storing instructions, wherein the instructions, when executed by the one or more processors, cause the one or more processors to:
   detect an episode in the received analyte data;
   display a first episode marker associated with the detected episode with a graph of analyte data, wherein the first episode marker is configured to indicate to a user to input information regarding the detected episode, wherein the first episode marker is placed at a time with the graph of analyte data at an estimated start time of the detected episode;
   receive, from the user, the information regarding the detected episode; and
   in response to receiving the information regarding the detected episode, replace, by the one or more processors, the first episode marker with a second episode marker, wherein the second episode marker is based on the received information regarding the detected episode, and wherein the second episode marker is displayed with the graph of analyte data after the information is received regarding the detected episode.

2. The system of claim 1, wherein the instructions further cause the one or more processors to display a notification that the episode was detected.

3. The system of claim 2, wherein the detected episode comprises a plurality of detected episodes, and wherein the notification comprises displaying a numeric value corresponding to a number of episodes in the plurality of detected episodes on an icon.

4. The system of claim 3, wherein the numeric value is incremented when an additional episode is detected.

5. The system of claim 3, wherein the numeric value is decremented after the information has been received for the detected episode.

6. The system of claim 3, wherein the numeric value is decremented after a predetermined time has passed after the episode was detected.

7. The system of claim 2, wherein the notification is displayed as an alert.

8. The system of claim 1, wherein the first episode marker is different from the second episode marker.

9. The system of claim 1, wherein the first episode marker comprises a question mark.

10. The system of claim 1, wherein the second episode marker comprises a picture related to the received information.

11. The system of claim 1, wherein the second episode marker comprises an X.

12. The system of claim 1, wherein the detected episode is an out-of-range episode.

13. The system of claim 1, wherein the analyte data is glucose data.

14. The system of claim 1, wherein the received information regarding the detected episode is further displayed in an abbreviated form below the graph of analyte data.

15. The system of claim 1, wherein the received information comprises a description of a meal.

16. The system of claim 1, wherein the received information comprises an indication of a size of a meal.

* * * * *